(12) United States Patent
Schmid et al.

(10) Patent No.: US 7,139,709 B2
(45) Date of Patent: Nov. 21, 2006

(54) MIDDLEWARE LAYER BETWEEN SPEECH RELATED APPLICATIONS AND ENGINES

(75) Inventors: Philipp Heinz Schmid, Seattle, WA (US); Ralph Lipe, Clyde Hill, WA (US); Robert Chambers, Issaquah, WA (US); Edward Connell, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 991 days.

(21) Appl. No.: 09/751,836

(22) Filed: Dec. 29, 2000

(65) Prior Publication Data

US 2002/0069065 A1  Jun. 6, 2002

Related U.S. Application Data

(60) Provisional application No. 60/219,861, filed on Jul. 20, 2000.

(51) Int. Cl.
*G01L 13/00* (2006.01)
*G01L 11/00* (2006.01)
*G01L 21/00* (2006.01)

(52) U.S. Cl. .................. 704/258; 704/270; 704/275

(58) Field of Classification Search .............. 704/235, 704/251, 257, 260, 258
See application file for complete search history.

(56) References Cited

U.S. PATENT DOCUMENTS

| | | | |
|---|---|---|---|
| 4,771,401 A | 9/1988 | Kaufman et al. | 715/533 |
| 4,914,590 A | 4/1990 | Loatman et al. | 704/8 |
| 5,621,859 A | 4/1997 | Schwartz et al. | 704/256 |
| 5,717,747 A * | 2/1998 | Boyle et al. | 379/201.03 |
| 5,748,974 A * | 5/1998 | Johnson | 704/9 |
| 5,799,273 A * | 8/1998 | Mitchell et al. | 704/235 |
| 5,819,220 A | 10/1998 | Sarukkai et al. | 704/270.1 |
| 5,864,863 A | 1/1999 | Burrows | 707/103 R |
| 5,865,626 A | 2/1999 | Beattie et al. | 434/185 |
| 5,913,192 A | 6/1999 | Parthasarathy et al. | 704/256 |
| 5,933,525 A | 8/1999 | Makhoul et al. | 382/186 |
| 5,991,720 A | 11/1999 | Galler et al. | 704/256 |
| 5,995,928 A | 11/1999 | Nguyen et al. | 704/251 |
| 6,018,708 A | 1/2000 | Dahan et al. | 704/244 |
| 6,021,409 A | 2/2000 | Burrows | 707/102 |
| 6,044,347 A * | 3/2000 | Abella et al. | 704/272 |
| 6,064,959 A | 5/2000 | Young et al. | 704/251 |
| 6,076,056 A | 6/2000 | Huang et al. | 704/254 |
| 6,138,098 A | 10/2000 | Shieber et al. | 704/257 |
| 6,233,559 B1 * | 5/2001 | Balakrishnan | 704/275 |
| 6,243,678 B1 | 6/2001 | Erhart et al. | 704/249 |
| 6,314,399 B1 | 11/2001 | Deligne et al. | 704/257 |
| 6,345,245 B1 * | 2/2002 | Sugiyama et al. | 704/10 |
| 6,374,226 B1 * | 4/2002 | Hunt et al. | 704/275 |
| 6,377,913 B1 * | 4/2002 | Coffman et al. | 704/8 |
| 6,377,925 B1 * | 4/2002 | Greene et al. | 704/271 |

(Continued)

OTHER PUBLICATIONS

Hataoka et al. "Sophisticated Speech Processing Middleware on Microprocessor", 1999 IEEE 3rd workshop on multimedia signal processing: Copenhagen, Sep. 13-15, 1999.*

(Continued)

*Primary Examiner*—David R Hudspeth
*Assistant Examiner*—Matthew J Sked
(74) *Attorney, Agent, or Firm*—Joseph R. Kelly; Westman, Champlin & Kelly, P.A.

(57) ABSTRACT

The present invention provides an application-independent and engine-independent middleware layer between applications and engines. The middleware provides speech-related services to both applications and engines, thereby making it far easier for application vendors and engine vendors to bring their technology to consumers.

3 Claims, 14 Drawing Sheets

U.S. PATENT DOCUMENTS

| | | | |
|---|---|---|---|
| 6,456,974 B1* | 9/2002 | Baker et al. | 704/270.1 |
| 6,466,909 B1* | 10/2002 | Didcock | 704/260 |
| 6,487,533 B1* | 11/2002 | Hyde-Thomson et al. | 704/260 |
| 6,513,009 B1* | 1/2003 | Comerford et al. | 704/270 |
| 6,526,381 B1* | 2/2003 | Wilson | 704/251 |
| 6,535,886 B1 | 3/2003 | Koontz | 707/102 |
| 6,618,703 B1* | 9/2003 | Peres et al. | 704/270 |
| 6,636,831 B1* | 10/2003 | Profit et al. | 704/275 |
| 2001/0032207 A1* | 10/2001 | Hartley et al. | 707/102 |
| 2002/0138265 A1 | 9/2002 | Stevens et al. | 704/251 |
| 2004/0174996 A1* | 9/2004 | Tewfik et al. | 380/44 |

OTHER PUBLICATIONS

"Java Speech API Programmer's Guide" Sun Microsystems, Version 1.0, Oct. 26, 1998.*

Isolated-word sentence recognition using probabilistic context-free grammar By: G.J.F. Jones et al. Eurospeech 91, 2nd European Conf. On Speech Comm. and Tech. Proceedings p. 487-9, vol. 2.

Context-free grammar driven, frame synchronous HMM-based continuous speech recognition methods using word spotting By: S. Nakagawa et al. Transactions of the Inst. of Electr., Information and Communication Engineers D-II vol. J76D-II, No. 7, p. 1329-36.

One-pass continuous speech recognition directed by generalized LR parsing By: K. Kita et al., ICSLP 94. 1994 International Conference on Spoken Language Processing.

The ARISTOTLE speech recognition system By: C. Waters et al., Progress in Connectionist-Based Information Systems.

A context-free grammar compiler for speech understanding systems By: M.K. Brown et al. ICSLP 94. 1994 International Conference on Spoken Language Processing Part. vol. 1, p. 21-4.

Efficient word-graph parsing and search with a stochastic context-free grammar By: C.J. Waters et al., 1997 IEEE Workshop on Automatic Speech Recognition and Understanding Proceedings.

Dynamic programming parsing for context-free grammar in continuous speech recognition By: H. Ney, IEEE Transactions on Signal Processing, vol. 39, No. 2, p. 336-40.

Using a stochastic context-free grammar as a language model for speech recognition By: D. Jurafsky, et al., 1995 International Conference on Acoustics, Speech, and Signal Processing. Part 1, p. 189-92, vol 1.

Development of an effective context-free parser for continuous stochastic languages By: L.R. Strydom et al., AFRICON 96'. Incorporating AP-MTT-96 and COMSIG-96.

Reliable utterance segment recognition by integrating a grammar with statistical language constraints By: H. Tsukada et al., Speech Communication vol. 26, No. 4, p. 299-309.

Active middleware services in a decision support system for managing highly available distributed resources By: S.A. Fakhouri et al., International Conf. On Distributed Systems Platforms and Open Distributed Processing. Lecture Notes in Computer Science vol. 1795, p. 349-71.

Improving scalability of event-driven distributed objects architectures. By: D. Mencnarowski et al., Poland Journal: Software-Practice and Experience vol. 30, No. 13, p. 1509-29.

Improved spelling recognition using a tree-based fast lexical match. By: C.D. Mitchell et al., 1999 IEEE International Conf. On Acoustics, Speech and Signal Proceedings. vol. 2, p. 597-600.

Event management components for the 3/sup rd/ generation OSS By: S, Desrochers et al., Proceedings of Network Operations and Management Symposium Conference Date: Apr. 10-14, 2000 Conference Location: Honolulu, HI, USA.

A context-dependent similarity measure for strings By: E. Tanaka. Transactions of the Institute of Electronics and Communication Engineers of Japan, Part A, VO.. J67A, No. 6, p. 612-13.

READY: a high performance event notification service By: Gruber, R.E. et al. Proceedings 16th International Conference on Data Engineering Conference Sponsor: IEEE Comput. Soc. Tech. Committee on Data Eng. Conference Date: Feb. 29-Mar. 3, 2000 Conference Location: San Diego, CA, USA.

An event notification framework based on Java and CORBA By: Tomono, M. Japan Conference Title: Integrated Network Management VI. Distributed Management for the Networked Millennium.

Mobile Streams By: Ranganathan, M et al., Proceedings of the Sixth Annual Tcl/Tk Conference p. 203-4 Publisher: USENIX Assoc, Berkeley, CA, USA Publication Date: 1998.

A flexible and recoverable client/server database event notification system By: Hanson, E.N. et al., VLDB Journal vol. 7, No. 1 p. 12-24, 1998.

Using events to build distributed applications Author(s): Bacon, J. et al., Second International Workshop on Services in Distributed and Networked Environments Conference Sponsor: IEEE Comput. Soc. Tech. Committee on Distributed Process Conference Date: Jun. 5-6, 1995.

High-Performance Alphabet Recognition, IEEE Speech and Audio Processing, By: Philipos C. Loizue et al. Nov. 1996, vol. 4, No. 6, pp. 430-445.

Speaker-Independent Name Retrieval From Spellings Using a Database of 50,000 Names, By: Ronald A. Cole et al., 1991 International Conference on Acoustics, Speech, and Signal Processing vol. 5, pp. 325-328.

IBM Voicetype Software, By: R. Fletcher, IEE Colloquium on the Language Toolkit Engineers in Business.

Temporal Decomposition and Acoustic-Phonetic Decoding for the Automatic Recognition of Continuous Speech By: P. Deleglise et al. 9th International Conference on Pattern Recognition. vol. 11, pp. 839-841.

Improving Recognizer Acceptance Through Robust, Natural Speech Repair By: Arthur E. McNair et al., 1994 International Conference on Spoken Language Processing. pp. S22-15.1-S22-15.4.

Automated Directory Listing Retrieval System Based on Isolated Word Recognition By: Bernd Aldefeld et al., Proceedings of the IEEE, vol. 68, No. 11, Nov. 80 pp. 1364-1379.

Empirical evaluation of interactive multimodal error correction, By: Suhm, B., 1997 IEEE Workshop on Automatic Speech Recognition and Understanding Proceedings.

Noise robust speech recognition makes in-car navigation safe and affordable By: Smolders, J. et al. 'Steps Forward'. Proceedings of the Second World Congress on Intellectual Transport Systems '95 Yokohama Part vol. 2 p. 601-4 vol. 2.

Building a listener engine: a Smalltalk interface to speech recognition By: LaLonde, W., Pugh, J. Journal: Journal of Object Oriented Programming (JOOP) vol. 10, No. 7 1997-1998.

LEAP: Language Enabled Application By: Alabiso, B. ; Kronfeld, A. First International Workshop on Human-Computer Conversation. Draft Proceedings p. 15.

Tools for developing voice-operated applications By: Newstadt, R.E., Speech Technology vol. 4, No. 4, p. 62-6.

Examining Microsoft's Speech SDK By: Davis, P., Dr. Dobb's Journal vol. 24, No. 7 p. 86, 88-90. 1999.

Speech processing technology towards practical use By: Shirai, K.; Kobayashi, T.; Kudo, I., Joho Shori vol. 38, No. 11 p. 971-5.

Recent improvements on Microsoft's trainable text-to-speech system—Whistler By: Haung, X et al., 1997 IEEE International Conference on Acoustics, Speech and Signal Processing (Cat. No. 97CB36052) Part vol. 2 p. 959-62 vol. 2.

Software text-to-speech By: Hallahan, W.J.; Vitale, A.J., Journal: International Journal of Speech Technology vol. 1, No. 2 p. 121-34.

Japanese text-to-speech software (FLUET) based on waveform synthesis method By: Hakoda, K.; Tsukada, H.; Hirokawa, T.; Yoshida, Y.: Mizuno, H.

DECtalk Software: text-to-speech technology and implementation By: Hallahan, W.I., : Digital Technical Journal vol. 7, No. 4 p. 5-19.

The InfoPad user interface By: Burstein, A. et al., Digest of Papers. COMPCON '95. Technologies for the Information Superhighway.

Hataoka et al. "Sophisticated Speech Processing Middleware on Microprocessor", 1999 IEEE 3$^{rd}$ Worskshop on multimedia signal processing: Copenhagen, Sep. 13-15 1999.

* cited by examiner

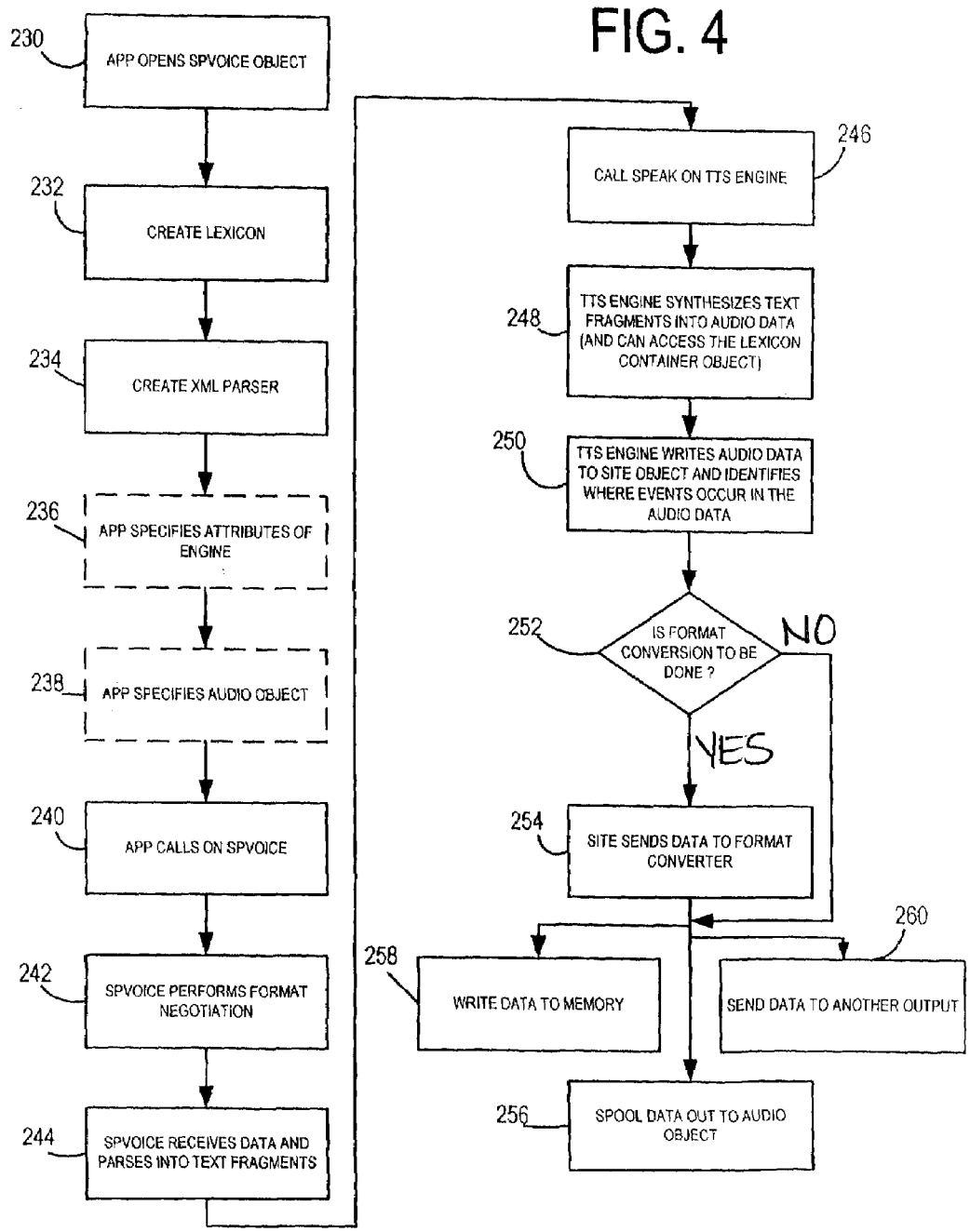

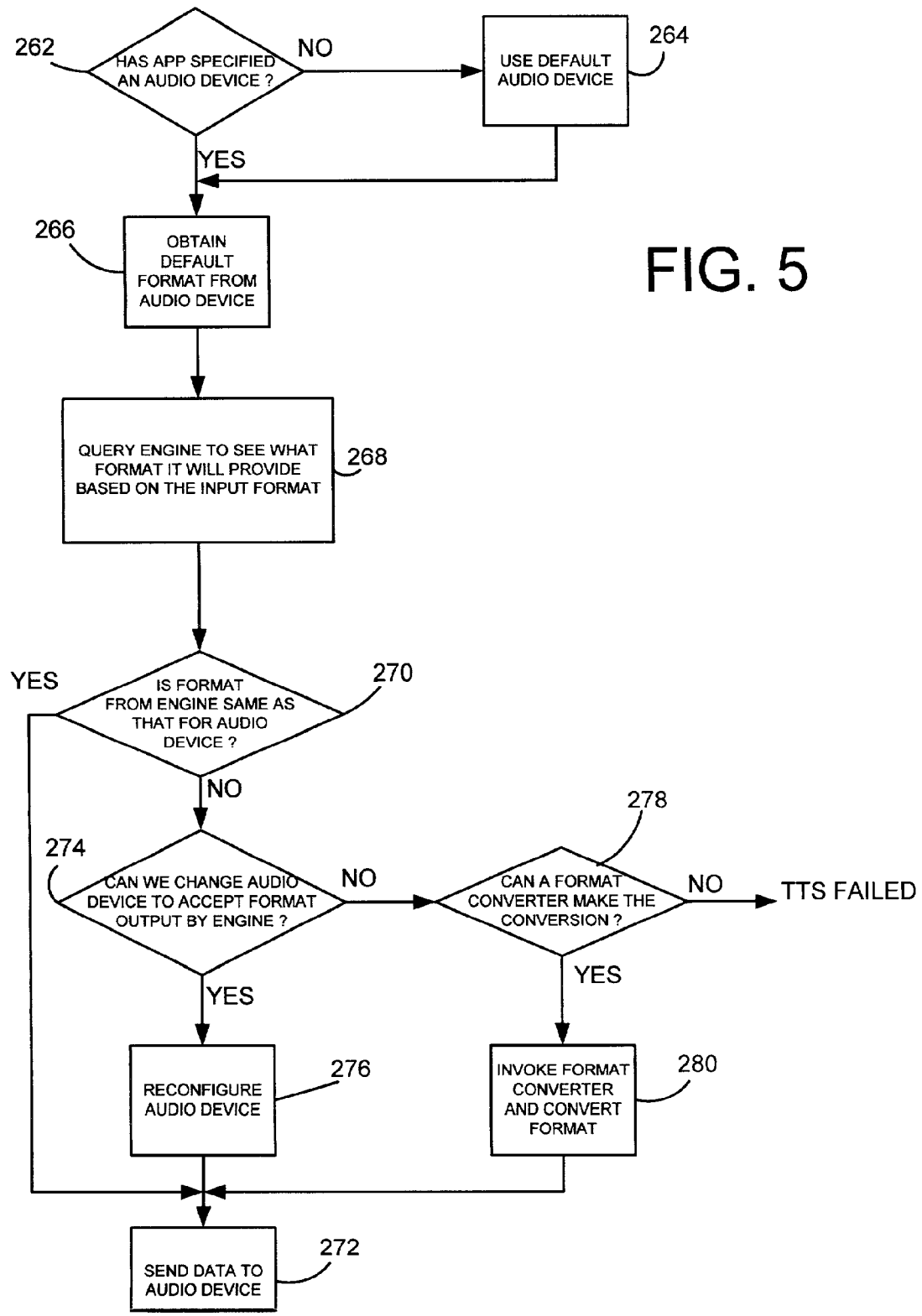

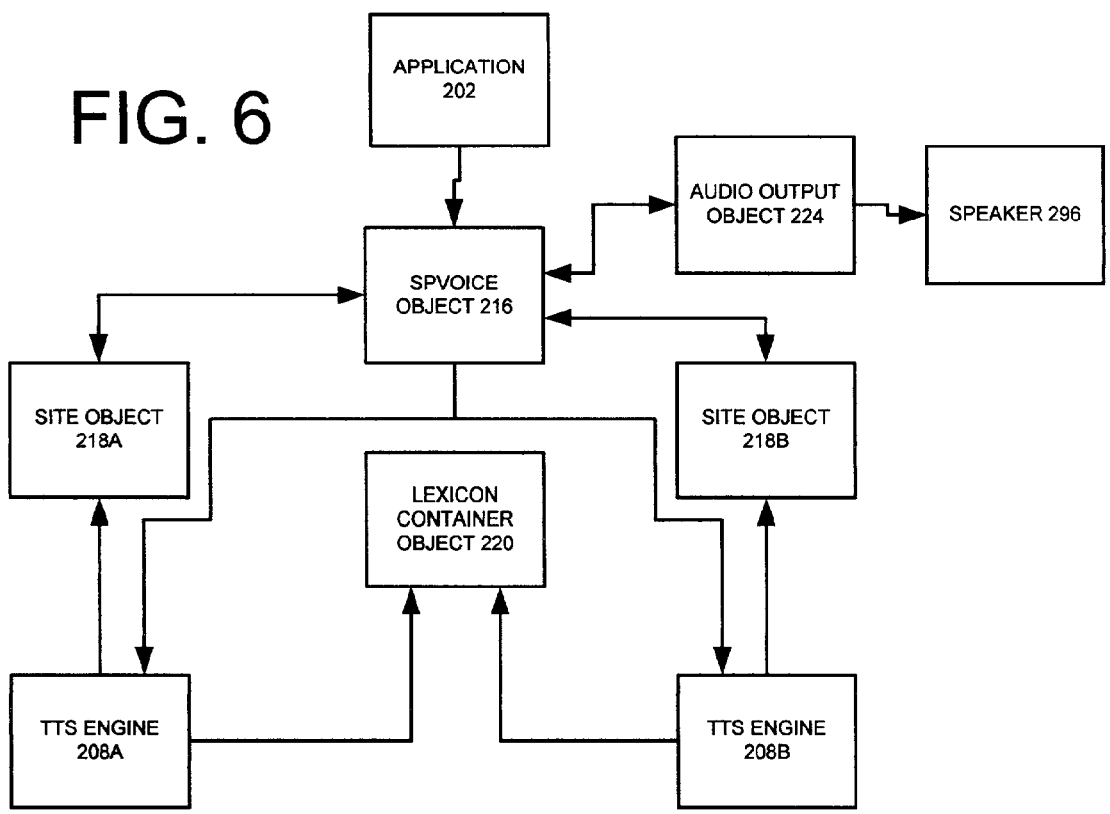
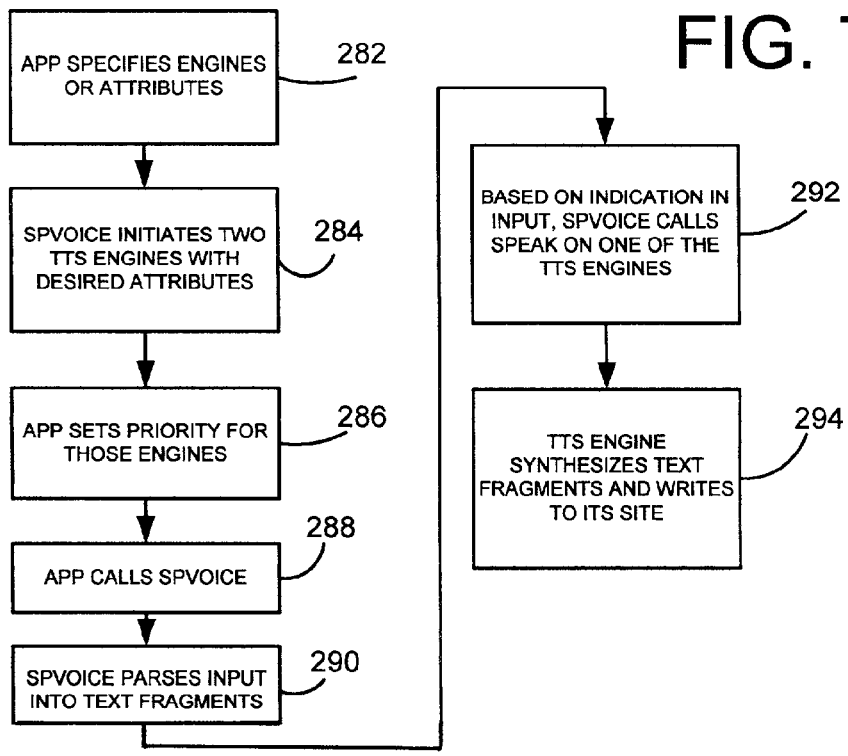

MIDDLEWARE LAYER BETWEEN SPEECH RELATED APPLICATIONS AND ENGINES

The present application is based on and claims the benefit of U.S. provisional patent application Ser. No. 60/219,861, filed Jul. 20, 2000, the content of which is hereby incorporated by reference in its entirety.

BACKGROUND OF THE INVENTION

The present invention deals with services for enabling speech recognition and speech synthesis technology. In particular, the present invention relates to a middleware layer which resides between applications and engines (i.e., speech recognizers and speech synthesizers) and provides services, on an application-independent and engine-independent basis, for both applications and engines.

Speech synthesis engines typically include a decoder which receives textual information and converts it to audio information which can be synthesized into speech on an audio device. Speech recognition engines typically include a decoder which receives audio information in the form of a speech signal and identifies a sequence of words from the speech signal.

In the past, applications which invoked these engines communicated directly with the engines. Because the engines from each vendor interacted with applications directly, the behavior of that interaction was unpredictable and inconsistent. This made it virtually impossible to change synthesis or recognition engines without inducing errors in the application. It is believed that, because of these difficulties, speech recognition technology and speech synthesis technology have not quickly gained wide acceptance.

In an effort to make such technology more readily available, an interface between engines and applications was specified by a set of application programming interfaces (API's) referred to as the Microsoft Speech API version 4.0 (SAPI4). Though the set of API's in SAPI4 specified direct interaction between applications and engines, and although this was a significant step forward in making speech recognition and speech synthesis technology more widely available, some of these API's were cumbersome to use, required the application to be apartment threaded, and did not support all languages.

The process of making speech recognition and speech synthesis more widely available has encountered other obstacles as well. For example, many of the interactions between the application programs and the engines can be complex. Such complexities include cross-process data marshalling, event notification, parameter validation, default configuration, and many others. Conventional operating systems provide essentially no assistance to either application vendors, or speech engine vendors, beyond basic access to audio devices. Therefore, application vendors and engine vendors have been required to write a great deal of code to interface with one another.

SUMMARY OF THE INVENTION

The present invention provides an application-independent and engine-independent middleware layer between applications and engines. The middleware provides speech-related services to both applications and engines, thereby making it far easier for application vendors and engine vendors to bring their technology to consumers.

In one embodiment, the middleware layer provides a rich set of services between speech synthesis applications and synthesis engines. Such services include parsing of input data into text fragments, format negotiation and conversion to obtain optimized data formats, selecting default values and managing data output to an audio device.

In another embodiment, the middleware layer manages single-application, multivoice processes. The middleware layer, in another embodiment, also manages multi-application, multivoice mixing processes.

In yet another embodiment, the invention includes a middleware component between speech recognition applications and speech recognition engines. In such an embodiment, the middleware layer illustratively generates a set of COM objects which configures the speech recognition engine, handles event notification and enables grammar manipulation.

In yet another embodiment, the middleware layer between the speech recognition application and speech recognition engine marshals calls from multiple application process to the speech recognition engine, and directs recognition results to the appropriate application process.

BRIEF DESCRIPTION OF THE DRAWINGS

FIG. 4 is a flow diagram illustrating the general operation of the system shown in FIG. 3.

FIG. 5 is a flow diagram illustrating format negotiation and conversion.

FIG. 6 is a more detailed block diagram of a multivoice implementation of the present invention.

FIG. 7 is a flow diagram illustrating the operation of the system shown in FIG. 6.

Appendix A illustrates an exemplary set of APIs.
Appendix B illustrates an exemplary set of DDIs.

DETAILED DESCRIPTION OF ILLUSTRATIVE EMBODIMENTS

Figure 1:
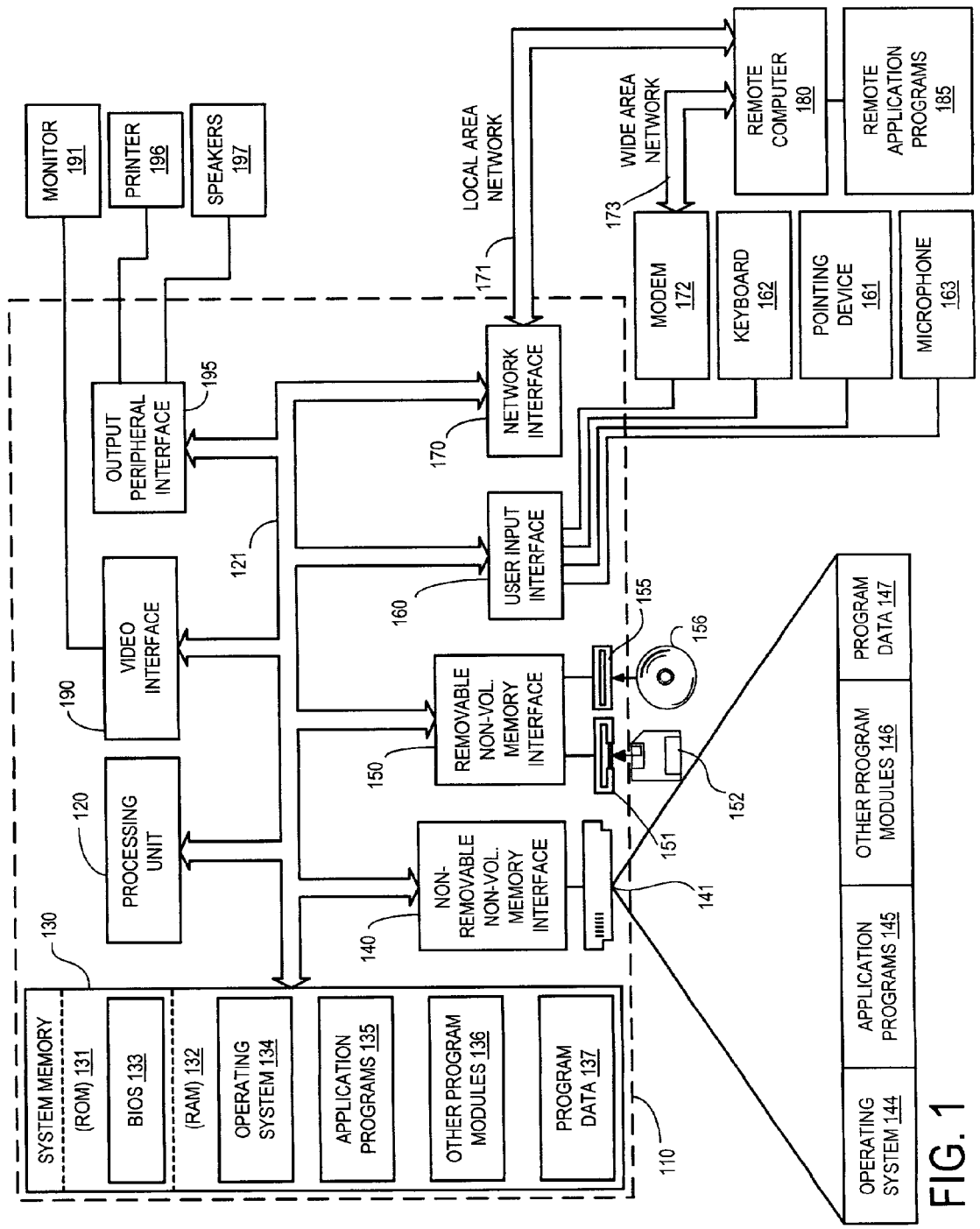
FIG. 1 is a block diagram of a general computing environment in which the present invention may be practiced.

FIG. 1 illustrates an example of a suitable computing system environment 100 on which the invention may be implemented. The computing system environment 100 is only one example of a suitable computing environment and is not intended to suggest any limitation as to the scope of use or functionality of the invention. Neither should the computing environment 100 be interpreted as having any dependency or requirement relating to any one or combination of components illustrated in the exemplary operating environment 100.

The invention is operational with numerous other general purpose or special purpose computing system environments or configurations. Examples of well known computing systems, environments, and/or configurations that may be suitable for use with the invention include, but are not limited to, personal computers, server computers, hand-held or laptop devices, multiprocessor systems, microprocessor-based systems, set top boxes, programmable consumer electronics, network PCs, minicomputers, mainframe computers, distributed computing environments that include any of the above systems or devices, and the like.

The invention may be described in the general context of computer-executable instructions, such as program modules, being executed by a computer. Generally, program modules include routines, programs, objects, components, data structures, etc. that perform particular tasks or implement particular abstract data types. The invention may also be practiced in distributed computing environments where tasks are performed by remote processing devices that are linked through a communications network. In a distributed computing environment, program modules may be located in both local and remote computer storage media including memory storage devices.

With reference to FIG. 1, an exemplary system for implementing the invention includes a general purpose computing device in the form of a computer 110. Components of computer 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

Computer 110 typically includes a variety of computer readable media. Computer readable media can be any available media that can be accessed by computer 110 and includes both volatile and nonvolatile media, removable and non-removable media. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computer 100. Communication media typically embodies computer readable instructions, data structures, program modules or other data in a modulated data signal such as a carrier WAV or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, FR, infrared and other wireless media. Combinations of any of the above should also be included within the scope of computer readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way o example, and not limitation, FIG. 1 illustrates operating system 134, application programs 135, other program modules 136, and program data 137.

The computer 110 may also include other removable/non-removable volatile/nonvolatile computer storage media. By way of example only, FIG. 1 illustrates a hard disk drive 141 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media discussed above and illustrated in FIG. 1, provide storage of computer readable instructions, data structures, program modules and other data for the computer 110. In FIG. 1, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145 other program modules 146, and program data 147 are given different numbers here to illustrate that, at a minimum, they are different copies.

A user may enter commands and information into the computer 110 through input devices such as a keyboard 162, a microphone 163, and a pointing device 161, such as a mouse, trackball or touch pad. Other input devices (not shown) may include a joystick, game pad, satellite dish, scanner, or the like. These and other input devices are often connected to the processing unit 120 through a user input interface 160 that is coupled to the system bus, but may be connected by other interface and bus structures, such as a parallel port, game port or a universal serial bus (USB). A monitor 191 or other type of display device is also connected to the system bus 121 via an interface, such as a video interface 190. In addition to the monitor, computers may also include other peripheral output devices such as speakers 197 and printer 196, which may be connected through an output peripheral interface 190.

The computer 110 may operate in a networked environment using logical connections to one or more remote computers, such as a remote computer 180. The remote computer 180 may be a personal computer, a hand-held device, a server, a router, a network PC, a peer device or other common network node, and typically includes many or all of the elements described above relative to the computer 110. The logical connections depicted in FIG. 1 include a local area network (LAN) 171 and a wide area network (WAN) 173, but may also include other networks. Such networking environments are commonplace in offices, enterprise-wide computer networks, intranets and the Internet.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160, or other appropriate mechanism. In a networked environment, program modules depicted relative to the computer 110, or portions thereof, may be stored in the remote memory storage device. By way of example, and not limitation, FIG. 1 illustrates remote application programs 185 as residing on remote computer 180. It will be appreciated that the network connections shown are exemplary and other means of establishing a communications link between the computers may be used.

Figure 2:
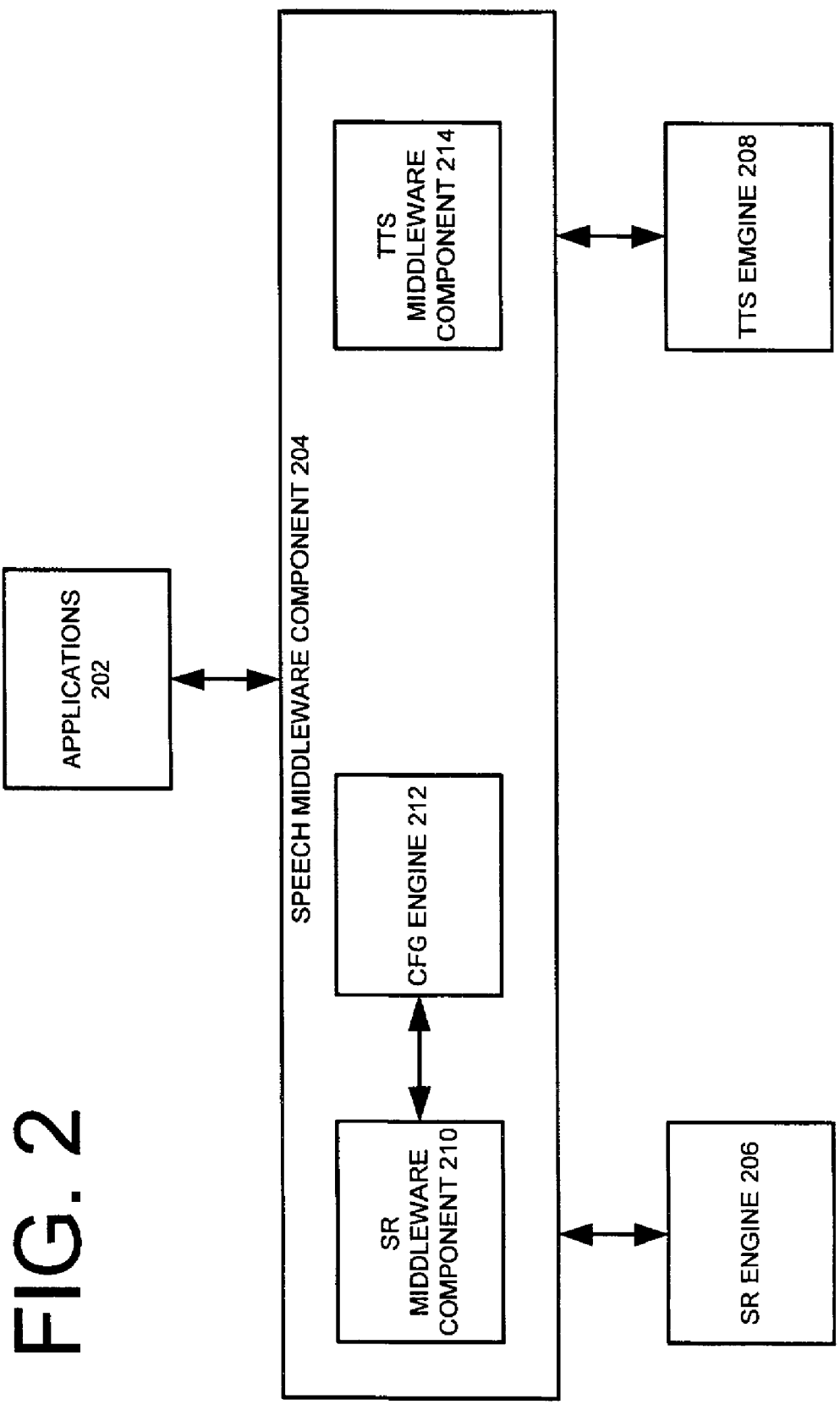
FIG. 2 is a block diagram of a speech recognition system in accordance with the present invention.

FIG. 2 is a more detailed block diagram of a speech recognition system 200 in accordance with one embodiment of the of the present invention. It should be noted that speech recognition system 200 can be incorporated into the environment illustrated in FIG. 1. Speech recognition system 200 includes one or more speech recognition applications 202, speech middleware component 204, one or more speech recognition engines 206 and one or more text-to-speech engines (synthesizers) 208.

In one illustrative embodiment, speech middleware component 204 is implemented in the operating system 134 illustrated in FIG. 1. Speech middleware component 204, as shown in FIG. 2, includes speech recognition middleware component 210, context free grammar (CFG) engine 212 and text-to-speech middleware component 214.

Briefly, in operation, speech middleware component 204 resides between applications 202 and engines 206 and 208. Applications 202 can be speech recognition and speech synthesis applications which desire to invoke engines 206 and 208. In doing so, applications 202 make calls to speech middleware component 204 which, in turn, makes calls to the appropriate engines 206 and 208 in order to have speech recognized or synthesized. For example, applications 202 may provide the source of audio data for speech recognition. Speech middleware component 204 passes that information to speech recognition engine 206 which simply recognizes the speech and returns a recognition result to speech recognition middleware component 210. Speech recognition middleware component 210 places the result in a desired format and returns it to the application 202 which requested it. Similarly, an application 202 can provide a source of textual data to be synthesized. TTS middleware component 214 assembles that data, and provides it to TTS engine 208, for synthesis. TTS engine 208 simply synthesizes the data and returns audio information to TTS middleware component 214, which handles spooling of that information to an audio device, writing that information to memory, or placing that information in any other desired location, as specified by the application 202 which requested it.

CFG engine 212, briefly, assembles and maintains grammars which are to be used by speech recognition engine 206. This allows multiple applications and multiple grammars to be used with a single speech recognition engine 206. This is discussed in greater detail later in the specification.

Figure 3:
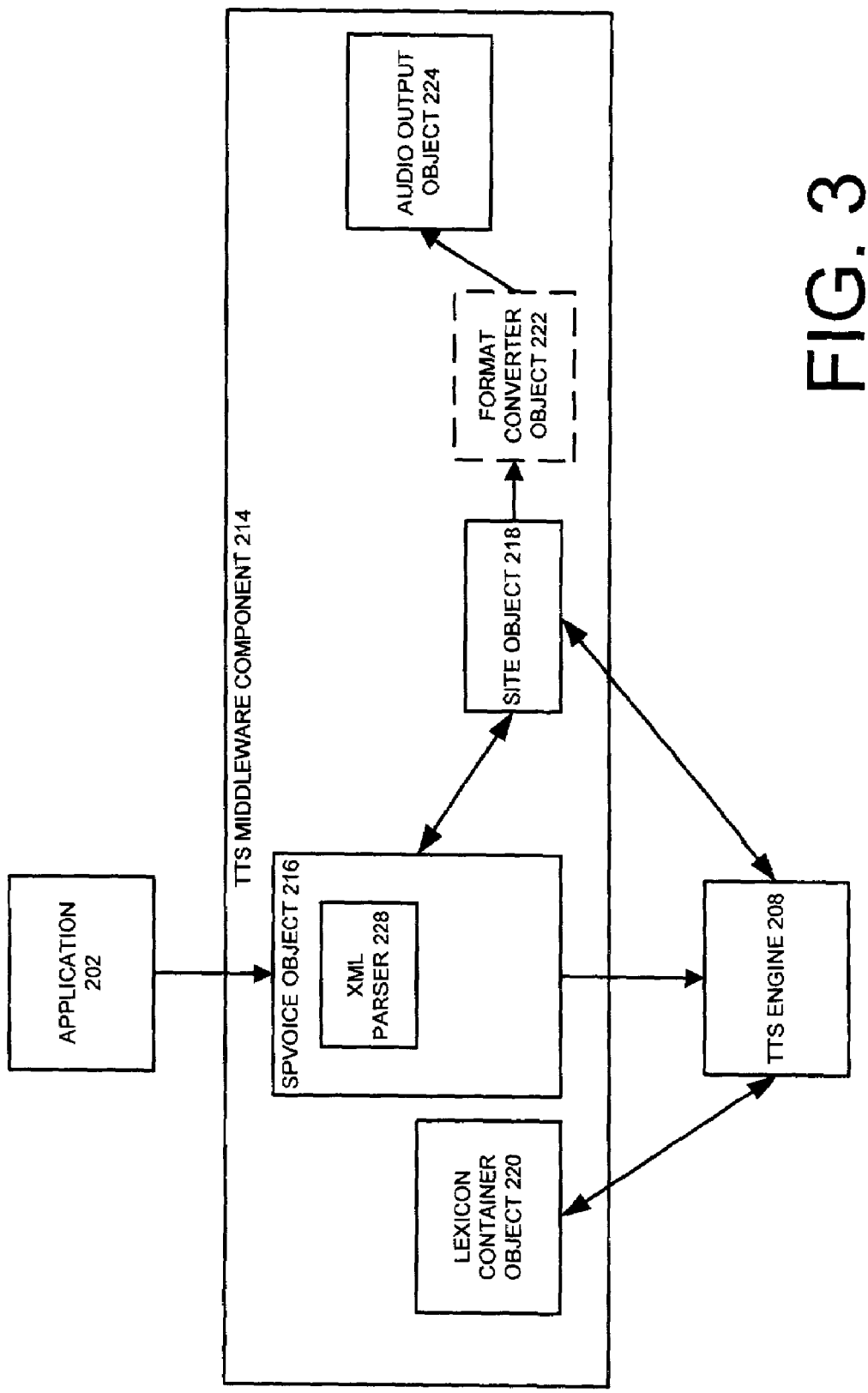
FIG. 3 is a more detailed block diagram of the TTS middleware component shown in FIG. 2.

FIG. 3 is a more detailed block diagram of a portion of system 200 shown in FIG. 2. Specifically, FIG. 3 illustrates TTS middleware component 214 in greater detail. TTS middleware component 214 illustratively includes a set of COM objects illustrated as the SpVoice object 216, Site object 218 and lexicon container object 220. In addition, TTS middleware component 214 can optionally include a format converter object 222 and an audio output object 224. In one illustrative embodiment, communication between the objects in TTS middleware component 214 and applications 202 is accomplished using application programming interfaces (API). Similarly, communication between the objects in TTS middleware component 214 and the TTS engine object 208 is accomplished using device driver interfaces (DDIs). One illustrative embodiment of DDIs and APIs and their related structures is set out in Appendices A and B hereto.

A general discussion of the operation of TTS middleware component 214, with applications 202 and engine 208, is illustrated by the flow diagram in FIG. 4. Initially, application 202 opens an instance of the SpVoice object 216. In one illustrative embodiment, the application calls the COM CoCreateInstance for the component CLSID_SpVoice to get a pointer to the interface ISpVoice of the SpVoice object. SpVoice object 216 then creates lexicon container object 220 and an XML parser object 228. This is indicated by blocks 230, 232 and 234 in FIG. 4.

Next, application 202 can either specify the attributes of TTS engine 208, such as whether the engine which is the synthesizer exhibits male or female voice qualities, the language of the synthesis, etc. This is done, for example, by calling the SetVoice method on the SpVoice object 216. This is indicated by optional block 236 in FIG. 4. In addition, the application can optionally specify the particular audio output object 224 which is desired. This is indicated by optional block 238 in FIG. 4.

The application 202 can set other attributes associated with the voice speaking, such as the rate and volume of speech, using for example, the SetRate and the SetVolume methods exposed by the SpVoice object 216. These are optional as well.

It should be noted that specifying the attributes of the engine 208 and audio output object 224 are optional. If the application does not specify these items, the first call to the SpVoice object 216 requiring synthesis results in the SpVoice object 216 choosing and initializing the default voice (i.e., the default TTS engine 208) and the default audio output object 224.

Once these items are configured properly, application 202 can call the SpVoice object 216 and request that textual information by synthesized. This can be done, for example, by calling the Speak or the SpeakStream methods on the SpVoice object 216. This is indicated by block 240.

The SpVoice object 216 then performs format negotiation. This is discussed in greater detail later in the specification with respect to FIG. 5. Briefly, however, the Spvoice object 216 attempts to optimize the format of data created by TTS engine 208 and that accepted by audio output object 224 for optimal synthesis. Format negotiation is indicated by block 242 in FIG. 4.

The SpVoice object 216 then breaks the textual information provided by application 202 into text fragments. For example, if the textual information is in XML, the SpVoice object 216 invokes the XML parser 228 to parse the XML input into text fragments. While the textual information can come from a variety of sources (such as a text buffer, straight textual information, XML, etc.) that information is broken into text fragments by SpVoice object 216, as indicated by block 244 in FIG. 4.

The SpVoice object 216 then calls a speak method on TTS engine 208, passing in the information to be synthesized. This is indicated by block 246. In doing this, the SpVoice object 216 also specifies a Site object 218 to be used by the TTS engine for returning the synthesized information.

TTS engine 208 receives the text fragments, synthesizes the text into WAV data (or other suitable audio data) and provides an indication of where events occur in the WAV data. For example, TTS engine 208 can illustratively provide an indication where word and phoneme boundaries occur in the WAV data. This information is all provided from TTS engine 208 to SpVoice object 216 through the Site object 218.

It should be noted that, in performing the synthesis, TTS engine 208 can access the lexicon object 220 contained in TTS middleware component 214. This is discussed in greater detail later in the specification with respect to FIGS. 9 and 10. Briefly, the lexicon container object 220 contains all lexicons of interest and the TTS engine 208 simply needs to access object 220 as if it were a single lexicon.

Synthesizing the actual fragments and writing them to the Site object are indicated by blocks 248 and 250 in FIG. 4.

During the format negotiation step 242, the SpVoice object 216 determines whether the format of the audio output object 224 or the format of the information provided by TTS engine 208 need to be converted. If conversion is required, information is provided to format converter object 222, such as through the ISpAudio or ISpStream interfaces, where the information is converted into a desired format for the audio output object 224. Format converter object 222 then manages the process of spooling out the audio information to audio output object 224 and also manages returning events noticed by the audio output object 224 to the Site object 218 and the SpVoice object 216 for transmission back to the application 202. This is indicated by blocks 252 and 254 in FIG. 4 Where no format conversion is desired, the information from the Site object 218 is spooled out to the audio output object 224 by the SpVoice object 216, through a suitable interface such as the IspStream interface. This is indicated by block 256.

Of course, it should also be noted that rather than providing the information directly to an audio output object 224, the information can be written to memory, as indicated by block 258, or provided at some other specified output or location as indicated by block 260 in FIG. 4.

FIG. 5 is a flow diagram illustrating the process of format negotiation and conversion (illustrated by blocks 242 and 254 in FIG. 4) in greater detail. In order to optimize the format used by TTS engine 208 and audio output object 224, SpVoice object 216 first determines whether the application has specified an audio output device object 224. If not, the default device object is initiated. This is indicated by blocks 262 and 264 in FIG. 5. If the application 202 specifies an audio output object 224, the application can also indicate whether it is acceptable to use a different format on that device, rather than the default format of the specified device.

In any case, once the appropriate audio output object 224 is initiated, SpVoice object 216 queries the audio output object 224 to obtain the default format from the audio output object 224. Obtaining the default format from the audio device object 224 is indicated by block 266 in FIG. 5.

Once the default format of information expected by the audio output object is obtained, the Spvoice object 216 queries TTS engine 208 to see what format it will provide based on the format that is input to it. This is indicated by block 268. It is next determined whether the output from TTS engine 208 is in the proper format to be received by the input to the audio output object 224. This is indicated by block 270. If the output format from TTS engine 208 matches the desired input format at audio output object 224, the information can be output in that format, to audio output object 224. This is indicated by block 272.

However, if, at block 270, it is determined that the output format from TTS engine 208 is not the same as the desired input format at audio output object 224, then the SpVoice object 216 determines whether it can reconfigure the audio output object 224 to accept the format output by TTS engine 208. This is indicated by block 274. Recall that, if the application specifies an audio output object 224 it can also specify that the input format not be changed.

If, at block 274, it is admissible to change the input format expected by the audio output object 224, then the audio output object 224 is simply reconfigured to accept the format output by TTS engine 208. This is indicated by block 276. The information can then be provided to the audio output object 224 as indicated by block 272.

However, if it is determined at block 274 that the expected input format of the audio output object 224 cannot be changed, the SpVoice object 216 determines whether a format converter 222 is available for converting the output format from the TTS engine 208 to the desired input format of audio output object 224. This is indicated by block 278. If no such converter is available, SpVoice object 216 simply provides an error message to application 202 indicating that the format conversion cannot be made. However, if a format converter is available to make the desired format conversion, the format converter is invoked so that the audio information from TTS engine 208 can be converted to the appropriate format. This is indicated by block 280. In that case, the converted audio information is provided from format converter object 222 to the audio output object 224, as indicated by block 272.

FIG. 6 is a more detailed block diagram of another embodiment of TTS middleware component 214 illustrating another feature of the present invention. A number of the items shown in FIG. 6 are similar to those shown in FIG. 3 and are similarly numbered. However, there are some differences. FIG. 6 illustrates an embodiment in which an application may wish to invoke two different voices. In other words, in a game or other application, there may be a desire to implement text-to-speech for two different types of speakers (e.g, male and female, two different types of same-gender voices, two different languages, etc.).

In order accomplish this, the application first performs the same first several steps illustrated in the flow diagram of FIG. 4. For example, the application first opens SpVoice object 216, which in turn creates the lexicon and XML parsers. These steps are not shown in FIG. 7 for the sake of clarity. The application 202 then specifies the engines, or the attributes of the voices which the application desires. This is indicated by block 282.

Setting the attributes of the engine (or the voice) can be done, for instance, by calling the method SetVoice on SpVoice object 216. In response to these specified voices, SpVoice object 216 instantiates two different TTS engine objects 208A and 208B, which contain the desired attributes specified by the application. Therefore, for example, if the application 202 specifies one male voice and one female voice, SpVoice object 216 instantiates a TTS engine 208A which has attributes of a female voice and TTS engine 208B which has attributes of a male voice. This is indicated by block 284. Application 202 also sets the priority for those specified voices (or engines). This is indicated by block 286. The priority basically indicates which TTS engine takes precedence in speaking, and is described in greater detail below. Setting the priority can be called, for instance, by invoking the method SetPriority on the SpVoice object 216.

Once the engines have been instantiated and the priorities set, the application indicates to the SpVoice object 216 that is wishes some textual information to be spoken. This is indicated by block 288 and can be done, for example, by calling Speak or SpeakStream on the SpVoice object 216. The information provided will also identify the particular engine 208A or 208B which application 202 wishes to have speak the information.

The textual input information is then parsed into text fragments as indicated by block 290. For example, if the input is an XML input, the XML is parsed into text fragments.

Based on the indication from application 202 (such as an XML tag on the input information) SpVoice object 216 calls the appropriate TTS engine 208A or 208B requesting synthesis and passing in the information to be synthesized. This is indicated by block 292. The TTS engine 208A or 208B which has been called, synthesizes the text fragments and writes the audio information to its corresponding Site object 218A or 218B. This is indicated by block 294. The synthesized information is then provided from Site 218A or 218B to audio output object 224 which provides it in turn to an audio device, such as speaker 296 or to another set of API's or objects, as desired.

It should be noted that, in setting priority as shown in block 286, a number of different things can be accomplished. If the priorities are set to normal, then the requests by application 202 to speak text are simply queued and are spoken in the order received. However, other priorities can be set as well. If a priority is set to alert, an audio message can be injected, in the middle of another audio message which is playing. Similarly, if the priority is set to speakover, then that audio text will simply speak at the same time as the audio which is currently being spoken.

Figure 8:
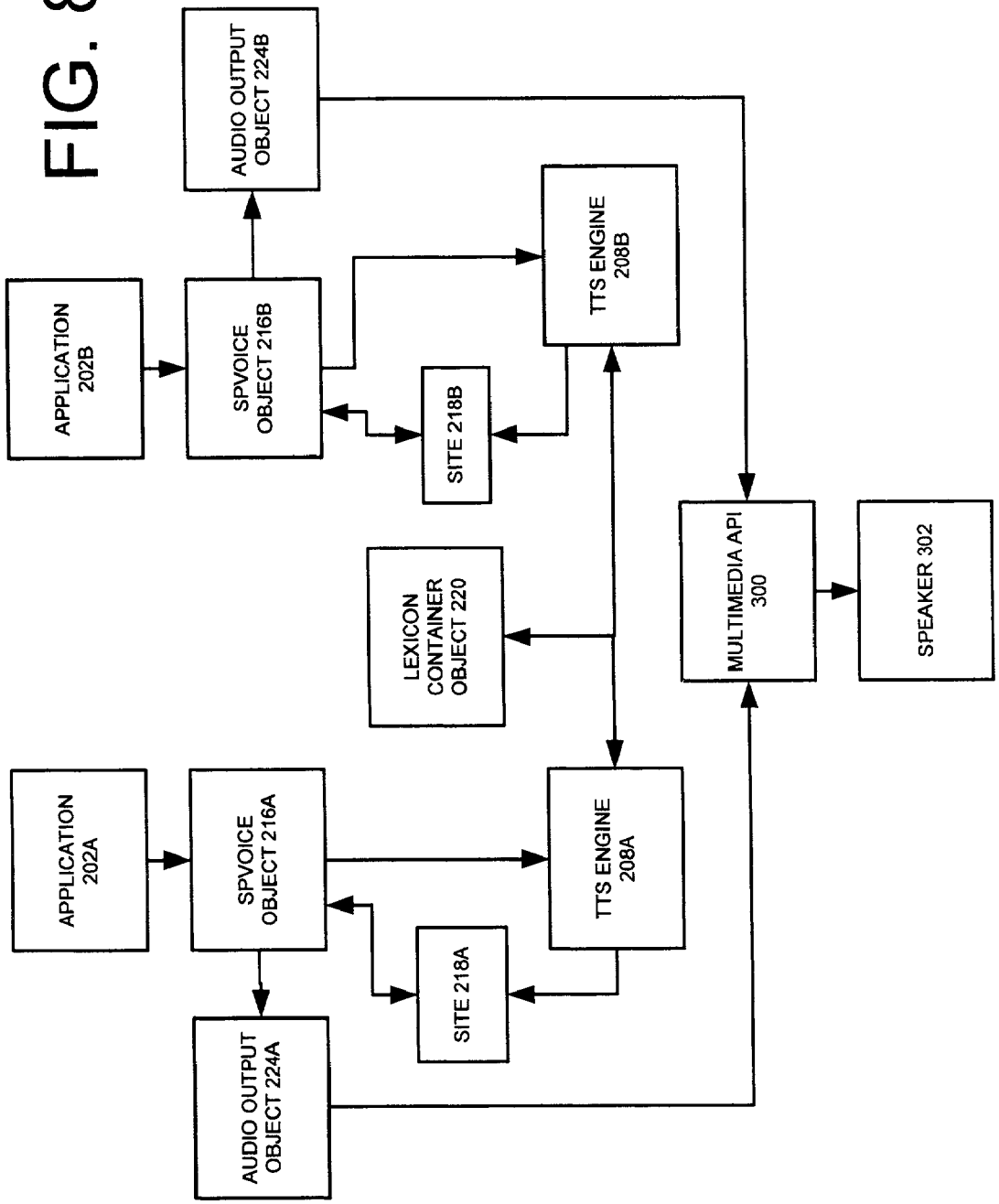
FIG. 8 is a more detailed block diagram of a multiapplication, multivoice implementation of the present invention.

The priorities are better illustrated with respect to FIG. 8. FIG. 8 shows a multiprocess, multivoice implementation of the present invention. In FIG. 8, two applications 202A and 202B have created two separate instances of the SpVoice Object 216A and 216B. Those objects have created separate Site objects 218A and 218B, TTS engine objects 208A and 208B and audio objects 224A and 224B. It should be noted that separate (i.e., A and B) lexicon container objects can be created as well. In FIG. 8, however, a unified lexicon container object 220 is illustrated. Both alternatives are within the scope of the present invention. The outputs from the audio output objects 224A and 224B are provided to a multimedia application programming interface (API) 300, such as that supported by the WINDOWS98 operating system, Second Edition or by the WINDOWS2000 operating system. The output of the multimedia API 300 is provided to an audio device, such as speaker 302.

The operation of processes A and B shown in FIG. 8 is similar to that illustrated by FIGS. 3–5 discussed above. It should also be mentioned, however, that in addition to setting the priority for a given voice, or TTS engine, the application can also specify the insertion points in a synthesized stream for alerts. Therefore, in one example, assume that application 202A has specified its request to speak as having a normal priority, and application 202B has specified its request to speak as having an alert priority, and further assume that audio output object 224A is speaking data which is being spooled out by either SpVoice object 216A or Site object 218A. Now assume that TTS engine 208B returns synthesis information which has been prioritized with an alert priority. Audio output object 224A will be allowed to speak to the alert boundary set by application 202A (such as the end of the current word) at which point the audio output object 224A will be closed and control will be assumed by SpVoice object 216B and audio output object 224B such that only its information can be output to multimedia API 300 and subsequently to speaker 302. This can be accomplished using a shared mutex scheme such as that provided through WinAP services. When audio output object 224A is closed, the SpVoice object 216A simply does not return on the call which TTS engine 208A has made to Site 218A. Therefore, TTS engine 208A simply pauses. After the alert message has been spoken, SpVoice object 216B and audio output object 224B release the mutex such that SpVoice object 216A and audio output object 224A can continue speaking. At that point, Spvoice object 216A returns on the TTS engine call such that TTS engine 208A can continue its processing.

If the two speak commands by applications 202A and 202B are indicated as speakover priority, then assuming that the multimedia API layer 300 supports mixing, the audio information from both audio output object 224A and audio object 224B will be spoken by speaker 302, at the same time. If the speak requests are indicated as normal, then the speak requests are queued and are spoken, in turn.

It should also be noted that if, within either process A or process B multiple speak requests are received, then processing is handled in a similar fashion. If a normal speak request is followed immediately by an alert request, than the normal speak request is halted at an alert boundary and the alert message is spoken, after which the normal speak request is again resumed. If more then one alert message is received within a single process, the alert messages are themselves queued, and spoken in turn.

It should also be noted that the configuration illustrated in FIG. 8 can be implemented by one application 202, rather than two applications. In that case, a single application 202 simply co-creates two instances of the SpVoice object 216. Those instances create the remaining objects, as illustrated in FIG. 8.

Figure 9:
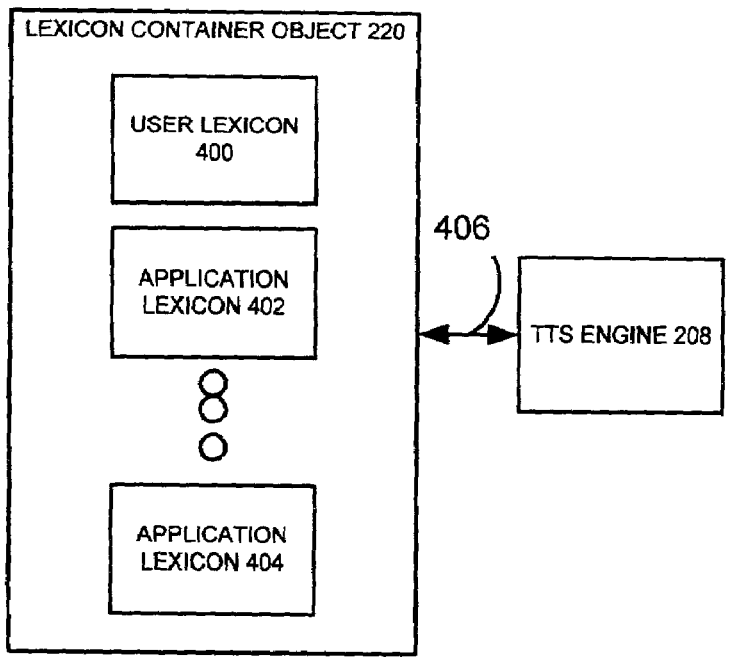
FIG. 9 illustrates a lexicon container object.

FIG. 9 is a more detailed block diagram illustrating the lexicon container object 220 shown and discussed in the above Figures. Lexicon container object 220 illustratively contains a plurality of lexicons, such as user lexicon 400 and one or more application lexicons 402 and 404. In accordance with one aspect of the present invention, certain applications can specify lexicons for use by the TTS engine 208. For example, such lexicons may contain words that have pronunciations which are not obtainable using normal letter-sound rules. In addition, a user may have a specified lexicon containing words which the user commonly uses, and which are not easily pronounceable and for which the user has a desired pronunciation. Such user lexicons can be changed through the control panel.

In any case, once the lexicon container object 220 is created, it examines the registry for user and application lexicons. Lexicon container object 220 can also expose an interface 406 accessible by TTS engine 208. This allows the TTS engine 208 to not only access various lexicons 400, 402 and 404 stored in lexicon container object 220, but also allows TTS engine 208 to add a lexicon to lexicon container object 220 as well. Lexicon container object 220 represents all of the lexicons contained therein, as one large lexicon to TTS engine 208. Therefore, TTS engine 208 or application 202 need not handle providing access to multiple lexicons, as that is all handled by lexicon container object 220 through its exposed interface.

Figure 10:
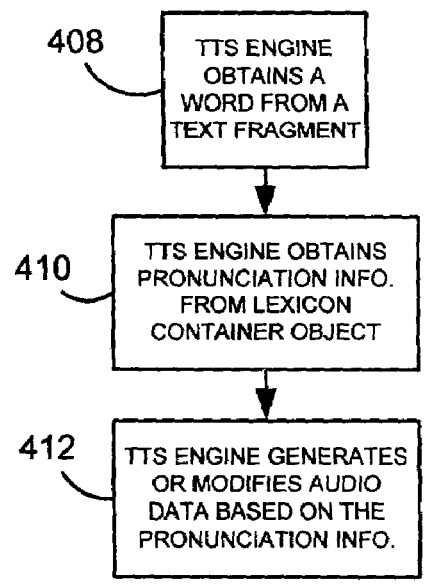
FIG. 10 is a flow diagram illustrating operation of the lexicon container object shown in FIG. 9.

FIG. 10 is a flow diagram illustrating operation of lexicon container 220 and TTS engine 208. In operation, once TTS engine 208 has obtained a synthesized word as indicated by block 408 in FIG. 10, it accesses lexicon container object interface 406 to determine whether a user or application has specified a pronunciation for that word, as indicated by block 410. If so, it changes the audio data created by it to reflect the pronunciation contained in lexicon container object 220 and provides that information to its Site 218. This is indicated by block 412.

This provides significant advantages. For example, in the past, TTS engines 208 contained the lexicon. If a user had terms with user-specified pronunciations, every time an application opened up a separate TTS engine that engine would speak the user's pronunciations improperly, until the TTS engine lexicon was modified. In contrast, using lexicon container object 220, each time a different TTS engine 208 is opened, it will automatically be directed to the user lexicon 400 such that the user's preferred pronunciations will always be used, regardless of the TTS engine 208 which is opened. This engine-independent lexicon thus greatly improves the process.

Figure 11:
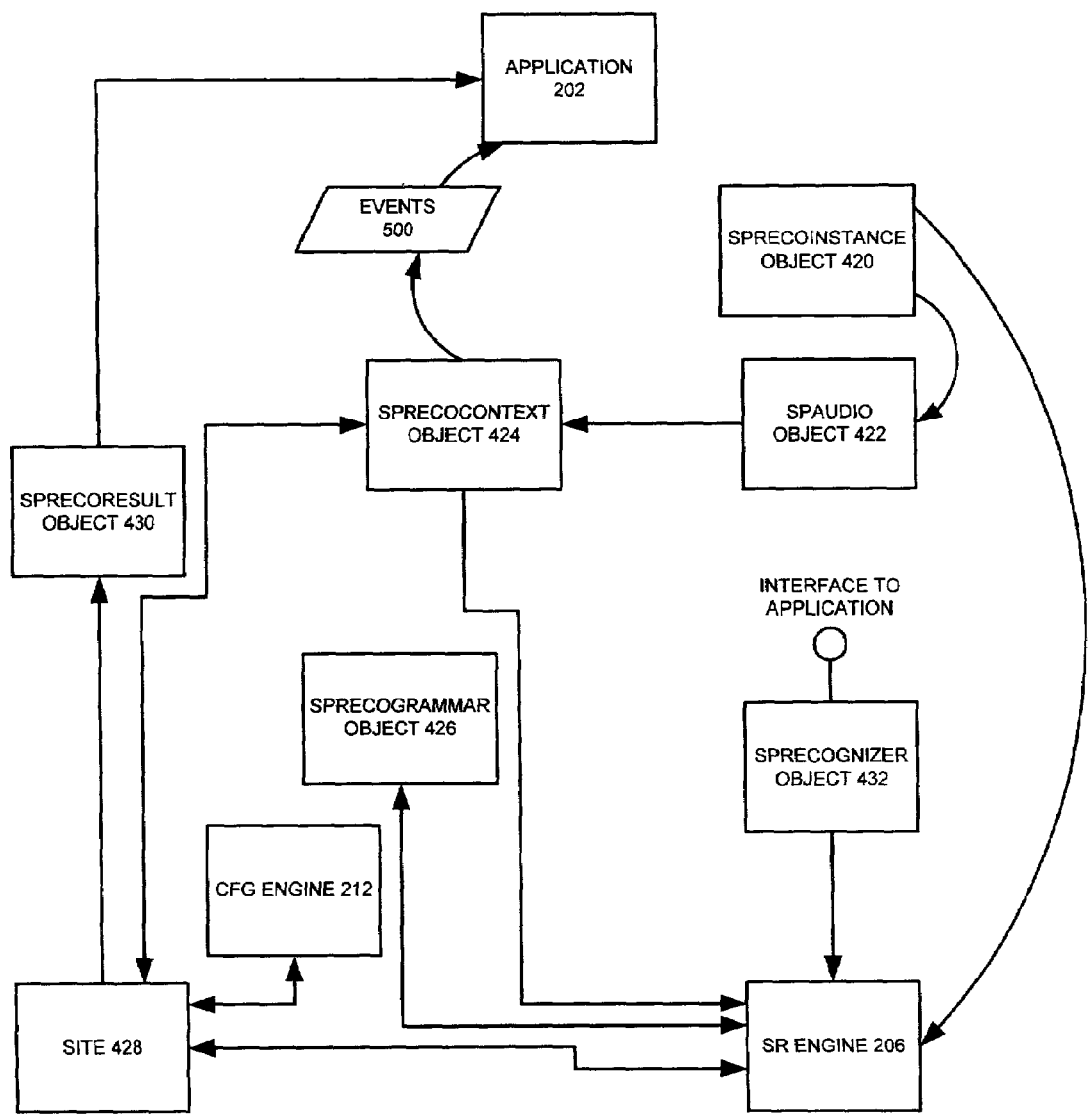
FIG. 11 is a more detailed block diagram of SR middleware component 210 shown in FIG. 2.

FIG. 11 is a more detailed block diagram of a portion of system 200 as shown in FIG. 2. More specifically, FIG. 11 illustrates SR middleware component 210 in greater detail. In the embodiment illustrated in FIG. 11, SR middleware component 210 includes a SpRecoInstance object 420 which represents an audio object (SpAudio 422, which provides an input audio stream, and its processor) and a speech recognition (SR) engine 206. SR middleware component 210 also includes SpRecoContext object 424, SpRecoGrammar object 426, SpSite object 428 SpRecoResult object 430 and SpRecognizer object 432. The SpRecoContext object 424 is similar to the SpVoice object 216 in TTS middleware component 214 in that it generally manages data flow, and performs services, within SR middleware component 210. SpRecoContext object 424 exposes an interface which can be used to communicate with application 202. SpRecoContext object 424 also calls interface methods exposed by SR engine object 206.

The SpRecoGrammar object 426 represents the grammar which the SR engine 206 associated with the SpRecoGrammar object 426 will be listening to. The SpRecoGrammar object 426 can contain a number of different items, such as a dictation topic grammar, a context free grammar (CFG), a proprietary grammar loaded either by SR engine 206 or application 202 and a word sequence data buffer which is explained in greater detail later in the specification.

Figure 12:
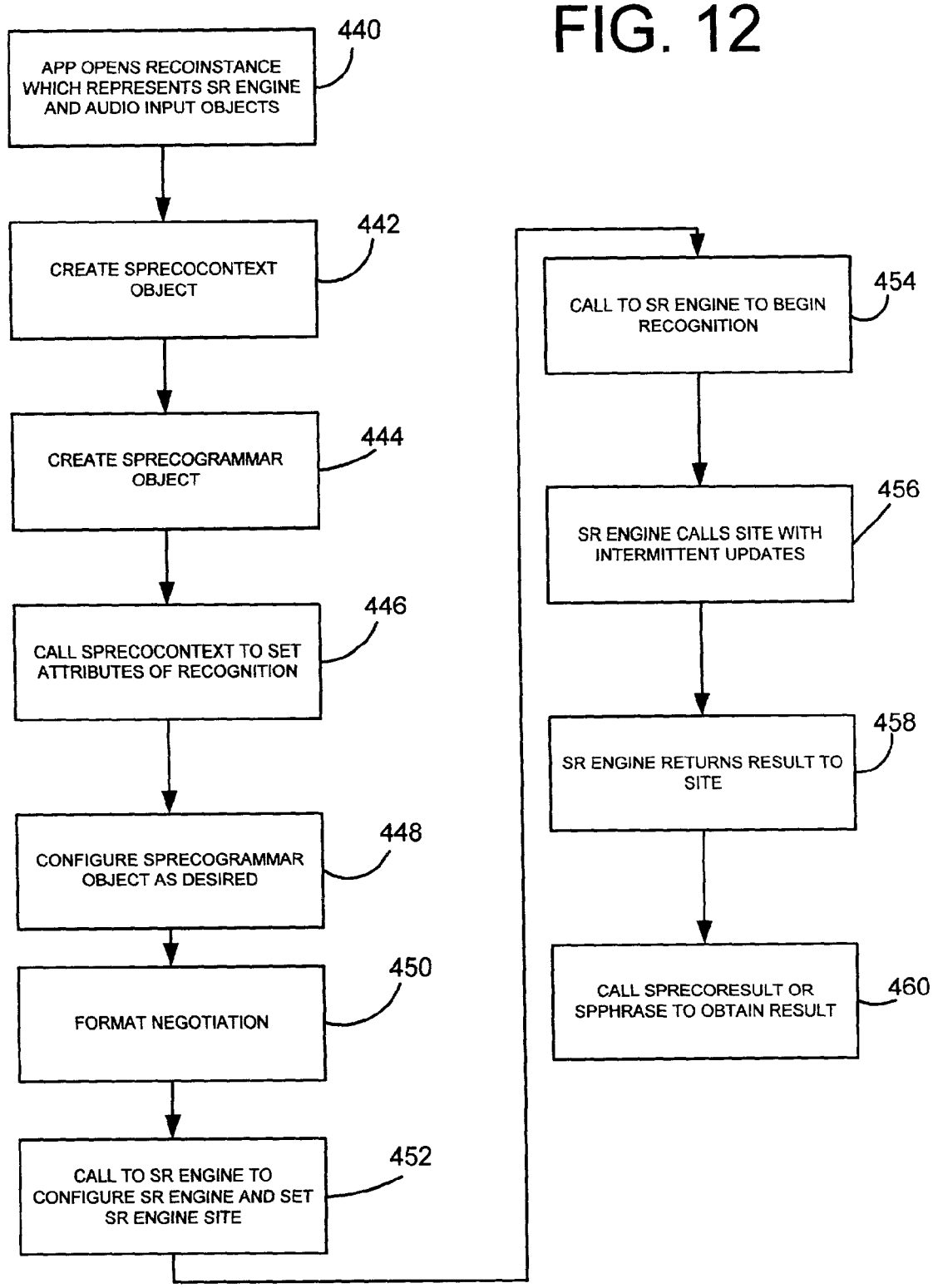
FIG. 12 is a flow diagram illustrating the general operation of the system shown in FIG. 11.

FIG. 12 is a flow diagram which illustrates the general operation of the embodiment of the SR middleware component 210 as illustrated in FIG. 11. First, application 202 opens the SpRecoInstance object 420 which creates an instance of SR engine 206 and the audio input object 422. Again, as with text-to-speech implementations, the application can request a specific SR engine 206 and audio engine 422. If one is not specified, the default objects are automatically initiated. This is indicated by block 440 in FIG. 12.

The SpRecoContext object 424 is then created as illustrated by block 442 in FIG. 12. The application can then call exposed interfaces on SpRecoContext object 424 to create the SpRecoGrammar object 426. Such an interface can include, for instance, the CreateGrammar method. Creation of the SpRecoGrammar object is illustrated by block 444 in FIG. 12.

The application then calls the SpRecoContext object 424 to set desired attributes of recognition, as indicated by block 446. For example, the application can determine whether it would like alternatives generated by SR engine 206 by calling the SetMaxAlternative method and can also enable or disable the retention of the audio information along with the results. In other words, SR middleware component 210 will retain the audio information which is provided by audio object 422 upon which SR engine 206 performs recognition. That way, the audio information can be reviewed later by the user, if desired. The application can also call interfaces exposed by the SpRecoContext object 424 in order to change the format of the retained audio. Otherwise, the default format which was used by the recognition engine 206 in performing recognition is used.

The application then illustratively configures the SpRecoGrammar object 426 as desired. For example, the application 202 can load a grammar into the SpRecoGrammar object by calling the LoadDictation method. The application can also set a word sequence data buffer in engine 206 by calling the SetWordSequenceData method. Further, the application can activate or deactivate grammar rules by either rule ID or by rule name, by calling the SetRuleIDState method or the SetRuleState method, respectively. The application can also enable or disable grammars within the SpRecoGrammar object 426 by calling the SetGrammarState method. It should be noted that, when a grammar is disabled, the SpRecoGrammar object 426 stores the state of the grammar prior to it being disabled. Therefore, when it is again enabled, the SpRecoGrammar object can automatically activate and deactivate rules in that grammar to obtain its previous activation state. Further, the application can load command and control grammars by calling the LoadCmdFromXXXX where "XXXX" can be a file, object, resource or memory. Configuring the SpRecoGrammar object is indicated by block 448 in FIG. 12.

The SpRecoContext object 424 then performs a format negotiation as indicated with the speech synthesis embodiment. In other words, the SpRecoContext object 424 queries the audio input object 422 to determine the format of the audio input. The SpRecoContext object 424 also quires SR engine 206 to determine what format it desires, and will reconfigure the audio object 422 or the SR engine 206 as desired, if possible. The format negotiation is indicated by block 450 in FIG. 12.

SpRecoContext object 424 then calls device driver interfaces exposed by SR Engine 206 to configure the engine and to set SrEngineSite 428, as indicated by block 452. The Site for the engine to use is set by calling the SetSite method on SR engine 206. This provides the handle to Site object 428 which is the object that SR engine 206 calls to communicate events and recognitions as well as to synchronize with and make other communications with, SR middleware component 210.

Acoustic recognition information is also set in engine 206 by, for instance, calling the SetRecoProfile method exposed by engine 206. The acoustic profile information may vary, for example, with user, or with application. Therefore, the appropriate acoustic profile information is obtained from the registry and loaded into SR engine 206.

The engine can also be loaded with specific or proprietary grammars or language models by calling the LoadProprietaryGrammar method or the LoadSLM method, respectively. The SpRecoContext object 242 can also set up a text buffer structure and hand SR engine 206 a pointer to it by calling the OnCreateGrammar method and can also set a word sequence data buffer in engine 206 by calling the SetWordSequenceData method.

The word sequence data buffer is a buffer which can be populated, on-the-fly, by the application. In one illustrative embodiment the word sequence data buffer contains double null terminated entries which can be used by SR engine 206 in making a recognition. For example, a CFG rule, which spawns a recognition by SR engine 206, can point SR engine 206 into the word sequence data buffer to look for matches of subsequent word sequences. In one illustrative embodiment, such a rule may spawn a recognition of the words "Send e-mail to". In that case, the application can populate the word sequence data buffer with electronic mail aliases. SR engine 206 then searches the word sequence data buffer to better refine the recognition process in making a recognition of the following speech.

Once SR engine 206 is configured, the SpRecoContext object 424 can call SR engine 206 to begin recognition. Such a call can be made on, for example, the RecognizeStream method. When such a method is called, SR engine 206 begins recognition on an input data stream and the process continues until a buffer containing the data to be recognized is empty, or until the process is affirmatively stopped. Beginning recognition is illustrated by block 454 in FIG. 12.

During recognition, SR engine 206 illustratively calls Site object 428 with intermittent updates. This is indicated by block 456. The Site object 428 exposes interfaces which are called by SR engine 206 to return these intermittent updates, to get audio data for recognition, and to return sound events and recognition information. For example, SR engine 206 calls the Site object to indicate when a sound has begun, and when it has ended. The SR engine 206 also calls Site to provide the current position of recognition in the input stream, such as by calling the UpdateRecoPos method. SR engine 206 can also call the Synchronize method to process changes in the state of its active grammar. In other words, the application may have changed the state of the active grammar in the SpRecoGrammar object being used by SR engine 206 during recognition. Therefore, SR engine 206 periodically calls Synchronize to stop processing and update the state of its active grammar. This can be done by obtaining word, rule, and state transition information for CFG rules, words and transitions in the SpRecoGrammar object 426. It does this, for example, by calling the GetRuleInfo, GetWordInfo, and GetStateInfo methods on the Site object.

SR engine 206 also illustratively calls Site 428 when either a recognition hypothesis or an actual final recognition has been obtained, by calling the Recognition method and either setting or resetting a hypothesis flag contained in the input parameters for the method. Once the final result is obtained, it is returned to Site 428 by calling the Recognition method and indicating that data is available, and by having the hypothesis flag reset. This is indicated by block 458 in FIG. 12. Of course, it should also be noted that where alternatives are requested, SR engine 206 passes those alternatives back to Site 428 along with the result.

Once Site contains the information indicating a final recognition, CFG engine 212 creates a complex result from the recognition information. The application 202 can then obtain the recognition result by calling the SpRecoResult object 430 or an associated SpPhrase object (not shown). For example, on the SpPhrase object, the application can call the GetPhrase or GetText methods which retrieve data elements associated with the phrase. The application can also obtain elements associated with alternatives and replace the original phrase with the alternatives by calling the GetAltInfo method and the Commit method, respectively One illustrative data structure which identifies a recognized result is as follows:

---
SPPHRASE
---

Typedef [restricted] struct SPPHRASE
| | |
|---|---|
| ULONG | cbSize; |
| LANGID | LangID; |
| WORD | wReserved; |
| ULONGLONG | ftStartTime; |
| ULONGLONG | ullAudioStreamPosition; |
| ULONG | ulAudioSizeBytes; |
| ULONG | ulAudioSizeTime; |
| SPPHRASERULE | Rule; |
| const SPPHRASEPROPERTY | *pProperties; |
| const SPHRASEELMENT | *pElements; |
| ULONG | cReplacements; |
| const SPPHRASEREPLACEMENT | pReplacements; |
| GUID | SREngineID; |
| ULONG | ulSREnginePrivateDataSize; |
| const BYE | *pSREnginePrivateData; |

SPPHRASE

Members
CbSize—The size of this structure in bytes.
LangID—The language ID of the current language.
WReserved—Reserved for future use.
FtStart Time—The start time of the recognition in the input stream.
UllAudioStreamPosition—The start position of the recognition in the input stream.

UlAudioSizeBytes—The size of audio information.
UlAudioSizeTime—The time of audio information.
Rule—The rule that spawned this result.
pProperties—The pointer to the semantic properties for the rule that spawned this result.
PElements—The pointer to the elements of the result.
pReplacements—The pointer to the replacement elements.
SREngineID—The ID of the SR engine which produced the results.
UlSREnginePrivateDataSize—The size of any proprietary data sent by the SR engine.
PSREnginePrivateData—The pointer to the proprietary data.

Application 202 can also set book marks in the audio stream to be recognized. For example, the application 202 may desire a bookmark so that it can note cursor position when the user clicks the mouse, as this event is temporally related to the audio stream. Therefore, the application calls the Bookmark method exposed by the SpRecoContext object to set a bookmark within the current recognition stream. Because SR engine 206 in intermittently calling Site 428 with updates as to its position within the recognition steam, the SpRecoContext object 424 can determine when the SR engine 206 has reached the bookmark. When this happens, an event 500 is added to the event queue which is communicated back to application 202. This allows application 202 to coordinate its state with events coming back from SR engine 206.

This can be quite useful in speech recognition applications. For example, a user manipulation of the mouse can change the state of the application. However, prior to actually changing the state of the application, the application may wish to wait until SR engine 206 has reached the same temporal point in the recognition stream. This allows the application to synchronize with SR engine 206 exactly where the application desires to take action.

Figures 13, 14:
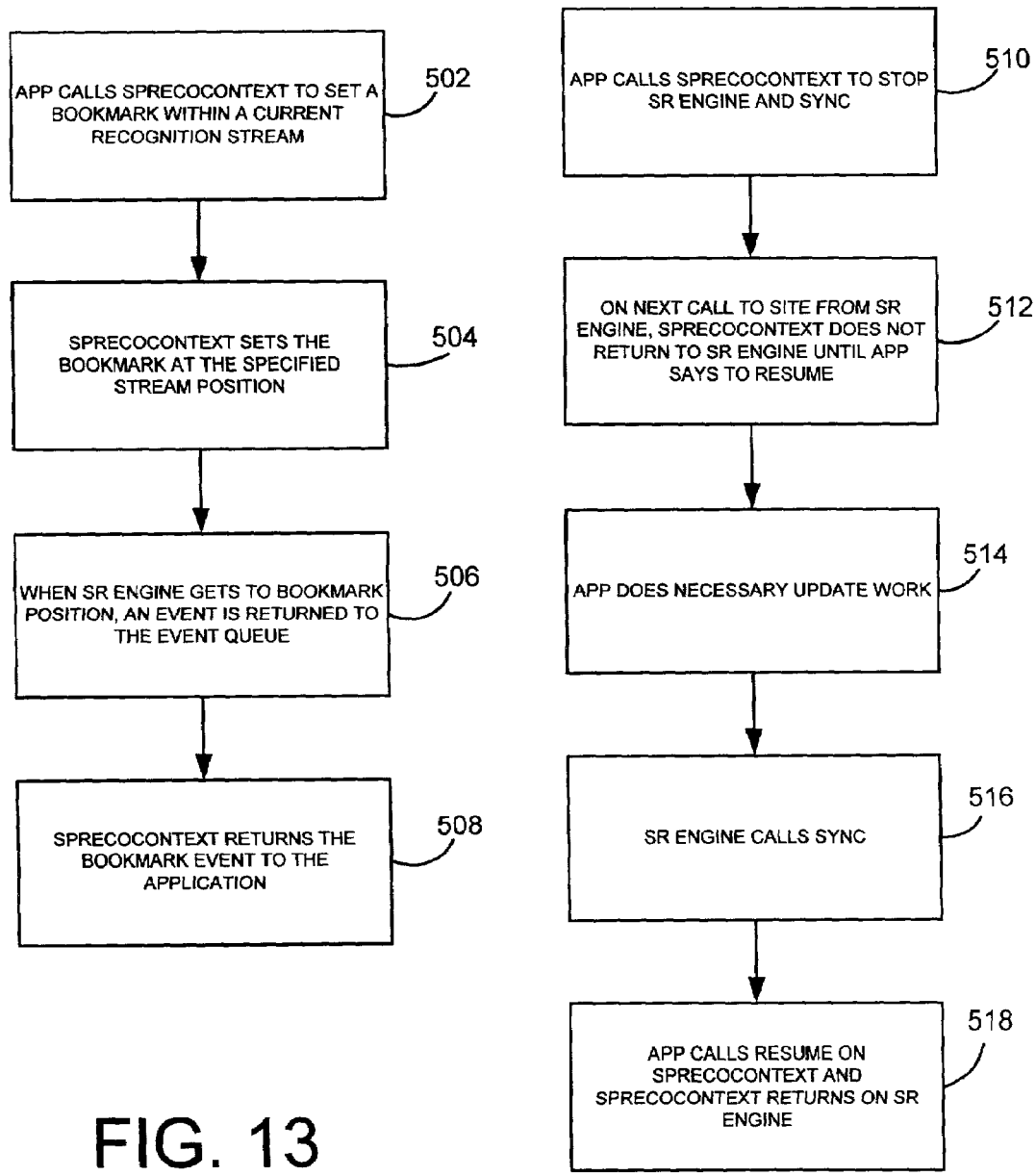
FIG. 13 is a flow diagram illustrating bookmarks.
FIGS. 14 and 15 are flow diagrams illustrating synchronization procedures.

FIG. 13 is a flow diagram better illustrating this process. First, the application 202 calls the SpRecoContext object 424 (illustratively the Bookmark method) to set a bookmark within the current recognition stream. This is indicated by block 502. The SpRecoContext object 424 sets the bookmark in the specified stream position as indicated by block 504. When the speech recognition engine 206 reaches the bookmark location, an event is returned to the event queue. This is indicated by block 506. The SpRecoContext object 424 then returns the bookmark event to application 202 as indicated by block 508.

Application 202 can also cause SR engine 206 to pause and synchronize with it in another way. FIG. 14 is a flow diagram which better illustrates this. Application program 202 calls a method (such as the Pause method) exposed by the SpRecoContext object 424 to stop SR engine 206 for synchronization. This is indicated by block 510. On the next call from the SR engine 206 to Site, the SpRecoContext object 424 does not return on that call to the SR engine 206 until the SR application 202 has said to resume recognition. This is indicated by block 512. At that time, the application can do necessary work in updating the state of the active grammar or loading another grammar to be used by SR engine 206 as indicated by block 514. During the pause mode, the SR engine 206 still calls the sync method exposed by Site 428, and asks it for updates to its active grammar as discussed above. This is indicated by block 516. After the synchronization has been completed, the SpRecoContext object 420 returns to the application 202 and the application calls Resume on SpRecoContext object 420. This is indicated by block 518. In response, SpRecoContext object 424 returns on the SR engine call so that the SR engine can continue processing.

Figure 15:
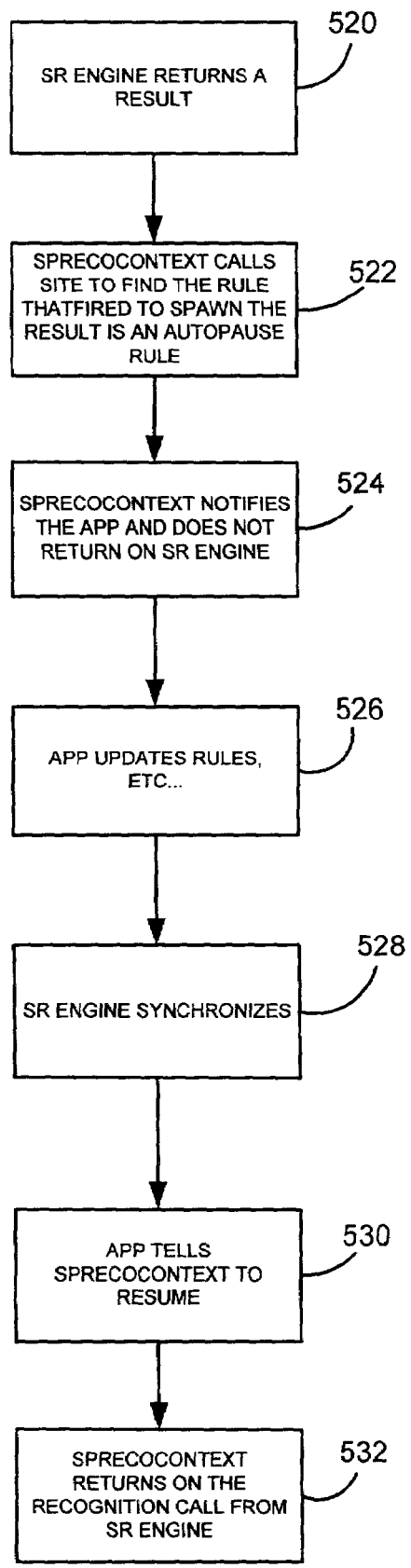

FIG. 15 is another flow diagram illustrating yet another way in which SR engine 206 can synchronize with application 202. Individual rules in the SpRecoGrammar object 426 can be tagged as autopause rules. When SR engine 206 recognizes one of these rules, the SR engine 206 is set into a pause state while the application 202 changes grammars. When the application is finished and calls resume, the SR engine now has the appropriate grammar to continue recognition.

Therefore, SR engine 206 first returns a result to Site 428. This is indicated by block 520. The SpRecoContext object 424 calls Site 428 to find that the rule which fired to spawn the recognition is an autopause rule. This is indicated by block 522. The SpRecoContext object 424 then notifies application 202 and does not return on the SR engine 206 at that time. This effectively pauses SR engine 206, and audio input is buffered in the meantime. This is indicated by block 524.

During this pause state, application 202 updates the grammar rules, words, transitions, etc., as desired. This is indicated by block 526. Because a recognition event is also a synchronize event, SR engine 206 still calls Site 428 while in the pause mode. This is indicated by block 528. Thus, the SR engine obtains the updated state of its active grammar.

The application 202 then calls Resume on SpRecoContext object 424, as indicated by block 530. The SpRecoContext object then returns on the recognition call from SR engine 206, allowing SR engine 206 to continue recognition. This is indicated by block 532.

Figure 16:
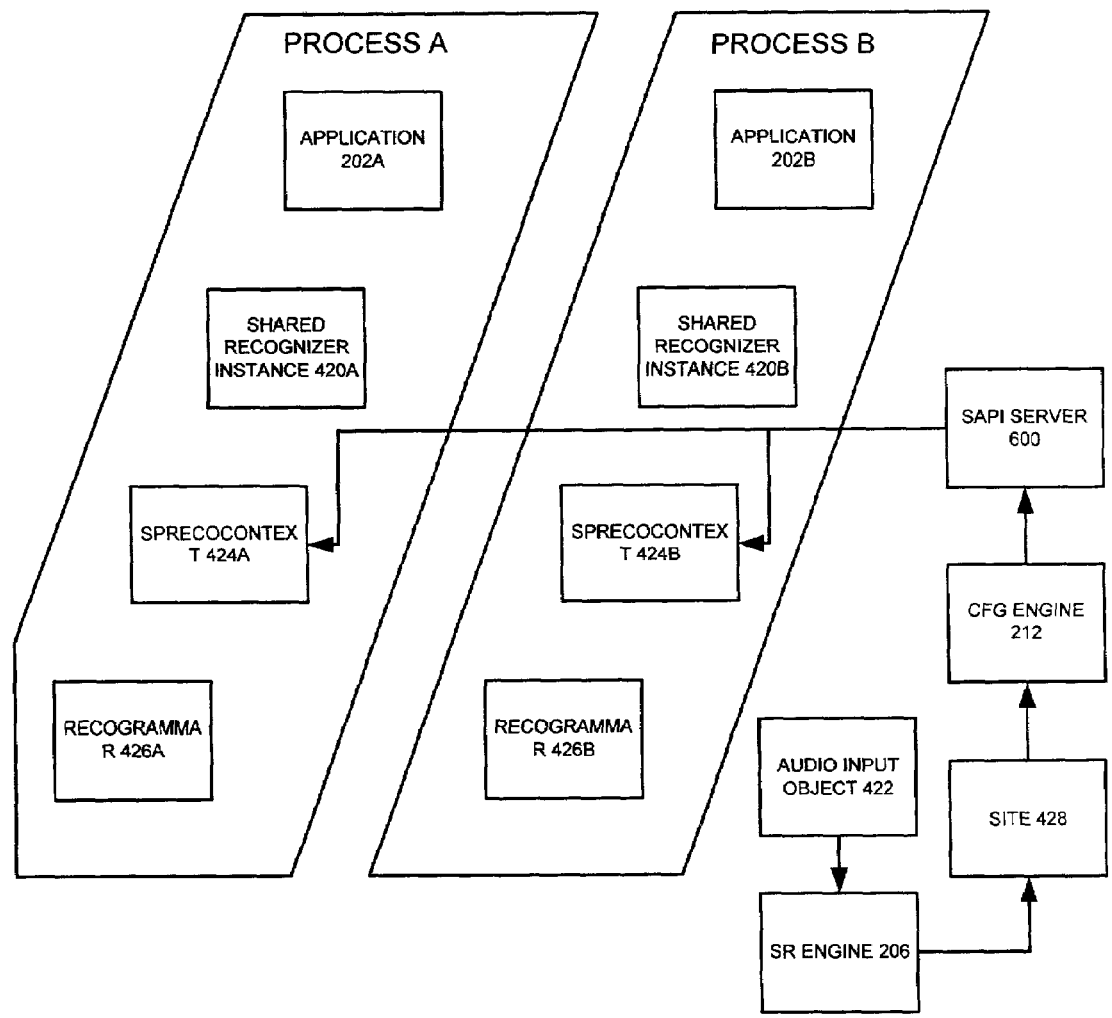
FIG. 16 is a more detailed block diagram of a multiprocess data marshaling implementation of the present invention.

FIG. 16 is a block diagram of a multiprocess implementation of the present invention. It may be desirable to have multiple applications implementing speech recognition technology at the same time. For example, it may well be desirable to use a command and control application which implements command and control steps based on speech commands. Similarly, it may be desirable to have another application, such as a word processing application, implementing speech recognition at the same time. However, it is also recognized that it may be desirable to have only a single arbiter determining what is actually said (i.e., it is desirable to have only a single speech recognition engine recognizing speech).

FIG. 16 indicates applications 202A and 202B. Many of the other contents in the block diagram are similar to those shown in FIG. 11, and are similarly number. However, the A and B suffixes indicate whether the objects are associated with process A or process B illustrated in FIG. 16. FIG. 16 also illustrates that the audio input object 422 and the SR engine 206 are part of the shared process so that only a single instance of each needs to be initiated. FIG. 16 further illustrates SAPI server 600 which can be implemented, as an executable program, for marshaling the delivery of recognized speech to the appropriate recognition process.

Figure 17:
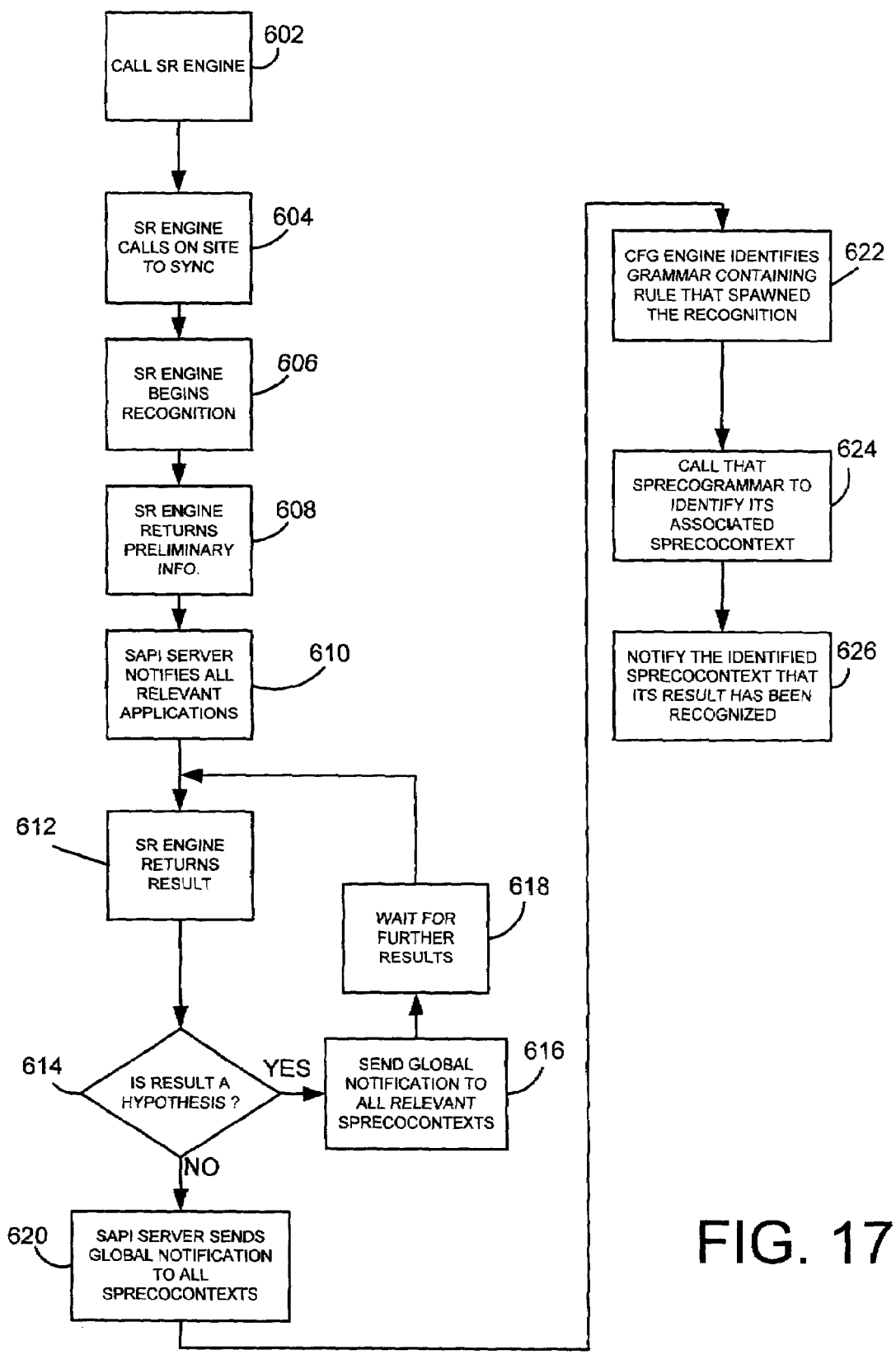
FIG. 17 is a flow diagram illustrating the data marshaling process.

FIG. 17 is a flow diagram illustrating data marshaling between processes. Both processes operate substantially as described with respect to FIG. 11, except both use audio input object 422 and SR engine 206. Therefore, one of the SpRecoContext objects first calls SR engine 206 on RecognizeStream. This is indicated by block 602 in FIG. 17. The SR engine then calls on Site 428 to synchronize and to obtain updates to its active grammar. This is indicated by block 604. The SR engine then begins its synchronization of the input data, as indicated by block 606.

SR engine 206 then returns preliminary information (such as its position within the recognition stream, when sound has been heard and has ended, and hypotheses). This is indicated by block 608. The SAPI server 600 notifies all applications 202A and 202B, which are currently operating, of the events returned by SR engine 206. SAPI server 600 illustratively does this through the RecoContext objects associated with the applications. This is indicated by block 610.

SR engine 206 then returns a result by calling the Recognition method exposed by Site 428. This is indicated by block 612. SAPI server 600 then determines whether it is a hypothesis (e.g., a preliminary result) by examining the hypothesis bit in the result returned by SR engine 206. This is indicated by block 614. If it is a hypothesis, then SAPI server 600 sends a global notification to all SpRecoContext objects that a hypothesis result has been received, and waits for a finally recognized result. This is indicated by block 616 and 618.

If, at block 614, it is determined that the result is final, then SAPI server 600 sends a global notification to all SpRecoContext objects indicating that a final result has been received. This is indicated by 620.

To better understand the remaining process, a brief discussion of CFG engine 212 may be helpful. The operation of CFG engine 212 is described in greater detail in U.S. Pat. No. 6,957,184 referred to above. Briefly, for the sake of completeness, CFG engine 212 combines all grammars from all applications and RecoContext objects and combines them into a single set of grammars which is communicated to SR engine 206. Therefore, the single SR engine 206 only sees a large collection of words, rules, and transitions which it is to recognize. In maintaining the collection of grammars, CFG engine 212 maintains an indication as to where the grammars came from (i.e., which process they came from).

Recall that when SR engine 206 returns its results, it indicates the rule which fired to spawn the result. Therefore, by examining the rule identifier (or rule name) that fired to spawn the result, CFG engine 212 can identify the particular SpRecoGrammar object which the rule came from. The CFG engine 212 can then call methods exposed by that SpRecoGrammar object to obtain the SpRecoContext object associated with that grammar (such as by calling the GetRecoContext method). Identifying the grammar which the rule came from, and identifying the SpRecoContext object associated with that grammar is indicated by blocks 622 and 624, respectively.

This information is passed to SAPI server 600, which in turn notifies the SpRecoContext object associated with that grammar. The notification indicates that its result has been recognized. That SpRecoContext object can then notify its application and pass the recognition event on to the application, as indicated by block 626.

In conclusion, it can be seen that the middleware layer between the applications and engines provides many services for both the applications and engines, which had previously been performed by either the application or the engine. The present middleware layer does this in an application-independent and engine-independent manner.

Although the present invention has been described with reference to preferred embodiments, workers skilled in the art will recognize that changes may be made in form and detail without departing from the spirit and scope of the invention.

Microsoft Speech SDK
with SAPI 5.0                                              

[This is preliminary documentation and subject to change.]

Structures

The following structures are used with SAPI 5.

- SPAUDIOBUFFERINFO
- SPAUDIOSTATUS
- SPBINARYGRAMMAR
- SPEVENT
- SPEVENTSOURCEINFO
- SPPARSEINFO
- SPPATHENTRY
- SPPHRASE
- SPPHRASEALT
- SPPHRASEALTREQUEST
- SPPHRASEELEMENT
- SPPHRASEPROPERTY
- SPPHRASEREPLACEMENT
- SPPHRASERULE
- SPPROPERTYINFO
- SPRECOCONTEXTSTATUS
- SPRECOGNIZERSTATUS
- SPRECORESULTINFO
- SPRECORESULTTIMES
- SPRULEENTRY
- SPSERIALIZEDEVENT
- SPSERIALIZEDPHRASE
- SPSERIALIZEDRESULT
- SPSTATEINFO
- SPTEXTSELECTIONINFO
- SPTMTHREADINFO
- SPTRANSITIONENTRY
- SPTRANSITIONPROPERTY
- SPVCONTEXT
- SPVOICESTATUS
- SPVPITCH
- SPVSENTITEM
- SPVSTATE
- SPVTEXTFRAG
- SPWORD
- SPWORDENTRY
- SPWORDLIST
- SPWORDPRONUNCIATION
- SPWORDPRONUNCIATIONLIST
- WAVEFORMATEX

SPAUDIOBUFFERINFO

SPAUDIOBUFFERINFO contains the audio stream buffer information.

```
typedef struct SPAUDIOBUFFERINFO
{
    ULONG       ulMsMinNotification;
    ULONG       ulMsBufferSize;
    ULONG       ulMsEventBias;
} SPAUDIOBUFFERINFO;
```

Members ulMsMinNotification
　　The minimum desired time, in milliseconds, allowed between the actual time an event notification occurs and the ideal time. The smaller this number is, the more CPU overhead is required, but the event notifications will be more timely. This value must be at most one quarter the size of the *ulMsBuffersize*.

ulMsBufferSize
　　The size of the audio object's buffer, in milliseconds. For readable audio objects, this is simply a desired size – readable objects will automatically expand their buffers to accommodate data. For writeable audio objects, this is the amount of audio data that will be buffered before a call to Write will block.

ulMsEventBias
　　The amount of time, in milliseconds, that events will be completed before they actually occur. For example, setting a value of 100 for the event bias would cause all events to be notified 100 milliseconds prior to the audio data being played. This can be useful for applications needing time to animate mouths for synthetic speech.

---

[This is preliminary documentation and subject to change.] 

SPAUDIOSTATUS

```
typedef [restricted] struct SPAUDIOSTATUS
{
    long            cbFreeBuffSpace;
    ULONG           cbNonBlockingIO;
    SPAUDIOSTATE    State;
    ULONGLONG       CurSeekPos;
    ULONGLONG       CurDevicePos;
    DWORD           dwReserved1;
    DWORD           dwReserved2;
} SPAUDIOSTATUS;
```

Members cbFreeBuffSpace
　　Size, in bytes, of free space for reading and/or writing in the audio object.
cbNonBlockingIO

State
    The state of type SPAUDIOSTATE of the audio device.
CurSeekPos
    The current seek position, in bytes, within the audio stream. This is the position in the stream at which the next read or write will be performed.
CurDevicePos
    The current read position, in bytes, of the device. This is the position in the stream where the device is currently reading or writing. For readable streams, this value will always be greater than or equal to CurSeekPos. For writeable streams, this value will always be less than or equal to CurSeekPos.
dwReserved1
    Reserved for future expansion.
dwReserved2
    Reserved for future expansion.

---

[This is preliminary documentation and subject to change.] 

SPBINARYGRAMMAR

SPBINARYGRAMMAR contains the grammar size information.

```
typedef struct SPBINARYGRAMMAR
{
    ULONG      ulTotalSerializedSize;
} SPBINARYGRAMMAR;
```

Members ulTotalSerializedSize
    Total size, in bytes, of the serialized grammar.

---

[This is preliminary documentation and subject to change.] 

SPEVENT

SPEVENT passes back information about event objects.

```
typedef struct SPEVENT
{
    int          eEventId : 16;
    int          elParamType : 16;
    ULONG        ulStreamNum;
    ULONGLONG    ullAudioStreamOffset;
    WPARAM       wParam;
    LPARAM       lParam;
} SPEVENT;
```

Members eEventId : 16
　　The event ID of type SPEVENTENUM.
elParamType : 16;
　　The parameter type of type SPEVENTLPARAMTYPE.
eEventId
　　The event ID. This ID contains flags used to define the characteristic of the event. Three characteristics are defined. Event Flags identify each event as separate depending on the context or the event source. Private Driver Code stores driver-dependent relationships. The pointer flag to *lParam* indicates that the *LParam* field of SPEVENT points to valid information. In this case, the *wParam* field stores the size of the structure.
ulStreamNum
　　The input stream number of the ISpVoice::Speak or ISpVoice::SpeakStream method associated with the event.
ullAudioStreamOffset
　　An offset with the audio stream for the event. For synthesis, the output is the synthesized data. For recognition, this indicates the required audio stream.
wParam
　　The generic word field. For event IDs with the SPFEI_LPARAM_IS_POINTER set, this is the size, in bytes, for the data pointed to by *lParam*. In some cases, the type of event will change the function of this parameter. See SPEVENTENUM for information about specific events.
lParam
　　The generic event field. For event IDs with the SPFEI_LPARAM_IS_POINTER set, this points to the data allocated by CoTaskMemAlloc. The caller is responsible for freeing this memory using CoTaskMemFree(). In some cases, the type of event will change the function of this parameter. See SPEVENTENUM for information about specific events.

---

[This is preliminary documentation and subject to change.] 

SPEVENTSOURCEINFO

A structure used by ISpEventSource::GetInfo to pass back event information.

```
typedef struct SPEVENTSOURCEINFO
{
    ULONGLONG   ullEventInterest;
    ULONGLONG   ullQueuedInterest;
    ULONG       ulCount;
} SPEVENTSOURCEINFO;
```

Members ullEventInterest
　　Event ID flags of type SPEVENTENUM marking events which invoke a notification.
ullQueuedInterest
　　Queue of event IDs. These remain until ISpEventSource::GetEvents removes them.
ulCount
　　Number of events currently queued.

SPPARSEINFO

```
typedef struct SPPARSEINFO
{
    ULONG           cbSize;
    SPRULEHANDLE    hRule;
    ULONGLONG       ullAudioStreamPosition;
    ULONG           ulAudioSize;
    ULONG           cTransitions;
    SPPATHENTRY     *pPath;
    BOOL            fHypothesis;
    GUID            SREngineID;
    ULONG           ulSREnginePrivateDataSize;
    const BYTE      *pSREnginePrivateData;
} SPPARSEINFO;
```

Members cbSize
hRule
ullAudioStreamPosition
ulAudioSize
cTransitions
pPath
fHypothesis
SREngineID
ulSREnginePrivateDataSize
pSREnginePrivateData

---

[This is preliminary documentation and subject to change.] 

SPPATHENTRY

```
typedef [restricted] struct SPPATHENTRY
{
    union
    {
        SPTRANSITIONID    hTransition;
        SPPHRASEELEMENT   elem;
    };
} SPPATHENTRY;
```

Members hTransition
elem

SPPHRASE

```
typedef [restricted] struct SPPHRASE
{
    ULONG                       cbSize;
    LANGID                      LangID;
    WORD                        wReserved;
    ULONGLONG                   ftStartTime;
    ULONGLONG                   ullAudioStreamPosition;
    ULONG                       ulAudioSizeBytes;
    ULONG                       ulAudioSizeTime;
    SPPHRASERULE                Rule;
    const SPPHRASEPROPERTY    * pProperties;
    const SPPHRASEELEMENT     * pElements;
    ULONG                       cReplacements;
    const SPPHRASEREPLACEMENT * pReplacements;
    GUID                        SREngineID;
    ULONG                       ulSREnginePrivateDataSize;
    const BYTE                * pSREnginePrivateData;
} SPPHRASE;
```

Members cbSize
    The size of this structure in bytes.
LangID
    The language ID of the current language.
wReserved
    Reserved for future use.
ftStartTime
ullAudioStreamPosition
ulAudioSizeBytes
ulAudioSizeTime
Rule
pProperties
pElements
cReplacements
pReplacements
SREngineID
ulSREnginePrivateDataSize
pSREnginePrivateData

---

[This is preliminary documentation and subject to change.]

SPPHRASEALT

```
typedef struct tagSPPHRASEALT
{
    ISpPhraseBuilder   *pPhrase;
    ULONG               ulStartElementInParent;
    ULONG               cElementsInParent;
```

```
        ULONG              cElementsInAlternate;
        void               *pvAltExtra;
        ULONG              cbAltExtra;
} SPPHRASEALT;
```

Members pPhrase
ulStartElementInParent
cElementsInParent
cElementsInAlternate
pvAltExtra
cbAltExtra

---

[This is preliminary documentation and subject to change.]

SPPHRASEALTREQUEST

```
typedef struct tagSPPHRASEALTREQUEST
{
    ULONG             ulStartElement;
    ULONG             cElements;
    ULONG             ulRequestAltCount;
    void *            pvResultExtra;
    ULONG             cbResultExtra;
    ISpPhrase *       pPhrase;
    ISpRecoContext *  pRecoContext;
} SPPHRASEALTREQUEST;
```

Members ulStartElement
cElements
ulRequestAltCount
pvResultExtra
cbResultExtra
pPhrase
pRecoContext

---

[This is preliminary documentation and subject to change.]

SPPHRASEELEMENT

```
typedef [restricted] struct SPPHRASEELEMENT
{
    ULONG             ulAudioStreamOffset;
    ULONG             ulAudioTimeOffset;
    ULONG             ulAudioSizeBytes;
    ULONG             ulAudioSizeTime;   // In 100ns units
```

```
    const WCHAR *          pszDisplayText;
    const WCHAR *          pszLexicalForm;
    const WCHAR *          pszPronunciation;
    BYTE                   bDisplayAttributes;
    char                   RequiredConfidence;
    char                   ActualConfidence;
    float                  SREngineConfidence;
    BYTE                   Reserved;
} SPPHRASEELEMENT;
```

Members ulAudioStreamOffset
ulAudioTimeOffset
ulAudioSizeBytes
ulAudioSizeTime
pszDisplayText
pszLexicalForm
pszPronunciation
bDisplayAttributes
RequiredConfidence
ActualConfidence
SREngineConfidence
Reserved

---

[This is preliminary documentation and subject to change.] 

SPPHRASEPROPERTY

```
struct SPPHRASEPROPERTY
{
    const WCHAR *           pszName;
    ULONG                   ulId;
    const WCHAR *           pszValue;
    VARIANT                 vValue;
    ULONG                   ulFirstElement;
    ULONG                   ulCountOfElements;
    char                    PropertyConfidence;
    const SPPHRASEPROPERTY* pNextSibling;
    const SPPHRASEPROPERTY* pFirstChild;
};
```

Members pszName
ulId
pszValue
vValue
    Will be VT_BOOL, VT_I4, VT_R4, VT_R8, or VT_BYREF (only for dynamic grammars)
ulFirstElement
ulCountOfElements
PropertyConfidence
pNextSibling
pFirstChild

SPPHRASEREPLACEMENT

```
typedef struct tagSPPHRASEREPLACEMENT
{
    BYTE                bDisplayAttributes;
    const WCHAR *       pszReplacementText;
    ULONG               ulFirstElement;
    ULONG               ulCountOfElements;
} SPPHRASEREPLACEMENT;
```

Members bDisplayAttributes
pszReplacementText
ulFirstElement
ulCountOfElements

---

[This is preliminary documentation and subject to change.]

SPPHRASERULE

```
struct tagSPPHRASERULE
{
    const WCHAR *           pszName;
    ULONG                   ulId;
    ULONG                   ulFirstElement;
    ULONG                   ulCountOfElements;
    const SPPHRASERULE *    pNextSibling;
    const SPPHRASERULE *    pFirstChild;
};
```

Members pszName
ulId
ulFirstElement
ulCountOfElements
pNextSibling
pFirstChild

SPPROPERTYINFO

SPPROPERTYINFO contains property name and value information.

```
typedef struct tagSPPROPERTYINFO
{
    const WCHAR    *pszName;
    ULONG          ulId;
    const WCHAR    *pszValue;
    VARIANT        vValue;
} SPPROPERTYINFO;
```

Members pszName
   Pointer to the null-terminated string that contains the name information of the property.
ulId
   Identifier associated with the property.
pszValue
   Pointer to the null-terminated string that contains the value information of the property.
vValue
   Must be one of the following: VT_BOOL, VT_I4, VT_R4, VT_R8, or VT_BYREF (for dynamic grammars only.)

---

[This is preliminary documentation and subject to change.]

SPRECOCONTEXTSTATUS

```
typedef [restricted] struct SPRECOCONTEXTSTATUS
{
    SPINTERFERENCE    eInterference;
    WCHAR             szRequestTypeOfUI[255];
    DWORD             dwReserved1;
    DWORD             dwReserved2;
} SPRECOCONTEXTSTATUS;
```

Members eInterference
   One of the interference types contained in the SPINTERFERENCE enumeration.
szRequestTypeOfUI[255]
   Specifies the type of UI requested. If the first byte is NULL, then no UI is requested.
dwReserved1
   Reserved for future expansion.
dwReserved2
   Reserved for future expansion.

SPRECOGNIZERSTATUS

```
typedef [restricted] struct SPRECOGNIZERSTATUS
{
    SPAUDIOSTATUS    AudioStatus;
    ULONGLONG        ullRecognitionStreamPos;
    ULONG            ulStreamNumber;
    ULONG            ulNumActive;
    CLSID            clsidEngine;
    ULONG            cLangIDs;
    LANGID           aLangID[ SP_MAX_LANGIDS ];
    DWORD            dwReserved1;
    DWORD            dwReserved2;
} SPRECOGNIZERSTATUS;
```

Members

AudioStatus
 The SPAUDIOSTATUS structure containing the current audio device information.
ullRecognitionStreamPos
ulStreamNumber
ulNumActive
 The current engine's number of active languages.
clsidEngine
 The unique identifier associated with the current engine.
cLangIDs
 The current engine's number of valid language identifiers.
aLangID
 The engine can support a maximum of SP_MAX_LANGIDS active languages.
dwReserved1
 Reserved for future expansion.
dwReserved2
 Reserved for future expansion.

---

[This is preliminary documentation and subject to change.]

SPRECORESULTINFO

SPRECORESULTINFO is the result structure passed from the engine to SAPI.

```
typedef struct SPRECORESULTINFO
{
    ULONG             cbSize;
    SPRESULTTYPE      eResultType;
    BOOL              fHypothesis;
    BOOL              fProprietaryAutoPause;
    ULONGLONG         ullStreamPosStart;
    ULONGLONG         ullStreamPosEnd;
    SPGRAMMARHANDLE   hGrammar;
    ULONG             ulSizeEngineData;
```

```
        void           * pvEngineData;
    ISpPhraseBuilder   *pPhrase;
} SPRECORESULTINFO;
```

Members cbSize
    Total size, in bytes, of this structure.
eResultType
    Type of result object (CFG, SLM, or Proprietary).
fHypothesis
    If TRUE then this recognition is a hypothesis.
fProprietaryAutoPause
    This field is only used for SPERT_PROPRITARY grammars. If TRUE, the recognition will pause.
ullStreamPosStart
    Starting position within the input stream.
ullStreamPosEnd
    Ending position within the input stream.
hGrammar
    Required for SPERT_SLM and SPERT_PROPRIETARY, otherwise this value is NULL
ulSizeEngineData
    Specifies the size of *pvEngineData*.
pvEngineData
    Pointer to the engine data.
pPhrase
    Pointer to phrase object

---

[This is preliminary documentation and subject to change.] 

SPRECORESULTTIMES

SPRECORESULTTIMES contains the time information for speech recognition. This data structure is used by the ISpRecoResult::GetResultTimes method.

```
typedef struct SPRECORESULTTIMES
{
    FILETIME     ftStreamTime
    ULONGLONG    ullLength
    DWORD        dwTickCount;
    ULONGLONG    ullStart;
} SPRECORESULTTIMES;
```

Members ftStreamTime
    Number of 100 nanosecond units in UTC time from January 1, 1601 to the start of the current result. This is the same as calling the Win32 GetSystemTimeAsFileTime() function for the result.
ullLength
    Value containing the length of the phrase specified in 100 nanosecond units.
dwTickCount

Number of 100 nanosecond units elasped from the start of the system to the start of the current result.
ulStart
Value containing the total 100 nanosecond units from the start of the stream to the start of the phrase.

---

[This is preliminary documentation and subject to change.] 

SPRULEENTRY

```
typedef [restricted] struct SPRULEENTRY
{
    SPRULEHANDLE    hRule;
    SPSTATEHANDLE   hInitialState;
    DWORD           Attributes;
    void *          pvClientContext;
} SPRULEENTRY;
```

Members hRule
hInitialState
Attributes
pvClientContext

---

[This is preliminary documentation and subject to change.] 

SPSERIALIZEDEVENT

```
typedef [restricted] struct SPSERIALIZEDEVENT
{
    WORD        eEventId;
    WORD        elParamType;
    ULONG       ulStreamNum;
    ULONGLONG   ullAudioStreamOffset;
    ULONG       SerializedwParam;
    LONG        SerializedlParam;
} SPSERIALIZEDEVENT;
```

Members eEventId
One of the event identifiers from the SPEVENTENUM enumeration.
elParamType
One of the event parameter types from the SPEVENTLPARAMTYPE enumeration.
ulStreamNum
The input stream number associated with this event.
ullAudioStreamOffset
SerializedwParam

SerializedlParam

---

[This is preliminary documentation and subject to change.]

SPSERIALIZEDPHRASE

```
typedef struct tagSPSERIALIZEDPHRASE
{
    ULONG       ulSerializedSize;
} SPSERIALIZEDPHRASE;
```

Members ulSerializedSize
    Value specifying the size of the structure in bytes.

---

[This is preliminary documentation and subject to change.]

SPSERIALIZEDRESULT

SPSERIALIZEDRESULT contains the phrase size information.

```
typedef struct SPSERIALIZEDRESULT
{
    ULONG    ulSerializedSize;
} SPSERIALIZEDRESULT;
```

Members ulSerializedSize
    The size of the entire phrase in bytes, including this ULONG.

---

[This is preliminary documentation and subject to change.]

SPSTATEINFO

```
typedef [restricted] struct SPSTATEINFO
{
    ULONG                cAllocatedEntries;
    SPTRANSITIONENTRY *  pTransitions;
    ULONG                cEpsilons;
    ULONG                cRules;
    ULONG                cWords;
```

```
    ULONG         cTextBuffer;
} SPSTATEINFO;
```

Members cAllocatedEntries
pTransitions
    Pointer to a SPTRANSITIONENTRY structure.
cEpsilons
cRules
cWords
cTextBuffer

---

[This is preliminary documentation and subject to change.] 

SPTEXTSELECTIONINFO

```
typedef struct tagSPTEXTSELECTIONINFO
{
    ULONG       ulStartActiveOffset;
    ULONG       cchActiveChars;
    ULONG       ulStartSelection;
    ULONG       cchSelection;
} SPTEXTSELECTIONINFO;
```

Members ulStartActiveOffset
cchActiveChars
ulStartSelection
cchSelection

---

[This is preliminary documentation and subject to change.] 

SPTMTHREADINFO

SPTMTHREADINFO contains thread management information implemented by the ISpTaskManager interface.

```
typedef struct SPTMTHREADINFO
{
    long    lPoolSize;
    long    lPriority;
    ULONG   ulConcurrencyLimit;
    ULONG   ulMaxQuickAllocThreads;
} SPTMTHREADINFO;
```

Members lPoolSize
    Number of threads in pool (-1 default)
lPriority
    Priority of threads in pool
ulConcurrencyLimit
    Number of threads allowed to concurrently execute (0 default)
ulMaxQuickAllocThreads
    Maximum number of dedicated threads retained

---

[This is preliminary documentation and subject to change.] 

SPTRANSITIONENTRY

```
typedef [restricted] struct SPTRANSITIONENTRY
{
    SPTRANSITIONID      ID;
    SPSTATEHANDLE       hNextState;
    BYTE                Type;           // SPTRANSITIONTYPE
    char                RequiredConfidence;
    struct
    {
        DWORD fHasProperty;
                //BUGBUG: should be bitfield -- robch
    };
    float               Weight;
    union
    {
        struct
        {
            SPSTATEHANDLE   hRuleInitialState;  // Only if Type == SPTRANSRULE
            SPRULEHANDLE    hRule;
            void          * pvClientRuleContext;
        };
        struct
        {
            SPWORDHANDLE    hWord;              // Only if Type == SPTRANSWORD
            void          * pvClientWordContext;
        };
        struct
        {
            void          * pvGrammarCookie;    // Only if Type == SPTRANSTEXTBUF
        };
    };
} SPTRANSITIONENTRY;
```

Members

ID
hNextState
Type
RequiredConfidence
Reserved
Weight
hRuleInitialState
hRule pvClientRuleContext
hWord
pvClientWordContext
pvGrammarCookie

---

[This is preliminary documentation and subject to change.] 

SPTRANSITIONPROPERTY

SPTRANSITIONPROPERTY contains transition property information.

```
typedef [restricted] struct   SPTRANSITIONPROPERTY
{
    const WCHAR    *pszName;
    ULONG          ulId;
    const WCHAR    *pszValue;
    VARIANT        vValue;
} SPTRANSITIONPROPERTY;
```

Members pszName
    Address of a null-terminated string containing the name information.
ulId
    Identifier associated with the transition property.
pszValue
    Address of a null-terminated string containing the value information.
vValue
    For dynamic grammars this value will be VT_BOOL, VT_I4, VT_R4, VT_R8, or VT_BYREF.

---

[This is preliminary documentation and subject to change.] 

SPVCONTEXT

SPVCONTEXT contains information specifying audio string context category information.

```
typedef [restricted] struct SPVCONTEXT
{
    LPCWSTR    pCategory;
    LPCWSTR    pBefore;
    LPCWSTR    pAfter;
} SPVCONTEXT;
```

Members pCategory
    Specifies the name information associated with the context category.

pBefore
    Specifies the *pBefore* pointer associated with the audio string.
pAfter
    Specifies the *pAfter* pointer associated with the audio string.

---

[This is preliminary documentation and subject to change.] 

SPVOICESTATUS

SPVOICESTATUS contains voice stream information.

```
typedef struct SPVOICESTATUS
{
    ULONG       ulCurrentStream;
    ULONG       ulLastStreamQueued;
    HRESULT     hrLastResult;
    DWORD       dwRunningState;
    ULONG       ulInputWordPos;
    ULONG       ulInputWordLen;
    ULONG       ulInputSentPos;
    ULONG       ulInputSentLen;
    LONG        lBookmarkId;
    SPPHONEID   PhonemeId;
    SPVISEMES   VisemeId;
    DWORD       dwReserved1;
    DWORD       dwReserved2;
} SPVOICESTATUS;
```

Members ulCurrentStream
    Number of the current stream being synthesized or receiving output.
ulLastStreamQueued
    Number of the last stream queued.
hrLastResult
    Result of the last speak.
dwRunningState
    Set if and only if all streams generated by Speak and SpeakStream calls have been sent to the audio output.
ulInputWordPos
    Character position within the stream of the word currently being rendered.
ulInputWordLen
    Length of the word currently being rendered.
ulInputSentPos
    Character position within the stream of the word currently being sent.
ulInputSentLen
    Length of the word currently being sent.
lBookmarkId
    Current bookmark name (in base 10) converted to a long integer. If name of current bookmark not an integer then *lBookmarkId* will be zero.
PhonemeId
    Current phoneme ID.
VisemeId
    Current viseme ID.

dwReserved1
    Reserved for future expansion.
dwReserved2
    Reserved for future expansion.

---

[This is preliminary documentation and subject to change.] 

SPVPITCH

```
typedef struct SPVPITCH
{
    long MiddleAdj;
    long RangeAdj;
} SPVPITCH;
```

Members

MiddleAdj
RangeAdj

Remarks

See Also

---

[This is preliminary documentation and subject to change.] 

SPVSENTITEM

```
typedef struct SPVSENTITEM
{
    const SPVSTATE* pXmlState;
    LPCWSTR         pItem;
    ULONG           ulItemLen;
    ULONG           ulItemSrcOffset;  // Original source character position
    ULONG           ulItemSrcLen;     // Length of original source item in charact
} SPVSENTITEM;
```

Members pXmlState
pItem
ulItemLen
ulItemSrcOffset
ulItemSrcLen

SPVSTATE

```
typedef [restricted] struct SPVSTATE
{
//--- Action
    SPVACTIONS        eAction;

//--- Running state values
    LANGID            LangID;
    WORD              wReserved;
    long              EmphAdj;
    long              RateAdj;
    ULONG             Volume;
    SPVPITCH          PitchAdj;
    ULONG             SilenceMSecs;
    SPPHONEID*        pPhoneIds;
    SPPARTOFSPEECH    ePartOfSpeech;
    SPVCONTEXT        Context;
} SPVSTATE;
```

Members eAction
    Describes the action to be performed with the associated text fragment. The normal action is to Speak (SPVA_Speak) the fragment.

LangID
    The language ID of the current language.

wReserved
    Reserved for future use.

EmphAdj
    Determines if the text should be emphasized. Zero means no emphasis is used and one indicates emphasis is used.

RateAdj
    The current rate for the voice instance. Zero uses the natural rate for the current voice. Other values range from -10 to +10.

Volume
    The current volume level for the voice instance. Valid range is from zero (complete silence) through 100 (full natural volume of the current voice).

PitchAdj
    The current pitch for the voice instance. Zero uses the natural pitch for the current voice. Other values range from -10 to +10.

SilenceMSecs
    The length of a silence, in milliseconds, to be inserted.

pPhoneIds
    Pointer to a null-terminated array of Phone identifiers.

ePartOfSpeech
    SAPI standard part of speech.

Context
    The context for the text being synthesized. This is intended for use during the normalization phase. A category preceding and following text can be specified.

SPVTEXTFRAG

The SPVTEXTFRAG structure contains information about the voice's text fragment during speech synthesis.

```
typedef struct SPVTEXTFRAG
{
    struct SPVTEXTFRAG*    pNext;
    SPVSTATE               State;
    LPCWSTR                pTextStart;
    ULONG                  ulTextLen;
    ULONG                  ulTextSrcOffset;
} SPVTEXTFRAG;
```

Members pNext
    Pointer to the next text fragment in list. A NULL value indicates the end of the list.
State
    The current XML attribute state.
pTextStart
    Pointer to the beginning text string.
ulTextLen
    The length, in characters, of the text string.
ulTextSrcOffset
    Original offset position within the text string.

---

[This is preliminary documentation and subject to change.] 

SPWORD

SPWORD is used with ISpLexicon to temporarily store the word currently being tested. It is usually used in connection with SPWORDLIST.

```
typedef [restricted] struct SPWORD
{
    struct SPWORD          *pNextWord;
    LANGID                 LangID;
    WORD                   wReserved;
    SPWORDTYPE             eWordType;
    WCHAR                  *pszWord;
    SPWORDPRONUNCIATION    *pFirstWordPronunciation;
} SPWORD;
```

Members pNextWord
    Pointer to the next word in the list.
LangID

The language ID of the word.
wReserved
    Reserved for future use.
eWordType
    Flag of type SPWORDTYPE indicating whether to add or delete the word.
pszWord
    The offset of the word entry.
pFirstWordPronunciation
    Pointer to the first possible pronunciation of the word.

---

[This is preliminary documentation and subject to change.] 

SPWORDENTRY

```
typedef [restricted] struct SPWORDENTRY
{
    SPWORDHANDLE    hWord;
    LANGID          LangID;
    const WCHAR   * pszDisplayText;
    const WCHAR   * pszLexicalForm;
    SPPHONEID     * aPhoneId;
    void          * pvClientContext;
} SPWORDENTRY;
```

Members hWord
    Handle to the current word.
LangID
    Language identifier.
pszDisplayText
    Pointer to a null-terminated string containing the display text information.
pszLexicalForm
    Pointer to a null-terminated string containing the lexical text information.
aPhoneId
    Pointer to a string containing the phoneme identifier.
pvClientContext
    Pointer to a string representing the client context data.

---

[This is preliminary documentation and subject to change.] 

SPWORDLIST

SPWORDLIST is used with ISpLexicon to set and receive words currently in the lexicon. This structure is the beginning of a linked list of SPWORD structures and contains the size and actual buffer of all subsequent word operations.

```
typedef struct SPWORDLIST
```

```
{
    ULONG                   ulSize;
    BYTE                    *pvBuffer;
    SPWORD                  *pFirstWord;
} SPWORDLIST;
```

Members ulSize
    The size of the buffer for the word, in bytes.
pvBuffer
    Pointer to the buffer for the word.
pFirstWord
    Pointer to the first word in the list.

Examples

The following example is a code fragment demonstrating the use and creation of SPWORDLIST. The code initializes the structure prior to use.

```
SPWORDLIST SPWordList;
    hr = ZeroMemory(&SPWordList, sizeof(SPWordList));
    if (SUCCEEDED(hr))
        hr = pLex->GetWords(eLEXTYPE_USER, &dwGen, &dwCookie, &SPWordList);
    ::CoTaskMemFree(SPWordList.pvBuffer);
```

---

[This is preliminary documentation and subject to change.] 

SPWORDPRONUNCIATION

SPWORDPRONUNCIATION is used by ISpLexicon for words with possible variations in pronunciation. SPWORDPRONUNCIATION contains the word pronouncation currently being tried.

```
typedef [restricted] struct SPWORDPRONUNCIATION
{
    struct SPWORDPRONUNCIATION    *pNextWordPronunciation;
    SPLEXICONTYPE                 eLexiconType;
    LANGID                        LangID;
    WORD                          wReserved;
    SPPARTOFSPEECH                ePartOfSpeech;
    WCHAR                         szPronunciation[1];
} SPWORDPRONUNCIATION;
```

Members pNextWordPronunciation
    Pointer to the next possible pronouncation. May be NULL.
eLexiconType
    Flags of type SPLEXICONTYPE where this pronouncation (PRO)/part of speech (POS) was obtained.
LangID
    The language identifier.
wReserved

Reserved for future use.
ePartOfSpeech
    The part of speech used by this particular variation.
szPronunciation[1]
    The offset from the start of lex file of the sub-lexwordinfoin. Used to convert the part of speech or pronouncation to a WORDINFO array.

---

[This is preliminary documentation and subject to change.] 

SPWORDPRONUNCIATIONLIST

SPWORDPRONUNCIATIONLIST is used with ISpLexicon::GetPronunciation to list possible variations in pronunciation for a given word. It is used to store intermediate values for word pronunciations. This structure is the start of a linked list of SPWORDPRONUNCIATION structures and contains the size and actual buffer of all subsequent pronunciation attempts.

```
typedef struct SPWORDPRONUNCIATIONLIST
{
    ULONG                 ulSize;
    BYTE                  *pvBuffer;
    SPWORDPRONUNCIATION   *pFirstWordPronunciation;
} SPWORDPRONUNCIATIONLIST;
```

Members ulSize
    Size of the pronunciation buffer, in bytes.
pvBuffer
    Pointer to a buffer for one pronunciation.
pFirstWordPronunciation
    Pointer to a SPWORDPRONUNCIATION structure.

Example

The following example is a code fragment demonstrating the use and creation of SPWORDPRONUNCIATIONLIST.

```
SPWORDPRONUNCIATIONLIST spwordpronlist;
    memset(spwordpronlist, 0, sizeof(spwordpronlist));

pISpLexicon->GetPronunciation(L"resume", 0, 0, &spwordpronlist);
    for (
        SPWORDPRONUNCIATION pwordpron = pwordpronlist->pFirstWordPron;
        wordpron != NULL;
        wordpron = pwordpron->pNextWordPron
        )
    {
        DoSomethingWith(pwordpron->ePartOfSpeech, pwordpron->pszPronIPA);
    }
    CoTaskMemFree(spwordpronlist.pvBuffer);
```

WAVEFORMATEX

WAVEFORMATEX defines the format of waveform-audio data. Only format information common to all waveform-audio data formats is included in this structure. For formats requiring additional information, this structure is included as the first member in another structure, along with the additional information.

```
typedef [restricted] struct WAVEFORMATEX
{
    WORD    wFormatTag;
    WORD    nChannels;
    DWORD   nSamplesPerSec;
    DWORD   nAvgBytesPerSec;
    WORD    nBlockAlign;
    WORD    wBitsPerSample;
    WORD    cbSize;
} WAVEFORMATEX;
```

Members wFormatTag
> Waveform-audio format type. Format tags are registered with Microsoft Corporation for many compression algorithms. A complete list of format tags is located in the Mmsystem.h header file.

nChannels
> Number of channels in the waveform-audio data. Monaural data uses one channel and stereo data uses two channels.

nSamplesPerSec
> Sample rate, in samples per second (hertz), that each channel should be played or recorded. If *wFormatTag* is WAVE_FORMAT_PCM, then common values for *nSamplesPerSec* are 8.0 kHz, 11.025 kHz, 22.05 kHz, and 44.1 kHz. For non-PCM formats, this member must be computed according to the manufacturer's specification of the format tag.

nAvgBytesPerSec
> Required average data-transfer rate, in bytes per second, for the format tag. If *wFormatTag* is WAVE_FORMAT_PCM, *nAvgBytesPerSec* should be equal to the product of *nSamplesPerSec* and *nBlockAlign*. For non-PCM formats, this member must be computed according to the manufacturer's specification of the format tag.
>
> Playback and record software can estimate buffer sizes by using the *nAvgBytesPerSec* member.

nBlockAlign
> Block alignment, in bytes. The block alignment is the minimum atomic unit of data for the *wFormatTag* format type. If *wFormatTag* is WAVE_FORMAT_PCM, *nBlockAlign* should be equal to the product of *nChannels* and *wBitsPerSample* divided by 8 (bits per byte). For non-PCM formats, this member must be computed according to the manufacturer's specification of the format tag.
>
> Playback and record software must process a multiple of *nBlockAlign* bytes of data at a time. Data written and read from a device must always start at the beginning of a block. For example, it is illegal to start playback of PCM data in the middle of a sample (that is, on a non-block-aligned boundary).

wBitsPerSample
    Bits per sample for the *wFormatTag* format type. If *wFormatTag* is WAVE_FORMAT_PCM, then *wBitsPerSample* should be equal to 8 or 16. For non-PCM formats, this member must be set according to the manufacturer's specification of the format tag. Note that some compression schemes cannot define a value for *wBitsPerSample*, so this member can be zero.

cbSize
    Size, in bytes, of extra format information appended to the end of the WAVEFORMATEX structure. This information can be used by non-PCM formats to store extra attributes for the *wFormatTag*. If no extra information is required by the *wFormatTag*, this member must be set to zero. For WAVE_FORMAT_PCM formats only, this member is ignored.

Application-Level Interfaces

This section describes the interfaces and methods for incorporating speech into applications. They are intended for use at the API or application level. Some managers or interfaces may have entries also in Engine-Level Interface section. However, entries listed here apply only to the application level.

- Audio Manager
- Event Manager
- Grammar Compiler Manager
- Lexicon Manager
- Resource Manager
- Speech Recognition Manager
- Text-to-Speech Manager © 1995-2000 Microsoft Corporation. All rights reserved Microsoft Speech SDK
with SAPI 5.0

[This is preliminary documentation and subject to change.]

Audio interfaces

This section provides SAPI 5.0 audio interfaces.

Audio inherits from the standard COM IStream interface. See the MSDN documentation for a complete discussion of IStream and associated methods.

- ISpAudio
- ISpMMSysAudio
- ISpStream
- ISpStreamFormat
- ISpStreamFormatConverter
- ISpTranscript © 1995-2000 Microsoft Corporation. All rights reserved Microsoft Speech SDK
with SAPI 5.0

[This is preliminary documentation and subject to change.]

ISpAudio

When to Implement

Objects implementing this interface are real-time audio streams, such as those connected to a live microphone or telephone line. ISpAudio methods allow control over the real-time behavior of the stream. IStream Read and Write methods transfer data to or from an object.

Note: The ISpAudio interface inherits from ISpStreamFormat.

Methods in Vtable Order

| ISpAudio Methods | Description |
| --- | --- |
| SetState | Sets the state of the audio device. |
| SetFormat | Sets the format of the audio device. |
| GetStatus | Passes back the status of the audio device. |
| SetBufferInfo | Sets the audio stream buffer information. |
| GetBufferInfo | Passes back the audio stream buffer information. |
| GetDefaultFormat | Passes back the default audio format. |
| EventHandle | Returns a Win32 event handle that applications can use to wait for status changes in the I/O stream. |
| GetVolumeLevel | Passes back the current volume level. |
| SetVolumeLevel | Sets the current volume level. |
| GetBufferNotifySize | Retrieves the audio stream buffer size information. |
| SetBufferNotifySize | Sets the audio stream buffer size information. |

© 1995-2000 Microsoft Corporation. All rights reserved.

[This is preliminary documentation and subject to change.] 

ISpAudio::SetState

ISpAudio::SetState sets the state of the audio device.

When transitioning from the SPAS_CLOSED state to any other state, the caller should be ready to handle various error conditions, specifically, SPERR_FORMAT_NOT_SUPPORTED and SPERR_DEVICE_BUSY. Many multi-media devices do not correctly report their capabilities for handling different audio formats and fail only when an attempt is made to open the device.

Also, in many older systems, audio output devices can only be opened by a single process. In all current versions of Windows, only a single process can open an audio input device. Therefore, SPERR_DEVICE_BUSY will return if an attempt is made to open a device that is being used by a different process or thread.

```
HRESULT SetState(
    SPAUDIOSTATE    NewState,
    ULONGLONG       ullReserved
);
```

Parameters

*NewState*
    [in] The flag of type SPAUDIOSTATE for the new state of the audio device.
*ullReserved*
    [in] Reserved, do not use. This value must be zero.

Return values

| Value | Description |
| --- | --- |
| S_OK | Function completed successfully. |
| E_INVALIDARG | *ullReserved* is not zero. |
| SPERR_DEVICE_BUSY | Hardware device is in use by another thread or process. |
| SPERR_FORMAT_NOT_SUPPORTED | Current format set by ISpAudio::SetFormat is not supported by the hardware device. |

© 1995-2000 Microsoft Corporation. All rights reserved

[This is preliminary documentation and subject to change.] 

ISpAudio::SetFormat

ISpAudio::SetFormat sets the format of the audio device.

This method can only be called when the audio device is in the SPAS_CLOSED state. Note that successfully setting the format on a audio device does not necessarily mean the format is supported. An attempt must be made to place the device into a non-closed state (SPAS_STOP, SPAS_PAUSE or SPAS_RUN) to be sure that the device can handle the format.

The format can be retrieved by calling the ISpStreamFormat::GetFormat method.

```
HRESULT SetFormat(
    REFGUID    rguidFmtId,
    const   WAVEFORMATEX   *pWaveFormatEx
);
```

Parameters

*rguidFmtId*
    [in] The REFGUID for the format to set.
*pWaveFormatEx*
    [in] Address of the WAVEFORMATEX structure containing the wave file format information.

Return values

| Value | Description |
|---|---|
| S_OK | Function completed successfully. See note about supported formats. |
| E_INVALIDARG | *pWaveFormatEx* is invalid or bad. |
| SPERR_DEVICE_BUSY | Device is not in the SPAS_CLOSED state. |
| SPERR_UNINITIALIZED | Audio stream not initialized. |
| SPERR_FORMAT_NOT_SUPPORTED | Specified format is not supported. |
| FAILED(hr) | Appropriate error message. |

© 1995-2000 Microsoft Corporation. All rights reserved.

---

[This is preliminary documentation and subject to change.] 

ISpAudio::GetStatus

ISpAudio::GetStatus gets the status of the audio device.

Use this method to determine whether the device is running, stopped, closed, or paused. It also determines the size of any buffered data.

```
HRESULT GetStatus(
   SPAUDIOSTATUS  *pStatus
);
```

Parameters

*pStatus*
    [out] Pointer to the SPAUDIOSTATUS buffer.

Return values

| Value | Description |
|---|---|
| S_OK | Function completed successfully. |
| E_POINTER | *pStatus* is invalid. |

© 1995-2000 Microsoft Corporation. All rights reserved

---

[This is preliminary documentation and subject to change.] 

ISpAudio::SetBufferInfo

ISpAudio::SetBufferInfo sets the audio stream buffer information.

This method can be called only when the audio device is in the SPAS_CLOSED state. The SPAUDIOBUFFERINFO members must conform to the following restrictions:

SPAudioBufferInfo.ulMsMinNotification may be at most one quarter the size of SPAudioBufferInfo.ulMsBufferSize.

SPAudioBufferInfo.ulMsEventBias can be no larger than SPAudioBufferInfo.ulMsBufferSize.

```
HRESULT SetBufferInfo(
    const   SPAUDIOBUFFERINFO   *pBuffInfo
);
```

Parameters

*pBuffInfo*
    [in] Pointer to the SPAUDIOBUFFERINFO buffer.

Return values

| Value | Description |
| --- | --- |
| S_OK | Function completed successfully. |
| SPERR_UNINITIALIZED | Audio stream not initialized. |
| E_INVALIDARG | *pBuffInfo* is invalid or the parameters do not meet the criteria described above. Alternaltely |
| SPERR_DEVICE_BUSY | Audio device is not in the SPAS_CLOSED state. |
| FAILED(hr) | Appropriate error message. |

© 1995-2000 Microsoft Corporation. All rights reser

---

[This is preliminary documentation and subject to change.] 

ISpAudio::GetBufferInfo

ISpAudio::GetBufferInfo gets the audio stream buffer information.

```
HRESULT GetBufferInfo(
    SPAUDIOBUFFERINFO   *pBuffInfo
);
```

Parameters

*pBuffInfo*
    [out] Pointer to the SPAUDIOBUFFERINFO buffer.

Return values

| Value | Description |
| --- | --- |
| S_OK | Function completed successfully. |
| E_POINTER | *pBuffInfo* is invalid. |

ISpAudio::GetDefaultFormat

ISpAudio::GetDefaultFormat gets the default audio format.

Other formats may be supported by the audio device; this format is guaranteed to work.

```
HRESULT GetDefaultFormat(
    GUID            *pFormatId,
    WAVEFORMATEX    **ppCoMemWaveFormatEx
);
```

Parameters

*pFormatId*
    [out] Pointer to the GUID of the default format.
*ppCoMemWaveFormatEx*
    [out] Address of a pointer to the WAVEFORMATEX structure that receives the wave file format information.

Return values

| Value | Description |
| --- | --- |
| S_OK | Function completed successfully. |
| SPERR_UNINITIALIZED | Stream is uninitialized. |
| E_POINTER | At least one of *pFormatId* or *pFormatId* is invalid or bad. |
| E_POINTER | *pFormatId* is invalid. |

© 1995-2000 Microsoft Corporation All rights reserved.

[This is preliminary documentation and subject to change.] 

ISpAudio::EventHandle

ISpAudio::EventHandle returns a Win32 event handle that applications can use to wait for status changes in the I/O stream.

The handle may use one of the various Win32 wait functions, such as WaitForSingleObject or WaitForMultipleObjects.

For read streams, set the event when there is data available to read and reset it whenever there is no available data. For write streams, set the event when all of the data has been written to the device, and reset it at any time when there is still data available to be played.

The caller should not close the returned handle, nor should the caller ever use the event handle after calling Release() on the audio object. The audio device will close the handle on the final release of the object.

```
HANDLE  EventHandle( void );
```

Parameters

None

Return values

| Value | Description |
|---|---|
| HANDLE | Returns valid event handle. |

© 1995-2000 Microsoft Corporation All rights reserv

[This is preliminary documentation and subject to change.]

ISpAudio::GetVolumeLevel

ISpAudio::GetVolumeLevel passes back the current volume level.

The volume level is on a linear scale from 0 to 10000.

```
HRESULT GetVolumeLevel(
    ULONG    *pLevel
);
```

Parameters

*pLevel*
    [out] Pointer to the returned volume level.

Return values

| Value | Description |
|---|---|
| S_OK | Function completed successfully. |
| SPERR_UNINITIALIZED | Audio interface is not initialized. |
| SPERR_DEVICE_NOT_SUPPORTED | The device is not valid or does not support volumes. |
| E_POINTER | *pulLevel* is invalid or bad. |
| E_INVALIDARG | The argument is invalid or is not the correct size. |
| FAILED(hr) | Appropriate error message. |

ISpAudio::SetVolumeLevel

ISpAudio::SetVolumeLevel sets the current volume level.

It is on a linear scale from 0 to 10000.

```
HRESULT SetVolumeLevel(
    ULONG    Level
);
```

Parameters

*Level*
    [in] The new volume level.

Return values

| Value | Description |
|---|---|
| S_OK | Function completed successfully. |

© 1995-2000 Microsoft Corporation. All rights reserved

[This is preliminary documentation and subject to change.] 

ISpAudio::GetBufferNotifySize

ISpAudio::GetBufferNotifySize retrieves the audio stream buffer size information. This information is used to determine when the event returned by ISpAudio::EventHandle is set or reset.

For read streams, the event is set if the audio buffered is greater than or equal to the value set in *pcbSize*, otherwise the event information is reset.

For write streams, the event is set if the audio buffered is less than the value set in *pcbSize*, otherwise the event information is reset.

```
HRESULT GetBufferNotifySize(
    ULONG    *pcbSize
);
```

Parameters

*pcbSize*
    [out] Address of the size information, specified in bytes, that is associated with the audio stream buffer.

Return values

| Value | Description |
|---|---|
| S_OK | Function completed successfully. |
| E_INVALIDARG | One or more arguments are invalid. |
| E_POINTER | Invalid pointer. |
| FAILED(hr) | Appropriate error message. |

© 1995-2000 Microsoft Corporation All rights reserve

[This is preliminary documentation and subject to change.]

ISpAudio::SetBufferNotifySize

ISpAudio::SetBufferNotifySize sets the audio stream buffer size information. This information is used to determine when the event returned by ISpAudio::EventHandle is set or reset.

For read streams the event is set if the audio buffered is greater than or equal to the value set in *pcbSize*, otherwise the event information is reset.

For write streams the event is set if the audio buffered is less than the value set in *pcbSize*, otherwise the event information is reset.

```
HRESULT SetBufferNotifySize(
    ULONG    cbSize
);
```

Parameters

*cbSize*
    [in] The size, specified in bytes, of the information associated with the audio stream buffer.

Return values

| Value | Description |
|---|---|
| S_OK | Function completed successfully. |
| FAILED(hr) | Appropriate error message. |

© 1995-2000 Microsoft Corporation All rights reserve

Microsoft Speech SDK
with SAPI 5.0

[This is preliminary documentation and subject to change.]

ISpMMSysAudio

ISpMMSysAudio inherits from ISpAudio.

This is the interface to the audio implementation for the standard Windows multimedia layer (wave in and wave out). Audio objects created through an object token do not allow the ISpMMSysAudio::SetDeviceId method to work because the token specifies which audio device ID to use. If, for some reason an application wants to associate an audio object with a specific multimedia wave in or wave out device ID, it should use CoCreateInstance with CLSID_SpMMAudioOut or CLSID_SpMMAudioIn and then use the SetDeviceId method to select the desired device.

Methods in Vtable Order

| ISpMMSysAudio Methods | Description |
| --- | --- |
| GetDeviceId | Passes back the multimedia device ID being used by the audio object. |
| SetDeviceId | Sets the multimedia device ID. |
| GetMMHandle | Passes back a multimedia audio stream handle. |

© 1995-2000 Microsoft Corporation. All rights reserved.

[This is preliminary documentation and subject to change.] 

ISpMMSysAudio::GetDeviceId

ISpMMSysAudio::GetDeviceId passes back the multimedia device ID being used by the audio object.

Initially set this device ID to WAVE_MAPPER for instances of CLSID_SpMMAudioIn or CLSID_SpMMAudioOut, which were created using CoCreateInstance. For audio objects created using an object token, the ID will always be a specific wave in or wave out device ID.

```
HRESULT GetDeviceId(
    UINT   *puDeviceId
);
```

Parameters

*puDeviceId*
    [out] Pointer receiving the device ID.

Return values

| Value | Description |
| --- | --- |
| S_OK | Function completed successfully. |
| E_POINTER | *puDeviceId* is invalid. |

ISpMMSysAudio::SetDeviceId

ISpMMSysAudio::SetDeviceId sets the multimedia device ID.

This method works only on audio objects that were not created using an object token, and only when the object is in the SPAS_CLOSED state.

```
HRESULT SetDeviceId(
    UINT    uDeviceId
);
```

Parameters

*uDeviceId*
    [in] The device ID of the device to set.

Return values

| Value | Description |
| --- | --- |
| S_OK | Function completed successfully. |
| SPERR_DEVICE_BUSY | Object is not in the SPAS_CLOSED state. |
| SPERR_ALREADY_INITIALIZED | Object was created using an object token. |
| E_INVALIDARG | *uDeviceId* is invalid. It is not set to WAVE_MAPPER or device does not exist. |

© 1995-2000 Microsoft Corporation. All rights reserved

---

[This is preliminary documentation and subject to change.] 

ISpMMSysAudio::GetMMHandle

ISpMMSysAudio::GetMMHandle passes back a multimedia audio devicestream handle.

The audio object must not be in the SPAS_CLOSED state or this call will fail because the multimedia device will not have been opened yet. The caller must not close the passed back handle. The caller must not use the handle either after changing the state of the audio object to SPAS_CLOSED or after releasing the object.

```
HRESULT GetMMHandle(
    void    **pHandle
);
```

Parameters

*pHandle*
    The wave in or wave out device handle.

Return values

| Value | Description |
|---|---|
| S_OK | Function completed successfully. |
| E_POINTER | *pHandle* is invalid. |
| SPERR_UNINITIALIZED | Audio object is in the SPAS_CLOSED state. |

© 1995-2000 Microsoft Corporation. All rights reserve

Microsoft Speech SDK
with SAPI 5.0 

[This is preliminary documentation and subject to change.]

ISpStream

Note: This interface inherits from ISpStreamFormat.

Methods in Vtable Order

| ISpStream Methods | Description |
|---|---|
| SetBaseStream | Sets the base address of the audio stream. |
| GetBaseStream | Retrieves the base address of the audio stream. |
| BindToFile | Binds the audio stream to the file that it identifies. |
| Close | Closes the audio stream. |

© 1995-2000 Microsoft Corporation. All rights reserve

[This is preliminary documentation and subject to change.] 

ISpStream::SetBaseStream

ISpStream::SetBaseStream sets the base address of the audio stream.

```
HRESULT SetBaseStream(
    IStream              *pStream,
    REFGUID              rguidFormat,
    const   WAVEFORMATEX *pWaveFormatEx
);
```

Parameters

*pStream*
    Address of the IStream containing the base audio stream data.
*rguidFormat*
    Address of the data format identifier associated with the audio stream.
*pWaveFormatEx*
    Address of the WAVEFORMATEX structure that contains the wave file format information.

Return values

| Value | Description |
|---|---|
| S_OK | Function completed successfully. |
| E_INVALIDARG | One or more arguments are invalid. |
| SPERR_UNINITIALIZED | The object has not been properly initialized. |
| SPERR_ALREADY_INITIALIZED | The object has already been initialized. |

© 1995-2000 Microsoft Corporation. All rig

[This is preliminary documentation and subject to change.]

ISpStream::GetBaseStream

ISpStream::GetBaseStream retrieves the base address of the audio stream.

```
HRESULT GetBaseStream(
    IStream    **ppStream
);
```

Parameters

*ppStream*
    Address of a pointer to the IStream that contains the audio stream.

Return values

| Value | Description |
|---|---|
| S_OK | Function completed successfully. |
| E_POINTER | Invalid pointer. |

© 1995-2000 Microsoft Corporation. All rig

[This is preliminary documentation and subject to change.]

ISpStream::BindToFile

ISpStream::BindToFile binds the audio stream to the file that it identifies.

```
HRESULT BindToFile(
    const WCHAR       *pszFileName,
    SPFILEMODE        eMode,
    const GUID        *pFormatId,
    const WAVEFORMATEX *pWaveFormatEx,
    ULONGLONG         ullEventInterest
);
```

Parameters

*pszFileName*
    Address of a null-terminated string containing the file name.
*eMode*
    Flags of the type SPFILEMODE for the desired file mode.

When opening an audio wav file, specify the mode SPFM_OPEN_READONLY or SPFM_CREATE_ALWAYS, otherwise the other modes will fail.

*pFormatId*
    Address of the data format identifier associated with the stream.
*pWaveFormatEx*
    Address of the WAVEFORMATEX structure that contains the wave file format information.
*ullEventInterest*
    Flags of type SPEVENTENUM for the desired events.

Return values

| Value | Description |
|---|---|
| S_OK | Function completed successfully. |
| E_INVALIDARG | One or more arguments are invalid. |
| SPERR_ALREADY_INITIALIZED | The object has already been initialized. |

© 1995-2000 Microsoft Corporation All rights reserv

---

[This is preliminary documentation and subject to change.] 

ISpStream::Close

ISpStream::Close closes the audio stream. Use this to validate the close operation.

`HRESULT Close ( void );`

Parameters

None.

Return values

| Value | Description |
|---|---|
| S_OK | Function completed successfully. |
| FAILED (hr) | Appropriate error message. |

© 1995-2000 Microsoft Corporation All rights reserv

Microsoft Speech SDK
with SAPI 5.0

ISpStreamFormat

ISpStreamFormat inherits from IStream.

Methods in Vtable Order

| ISpStreamFormat Methods | Description |
| --- | --- |
| GetFormat | Passes back the cached format of the stream. |

© 1995-2000 Microsoft Corporation All rights reserved

[This is preliminary documentation and subject to change.]

ISpStreamFormat::GetFormat

ISpStreamFormat::GetFormat passes back the cached format of the stream.

```
HRESULT GetFormat(
    GUID          *pguidFormatId,
    WAVEFORMATEX  **ppCoMemWaveFormatEx
);
```

Parameters

*pguidFormatId*
　　The actual format of the stream being used.
*ppCoMemWaveFormatEx*
　　Address of a pointer to a WAVEFORMATEX data structure that contains the wave file format information.

Return values

| Value | Description |
| --- | --- |
| S_OK | Function completed successfully. |

© 1995-2000 Microsoft Corporation All rights reserved.

Microsoft Speech SDK
with SAPI 5.0

[This is preliminary documentation and subject to change.]

ISpStreamFormatConverter

ISpStreamFormatConverter inherits from ISpStreamFormat. Several methods are included to allow data conversion.

Methods in Vtable Order

| ISpStreamFormatConverter Methods | Description |
| --- | --- |
| SetBaseStream | Sets the current audio stream. |
| GetBaseStream | Gets the current audio stream. |
| SetFormat | Sets the base stream format. |
| ResetSeekPosition | Resets the seek position to the start of the stream. |
| ScaleConvertedToBaseOffset | Converts a stream offset in the converted stream into a stream offset in the base stream. |
| ScaleBaseToConvertedOffset | Converts an offset in the base stream into a stream offset in the converted stream. |

© 1995-2000 Microsoft Corporation. All rights reserved

---

[This is preliminary documentation and subject to change.] 

ISpStreamFormatConverter::SetBaseStream

ISpStreamFormatConverter::SetBaseStream sets the current, or base audio stream.

```
HRESULT SetBaseStream(
    ISpStreamFormat    *pStream,
    BOOL               fSetFormatToBaseStreamFormat,
    BOOL               fWriteToBaseStream
);
```

Parameters

*pStream*
    [in] Address of an ISpStreamFormat containing the base audio stream data.
*fSetFormatToBaseStreamFormat*
    [in] Flag specifies that the stream will be set to the same format as the base stream.

If TRUE, then format of format converter stream will be set to same format as base stream (set up as a pass-through). If *pStream* == NULL and this is set to TRUE, then format of stream is reset.

*fWriteToBaseStream*
    [in] Flag specifies that the steam will be written to the base stream.

Return values

| Value | Description |
|---|---|
| S_OK | Function completed successfully. |
| FAILED (hr) | Appropriate error message. |

© 1995-2000 Microsoft Corporation. All rights reserve

---

[This is preliminary documentation and subject to change.] 

ISpStreamFormatConverter::GetBaseStream

ISpStreamFormatConverter::GetBaseStream gets the current audio stream.

This parameter can be NULL if that information is not required. Use this method to simply test if there is a stream by calling it and checking for a return code of S_FALSE.

```
HRESULT GetBaseStream(
    ISpStreamFormat   **ppStream
);
```

Parameters

*ppStream*
    [out] The current base audio stream.

Return values

| Value | Description |
|---|---|
| S_OK | Function completed successfully. |
| S_FALSE | No base stream is present. |
| E_POINTER | Pointer is bad or invalid. |
| FAILED (hr) | Appropriate error message. |

© 1995-2000 Microsoft Corporation. All rights reserve

---

[This is preliminary documentation and subject to change.] 

ISpStreamFormatConverter::SetFormat

ISpStreamFormatConverter::SetFormat sets the base stream format.

```
HRESULT SetFormat(
    REFGUID           rguidFormatIdOfConvertedStream,
    const WAVEFORMATEX  *pWaveFormatExOfConvertedStream
);
```

Parameters

*rguidFormatIdOfConvertedStream*
 [in] Address of the data format identifier associated with the converted stream.
*pWaveFormatExOfConvertedStream*
 [in] Address of the WAVEFORMATEX structure containing the wave file format information of the converted stream.

Return values

| Value | Description |
|---|---|
| S_OK | Function completed successfully. |
| FAILED (hr) | Appropriate error message. |

© 1995-2000 Microsoft Corporation. All rights reserved

[This is preliminary documentation and subject to change.]

ISpStreamFormatConverter::ResetSeekPosition

ISpStreamFormatConverter::ResetSeekPosition resets the seek position to the start of the stream.

```
HRESULT ResetSeekPosition( void );
```

Parameters

None.

Return values

| Value | Description |
|---|---|
| S_OK | Function completed successfully. |
| SPERR_UNINITIALIZED | Current stream base is uninitialized. |
| FAILED (hr) | Appropriate error message. |

© 1995-2000 Microsoft Corporation. All rights reserved

[This is preliminary documentation and subject to change.]

ISpStreamFormatConverter::ScaleConvertedT

ISpStreamFormatConverter::ScaleConvertedToBaseOffset converts a stream offset in the converted stream into an offset in the base stream.

```
HRESULT ScaleConvertedToBaseOffset(
    ULONGLONG    ullOffsetConvertedStream,
    ULONGLONG    *pullOffsetBaseStream
);
```

Parameters

*ullOffsetConvertedStream*
    The offset of the current stream.
*pullOffsetBaseStream*
    The new offset in the base stream.

Return values

| Value | Description |
| --- | --- |
| S_OK | Function completed successfully. |
| E_POINTER | *pullConvertedOffset* is invalid. |
| SPERR_UNINITIALIZED | SetBaseStream has not been called successfully. |
| FAILED (hr) | Appropriate error message. |

© 1995-2000 Microsoft Corporation All rights reserved.

---

[This is preliminary documentation and subject to change.] 

ISpStreamFormatConverter::ScaleBaseToConv

ISpStreamFormatConverter::ScaleBaseToConvertedOffset converts an offset in the base stream into an offset in the converted stream.

```
HRESULT ScaleBaseToConvertedOffset(
    ULONGLONG    ullOffsetBaseStream,
    ULONGLONG    *pullOffsetConvertedStream
);
```

Parameters

*ullOffsetBaseStream*
    The current offset in the base stream.
*pullOffsetConvertedStream*
    The new offset in the converted stream.

Return values

| Value | Description |
| --- | --- |
| S_OK | Function completed successfully. |
| E_POINTER | *pullOffsetConvertedStream* is bad or invalid. |
| SPERR_UNINITIALIZED | *ullOffsetBaseStream* is less than the initial seek position of the current steam. *pullOffsetConvertedStream* is set to 0xFFFFFFFFFFFFFFFF. |
| SPERR_UNINITIALIZED | *SetBaseStream* has not been called successfully. |
| FAILED (hr) | Appropriate error message. |

ISpTranscript

Methods in Vtable Order

| ISpTranscript Methods | Description |
|---|---|
| GetTranscript | Gets the current transcript. |
| AppendTranscript | Adds the current text to the transcript. |

© 1995-2000 Microsoft Corporation All rights reserved

[This is preliminary documentation and subject to change.]

ISpTranscript::GetTranscript

ISpTranscript::GetTranscript gets the current transcript.

```
HRESULT GetTranscript(
    WCHAR    **ppszTranscript
);
```

Parameters

*ppszTranscript*
    [out, string] A pointer to the transcription string.

Return values

| Value | Description |
|---|---|
| S_OK | Function completed successfully. *ppszTranscript* contains a CoTaskMemAllocated string. |
| E_INVALIDARG | *ppszTranscript* is bad or invalid. |
| E_OUTOFMEMORY | Exceeded available memory. |
| SPERR_UNINITIALIZED | Object has not been initialized. |
| E_POINTER | *ppszTranscript* is bad or invalid. |
| S_FALSE | No transcript is present. |
| FAILED (hr) | Appropriate error message. |

Example

```
HRESULT hr = S_OK;
CComPtr<IStream> cpWavStream;

hr = SPOpenWavFile(L"Created.Wav", NULL, &cpWavStream);
CComQIPtr<ISpTranscript> cpTrans(cpWavStream);
CSpDynamicString dstrTranscript;
cpTrans->GetTranscript(&dstrTranscript);
WCHAR * psz = dstrTranscript;
pVoice->SetInterest(SPFEI_WORDBOUNDARY | SPFEI_END_INPUT_STREAM, 0);
hr = pVoice->SpeakStream(cpWavStream, NULL, 0, SPF_ASYNC, NULL);

while (TRUE)
{
    SPVOICESTATUS Stat;
    pVoice->WaitForNotifyEvent(INFINITE);
    pVoice->GetStatus(&Stat, NULL);
    if (Stat.dwRunningState & SPRS_DONE) break;

while (static_cast<ULONG>(psz - dstrTranscript) < (Stat.ulInputWordPos + S
    {
        wprintf(L"%lc", *psz++);
    }
}

//Print the remainder (if any)
wprintf(L"%s\n", psz);
pVoice->SetNotifySink(NULL);
```

© 1995-2000 Microsoft Corporation All rights reserved.

[This is preliminary documentation and subject to change.] 

ISpTranscript::AppendTranscript

ISpTranscript::AppendTranscript adds the current text to the transcript.

```
HRESULT AppendTranscript(
    const WCHAR    *pszTranscript
);
```

Parameters

*pszTranscript*
    [in, string] The text of the transcript. If *pszTranscript* is NULL, then the current transcript is deleted. Otherwise, the text is appended to the current transcript.

Return values

| Value | Description |
| --- | --- |
| S_OK | Function completed successfully. |
| E_INVALIDARG | *pszTranscript* is bad or invalid. |
| E_OUTOFMEMORY | Exceeded available memory. |
| FAILED (hr) | Appropriate error message. |

Example

```
HRESULT hr;
CComPtr<IStream> cpWavStream;

// Wrapper for ISpWavStream::Create
hr = SPCreateWavFile(L"Created.Wav", SPDFID_22kHz16BitMono, &cpWavStream);
if (SUCCEEDED(hr))
{
    hr = pVoice->SetOutput(cpWavStream, NULL);
    CComQIPtr<ISpTranscript> cpTrans(cpWavStream);
    cpTrans->AppendTranscript(L"This is a simple sample sentence");

if (SUCCEEDED(hr))
    {
        //A sample of generated speech written to a WAV file
        hr = pVoice->Speak( L"This is a simple sample sentence.", 0, 0, NULL);
        pVoice->SetOutput(NULL,  NULL);
    }
}
//Start the media player on the created file
pVoice->Speak( L"Press the play button to play the recorded audio.", 0, 0, NUL
cpWavStream.Release();
if (SUCCEEDED(hr))
{
    ::ShellExecute(NULL, "open", _T("Created.Wav"), NULL, NULL, SW_SHOWNORMAL)
}
```

© 1995-2000 Microsoft Corporation. All rights reserved

Microsoft Speech SDK
with SAPI 5.0

[This is preliminary documentation and subject to change.]

Eventing interfaces

This section provides SAPI 5.0 event information.

- ISpNotifySource
- ISpNotifySink
- ISpNotifyTranslator
- ISpEventSink
- ISpEventSource
- ISpNotifyCallback © 1995-2000 Microsoft Corporation. All rights reserved Microsoft Speech SDK
with SAPI 5.0

[This is preliminary documentation and subject to change.]

ISpNotifySource

In both speech synthesis and speech recognition, applications receive notifications when words have been spoken or when phrases have been recognized. SAPI components that generate notifications implement an ISpNotifySource.

The ISpNotifySource and ISpNotifySink interfaces by themselves only provide a mechanism for a notification but no information on the events that caused the notification. With an ISpEventSource object, an application can retrieve information about the events that caused the notification. An ISpEventSource also provides the mechanism to filter and queue events. By default, an application (really an ISpNotifySink) receives no notifications from ISpEventSource until SetInterests has been called to specify on which events to notify or queue.

When an application is notified of an event that is not queued, an application will take measures based on which event sink receives the notification. From context, an application might know exactly what it needs to do, or it may need to interact with the components which sent the notifications. If an application is notified of an event which is queued, then the application will call ISpEventSource::GetEvents to retrieve the actual events that caused a notification.

When to Implement

Implement the ISpNotifySource interface during initialization to set the default action for how an event source notifies the receiver.

Methods in Vtable Order

| ISpNotifySource Methods | Description |
| --- | --- |
| SetNotifySink | Sets up the instance to make free-threaded calls through ISpNotifySink::Notify. |
| SetNotifyWindowMessage | Sets a window callback function to receive notifications as window messages. |
| SetNotifyCallbackFunction | Sets a callback function to receive notifications. |
| SetNotifyCallbackInterface | Enables an object derived from ISpTask to receive notifications. |
| SetNotifyWin32Event | Sets up a Win32 event object to be used by this instance. |
| WaitForNotifyEvent | A blocking call in response to a SAPI notification event. |
| GetNotifyEventHandle | Retrieves notifications via Win32 events. |

© 1995-2000 Microsoft Corporation All rights reserved

[This is preliminary documentation and subject to change.] 

ISpNotifySource::SetNotifySink

ISpNotifySource::SetNotifySink sets up the instance to make free-threaded calls through ISpNotifySink::Notify.

```
HRESULT SetNotifySink(
    ISpNotifySink    *pNotifySink
);
```

Parameters

*pNotifySink*
    [in] Pointer to the notification method. May be NULL if no default action is required.

Return values

| Value | Description |
|---|---|
| S_OK | Function completed successfully. |
| E_FAIL | Interface not initialized. |
| FAILED (hr) | Appropriate error message. |

© 1995-2000 Microsoft Corporation All rights reserv

[This is preliminary documentation and subject to change.]

ISpNotifySource::SetNotifyWindowMessage

ISpNotifySource::SetNotifyWindowMessage sets up the instance to send window messages to a specified window.

```
HRESULT SetNotifyWindowMessage(
    HWND      hWnd,
    UINT      Msg,
    WPARAM    wParam,
    LPARAM    lParam
);
```

Parameters

*hWnd*
    [in] Handle to the window whose message handler function will receive SAPI notifications.
*Msg*
    [in] Message number which will be passed into the message handler function of the window *hWnd*.
*wParam*
    [in] *wParam* that will be passed into the message handler function of the window *hWnd*.
*lParam*
    [in] *lParam* that will be passed into the message handler function of the window *hWnd*.

Return values

| Value | Description |
|---|---|
| S_OK | Function completed successfully. |
| E_FAIL | Interface not initialized. |
| FAILED (hr) | Appropriate error message. |

ISpNotifySource::SetNotifyCallbackFunction

ISpNotifySource::SetNotifyCallbackFunction sets up this instance to send notifications via a standard C-style callback function.

```
HRESULT SetNotifyCallbackFunction(
   SPNOTIFYCALLBACK    *pfnCallback,
   WPARAM              wParam,
   LPARAM              lParam
);
```

Parameters

*pfnCallback*
 [in] The notification callback function to be used.
*wParam*
 [in] Constant word value that will be passed to the *pfnCallback* function when it is called.
*lParam*
 [in] Constant long value that will be passed to the *pfnCallback* function when it is called.

Return values

| Value | Description |
| --- | --- |
| S_OK | Function completed successfully. |
| E_FAIL | Interface not initialized. |
| FAILED (hr) | Appropriate error message. |

© 1995-2000 Microsoft Corporation. All rights reser:

[This is preliminary documentation and subject to change.] 

ISpNotifySource::SetNotifyCallbackInterface

ISpNotifySource::SetNotifyCallbackInterface sets up this instance to call the virtual method ISpNotifyCallback::NotifyCallback for notifications.

```
HRESULT SetNotifyCallbackInterface(
   ISpNotifyCallback   *pSpCallback,
   WPARAM              wParam,
   LPARAM              lParam
);
```

Parameters

*pSpCallback*
 [in] A pointer to an application-defined implementation of the ISpNotifyCallback interface.

*wParam*
    [in] Constant word value that will be passed to the NotifyCallback method when it is called.
*lParam*
    [in] Constant long value that will be passed to the NotifyCallback method when it is called.

Return values

| Value | Description |
| --- | --- |
| S_OK | Function completed successfully. |
| E_FAIL | Interface not initialized. |
| FAILED (hr) | Appropriate error message. |

© 1995-2000 Microsoft Corporation. All rights reserve

[This is preliminary documentation and subject to change.] 

ISpNotifySource::SetNotifyWin32Event

ISpNotifySource::SetNotifyWin32Event sets up a Win32 event object to be used by this instance.

For an explanation of Win32 event objects, see the Win32 Platform SDK documentation. Once an event object has been initialized for this instance, use either the WaitForNotifyEvent and GetNotfyEventHandle methods. Note that Win32 event objects and SAPI events are different notifications.

```
HRESULT   SetNotifyWin32Event ( void );
```

Parameters

None

Return values

| Value | Description |
| --- | --- |
| S_OK | Function completed successfully. |
| E_FAIL | Interface not initialized. |
| FAILED (hr) | Appropriate error message. |

© 1995-2000 Microsoft Corporation. All rights reserv

[This is preliminary documentation and subject to change.] 

ISpNotifySource::WaitForNotifyEvent

ISpNotifySource::WaitForNotifyEvent is a blocking call in response to a SAPI notification event.

A blocking call returns when a SAPI notification has fired, a timeout has passed or the initialized Win32 event object has signaled. This call is only valid after calling InitWin32Event.

```
HRESULT WaitForNotifyEvent(
    DWORD   dwMilliseconds
);
```

Parameters

*dwMilliseconds*
    [in] Number of milliseconds for the timeout on a blocking call. If set to INFINITE, there is no timeout.

Return values

| Value | Description |
| --- | --- |
| S_OK | Function completed successfully. |
| SPERR_UNINITIALIZED | InitWin32Event did not return successfully or has not been called. |
| E_FAIL | Interface not initialized. |
| FAILED (hr) | Appropriate error message. |

© 1995-2000 Microsoft Corporation. All rights reserved

---

[This is preliminary documentation and subject to change.] 

ISpNotifySource::GetNotifyEventHandle

ISpNotifySource::GetNotifyEventHandle retrieves the Win32 event object handle.

```
HANDLE  GetNotifyEventHandle ( void );
```

Parameters

None

Return values

| Value | Description |
| --- | --- |
| Win32 event object | Initialized by InitWin32Event on this ISpNotifyTranslator instance. |
| NULL | Interface not initialized. |
| FAILED (hr) | Appropriate error message. |

© 1995-2000 Microsoft Corporation. All rights reserved

Microsoft Speech SDK 

ISpNotifySink

In both speech synthesis and speech recognition, applications receive notifications when words have been spoken or when phrases have been recognized. SAPI components that generate notifications implement an ISpNotifySource.

The ISpNotifySource and ISpNotifySink interfaces by themselves only provide a mechanism for a notification but no information on the events that caused the notification. With an ISpEventSource object, an application can retrieve information about the events that caused the notification. An ISpEventSource also provides the mechanism to filter and queue events. By default, an application (really an ISpNotifySink) receives no notifications from ISpEventSource until SetInterests has been called to specify on which events to notify or queue.

When an application is notified of an event which is not queued, an application will take measures based on which event sink is receiving the notification. From context an application might know exactly what it needs to do, or it may need to interact with the components which sent the notifications. If an application is notified of an event which is queued, then the application will call ISpEventSource::GetEvents to retrieve the actual events that caused a notification.

When to Implement

Implement the ISpNotifySink interface when an ISpNotifySink object is to be notified.

Methods in Vtable Order

| ISpNotifySink Methods | Description |
| --- | --- |
| Notify | Notifies the ISpNotifySink object. |

© 1995-2000 Microsoft Corporation. All rights reserved

[This is preliminary documentation and subject to change.] 

ISpNotifySink::Notify

ISpNotifySink::Notify notifies an ISpNotifySink object when an event has occurred.

If a message has not already been posted, this method either sets an event or posts a message to the private window. Often an application will call specific status functions based on the context of where a notification has come from. For instance, an application receiving a notification from an ISpVoice instance can call ISpVoice::GetStatus to find out the most recent cause of a Notify call.

```
HRESULT   Notify  ( void );
```

Parameters

None

Return values

| Value | Description |
|---|---|
| S_OK | Function completed successfully. |
| SPERR_UNINITIALIZED | Object has not been properly initialized. |

© 1995-2000 Microsoft Corporation. All rights reserved

Microsoft Speech SDK
with SAPI 5.0

[This is preliminary documentation and subject to change.]

ISpNotifyTranslator

ISpNotifyTranslator inherits from ISpNotifySink.

The component CLSID_SpNotify, provides this interface for reuse by implementers of the ISpNotifySource interface. It provides a proxy object to other calls so that a developer does not need to re-address threading issues. Many, but not all, of these methods are identical to those in ISpNotifySource.

When to Use

ISpNotifyTranslator may be used in applications to pass in specific Win32 events.

Methods in Vtable Order

| ISpNotifyTranslator Methods | Description |
|---|---|
| InitWindowMessage | Enables a window callback function to receive notifications as window messages. |
| InitCallback | Enables a callback function to receive notifications. |
| InitSpNotifyCallback | Enables an object derived from ISpTask to receive notifications. |
| InitWin32Event | Sets up a Win32 event object to be used by this instance. |
| Wait | A blocking call in response to a SAPI notification event. |
| GetEventHandle | Retrieves notifications via Win32 events. |

© 1995-2000 Microsoft Corporation All rights reserved.

[This is preliminary documentation and subject to change.]

ISpNotifyTranslator::InitWindowMessage

ISpNotifyTranslator::InitWindowMessage sets up the instance to send window messages to a specified window.

```
HRESULT InitWindowMessage(
    HWND      hWnd,
    UINT      Msg,
    WPARAM    wParam,
    LPARAM    lParam
);
```

Parameters

*hWnd*
    [in] Handle to the window whose message handler function will receive SAPI notifications.
*Msg*
    [in] Message number which will be passed into the message handler function of the window *hWnd*.
*wParam*
    [in] *wParam* that will be passed into the message handler function of the window *hWnd*.
*lParam*
    [in] *lParam* that will be passed into the message handler function of the window *hWnd*

Return values

| Value | Description |
| --- | --- |
| S_OK | Function completed successfully. |
| SPERR_ALREADY_INITIALIZED | Interface is already initialized. |
| E_INVALIDARG | *hWnd* is invalid or bad. |
| FAILED(hr) | Appropriate error message. |

© 1995-2000 Microsoft Corporation. All rights reserved

[This is preliminary documentation and subject to change.] 

ISpNotifyTranslator::InitCallback

ISpNotifyTranslator::InitCallback sets up this instance to send notifications via a standard C-style callback function.

```
HRESULT InitCallback(
    SPNOTIFYCALLBACK    *pfnCallback,
    WPARAM              wParam,
    LPARAM              lParam
);
```

Parameters

*pfnCallback*
    [in] The notification callback function to be used.
*wParam*
    [in] Constant word value that will be passed to the *pfnCallback* function when it is called.

*lParam*
    [in] Constant long value that will be passed to the *pfnCallback* function when it is called.

Return values

| Value | Description |
|---|---|
| S_OK | Function completed successfully. |
| SPERR_ALREADY_INITIALIZED | Interface is already initialized. |
| E_INVALIDARG | *pfnCallback* is invalid or bad. |
| FAILED(hr) | Appropriate error message. |

© 1995-2000 Microsoft Corporation. All rights reserve

---

[This is preliminary documentation and subject to change.] 

ISpNotifyTranslator::InitSpNotifyCallback

ISpNotifyTranslator::InitSpNotifyCallback sets up this instance to call the virtual method ISpNotifyCallback::NotifyCallback for notifications.

```
HRESULT InitSpNotifyCallback(
    ISpNotifyCallback   *pSpCallback,
    WPARAM              wParam,
    LPARAM              lParam
);
```

Parameters

*pSpCallback*
    [in] A pointer to an application-defined implementation of the ISpNotifyCallback interface.
*wParam*
    [in] Constant word value that will be passed to the NotifyCallback method when it is called.
*lParam*
    [in] Constant long value that will be passed to the NotifyCallback method when it is called.

Return values

| Value | Description |
|---|---|
| S_OK | Function completed successfully. |
| SPERR_ALREADY_INITIALIZED | Interface is already initialized. |
| E_INVALIDARG | *pSpNotifyCallback* is invalid or bad. |
| FAILED(hr) | Appropriate error message. |

ISpNotifyTranslator::InitWin32Event

ISpNotifyTranslator::InitWin32Event sets up a Win32 event object to be used by this instance.

This method is applicable only with objects using Win32 events. For an explanation of Win32 event objects see the Win32 Platform SDK documentation.

Once an event object has been initialized for this instance, then use WaitForNotifyEvent and GetNotfyEventHandle methods. Win32 event objects and SAPI events are different. It is identical to ISpNotifySource::SetNotifyWin32Event except with two additional parameters.

```
HRESULT InitWin32Event(
    [in] HANDLE   hEvent,
    [in] BOOL     fCloseHandleOnRelease
);
```

Parameters

*hEvent*
    Handle of an existing Win32 event object for the application to use with ISpNotifyTranslator. An ISpNotifyTranslator object will take care of all Win32 event object details. May be NULL, in which case an application may call ISpNotifyTranslator::Wait to block a thread until a SAPI notification occurs.

*fCloseHandleOnRelease*
    Specifies whether the *hEvent* handle should be closed when the object is released. If *hEvent* is NULL, then this ignore this parameter and always close the handle upon release of the object.

Return values

| Value | Description |
| --- | --- |
| S_OK | Function completed successfully. |
| SPERR_ALREADY_INITIALIZED | Interface is already initialized. |
| FAILED(hr) | Appropriate error message. |

© 1995-2000 Microsoft Corporation All rights reserved

[This is preliminary documentation and subject to change.] 

ISpNotifyTranslator::Wait

ISpNotifyTranslator::Wait is a blocking call in response to a SAPI notification event.

A blocking call returns when a SAPI notification has fired, a timeout has passed or the initialized WIN32 event object has signaled. This method is applicable only with objects using Win32 events.

```
HRESULT Wait(
    DWORD   dwMilliseconds
);
```

Parameters

*dwMilliseconds*
 [in] Number of milliseconds for the timeout on a blocking call. If set to INFINITE, there is no timeout.

Return values

| Value | Description |
|---|---|
| S_OK | Function completed successfully. |
| S_FALSE | The event was not set and the call was timed out. |
| SPERR_UNINITIALIZED | InitWin32Event did not return successfully or has not been called. |

© 1995-2000 Microsoft Corporation. All rights reserve

[This is preliminary documentation and subject to change.] 

ISpNotifyTranslator::GetEventHandle

ISpNotifyTranslator::GetEventHandle returns the Win32 event object handle initialized by InitWin32Event on this ISpNotifyTranslator instance. This method is applicable only with objects using Win32 events.

The handle is not a duplicated handle and should not be closed by the caller.

```
HANDLE   GetEventHandle    ( void );
```

Parameters

None

Return values

| Value | Description |
|---|---|
| *handle* | The handle to the event |
| INVALID_HANDLE_VALUE | Call failed. |

© 1995-2000 Microsoft Corporation. All rights reserv

Microsoft Speech SDK
with SAPI 5.0 

[This is preliminary documentation and subject to change.]

ISpEventSink

This interface allows event sources to send events directly to an event sink through a free-threaded call.

When to Implement

This interface is never used by most applications.

Methods in Vtable Order

| ISpEventSink Methods | Description |
| --- | --- |
| AddEvents | Adds events directly to an event sink. |
| GetEventInterest | Passes back the event interest for the voice. |

© 1995-2000 Microsoft Corporation All rights reser

[This is preliminary documentation and subject to change.]

ISpEventSink::AddEvents

ISpEventSink::AddEvents adds events directly to an event sink.

```
HRESULT AddEvents(
    const SPEVENT    *pEventArray,
    ULONG            ulCount
);
```

Parameters

*pEventArray*
    Pointer to an array of SPEVENT event structures.
*ulCount*
    Number of event structures being passed in.

Return values

| Value | Description |
| --- | --- |
| S_OK | Function completed successfully. |
| E_INVALIDARG | *pEventArray* is bad or invalid |
| FAILED(hr) | Appropriate error message. |

© 1995-2000 Microsoft Corporation All rights rese

[This is preliminary documentation and subject to change.]

ISpEventSink::GetEventInterest

ISpEventSink::GetEventInterest passes back the event interest for the voice.

```
HRESULT GetEventInterest(
   ULONGLONG   *pullEventInterest
);
```

Parameters

*pullEventInterest*
  [out] Set of flags of type SPEVENTENUM defining the event interest.

Return values

| Value | Description |
| --- | --- |
| S_OK | Function completed successfully. |
| E_POINTER | Pointer bad or invalid. |
| FAILED(hr) | Appropriate error message. |

© 1995-2000 Microsoft Corporation All rights reserved.

Microsoft Speech SDK
with SAPI 5.0

[This is preliminary documentation and subject to change.]

ISpEventSource

This interface provides functionality for events which can be queued, filtered or can cause a notification to ISpNotifySink.

The ISpEventSource inherits from the ISpNotifySource interface.

Methods in Vtable Order

| ISpEventSource Methods | Description |
| --- | --- |
| SetInterest | Sets the types of events. |
| GetEvents | Retrieves and removes the queued events. |
| GetInfo | Returns queuing and interest information about the event. |

© 1995-2000 Microsoft Corporation All rights reserved

[This is preliminary documentation and subject to change.]

ISpEventSource::SetInterest

ISpEventSource::SetInterest sets the type of events which will invoke a notification and become queued.

If SetInterest is never called, the speech recognition engine defaults to SPEI_RECOGNITION as the sole event interest. No events will be passed through if both parameters are set to zero.

```
HRESULT SetInterest(
    ULONGLONG   ullEventInterest,
    ULONGLONG   ullQueuedInterest
);
```

Parameters

*ullEventInterest*
    [in] Event ID flags indicating which events should invoke a notification to the event sink that this event source uses.

*ullQueuedInterest*
    [in] Event ID flags indicating which events should be queued prior to ISpEventSource::GetEvents. The event flags set here must also be set in *dwEventInterest*.

Return values

| Value | Description |
| --- | --- |
| S_OK | Function completed successfully. |
| E_FAIL | Interface not defined. |
| FAILED(hr) | Appropriate error message. |

© 1995-2000 Microsoft Corporation. All rights reserved.

---

[This is preliminary documentation and subject to change.] 

ISpEventSource::GetEvents

ISpEventSource::GetEvents retrieves and removes the events which have been queued.

```
HRESULT GetEvents(
    ULONG     ulCount,
    SPEVENT   *pEventArray,
    ULONG     *pulFetched
);
```

Parameters

*ulCount*
    [in] Maximum number of events that SPEVENT structures can return.

*pEventArray*
    [out] Pointer to array of SPEVENT structures. Each returned event is written to one of these SPEVENT structures.

*pulFetched*
    [out] Pointer to the number of events returned. This number represents the earliest events to take place. These events are then removed from the queue. The events not returned are left for a future call to GetEvents. It is possible that by the time an application calls GetEvents, another thread has processed the events and there are no events to be returned. This may be the result of subsequent Notify calls.

Return values

| Value | Description |
|---|---|
| S_OK | Function completed successfully. |
| E_FAIL | Interface not valid. |
| FAILED(hr) | Appropriate error message. |

© 1995-2000 Microsoft Corporation. All rights reserved

[This is preliminary documentation and subject to change.]

ISpEventSource::GetInfo

ISpEventSource::GetInfo passes back the information about the event.

```
HRESULT GetInfo(
    SPEVENTSOURCEINFO    *pInfo
);
```

Parameters

*pInfo*
 [out] Pointer to a SPEVENTSOURCEINFO structure about the event.

Return values

| Value | Description |
|---|---|
| S_OK | Function completed successfully. |
| E_FAIL | Interface not valid. |
| FAILED(hr) | Appropriate error message. |

© 1995-2000 Microsoft Corporation. All rights reserved

Microsoft Speech SDK
with SAPI 5.0

[This is preliminary documentation and subject to change.]

ISpNotifyCallback

Note: This is not a COM interface.

Methods in Vtable Order

| ISpNotifySource Methods | Description |
|---|---|
| NotifyCallback | Sets the notification mechanism for a particular instance. |

© 1995-2000 Microsoft Corporation All rights reserved

[This is preliminary documentation and subject to change.]

ISpNotifyCallback::NotifyCallback

ISpNotifyCallback::NotifyCallback sets the notification mechanism for a particular instance. This method is not required to be defined and implementation is unique to the application.

```
HRESULT NotifyCallback(
    WPARAM    wParam,
    LPARAM    lParam
);
```

Parameters

*wParam*
    [in] *wParam* that will be passed into the message handler function of the window *hWnd*.
*lParam*
    [in] *lParam* that will be passed into the message handler function of the window *hWnd*.

Return values

Return values are application dependent

© 1995-2000 Microsoft Corporation All rights reserve

Microsoft Speech SDK
with SAPI 5.0

[This is preliminary documentation and subject to change.]

Grammar Compiler Manager

The following section covers:

- Text grammar format
- ISpGrammarBuilder

Text grammar format

The context-free grammar (CFG) format in SAPI 5.0 defines the structure of grammars and grammar rules. Extensible Markup Language (XML) using the tagging language. The CFG compiler transforms the XML tags defining the grammar elements into a binary format used by speech engines. This compiling process can be performed either before or during application runtime. Speech recognition engines use CFGs to constrain the user's words to words it will recognize.

The following section covers:

- Text grammar format overview
- Syntax and terminology
- Grammar rules
- Designing grammar rules
- Using grammar rules © 1995-2000 Microsoft Corporation. All rights reserved

[This is preliminary documentation and subject to change.] 

Text grammar format overview

The Extensible Markup Language (XML) format inside a GRAMMAR XML element (block), is an "expert–only–readable" declaration of a grammar that a speech application uses to accomplish the following:

- Improve recognition accuracy by restricting and indicating to an engine what words it should expect.
- Improve translation of recognized speech into application actions. This is made easier by providing "semantic tags," (property name, and value associations) to words/phrases declared inside the grammar.

A GRAMMAR XML element (block) appears in a XML source code file. The XML source is compiled into a binary grammar format and is the format used by SAPI during application runtime.

The following section covers:

- Extensible Markup Language (XML)
- Attributes
- Contents
- How SAPI utilizes XML information
- Frequently used definitions
- Non–empty concatenated recognition contents

Extensible Markup Language

The textual grammar format is an application of the XML. Every XML element consists of a start tag (<SOME_TAG>) and an end tag (</SOME_TAG>) with a case-sensitive tag name and contents between these tags. The start tag and the end tag are the same if the element is empty. For example, the tag (<SOME_TAG/>). More information about XML and the XML specification is available at: http://www.w3.org/TR/REC-xml.

Attributes

Attributes of an XML element appear inside the start tag. Each attribute is in the form of a name followed by an equal sign followed by a string which must be surrounded by either single or double quotation marks. An attribute of a given name may only appear once in a start tag.

In summary, the literal string cannot contain either < or ', if the string is surrounded by single quotation marks. It may not contain ", if the string is surrounded by double quotation marks. Furthermore, use all ampersand (&) characters only in an entity reference such as & and >. When a literal string is parsed, the resulting replacement text will resolve all entity references such as > into its corresponding text, such as >. In this specification, only the resulting replacement text needs to be defined for attribute value strings. More information about XML and the XML specification is available at: http://www.w3.org/TR/REC-xml.

Contents

The contents of an element consists of text or subelements. Formal definitions of valid contents in this specification are provided as regular and "multi-set" expressions. The pseudo-element name "Text" indicates untagged text. With these definitions, the XML specification defines the exact file syntax details.

⊼ Back to top

How SAPI utilizes XML information

SAPI uses XML content in the following two methods:

1. The SAPI context-free grammar compiler, compiles the XML grammar into a binary grammar format. The compiled binary grammar is loaded into the SAPI runtime environment from a file, memory, or object (.DLL) resource.
2. The speech recognition (SR) engine queries the runtime environment for available grammar information.

⊼ Back to top

Frequently used definitions

Untagged text declaring a sequence of words that the recognition engine will recognize. Tentatively this text is only the not-necessarily-phonetic representation of words used for reading words whose pronunciation is unknown to the user (for example, for Japanese, kana, not kanji); this form will be called the spelling form. In further definitions in this section, *Text* will be referenced as though it were a pseudo-element.

⊼ Back to top

Non–empty concatenated recognition contents

The contents of a number of XML elements in this specification such as, the P element, contain a sequence of grammar constructs which are concatenated together (one grammar construct after another). These grammar elements must be recognized in order for the contents defined to be recognized.

The contents must be one of the following (and not both):

Text and any number of L, P, O, or RULEREF elements in any order with at least one L, P, or RULEREF.

For more information on the use of XML grammars, please see the Syntax and terminology section.

 Back to top

© 1995-2000 Microsoft Corporation All rights reserved.

[This is preliminary documentation and subject to change.] 

Syntax and terminology

The tags used for in the Speech Text Grammar Format (STGF) are defined using the following XML syntax:

| Element | Attributes | Description |
| --- | --- | --- |
| GRAMMAR | LANGID, WORDTYPE, LEXDELIMITER | Grammar definition |
| DEFINE | None | Defines grammar constants. |
| ID | NAME, VAL, VALSTR | Defines property name id. (10 bit) |
| RULE | NAME, ID, TOPLEVEL, EXPORT, INTERPRETER, DYNAMIC, TEMPLATE | Rule definition *(non-terminal)* |
| RULEREF | NAME, REFID, OBJECT, URL, PROPNAME, PROPID, VAL, VALSTR, WEIGHT | Rule reference *(non-terminal)* |
| PHRASE or P | PROPNAME, PROPID, VAL, VALSTR, PRON, DISP, MIN, MAX, WEIGHT | Phrase |

| | | |
|---|---|---|
| OPT or O | PROPNAME, PROPID, VAL, VALNUM, MAX, MIN | Optional phrase |
| LIST or L | PROPNAME, PROPID, VAL, VALSTR | List of alternate phrase elements. |
| DICTATION | MIN, MAX, PROPID | Transition to a dictation grammar. |
| RESOURCE | NAME | |
| TEXTBUFFER | PROPNAME, PROPID, WEIGHT | Transition to a textbuffer grammar. |
| WILDCARD | None | Garbage identifier for one or more non-silence sounds. |

⊼ Back to top

GRAMMAR

Grammar definition

The top-level XML element containing all other XML elements needed to declare one grammar.

Tag name: GRAMMAR
    Contents: One or more RULE elements.
    Contents (formally): <RULE>+, <DEFINE>?

Attributes:

LANGID
    String specifying the language identifier associated with the grammar. The language identifier is specified as a hexadecimal value. For example, the LANGID for English (US) expressed in the hexadecimal form is 0x0409.

WORDTYPE
    String specifying the grammar word type. One of the grammar word types specified in the SPGRAMMARWORDTYPE enumeration sequence. Note: Only SPWT_LEXICAL is supported in this release of SAPI.

LEXDELIMITER

⊼ Back to top

DEFINE

The DEFINE tag specifies a group of ID tags.

Attributes:

None.

⊼ Back to top

ID

The ID tag defines named constants for RULE, PROPNAME elements.

Attributes:

NAME
    The name of the property id to be defined. Single or double quotation marks surround valid entries.

VAL
    Integer value associated with NAME in the range of 0 to 1023.

🔺 Back to top

RULE

Rule definition *(non-terminal)*

Defines a grammar rule, (non-terminal in CFG terminology) only for use internally within a grammar. A rule defined in a RULE element cannot be referenced by another grammar and cannot be activated or deactivated at runtime. For more information on grammar types, see SPCFGRULEATTRIBUTES. The tag name is RULE, the contents must be non-empty concatenated recognition contents and the attributes are as follows:

Attributes:

NAME
    *(Required)* Textual case-sensitive name of rule to be referenced internally and externally to this grammar. These rules may be activated and deactivated at runtime. Other grammars reference these rules. The replacement text string resulting from this attribute value must satisfy the requirements for a rule name in the binary grammar format. The name must be unique within a grammar.

ID
    Specifies the constant value or VARIANT type (VT_UI4) identifying the RULE.

TOPLEVEL
    Attribute that indicates that this is a top-level rule. Activate and deactivate top-level rules individually by the application. The value of this attribute, either "ACTIVE" or "INACTIVE" (default) indicates whether or not the rule should be active after loading.

Note: When a grammar rule is imported by another grammar rule, the "INACTIVE" state of a rule is assumed.

EXPORT
    Specifies if the rule can be imported by another grammar rule. Set the attribute value to either 0 or 1 to control the state of this rule. For example, set the attribute to EXPORT="1" to enable other grammar rules to import the rule; set the attribute to EXPORT="0" when the rule is not intended to be imported by another rule.

INTERPRETER
    Value indicating whether this is an interpreted grammar rule. Set the attribute value to either 0 or 1 to control the state of this rule. For example, set the attribute to INTERPRETER="1", to indicate this is an interpreted rule; set the attribute to INTERPRETER="0" when the grammar rule is not intended as an interpreted rule.

DYNAMIC

Value indicating whether this is a dynamic rule. Set the attribute value to either 0 or 1 to control the state of this rule. For example, set the attribute to DYNAMIC="1", to use the rule dynamically; set the attribute to DYNAMIC="0" when the rule is not intended for dynamic use.

Note: When specifying that a grammar RULE be used dynamically, its contents must be empty. When a grammar RULE is dynamic its contents are modifiable.

TEMPLATE
Specifies the contents of the RULE attribute are replaced by the string value of the PROPNAME. For example, TEMPLATE="$PROPNAME$" is replaced by the contents of PROPNAME.

↥ Back to top

RULEREF

Rule reference *(non-terminal)*

Use this element inside the contents of a rule definition (RULE) to reference another defined rule.

Tag name:    RULEREF
   Contents:    Empty (no contents)

Attributes:

NAME
Specifies the name of the referenced rule. A rule that has not yet been declared in the file may be referenced.
REFID
Constant value or VARIANT type (VT_UI4) identifying the RULEREF.
OBJECT
Specifies the class identifier (CLSID) or programmatic identifier (ProgID) that is associated with the RULEREF.
URL
Specifies that the referenced rule should be loaded from a stored file, resource, or Internet location.
    file://directory_name/some_file_name.xml
    res://directory_name/some_resource.dll
    http://www.microsoft.com/some_resource.dll
PROPNAME
*(Optional)* except if a VAL attribute is present.
The case-sensitive and possibly non-unique name of zero length whose XML replacement text (see XML attribute syntax above) is the semantic property name to be associated with recognition of this rule in the context of wherever this tag reference is present. Wherever this rule reference element is present, all property name/value pairs recognized by this rule will add PROPNAME to the front of the property name followed by a period.
PROPID
*(Optional)* The identifier of the PROPNAME element.
VAL
*(Optional)* Semantic value for property specified by attribute PROPNAME.
The recognized text of this rule reference will be used as the property value if this attribute is omitted when a PROPNAME is present.
VALSTR

*(Optional)* String containing the identifier of the VAL element.
WEIGHT
Specifies the relative list position of the RULEREF and is expressed as a float value.

↥ Back to top

PHRASE or P

Phrase

The tag name is P, the contents must be non-empty, concatenated, recognition contents (as defined above). These attributes are:

Attributes:
PROPNAME
The replacement text (see XML attribute syntax above) of this attribute value is the name of the semantic property to be associated with the recognition of this expression.
PROPID
*(Optional)* The identifier of the PROPNAME element.
VAL
*(Optional)* Semantic value for property specified by attribute PROPNAME.
VALSTR
*(Optional)* String containing the value identifier of the property.
PRON
Specifies a pronunciation for a single text word in the SAPI phoneme set.
For more phoneme related information, please see the American English phoneme representation section.
DISP
Specifies the string contents of the display form of a text phrase element. The string containing the display form can be from zero to 255 characters in length.
MIN
*(Optional)* The default value for this is 1. The valid range of values for this is 0 to 255 and must be less than the value specified in MAX. Note: The value specified by MAX will be used when the specified MIN value is greater than the MAX value.
MAX
*(Optional)* The default value for this is 1. The valid range of values for this is 1 to 255, or indicated by "INF" in text.
This value indicates the maximum number of times valid recognitions of this element's contents may be recognized repeatedly. A value "INF" indicates that any number of recognitions may occur.
WEIGHT
Specifies the relative list position of the PHRASE and is expressed as a float value.

↥ Back to top

OPT or O

Optional phrase

This element is similar to the P element. The exception being that the O element is optional. An associated property name and value pair will be generated only if the contents of this element are recognized.

| | |
|---|---|
| Contents: | Text or any number of L, P, O, or RULEREF elements in any order. |
| Contents (formally): | Text | ( L | P | O | RULEREF )+ |

Attributes:

PROPNAME
  The replacement text (see XML attribute syntax above) of this attribute value is the name of the semantic property to be associated with the recognition of this expression.

PROPID
  *(Optional)* The identifier of the PROPNAME element.

VAL
  *(Optional)* Semantic value for the property specified by attribute PROPNAME.

VALSTR
  *(Optional)* String containing the value identifier of the PROPNAME element.

MAX
  *(Optional)* The default value for this is 1. The valid range of values for this is 1 to 255, or indicated by "INF" in text.

This value indicates the maximum number of times valid recognitions of this element's contents may be recognized repeatedly. A value "INF" indicates any number of recognitions may occur.

MIN
  *(Optional)* The default value for this is 1. The valid range of values for this is 0 to 255 and must be less than the value specified in MAX. Note: The value specified by MAX will be used when the specified MIN value is greater than the MAX value.

This value indicates the minimum number of times valid recognitions of this element's contents may be recognized repeatedly.

 Back to top

LIST or L

List of alternate phrase elements

Defines an expression of alternate phrase recognitions. Each subelement represents a possible separate recognition in place of this element.

| | |
|---|---|
| Tag name: | L |
| Contents (formally): | P+, L, RULEREF |

Attributes:

PROPNAME
  The replacement text (see XML attribute syntax above) of this attribute value is the name of the semantic property to be associated with the recognition of this expression.

PROPID
  *(Optional)* The identifier of the PROPNAME element.

VAL
  *(Optional)* Semantic value for the property specified by attribute PROPNAME.

VALSTR
    *(Optional)* String containing the value identifier of the PROPNAME element.

🔺 Back to top

DICTATION

Specifies the grammar node is a dictation grammar.

Attributes:

PROPNAME
    *(Optional)* except if a VAL attribute is present.
    The case-sensitive and possibly non-unique name of zero length whose XML replacement text (see XML attribute syntax above) is the semantic property name to be associated with recognition of this rule in the context of wherever this tag reference is present. Wherever this rule reference element is present, all property name/value pairs recognized by this rule will add PROPNAME to the front of the property name followed by a period.

VAL
    Specifies the dictated text.

PROPID
    *(Optional)* The identifier of the PROPNAME element.

MIN
    *(Optional)* The default value for this is 1. The valid range of values for this is 0 to 255 and must be less than the value specified in MAX. Note: The value specified by MAX will be used when the specified MIN value is greater than the MAX value.

MAX
    *(Optional)* The default value for this is 1. The valid range of values for this is 1 to 255, or indicated by "INF" in text.
    This value indicates the maximum number of times valid recognitions of this element's contents may be recognized repeatedly. A value "INF" indicates that any number of recognitions may occur.

🔺 Back to top

RESOURCE

Specifies the grammar node is a resource grammar.

Attributes:

NAME
    The text string containing the NAME and VALUE information associated with this resource.

🔺 Back to top

TEXTBUFFER

Specifies the grammar is from a null-terminated string.

Attributes:

PROPNAME
    *(Optional)* except if a VAL attribute is present.

The case-sensitive and possibly non-unique name of zero length whose XML replacement text (see XML attribute syntax above) is the semantic property name to be associated with recognition of this rule in the context of wherever this tag reference is present. Wherever this rule reference element is present, all property name/value pairs recognized by this rule will add PROPNAME to the front of the property name followed by a period.

VAL
*(Optional)* Semantic value for the property specified by attribute PROPNAME.

PROPID
*(Optional)* The identifier of the TEXTBUFFER grammar element.

WEIGHT
Specifies the relative list position of the TEXTBUFFER grammar and is expressed as a float value.

⌃ Back to top

WILDCARD

Specifies a garbage word identifier for one or more non-silence sounds.

Attributes:

None

⌃ Back to top

© 1995-2000 Microsoft Corporation. All rights reserved

[This is preliminary documentation and subject to change.] 

Grammar rules

Grammar rules are elements that SAPI 5.0 compliant recognition engines use to restrict the possible word or sentence choices during the speech recognition process. Recognition engines use grammar rules to control the elements of sentence construction by utilizing the predetermined list of recognized word or phrase choices. This list of recognized words or phrase choices contained in the grammar rules forms the basis of the recognition engine vocabulary.

The phrase or sentence uses each grammar rule element to determine the recognition path.

For example, examine the phrase describing travel plans, "I would like to travel from Seattle to New York," and note that there are elements that determine the resulting information. In this example, a person is planning to fly to New York from Seattle. This is a very simple illustration of what could be a very complex problem. Determining the same travel plans without limiting the method, direction, and travel destination would result in an infinite number of travel options.

> The resulting information can be determined by restricting the available choices for a given sentence. Through this method, the resulting information can be composed only from certain available choices, thus eliminating the possibility of an infinite number of travel plan combinations.

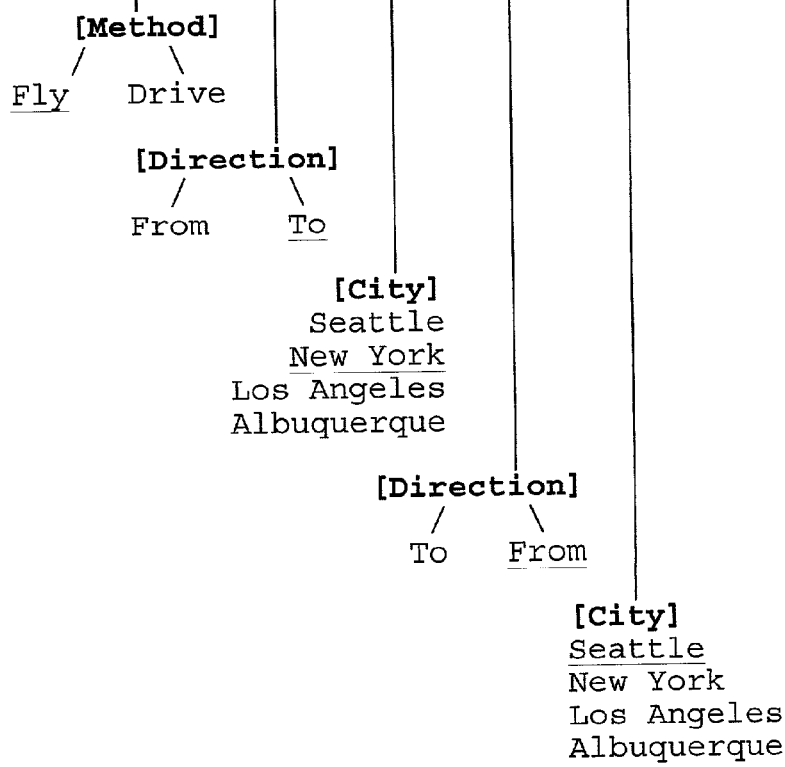

The elements of interest in the example phrase are as follows:

- Method of travel (fly or drive)
- Travel direction (from or to)
- The city of origin for the travel plan (from)
- The city of destination for the travel plan (to)

I would like to travel from Seattle to New York.

Grammar rules become concatenated phrase elements. These phrase elements are limited to the defined set of grammars. Control can be significantly improved over the resulting information by restricting the input choice to a limited set of possibilities. Otherwise, obtaining the travel plan information from the same sample phrase, "I would like to travel from Seattle to New York," would be considerably more ambiguous.

The complexity of parsing the same sentence increases exponentially without using a defined set of choices. Imagine the possible number of combination in a sentence that is not restricted to a finite list of combinations. For example, examine the possible choice combinations by moving the mouse over the following sentence.

To display the available choice selections in the example phrase, move the mouse over the underlined text below:

"I want to—(unknown travel method)—(unknown travel direction)—(unknown city)—(unknown travel direction) (unknown city)." The amount of predictable information is significantly reduced without the ability to constrain the available choices within a sentence.

Grammar rules apply to the following:

TOPLEVEL
A grammar tagged as TOPLEVEL can be in an active or inactive state. The rules that import a grammar can override the activation state of a rule. This conditional state can be configured dynamically at runtime. If an inactive grammar is included in another grammar or grammar rule, ignore the inactive state. When a rule is activated, a speech recognition engine will accept only speech satisfying at least one of the active rules contained in the loaded grammar.

Non-terminal
A grammar node is considered to be non-terminal if it is the beginning of a choice selection or a group of choice selections. For example, the grammar node Dog is non-terminal when the subsequent choice selections are types of dogs. This type of grammar is defined as non-terminal because of its choice selections.

Terminal
A grammar node is considered to be terminal if it's the only word in the recognized vocabulary which can be spoken. Using the Dog example above, terminal grammar nodes are the type of dogs.

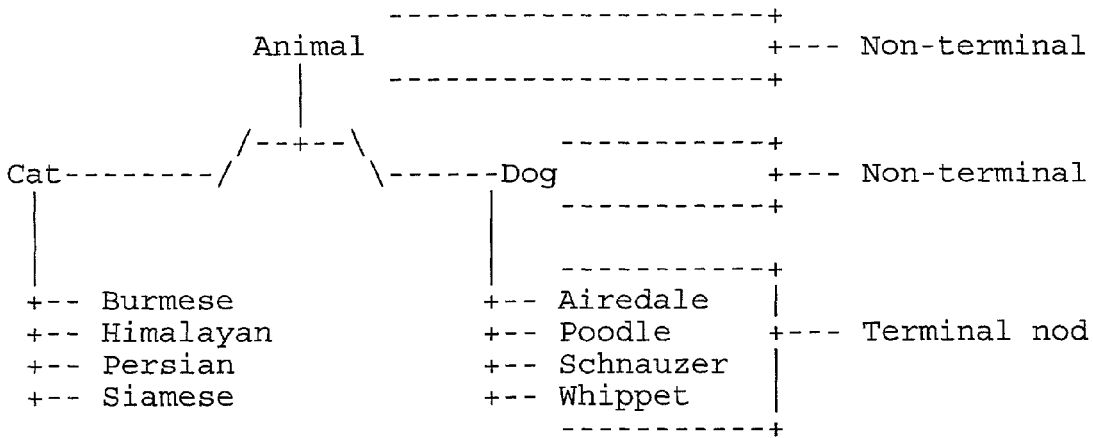

The text format grammar XML tags follow block scope methods that are similar to HTML tags. That is, each tag has an opening tag and a corresponding closing tag. There is more information about XML syntax in the Syntax and terminology section.

| XML tag syntax | Contents |
| --- | --- |
| <sometag NAME="some_name" VAL="some_value"> | Start of "sometag" tag scope which includes the name and value information. |
| </sometag> | End of the "sometag" scope. |

⌐ Back to top

Designing grammar rules

Speech applications often use context-free grammars (CFG) to parse the recognizer output and in some instances, to act as the recognizer's language model. A speech recognition engine uses the CFG to constrain the words it will recognize that are contained in the user's utterance. If the CFG is augmented with semantic information (property names and property values as explained below), then a SAPI component converts the recognized word string into a name/value-meaning representation. The application then uses the meaning representation to control its part of the conversation with the user.

For example, the phrase "*Please schedule a meeting with Amy Anderson*" could be annotated as follows:

```
Phrase element            Grammar element              Conte
------------------------------------------------------------
"schedule a meeting"      "request: meeting"           // attri
"with"                    "participants:"              // only
"Amy Anderson"            "<email alias>"              // value
```

Defining the different grammar element components could result in the following:

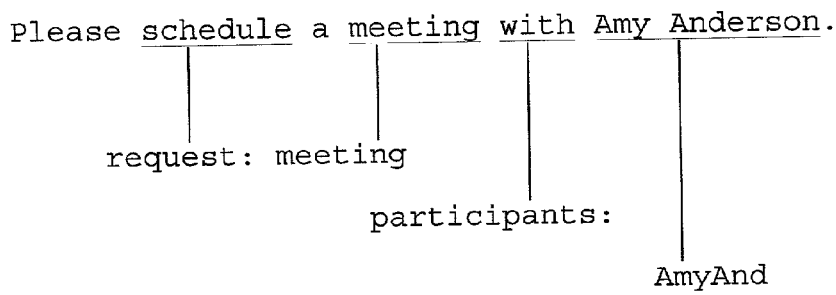

The example sentence "Please schedule a meeting with Amy Anderson" generates the following SAPI 5.0 grammar:

```
<RULE TOPLEVEL=ACTIVE>
     <P PROPNAME="request" VAL="meeting">schedule a meet
```

```
    <P>with</P>
    <LN PROPNAME="participants">
        <PN VAL="AmyAnd">Amy Anderson</PN>
        <PN VAL="tbremer">Ted Bremer</PN>
        <PN VAL="fralee">Frank Lee</PN>
        <PN VAL="crandall">Cynthia Randall</PN>
        <PN VAL="swhite">Suki White</PN>
        <PN VAL="kyoshida">Kim Yoshida</PN>
    </LN>
</RULE>
```

The result of saying the example sentence "Please schedule a meeting with Amy Anderson" would be as follows:

request:meeting participants:AmyAnd

© 1995-2000 Microsoft Corporation All rights reserved

---

[This is preliminary documentation and subject to change.] 

Using grammar rules

Grammar rules define sentence contents and phrase elements. Each grammar and grammar element determines the recognition engine's ability to effectively construct phrase elements. Phrases and sub-expressions are commonly represented by a separate rule and combined into larger phrases and sentences with higher level rules. For more information, see the Grammar rules section.

The following example illustrates how to implement a grammar for a game of solitaire.

```
<GRAMMAR LANGID="1033">
    <DEFINE>
        <ID NAME="FROM" VAL="1"/>
        <ID NAME="TO" VAL="2"/>
        <ID NAME="SUIT" VAL="3"/>
        <ID NAME="COLOR" VAL="4"/>
        <ID NAME="RANK" VAL="5"/>
        <ID NAME="ColorRed" VAL="11101"/>
        <ID NAME="ColorBlack" VAL="10011"/>
    </DEFINE>
    <RULE NAME="newgame" TOPLEVEL="ACTIVE">
        <P>new +game</P><O>-please</O>
    </RULE>
    <RULE NAME="playcard" TOPLEVEL="ACTIVE" EXPORT="1">
```

```
<RULE NAME="playcard" TOPLEVEL="ACTIVE" EXPORT="1">
    <O>please</O>
    <P>play the</P>
    <O>...</O>
    <RULEREF REF="card"/>
    <O>please</O>
</RULE>
<RULE NAME="movecard" TOPLEVEL="ACTIVE">
    <O>please</O>
    <P>
        <L>
            <P>move</P>
            <P>put</P>
        </L>
        <P>the</P>
    </P>
    <RULEREF PROPNAME="from" PROPID="FROM" NAME="card"/>
    <O>
        <L>
            <P>on</P>
            <P>to</P>
        </L>
        <P>the</P>
        <RULEREF PROPNAME="to" PROPID="TO" NAME="card"/>
    </O>
    <O>please</O>
</RULE>
<RULE NAME="card">
    <L>
        <P>
            <LN PROPNAME="color" PROPID="COLOR">
                <PN VAL="ColorRed">red</PN>
                <PN VAL="ColorBlack">black</PN>
            </LN>
            <RULEREF NAME="rank"/>
        </P>
        <P>
            <RULEREF NAME="rank"/>
            <O>
                <P>of</P>
                <LN PROPNAME="suit" PROPID="SUIT">
                    <PN VAL="0">clubs</PN>
                    <PN VAL="1">hearts</PN>
                    <PN VAL="2">diamonds</PN>
                    <PN VAL="3">spades</PN>
                </LN>
            </O>
        </P>
        <LN PROPNAME="suit" PROPID="SUIT">
            <PN VAL="0">club</PN>
```

```
            <PN VAL="1">heart</PN>
            <PN VAL="2">diamond</PN>
            <PN VAL="3">spade</PN>
        </LN>
    </L>
  </RULE>
  <RULE NAME="rank">
        <LN PROPNAME="rank" PROPID="RANK">
            <PN VAL="1">ace</PN>
            <PN VAL="2">two</PN>
            <PN VAL="3">three</PN>
            <PN VAL="4">four</PN>
            <PN VAL="5">five</PN>
            <PN VAL="6">six</PN>
            <PN VAL="7">seven</PN>
            <PN VAL="8">eight</PN>
            <PN VAL="9">nine</PN>
            <PN VAL="10">ten</PN>
            <PN VAL="11">jack</PN>
            <PN VAL="12">queen</PN>
            <PN VAL="13">king</PN>
            <PN VAL="12">lady</PN>
            <PN VAL="13">emperor</PN>
        </LN>
    </RULE>
</GRAMMAR>
```

⤒ Back to top

© 1995-2000 Microsoft Corporation. All rights reserved

Microsoft Speech SDK
with SAPI 5.0

[This is preliminary documentation and subject to change.]

ISpGrammarBuilder

Methods in Vtable Order

| ISpGrammarBuilder Methods | Description |
| --- | --- |
| ResetGrammar | Resets all grammar rules and specifies an optional grammar. |
| GetRule | Retrieves grammar rule information. |
| ClearRule | Removes the state information associated with a grammar rule. |
| CreateNewState | Creates a new state in the same grammar rule. |

| | |
|---|---|
| AddWordTransition | Changes a phrase from the display form and adds each word individually to the grammar. |
| AddRuleTransition | |
| AddResource | |
| Commit | |

© 1995-2000 Microsoft Corporation. All rights reserved

[This is preliminary documentation and subject to change.] 

Example application of ISpGrammarBuilder

The code example below illustrates an implementation of the ISpGrammarBuilder interface.

```
TPR t_ISpGrammarBuilder_ThankYouExample(ISpGrammarBuilder* pGrammarBuilder, LPCSTR
{
    // This test implement a small but compete example application using
    // ISpGrammarBuilder
    // THANKYOU ::= THANK (YOU)?
    // THANK   ::= Thanks
    // THANK   ::= Thank you (very much)?
    // YOU     ::= Mary | Mike | Sam HRESULT hr = S_OK;
    int tpr = TPR_PASS;

SPSTATEHANDLE hStateTHANK;        // the starting node of rule THANK
    SPSTATEHANDLE hStateThank1;
    SPSTATEHANDLE hStateThank2;
    SPSTATEHANDLE hStateThank3;
    SPSTATEHANDLE hStateYOU;          // the starting node of rule YOU
    SPSTATEHANDLE hStateTHANKYOU;     // the starting node of rule THANKYOU
    SPSTATEHANDLE hStateThankYou1;
    CSpCoTaskMemPtr<SPBINARYGRAMMAR> cpBinaryGrammar;

// define rule THANK
    DOCHECKHREX(hr = pGrammarBuilder->GetRule(L"THANK", 1, 0, TRUE, &hStateTHANK);
    DOCHECKHREX(hr = pGrammarBuilder->CreateNewState(hStateTHANK, &hStateThank1);)
    DOCHECKHREX(hr = pGrammarBuilder->CreateNewState(hStateTHANK, &hStateThank2);)
    DOCHECKHREX(hr = pGrammarBuilder->CreateNewState(hStateTHANK, &hStateThank3);)
    // THANK ::= Thanks
    DOCHECKHREX(hr = pGrammarBuilder->AddWordTransition(hStateTHANK, NULL, L"Thank
    // THANK ::= Thank you (very much)?
    DOCHECKHREX(hr = pGrammarBuilder->AddWordTransition(hStateTHANK, hStateThank1,
    DOCHECKHREX(hr = pGrammarBuilder->AddWordTransition(hStateThank1, hStateThank2
    DOCHECKHREX(hr = pGrammarBuilder->AddWordTransition(hStateThank2, hStateThank3
    DOCHECKHREX(hr = pGrammarBuilder->AddWordTransition(hStateThank3, NULL, L"much
    DOCHECKHREX(hr = pGrammarBuilder->AddWordTransition(hStateThank2, NULL, NULL, // define rule YOU
    DOCHECKHREX(hr = pGrammarBuilder->GetRule(L"YOU", 2, 0, TRUE, &hStateYOU););
    // YOU ::= Mary | Mike | Sam
    // TODO: property?
    DOCHECKHREX(hr = pGrammarBuilder->AddWordTransition(hStateYOU, NULL, L"Mary",
    DOCHECKHREX(hr = pGrammarBuilder->AddWordTransition(hStateYOU, NULL, L"Mike",
    DOCHECKHREX(hr = pGrammarBuilder->AddWordTransition(hStateYOU, NULL, L"Sam", L // define rule THANKYOU
    DOCHECKHREX(hr = pGrammarBuilder->GetRule(L"THANKYOU", 3, SPRAF_TopLevel, TRUE
    DOCHECKHREX(hr = pGrammarBuilder->CreateNewState(hStateTHANKYOU, &hStateThankY
```

```
// THANKYOU ::= THANK (YOU)?
DOCHECKHREX(hr = pGrammarBuilder->AddRuleTransition(hStateTHANKYOU, hStateThan
DOCHECKHREX(hr = pGrammarBuilder->AddRuleTransition(hStateThankYou1, NULL, hSt
DOCHECKHREX(hr = pGrammarBuilder->AddWordTransition(hStateThankYou1, NULL, NUL // TODO: loop?

hr = pGrammarBuilder->Commit(0);
CheckHr(hr, tpr, "Example failed when Commit(0).");

return tpr;
}
```

© 1995-2000 Microsoft Corporation. All rights reserved.

[This is preliminary documentation and subject to change.] 

ISpGrammarBuilder::ResetGrammar

ISpGrammarBuilder::ResetGrammar resets all grammar rules and specifies an optional grammar.

```
HRESULT ResetGrammar(
    LANGID    NewLanguage
);
```

Parameters

*NewLanguage*
    [in] Language identifier associated with the grammar rule.

Return values

| Value | Description |
| --- | --- |
| S_OK | Function completed successfully. |
| FAILED(hr) | Appropriate error message. |

Example

The following code snippet illustrates the use of ResetGrammar.

```
{
    HRESULT hr = S_OK;
    int tpr = TPR_PASS;
//=======================================================================
    TEST_TOPIC = "ResetGrammar when no rules";
//=======================================================================
    hr = pGrammarBuilder->ResetGrammar(1033);
    CheckHr(hr, tpr, TEST_TOPIC);

//=======================================================================
    TEST_TOPIC = "Set language to default user language";
//=======================================================================
    hr = pGrammarBuilder->ResetGrammar(SpGetUserDefaultUILanguage());
    CheckHr(hr, tpr, TEST_TOPIC);
```

```
//===========================================================================
    TEST_TOPIC = "Set language to non-english";
//===========================================================================
    hr = pGrammarBuilder->ResetGrammar(MAKELANGID(LANG_CHINESE, SUBLANG_CHINESE_SI
    CheckHr(hr, tpr, TEST_TOPIC);
    hr = pGrammarBuilder->ResetGrammar(MAKELANGID(LANG_JAPANESE, SUBLANG_DEFAULT))
    CheckHr(hr, tpr, TEST_TOPIC);

return tpr;
}
```

© 1995-2000 Microsoft Corporation. All rights reserved

---

[This is preliminary documentation and subject to change.] 

ISpGrammarBuilder::GetRule

ISpGrammarBuilder::GetRule retrieves grammar rule information.

```
HRESULT GetRule(
    const WCHAR     *pszRuleName,
    DWORD           dwRuleId,
    DWORD           dwAttributes,
    BOOL            fCreateIfNotExist,
    SPSTATEHANDLE   *phInitialState
);
```

Parameters

*pszRuleName*
    [in] Address of the null-terminated string containing the grammar rule name. If NULL, no search is made for the name.
*dwRuleId*
    [in] Grammar rule identifier. If zero, no search is made for the rule ID.
*dwAttributes*
    [in] Grammar rule attributes.
*fCreateIfNotExist*
    [in] Boolean indicating that the grammar rule is to be created if one does not currently exist. TRUE allows the creation; FALSE does not.
*phInitialState*
    [out] The initial state of the rule. May be NULL.

Return values

| Value | Description |
| --- | --- |
| S_OK | Function completed successfully. |
| E_INVALIDARG | At least *pszRuleName phInitialState* is invalid or bad. Alternately, *pszRuleName* is NULL or *dwRuleId* is zero. |
| E_OUTOFMEMORY | Not enough memory to complete operation. |
| SPERR_RULE_NOT_FOUND | No rule matching the specified criteria can be found. |
| SPERR_RULE_NAME_ID_CONFLICT | More than one rule with the same name and ID was found. |
| FAILED(hr) | Appropriate error message. |

Example

The following code snippet illustrates the use of GetRule.

```
    HRESULT hr = S_OK;
    SPSTATEHANDLE hState;
//======================================================================
    TEST_TOPIC = "Create a rule with id";
//======================================================================
    hr = pGrammarBuilder->GetRule(L"rule1", 1, SPRAF_Dynamic, TRUE, &hState);
    //Check return value
//======================================================================
    TEST_TOPIC = "Create a rule without id";
//======================================================================
    hr = pGrammarBuilder->GetRule(L"rule2", 0, SPRAF_Dynamic, TRUE, &hState);
    //Check return value
//======================================================================
    TEST_TOPIC = "Get an existing rule by id";
//======================================================================
    hr = pGrammarBuilder->GetRule(L"rule1", 1, SPRAF_Dynamic, TRUE, &hState);
    //Check return value
//======================================================================
    TEST_TOPIC = "Get an existing rule by name";
//======================================================================
    hr = pGrammarBuilder->GetRule(L"rule1", 0, SPRAF_Dynamic, TRUE, &hState);
    //Check return value
```

© 1995-2000 Microsoft Corporation. All rights rese

[This is preliminary documentation and subject to change.]

ISpGrammarBuilder::ClearRule

ISpGrammarBuilder::ClearRule removes the state information associated with a grammar rule.

```
HRESULT ClearRule(
    SPSTATEHANDLE   hState
);
```

Parameters

*hState*

Return values

| Value | Description |
| --- | --- |
| S_OK | Function completed successfully. |
| FAILED(hr) | Appropriate error message. |

Example

The following code snippet illustrates the use of ClearRule.

```
{
    HRESULT hr = S_OK;
    int tpr = TPR_PASS;

SPSTATEHANDLE hInit;
    SPSTATEHANDLE hState;
    DOCHECKHREX(hr = pGrammarBuilder->GetRule(L"rule1", 1, 0, TRUE, &hInit););

//=====================================================================
    TEST_TOPIC = "ClearRule using hInitState";
//=====================================================================
    DOCHECKHREX(hr = pGrammarBuilder->CreateNewState(hInit, &hState););
    DOCHECKHREX(hr = pGrammarBuilder->AddWordTransition(hInit, hState, L"word", NU
    hr = pGrammarBuilder->ClearRule(hInit);
    CheckHr(hr, tpr, TEST_TOPIC);
    hr = pGrammarBuilder->AddWordTransition(hInit, hState, L"word", NULL, SPWT_LEX
    CompareHr(hr, E_INVALIDARG, tpr, CatMsg(TEST_TOPIC, ": not really cleared."));

//=====================================================================
    TEST_TOPIC = "ClearRule using hState != hInit";
//=====================================================================
    DOCHECKHREX(hr = pGrammarBuilder->CreateNewState(hInit, &hState););
    DOCHECKHREX(hr = pGrammarBuilder->AddWordTransition(hInit, hState, L"word", NU
    hr = pGrammarBuilder->ClearRule(hState);
    CheckHr(hr, tpr, TEST_TOPIC);
    hr = pGrammarBuilder->AddWordTransition(hInit, hState, L"word", NULL, SPWT_LEX
    CompareHr(hr, E_INVALIDARG, tpr, CatMsg(TEST_TOPIC, ": not really cleared."));

return tpr;
}
```

© 1995-2000 Microsoft Corporation. All rights reserved.

---

[This is preliminary documentation and subject to change.] 

ISpGrammarBuilder::CreateNewState

ISpGrammarBuilder::CreateNewState creates a new state in the same grammar rule.

```
HRESULT CreateNewState(
    SPSTATEHANDLE   hState,
    SPSTATEHANDLE   *phState
);
```

Parameters

*hState*
    Handle to the grammar rule information.
*phState*
    Address of the handle containing the grammar rule state information.

Return values

| Value | Description |
| --- | --- |

S_OK                    Function completed successfully.
E_INVALIDARG            One or more arguments are invalid.
FAILED(hr)              Appropriate error message.

Example

The following code snippet illustrates the use of CreateNewState.

```
{
    HRESULT hr = S_OK;
    int tpr = TPR_PASS;

SPSTATEHANDLE hInit;
    DOCHECKHREX(hr = pGrammarBuilder->GetRule(L"rule1", 1, 0, TRUE, &hInit););

//=======================================================================
    TEST_TOPIC = "CreateNewState using the hInitState";
//=======================================================================
    SPSTATEHANDLE hState;
    hr = pGrammarBuilder->CreateNewState(hInit, &hState);
    CheckHr(hr, tpr, TEST_TOPIC);

//=======================================================================
    TEST_TOPIC = "CreateNewState using hState != hInit";
//=======================================================================
    SPSTATEHANDLE hState2;
    hr = pGrammarBuilder->CreateNewState(hState, &hState2);
    CheckHr(hr, tpr, TEST_TOPIC);

return tpr;
}
```

© 1995-2000 Microsoft Corporation All rights reserved.

---

[This is preliminary documentation and subject to change.] 

ISpGrammarBuilder::AddWordTransition

ISpGrammarBuilder::AddWordTransition changes a phrase from the display form and adds each word individually to the grammar. Inverse text normalization is preformed on he phrase before adding words to the grammar.

```
HRESULT AddWordTransition(
    SPSTATEHANDLE       hFromState,
    SPSTATEHANDLE       hToState,
    const WCHAR         *psz,
    const WCHAR         *pszSeperators,
    SPGRAMMARWORDTYPE   eWordType,
    float               Weight,
    const SPPROPERTYINFO *pPropInfo
);
```

Parameters

*hFromState*
    Handle of the "from" word transition state information.

Handle of the "from" word transition state information.

*hToState*
    Handle of the "to" word transition state information.

*psz*
    Address of a null-terminated string containing the transition information. If the value in *psz* is NULL, the contents of *psz* is an epsilon.

*pszSeperators*
    Address of a null-terminated string containing the transition word separation characters. *pszSeperators* points to a single word if this value is NULL, or else *pszSeperators* specifies the valid separator characters.

*eWordType*
    The SPGRAMMARWORDTYPE enumeration that specifies the grammar type. Currently, only valid SPWT_LEXICAL is supported.

*Weight*
    Value specifying the grammar rule weight information.

*pPropInfo*
    The SPPROPERTYINFO structure containing property name and value information that is associated with the grammar.

Return values

| Value | Description |
| --- | --- |
| S_OK | Function completed successfully. |
| E_INVALIDARG | At least one of *psz*, *pszSeparators*, or *pPropInfo* is invalid or bad. Alternately *eWordType* is a value other than SPWT_LEXICAL. |
| FAILED(hr) | Appropriate error message. |

Example

The following code snippet illustrates the use of AddWordTransition.

```
{
    HRESULT hr = S_OK;

SPSTATEHANDLE hStateHello;
    SPSTATEHANDLE hStateHello1;
    SPSTATEHANDLE hStateBye;
    SPSTATEHANDLE hStateBye1;

//===========================================================================
    TEST_TOPIC = "Add word transition from normal state to NULL state (end of rule
//===========================================================================
    // define a new rule whose initial state is hState if(s_fVerifyEmptyRule)
    {
        hr = pGrammarBuilder->Commit(0);
        //Check return value
    }

// add a word transition from hStateHello to NULL
    hr = pGrammarBuilder->AddWordTransition(hStateHello, NULL, L"Hello", L" ", SPW
```

```
//Check return value hr = pGrammarBuilder->Commit(0);
//Check return value
//========================================================================
    TEST_TOPIC = "Add word transition from a 'fly' state which is not connected to
//========================================================================
    SPSTATEHANDLE hStateFly;

hr = pGrammarBuilder->AddWordTransition(hStateFly, NULL, L"fly", NULL, SPWT_LE
    //Check return value if(s_fVerifyFlyState)
    {
        hr = pGrammarBuilder->Commit(0);
        //Check return value
    }

//========================================================================
    TEST_TOPIC = "Add word transition to non-NULL state";
//========================================================================
    if(s_fVerifyEmptyRule)
    {
        hr = pGrammarBuilder->Commit(0);
        //Check return value
    }

// add word transitions from hStateBye to hStateBye1 then to NULL
    hr = pGrammarBuilder->AddWordTransition(hStateBye, hStateBye1, L"Good", L" ",
    //Check return value hr = pGrammarBuilder->AddWordTransition(hStateBye1, NULL, L"bye", L" ", SPWT_L
    //Check return value hr = pGrammarBuilder->Commit(0);
    CheckHr(hr, tpr, CatMsg(TEST_TOPIC, ": Commit(0)"));

//========================================================================
    TEST_TOPIC = "Add additional word transition to a node";
//========================================================================
    hr = pGrammarBuilder->AddWordTransition(hStateHello, NULL, L"Hi", L" ", SPWT_L
    //Check return value hr = pGrammarBuilder->Commit(0);
    //Check return value //========================================================================
    TEST_TOPIC = "Add duplicate word transition to a different node";
//========================================================================
    // add duplicate word transition from hStateHello to newNode
    hr = pGrammarBuilder->AddWordTransition(hStateHello, hStateHello1, L"Hi", L" "
    //Check return value hr = pGrammarBuilder->Commit(0);
    //Check return value // now finish this rule
    hr = pGrammarBuilder->AddWordTransition(hStateHello1, NULL, L"there", L" ", SP
    //Check return value hr = pGrammarBuilder->Commit(0);
    //Check return value //========================================================================
    TEST_TOPIC = "Add duplicate word transition to the same NULL node";
//========================================================================
    hr = pGrammarBuilder->AddWordTransition(hStateHello, NULL, L"Hi", L" ", SPWT_L
```

```
    //Check return value
//=====================================================================
    TEST_TOPIC = "Add duplicate word transition to the same non-NULL node";
//=====================================================================
    hr = pGrammarBuilder->AddWordTransition(hStateHello, hStateHello1, L"Hi", L" "
    //Check return value
```

© 1995-2000 Microsoft Corporation All rights reserved.

---

[This is preliminary documentation and subject to change.] 

ISpGrammarBuilder::AddRuleTransition

```
HRESULT AddRuleTransition(
    SPSTATEHANDLE       hFromState,
    SPSTATEHANDLE       hToState,
    SPSTATEHANDLE       hRule,
    float               Weight,
    const SPPROPERTYINFO *pPropInfo
);
```

Parameters

*hFromState*
    Handle of the "from" rule transition state information.
*hToState*
    Handle of the "to" rule transition state information.
*hRule*
    Handle of the grammar rule's initial state.
*Weight*
    Value specifying the grammar rule weight information.
*pPropInfo*
    The SPPROPERTYINFO structure containing property name and value information associated with the grammar.

Return values

| Value | Description |
| --- | --- |
| S_OK | Function completed successfully. |
| E_INVALIDARG | The grammar nodes rule state are the not the same. |
| E_OUTOFMEMORY | Not enough memory to complete operation. |
| FAILED(hr) | Appropriate error message. |

© 1995-2000 Microsoft Corporation All rights reserved

---

[This is preliminary documentation and subject to change.] 

ISpGrammarBuilder::AddResource

ISpGrammarBuilder::AddResource

```
HRESULT AddResource(
    SPSTATEHANDLE   hRuleState,
    const WCHAR     *pszResourceName,
    const WCHAR     *pszResourceValue
);
```

Parameters

*hRuleState*
    [in] Handle of the rule state information.
*pszResourceName*
    [in] Address of a null-terminated string specifying the resource name information.
*pszResourceValue*
    [in] Address of a null-terminated string specifying the resource value information.

Return values

| Value | Description |
| --- | --- |
| S_OK | Function completed successfully. |
| FAILED(hr) | Appropriate error message. |

Example

The following code snippet illustrates the use of AddResource.

```
{
    HRESULT hr = S_OK;
    int tpr = TPR_PASS;

SPSTATEHANDLE hInit;
    DOCHECKHREX(hr = pGrammarBuilder->GetRule(L"rule1", 1, 0, TRUE, &hInit););
    SPSTATEHANDLE hState;
    DOCHECKHREX(hr = pGrammarBuilder->CreateNewState(hInit, &hState););
//=================================================================
    TEST_TOPIC = "AddResource using the hInitState";
//=================================================================
    hr = pGrammarBuilder->AddResource(hInit, L"ResName1", L"ResValue1");
    CheckHr(hr, tpr, TEST_TOPIC);

//=================================================================
    TEST_TOPIC = "AddResource using hState != hInit";
//=================================================================
    hr = pGrammarBuilder->AddResource(hState, L"ResName2", L"ResValue2");
    CheckHr(hr, tpr, TEST_TOPIC);

return tpr;
}
```

© 1995-2000 Microsoft Corporation All rights res

[This is preliminary documentation and subject to change.]

ISpGrammarBuilder::Commit

ISpGrammarBuilder::Commit

ISpGrammarBuilder::Commit

```
HRESULT Commit(
    DWORD    dwReserved
);
```

Parameters

*dwReserved*
    Reserved.

Return values

| Value | Description |
| --- | --- |
| S_OK | Function completed successfully. |
| FAILED(hr) | Appropriate error message. |

Example

The following code snippet illustrates the use of Commit.

```
{
    HRESULT hr = S_OK;
    int tpr = TPR_PASS;
//======================================================================
    TEST_TOPIC = "Commit when there are no rules";
//======================================================================
    hr = pGrammarBuilder->Commit(0);
    CompareHr(hr, SPERR_NO_RULES, tpr, TEST_TOPIC);

// not add some rules
    DOCHECKHREX(hr = pGrammarBuilder->GetRule(L"rule1", 1, SPRAF_Dynamic, TRUE, NU
    SPSTATEHANDLE hState;
    DOCHECKHREX(hr = pGrammarBuilder->GetRule(L"rule2", 2, 0, TRUE, &hState););
    DOCHECKHREX(hr = pGrammarBuilder->AddWordTransition(hState, NULL, L"test", L"
//======================================================================
    TEST_TOPIC = "Commit normally";
//======================================================================
    {
        hr = pGrammarBuilder->Commit(0);
        CheckHr(hr, tpr, TEST_TOPIC);
    } return tpr;
}
```

Related topics

Lexicon Manager

The following section covers:

- ISpContainerLexicon
- ISpLexicon
- ISpPhoneConverter

Microsoft Speech SDK
with SAPI 5.0

[This is preliminary documentation and subject to change.]

ISpContainerLexicon

ISpContainerLexicon inherits from ISpLexicon.

Methods in Vtable Order

| ISpContainerLexicon Methods | Description |
| --- | --- |
| AddLexicon | Adds a lexicon and its type to the lexicon stack. |

[This is preliminary documentation and subject to change.]

ISpContainerLexicon::AddLexicon

ISpContainerLexicon::AddLexicon adds a lexicon and its type to the lexicon stack.

```
HRESULT AddLexicon(
    ISpLexicon    *pAddLexicon,
    DWORD         dwFlags
);
```

Parameters

*pAddLexicon*
    [in] Pointer to the lexicon interface.
*dwFlags*
    [in] flags of type SPLEXICONTYPE indicating the lexicon type.

Return values

| Value | Description |
| --- | --- |
| S_OK | Function completed successfully. |
| E_INVALIDARG | *dwFlag* is invalid or bad. |
| E_POINTER | *pLexicon* is invalid or bad. |
| E_OUTOFMEMORY | Exceeded available memory. |
| FAILED(hr) | Appropriate error message. |

© 1995-2000 Microsoft Corporation All rights reserved

Microsoft Speech SDK with SAPI 5.0 

[This is preliminary documentation and subject to change.]

ISpLexicon

The Lexicon database is a repository of words and word-related information such as pronunciations and parts of speech. The SAPI lexicon interface provides application CSR and TTS engine developers a standard method with which to create, access, modify, and synchronize with lexicons.

There are two types of custom lexicons supported by lexicon interface: user and application. The user lexicon stores words specific to a user. It is a read/write lexicon and is shared among all applications. The application lexicon is supplied by the application and stores words specific to the application. The application supplied lexicons are read-only. Application lexicons ensure that the vocabulary used by the application is well represented in the lexicon.

Application lexicons are built with an application lexicon compiler shipped with the SDK (not shipped in beta release). The lexicon interface provides methods to synchronize changes in lexicons using a lexicon generation ID. These changes in the lexicon are a result of modifications to user lexicons or for the installation or uninstallation of application lexicons. Clients can use the synchronization to update their private stores with the changes made to the custom lexicons while the client has been offline. For example, SR engines can update their language models with changes made to the custom lexicons while the SR engine had been off-line.

Note: Application lexicons cannot be added in the runtime environment.
When an application wants to add a lexicon, the application must either:

1. Create and add a private lexicon.
2. Register the lexicon, close the container lexicon and restart it.

Apart from custom lexicons, the lexicon interface provides access to vendor, morph, and letter-to-sound lexicons that Microsoft ships with SAPI. Vendor lexicons are large vocabulary lexicons holding words and their pronunciations and parts of speech. The morph lexicons derive pronunciations using the data in the vendor lexicon. The letter-to-sound lexicon computes the pronunciation of a word from its spelling.

Methods in Vtable Order

| ISpLexicon Methods | Description |
| --- | --- |

| | |
|---|---|
| GetPronunciations | Gets pronunciations and parts of speech for a word. |
| AddPronunciation | Adds pronunciations and parts of speech to a word. |
| RemovePronunciation | Removes the word and its pronunciations and the parts of speech from the user lexicon. |
| GetGeneration | Passes back the generation ID for a word. |
| GetGenerationChange | Gets a list of words which have changed between the current and a specified generation. |
| GetWords | Gets all words for the user and/or application lexicons. |

© 1995-2000 Microsoft Corporation. All rights reserved

[This is preliminary documentation and subject to change.]

ISpLexicon::GetPronunciations

ISpLexicon::GetPronunciations gets pronunciations and parts of speech for a word.

```
HRESULT GetPronunciations(
    const WCHAR              *pszWord,
    LANGID                   LangID,
    DWORD                    dwFlags,
    SPWORDPRONUNCIATIONLIST  *pWordPronunciationList
);
```

Parameters

*pszWord*
    [in] Pointer to a text string as a search keyword. Length must be equal to less than SP_MAX_WORD_LENGTH.

*LangID*
    [in] The language ID of the word. May be zero to indicate that the word can be of any LANGID.

*dwFlags*
    [in] Bitwise flags of type SPLEXICONTYPE indicating that the lexicons searched for this word.

*pWordPronunciationList*
    [in, out] Pointer to SPWORDPRONUNCIATIONLIST structure in which the pronunciations and parts of speech are returned.

Return values

| Value | Description |
|---|---|
| S_OK | Function completed successfully. |
| E_POINTER | Either *pszWord* and/or *pWordPronunciationList* is NULL. |
| E_INVALIDARG | Either *pszWord* and/or *pWordPronunciationList* is invalid or bad. |
| E_OUTOFMEMORY | Exceeded available memory. |
| SPERR_UNINITIALIZED | Interface not allocated. |

| | |
|---|---|
| SPERR_NOT_IN_LEX | Word is not found in the lexicon. |
| SP_WORD_EXISTS_WITHOUT_PRONUNCIATION | The word exists but does not have a pronunciation. |
| FAILED(hr) | Appropriate error message. |

Example

The following example is a code fragment demonstrating the use of GetPronunciations.

```
SPWORDPRONUNCIATIONLIST spwordpronlist;
memset(&spwordpronlist, 0, sizeof(spwordpronlist));

hr = pISpLexicon->GetPronunciations(L"resume", 1033, eLEXTYE_ALL, &spwordp
//test for results
if( !SUCCEDED(hr) ) return;

for (
     SPWORDPRONUNCIATION pwordpron = pwordpronlist->pFirstWordPron;
     wordpron != NULL;
     wordpron = pwordpron->pNextWordPron
     )
{
    DoSomethingWith(pwordpron->ePartOfSpeech, pwordpron->szPronunciation);
}

//free all the buffers
CoTaskMemFree(spwordpronlist.pvBuffer);
```

© 1995-2000 Microsoft Corporation. All rights reserved.

---

[This is preliminary documentation and subject to change.] 

ISpLexicon::AddPronunciation

ISpLexicon::AddPronunciation adds word pronunciations and parts of speech (POS) to the user lexicon. SAPI will not modify the word if spelling, pronunciation, and POS are the same as the existing entry.

```
HRESULT AddPronunciation(
    const WCHAR       *pszWord,
    LANGID            LangID,
    SPPARTOFSPEECH    ePartOfSpeech,
    const WCHAR       *pszPronunciation
);
```

Parameters

*pszWord*
   [in] The word to add.
*LangID*
   [in] The language ID of the word. The speech user default will be used if LANGID is omitted. Length must be equal to or less than SP_MAX_WORD_LENGTH.
*ePartOfSpeech*
   [in] The part of speech of type SPPARTOFSPEECH.
*pszPronunciation*
   [in] Null-terminated pronunciation of the word in the NUM phone set. Multiple pronunciations

[in] Null-terminated pronunciation of the word in the NUM phone set. Multiple pronunciations may be appended to a single word by assigning a new POS. The length must be equal to or less than SP_MAX_PRON_LENGTH.

Return values

| Value | Description |
| --- | --- |
| S_OK | Function completed successfully. |
| E_POINTER | Pointer to the word is invalid. |
| E_INVALIDARG | At least one of the parameters are invalid or bad. |
| SP_ALREADY_IN_LEX | Word has already been added to the lexicon. |
| SPERR_APPLEX_READ_ONLY | Word is read only and cannot be removed. |
| SPERR_UNINITIALIZED | The interface has not been initialized. |
| E_OUTOFMEMORY | Exceeded available memory. |
| FAILED(hr) | Appropriate error message. |

Example

The following is an example of AddPronunciation.

```
WCHAR wszNum[3];
wszNum[0] = 0x000b;
wszNum[1] = 0x0012;
wszNum[2] = 0;

pISpLexicon->AddPronunciation(L"Rob", 0x409, SPPS_NOUN, szNum);
```

© 1995-2000 Microsoft Corporation. All rights reserved.

[This is preliminary documentation and subject to change.] 

ISpLexicon::RemovePronunciation

ISpLexicon::RemovePronunciation removes the word, its pronunciations and the part of speech (POS) from the user lexicon.

```
HRESULT RemovePronunciation(
    const WCHAR      *pszWord,
    LANGID           LangID,
    SPPARTOFSPEECH   ePartOfSpeech,
    const WCHAR      *pszPronunciation
);
```

Parameters

*pszWord*
    [in] The word to remove.
*LangID*
    [in] The language ID of the word. The speech user default will be used if LANGID is omitted.
*ePartOfSpeech*

[in] The part of speech of type SPPARTOFSPEECH.

*pszPronunciation*

[in] Pronunciation of the word. If the pronunciation is non-NULL, then delete only this pronunciation and its associated part of speech. If there is only one pronunciation, then delete the word. If the pronunciation is NULL, then delete the word and all of its pronunciations and parts of speech.

Return values

| Value | Description |
| --- | --- |
| S_OK | Function completed successfully. |
| E_POINTER | Pointer to the word is invalid. |
| E_INVALIDARG | One of the parameters is not valid. |
| E_OUTOFMEMORY | Exceeded available memory. |
| SPERR_NOT_IN_LEX | Word is not found in the lexicon. |
| SPERR_APPLEX_READ_ONLY | Word is read only and can not be removed. |
| SPERR_UNINITIALIZED | Interface not initialized. |
| FAILED(hr) | Appropriate error message. |

Example

The following code fragment is an example of RemovePronunciation.

```
WCHAR szPronounce[MAX_PRON_LEN];
DWORD d;
VOICEPARTOFSPEECH POS;

HRESULT hr = Get((VOICECHARSET)0, pszText, wSense, szPronounce, MAX_PRON_L
if (SUCCEEDED(hr))
        hr = m_pLex->RemovePronunciation(pszText, 1033, (SPPARTOFSPEECH)POS
```

© 1995-2000 Microsoft Corporation. All rights reserved.

[This is preliminary documentation and subject to change.]

ISpLexicon::GetGeneration

ISpLexicon::GetGeneration passes back the generation ID for a word.

Each change (either as an install or uninstall) in the user lexicon will increment the generation ID by one.

```
HRESULT GetGeneration(
    DWORD    *pdwGeneration
);
```

Parameters

*pdwGeneration*

*pdwGeneration*
> The generation ID. This is a relative count of how many times the custom lexicons have changed.

Return values

| Value | Description |
| --- | --- |
| S_OK | Function completed successfully. |
| E_POINTER | Generation value is zero or undefined. |
| E_INVALIDARG | Generation value is invalid. |
| SPERR_UNINITIALIZED | Interface is not initialized. |
| FAILED(hr) | Appropriate error message. |

© 1995-2000 Microsoft Corporation. All rights reserved.

[This is preliminary documentation and subject to change.] 

ISpLexicon::GetGenerationChange

ISpLexicon::GetGenerationChange passes back a list of words which has changed between a given generation and current generation.

```
HRESULT GetGenerationChange(
    DWORD         dwFlags,
    DWORD         *pdwGeneration,
    SPWORDLIST    *pWordList
);
```

Parameters

*dwFlags*
> [in] The lexicon category of type SPLEXICONTYPE. Currently it must be eLEXTYPE_USER or eLEXTYPE_APP.

*pdwGeneration*
> [in, out] The generation ID of client when passed in. The current generation ID is passed back on successful completion of the call.

*pWordList*
> [in, out] The buffer containing the word list and its related information.

Return values

| Value | Description |
| --- | --- |
| S_OK | Function completed successfully. |
| E_POINTER | *pdwGeneration* is zero or NULL. |
| E_INVALIDARG | *pdwGeneration* is invalid or bad. |
| SPERR_UNINITIALIZED | Interface has not been initialized. |
| E_OUTOFMEMORY | Exceeded available memory. |
| SP_LEX_NOTHING_TO_SYNC | No words are available with which to synchronize. |

| | |
|---|---|
| SP_LEX_NOTHING_TO_SYNC | No words are available with which to synchronize. |
| SPERR_APPLEX_READ_ONLY | Word is read only and cannot be removed. |
| SPERR_LEX_VERY_OUT_OF_SYNC | The value passed in with *pdwGeneration* is greater than the custom lexicon's generation ID. Use ISpLexicon::GetWords if GetGenerationChange returns SPERR_LEX_VERY_OUT_OF_SYNC to regenerate an entire list of words based on the current generation. |
| FAILED(hr) | Appropriate error message. |

Example

The following is an example of GetGenerationChange.

```
MainSRLoop:

for (;;)
  {
    hr = pISpLexicon->GetGenerationChange(eLEXTYPE_USER, &m_dwGeneration, &spwordl // If, for example, a new application lexicon was added, we'll have
    // to rebuild from scratch.
    if (hr == SPERR_LEX_VERY_OUT_OF_SYNC)
        Rebuild(); // Call GetWords // Some other error
    if (FAILED(hr)
        DealWithOtherErrors();

// Loop thru the changed words, and their new pronunciations
        for (SPWORD *pword = spwordlist.pFirstWord;
             pword != NULL;
             pword = pword->pNextWord)
    {
        for (SPWORDPRON pwordpron = pword->pFirstWordPron;
             pwordpron != NULL;
             pwordpron = pwordpron->pNextWordPron)
        {
            AddPronunciationToEngineDataStructures(
            pword->pszWord,
            pwordpron->ePartOfSpeech,
            pwordpron->pszPronIPA);
        }
    }
  }
// Continue with SR code...
```

© 1995-2000 Microsoft Corporation. All rights reserved.

---

[This is preliminary documentation and subject to change.] 

ISpLexicon::GetWords

ISpLexicon::GetWords gets all words for the container lexicons.

This method is called repeatedly with the cookie (set to zero the first time) until S_OK is returned. S_FALSE is returned indicating additional information is left.

```
HRESULT GetWords(
    DWORD       dwFlags,
    DWORD       *pdwGeneration,
    DWORD       *pdwCookie,
    SPWORDLIST  *pWordList
);
```

Parameters

*dwFlags*
    [in] Bitwise flags of type SPLEXICONTYPE from which words are to be retrieved. Valid values are eLEXTYPE_USER and eLEXTYPE_APP.

*pdwGeneration*
    [out] The current generation ID of the custom lexicon.

*pdwCookie*
    [in, out] Cookie passed back by this call. It should subsequently be passed back in to get more data. If the call returns S_FAILED, then data is remaining and GetWords should be called again. The initial value of the cookie passed in must be zero or *pdwCookie* be a NULL pointer. NULL indicates the method should return all words contained in the lexicon. If it cannot SP_LEX_REQUIRES_COOKIE is returned instead.

*pWordList*
    [in, out] The buffer containing the word list and its related information.

Return values

| Value | Description |
| --- | --- |
| S_OK | Function completed successfully. In addition, the value of *pdwCookie* did not change. |
| S_FALSE | Additional words are left in the lexicon(s) to process. The value of *pdwCookie* did change. |
| E_POINTER | At least one of *pdwGeneration, pdwCookie, pWordList* is zero or NULL. |
| E_INVALIDARG | One of the parameters is not valid. |
| E_OUTOFMEMORY | Exceeded available memory. |
| SPERR_UNINITIALIZED | Interface not initialized. |
| SP_LEX_NOTHING_TO_SYNC | No words are available with which to synchronize. |
| SP_LEX_REQUIRES_COOKIE | A complete list of words cannot be returned from the container lexicon. *pdwCookie* must not be NULL. |
| FAILED(hr) | Appropriate error message. |

Example

The following is an example of using GetWords.

```
SPWORDLIST spwordlist;
memset(&spwordlist, 0, sizeof(spwordlist));
dwCookie = 0;

while (SUCCEEDED(hr = pISpLexicon->GetWords(eLEXTYPE_USER | eLEXTYPE_APP, &dwG
        {
            for (SPWORD *pword = spwordlist.pFirstWord;
                 pword != NULL;
                 pword = pword->pNextWord)
            {
```

```
    {
        for (SPWORDPRONUNCIATION *pwordpron = pword->pFirstWordPronunciation;
             pwordpron != NULL;
             pwordpron = pwordpron->pNextWordPronunciation)
        {
            DoSomethingWith(pwordpron->ePartOfSpeech, pwordpron->pszPronIPA);
        }
    } if (hr == S_OK)
        break;   // nothing more to retrieve
}
//free all the buffers
CoTaskMemFree(spwordlist.pvBuffer);

// Check for SUCCEEDED(hr);
```

© 1995-2000 Microsoft Corporation. All rights reserved

Microsoft Speech SDK
with SAPI 5.0

[This is preliminary documentation and subject to change.]

ISpPhoneConverter

The ISpPhoneConverter interface enables the client to convert from the SAPI character phoneset to the Id phoneset.

When to Use

Call methods of the ISpPhoneConverter interface to convert between character and NUM phonesets.

Note: ISpPhoneConverter inherits from ISpObjectWithToken.

Methods in Vtable Order

| ISpPhoneConverter Methods | Description |
| --- | --- |
| PhoneToId | Converts an internal phone string to Id code string. |
| IdToPhone | Converts an Id code string to internal phone. |

© 1995-2000 Microsoft Corporation All rights reserve

[This is preliminary documentation and subject to change.]

ISpPhoneConverter::PhoneToId

ISpPhoneConverter::PhoneToId converts an internal phone string to Id code string.

The internal phones are space separated and may have a space at the end.

```
HRESULT PhoneToId(
    const WCHAR    *pszPhone,
    SPPHONEID      *pId
);
```

Parameters

*pszPhone*
   [in] Address of a null-terminated string that contains the phone string information.

*pId*
   [out] Address of the SPPHONEID that receives the phone identifier.

Return values

| Value | Description |
| --- | --- |
| S_OK | Function completed successfully. |
| E_INVALIDARG | One or more arguments are invalid. |
| FAILED(hr) | Appropriate error message. |

© 1995-2000 Microsoft Corporation. All righ

---

[This is preliminary documentation and subject to change.]

ISpPhoneConverter::IdToPhone

ISpPhoneConverter::IdToPhone converts an Id code string to internal phone.

The output internal phones are space separated.

```
HRESULT IdToPhone(
    const SPPHONEID   *pId,
    WCHAR             *pszPhone
);
```

Parameters

*pId*
   [in] Address of the SPPHONEID that contains the phone identifier.

*pszPhone*
   [out] Address of a null-terminated string that receives the phone string information.

Return values

| Value | Description |
| --- | --- |
| S_OK | Function completed successfully. |
| E_INVALIDARG | One or more arguments are invalid. |
| E_POINTER | Invalid pointer. |

FAILED(hr)      Appropriate error message.

© 1995-2000 Microsoft Corporation. All rights reserved

Microsoft Speech SDK
with SAPI 5.0 

[This is preliminary documentation and subject to change.]

Resource Manager

The following section covers:

- ISpDataKey
- ISpRegDataKey
- ISpObjectTokenInit
- ISpObjectTokenCategory
- ISpObjectToken
- IEnumSpObjectTokens
- ISpObjectWithToken
- ISpResourceManager
- ISpTask © 1995-2000 Microsoft Corporation All rights reserve Microsoft Speech SDK
with SAPI 5.0 

[This is preliminary documentation and subject to change.]

ISpDataKey

The ISpDataKey interface is used to access the speech object registry functions.

When to Implement

Implement this interface when a caller wants to have access and the ability to modify the registry information for a given speech object.

Methods in Vtable Order

| ISpDataKey Methods | Description |
| --- | --- |
| SetData | Sets the value information for a specified registry key. |
| GetData | Retrieves a value information from a specified registry key. |
| SetStringValue | Sets the string value information for a specified registry key. |
| GetStringValue | Retrieves the string value information from a specified registry key. |
| SetDWORD | Sets the value information for a specified registry key. |

| | |
|---|---|
| GetDWORD | Retrieves the value information from a specified registry key. |
| OpenKey | Opens a specified registry key. |
| CreateKey | Creates a new registry key. |
| DeleteKey | Deletes a specified registry key and all its descendants. |
| DeleteValue | Deletes a named value from the specified registry key. |
| EnumKeys | Enumerates the subkeys of the specified open registry key. |
| EnumValues | Enumerates the values of the specified open registry key. |

© 1995-2000 Microsoft Corporation All rights reserved

[This is preliminary documentation and subject to change.]

ISpDataKey::SetData

ISpDataKey::SetData sets the value information for a specified registry key.

```
HRESULT SetData(
    const WCHAR    *pszValueName,
    ULONG          cbData,
    const BYTE     *pData
);
```

Parameters

*pszValueName*
 [in] Address of a null-terminated string that contains the registry key value name.
*cbData*
 [in] Size of the destination data buffer that contains the registry key value information.
*pData*
 [out] Address of the destination data buffer that contains the registry key value information.

Return values

| Value | Description |
|---|---|
| S_OK | Function completed successfully. |
| E_INVALIDARG | Either *pszValueName* or *pData* is an invalid or bad pointer. |
| FAILED(hr) | Appropriate error message. |

© 1995-2000 Microsoft Corporation. All rights reserved

[This is preliminary documentation and subject to change.]

ISpDataKey::GetData

ISpDataKey::GetData

ISpDataKey::GetData retrieves the value information from a specified registry key.

```
HRESULT GetData(
    const WCHAR   *pszValueName,
    ULONG         *pcbData,
    BYTE          *pData
);
```

Parameters

*pszValueName*
   Address of a null-terminated string containing the name of the registry key from which to retrieve the registry key value.

*pcbData*
   Address of the size of the destination data buffer that receives the registry key value information.

*pData*
   Address of the destination data buffer that receives the registry key value information.

Return values

| Value | Description |
| --- | --- |
| S_OK | Function completed successfully. |
| E_INVALIDARG | *pszValueName* is invalid or bad. |
| E_POINTER | Either *pcbData* or *pData* is an invalid or bad pointer. |
| FAILED(hr) | Appropriate error message. |

© 1995-2000 Microsoft Corporation. All rights reserved

---

[This is preliminary documentation and subject to change.] 

ISpDataKey::SetStringValue

ISpDataKey::SetStringValue writes the string value information for a specified registry key.

```
HRESULT SetStringValue(
    const WCHAR   *pszValueName,
    const WCHAR   *pszValue
);
```

Parameters

*pszValueName*
   Address of the null-terminated string that specifies the name of the string value. If NULL, the default value of the registry key is used.

*pszValue*
   Address of a null-terminated string that contains the string value to be set for the specified key.

Address of a null-terminated string that contains the string value to be set for the specified key.

Return values

| Value | Description |
|---|---|
| S_OK | Function completed successfully. |
| E_INVALIDARG | Either *pszValueName* or *pszValue* is invalid or bad. |
| FAILED(hr) | Appropriate error message. |

© 1995-2000 Microsoft Corporation. All rights reserved

[This is preliminary documentation and subject to change.]

ISpDataKey::GetStringValue

ISpDataKey::GetStringValue reads the string value information from a specified registry key.

```
HRESULT GetStringValue(
    const WCHAR    *pszValueName,
    WCHAR          **ppszValue
);
```

Parameters

*pszValueName*
    Address of a null-terminated string that specifies the name of the registry key. If NULL, the default value of the registry key is read.

*ppszValue*
    Address of a pointer to a null-terminated string that receives the string value for the specified key.

Return values

| Value | Description |
|---|---|
| S_OK | Function completed successfully. |
| E_INVALIDARG | *pszValueName* is invalid or bad. |
| E_POINTER | *ppszValue* is invalid or bad. |
| SPERR_NOT_FOUND | Registry file not found. |
| FAILED(hr) | Appropriate error message. |

© 1995-2000 Microsoft Corporation All rights reserve

[This is preliminary documentation and subject to change.]

ISpDataKey::SetDWORD

ISpDataKey::SetDWORD sets the specified DWORD to the registry.

```
HRESULT SetDWORD(
    const WCHAR    *pszValueName,
    DWORD          dwValue
);
```

Parameters

*pszValueName*
    Address of a null-terminated string that contains the registry key value name.
*dwValue*
    Address of the destination data buffer that contains the registry key value information.

Return values

| Value | Description |
| --- | --- |
| S_OK | Function completed successfully. |
| E_INVALIDARG | *pszValueName* is invalid or bad. |
| FAILED(hr) | Appropriate error message. |

© 1995-2000 Microsoft Corporation. All rights reserved

[This is preliminary documentation and subject to change.]

ISpDataKey::GetDWORD

ISpDataKey::GetDWORD reads the specified DWORD from the registry.

```
HRESULT GetDWORD(
    const WCHAR    *pszValueName,
    DWORD          *pdwValue
);
```

Parameters

*pszValueName*
    [in] Address of a null-terminated string containing the name of the registry key from which to retrieve the registry key value.
*pdwValue*
    [out] Address of the destination data buffer that receives the registry key value information.

Return values

| Value | Description |
| --- | --- |
| S_OK | Function completed successfully. |
| E_INVALIDARG | *pszValueName* is invalid or bad. |

| | |
|---|---|
| E_POINTER | *pdwValue* is invalid or bad. |
| SPERR_NOT_FOUND | Registry key not found. |
| FAILED(hr) | Appropriate error message. |

© 1995-2000 Microsoft Corporation. All rights reserved.

[This is preliminary documentation and subject to change.] 

ISpDataKey::OpenKey

ISpDataKey::OpenKey opens a subkey and passes back a new object that supports ISpDataKey for the specified subkey.

```
HRESULT OpenKey(
    const WCHAR    *pszSubKeyName,
    ISpDataKey     **ppSubKey
);
```

Parameters

*pszSubKeyName*
    Address of a null-terminated string specifying the name of the key to open.
*ppSubKey*
    Address of a pointer to an ISpDataKey interface. dl

Return values

| Value | Description |
|---|---|
| S_OK | Function completed successfully. |
| E_INVALIDARG | *pszSubKeyName* is invalid or bad. |
| E_POINTER | *ppSubKey* is invalid or bad. |
| SPERR_NOT_FOUND | Registry key not found. |
| FAILED(hr) | Appropriate error message. |

© 1995-2000 Microsoft Corporation. All rights reserved.

[This is preliminary documentation and subject to change.] 

ISpDataKey::CreateKey

ISpDataKey::CreateKey creates a sub-key and returns a new object which supports ISpDataKey for the specified sub-key.

```
HRESULT CreateKey(
    const WCHAR    *pszSubKey,
```

```
ISpDataKey    **ppSubKey
);
```

Parameters

*pszSubKey*
　　Address of a null-terminated string specifying the name of the key to create.
*ppSubKey*
　　Address of a pointer to an ISpDataKey interface.

Return values

| Value | Description |
|---|---|
| S_OK | Function completed successfully. |
| E_INVALIDARG | Either *pszSubKeyName* or *ppSubKey* is invalid or bad. |
| FAILED(hr) | Appropriate error message. |

© 1995-2000 Microsoft Corporation. All rights reserv

---

[This is preliminary documentation and subject to change.]

ISpDataKey::DeleteKey

ISpDataKey::DeleteKey deletes a specified registry key and all its descendants.

The function will remove the key and all of the key's values from the registry.

```
HRESULT DeleteKey(
   const WCHAR    *pszSubKey
);
```

Parameters

*pszSubKey*
　　Address of a null-terminated string specifying the name of the key to delete.

Return values

| Value | Description |
|---|---|
| S_OK | Function completed successfully. |
| E_INVALIDARG | *pszSubKeyName* is invalid or bad. |
| FAILED(hr) | Appropriate error message. |

ISpDataKey::DeleteValue

ISpDataKey::DeleteValue deletes a named value from the specified registry key.

```
HRESULT DeleteValue(
    const WCHAR    *pszValueName
);
```

Parameters

*pszValueName*
    Address of a null-terminated string specifying the value to be deleted.

Return values

| Value | Description |
| --- | --- |
| S_OK | Function completed successfully. |
| E_INVALIDARG | *pszValueName* is invalid or bad. |
| SPERR_NOT_FOUND | Registry key not found. |
| FAILED(hr) | Appropriate error message. |

© 1995-2000 Microsoft Corporation. All rights reserved.

[This is preliminary documentation and subject to change.]

ISpDataKey::EnumKeys

ISpDataKey::EnumKeys enumerates the subkeys of the specified open registry key using the index.

```
HRESULT EnumKeys(
    ULONG     Index,
    WCHAR    **ppszKeyName
);
```

Parameters

*Index*
    [in] Index of the subkey to retrieve. This parameter should be zero for the first call and incremented for subsequent calls.
*ppszKeyName*

*ppszKeyName*
　　[out] Address of a pointer to a null-terminated string that receives the enumerated key name. This must be freed with CoMemTaskFree() when no longer required.

Return values

| Value | Description |
|---|---|
| S_OK | Function completed successfully. |
| E_INVALIDARG | *ppszKeyName* is invalid or bad. |
| SPERR_NOT_FOUND | Registry key not found. |
| E_OUTOFMEMORY | Not enough memory to allocate string. |
| FAILED(hr) | Appropriate error message. |

© 1995-2000 Microsoft Corporation. All rights reserved

[This is preliminary documentation and subject to change.] 

ISpDataKey::EnumValues

ISpDataKey::EnumValues enumerates the values of the specified open registry key.

```
HRESULT EnumValues(
    ULONG     Index,
    WCHAR     **ppszValueName
);
```

Parameters

*Index*
　　Index of the subkey to retrieve. This parameter should be zero for the first call and incremented for subsequent calls.
*ppszValueName*
　　Address of a pointer to a null-terminated string that receives the enumerated registry key values. This must be freed with CoMemTaskFree() when no longer required.

Return values

| Value | Description |
|---|---|
| S_OK | Function completed successfully. |
| E_INVALIDARG | *ppszValueName* is invalid or bad. |
| SPERR_NOT_FOUND | Registry key not found. |
| E_OUTOFMEMORY | Not enough memory to allocate string. |
| FAILED(hr) | Appropriate error message. |

© 1995-2000 Microsoft Corporation. All rights reserved

Microsoft Speech SDK

ISpRegDataKey

The ISpRegDataKey inherits from ISpDataKey.

Methods in Vtable Order

| ISpRegDataKey Methods | Description |
| --- | --- |
| SetKey | Sets the hive registry key (HKEY) to use for subsequent token operations. |

© 1995-2000 Microsoft Corporation All rights reserved

[This is preliminary documentation and subject to change.] 

ISpRegDataKey::SetKey

ISpRegDataKey::SetKey sets the hive registry key (HKEY) to use for subsequent token operations.

```
HRESULT SetKey(
    HKEY    hkey,
    BOOL    fReadOnly
);
```

Parameters

*hkey*
    [in] The registry key to use.
*fReadOnly*
    [in] Boolean flag setting the keys to read/write status. If TRUE, the registry is read only; FALSE sets it to read and write.

Return values

| Value | Description |
| --- | --- |
| S_OK | Function completed successfully. |
| SPERR_ALREADY_INITIALIZED | Interface is already initialized. |

Example

The following code snippet adds, tests and deletes a superfluous key from the speech registry.

```
HRESULT hr;

CComPtr cpSpRegDataKey;
CComPtr cpSpCreatedDataKey;
CComPtr cpSpCategory;
CComPtr cpSpDataKey;
HKEY hkey;

//create a bogus key under Voices
hr = g_Unicode.RegCreateKeyEx(HKEY_LOCAL_MACHINE,
        L"SOFTWARE\\Microsoft\\Speech\\Voices\\bogus",
        0, NULL, 0, KEY_READ | KEY_WRITE, NULL, &hkey, NULL);
//Check error hr = cpSpRegDataKey.CoCreateInstance(CLSID_SpDataKey);
//Check error hr = cpSpRegDataKey->SetKey(hkey, false);
//Check error hkey = NULL;
hr = cpSpRegDataKey->QueryInterface(&cpSpCreatedDataKey);
//Check error //delete this bogus key
hr = SpGetCategoryFromId(SPCAT_VOICES, &cpSpCategory);
//Check error hr = cpSpCategory->GetDataKey(SPDKL_LocalMachine, &cpSpDataKey);
//Check error hr = cpSpDataKey->DeleteKey(L"bogus");
//Check error
```

© 1995-2000 Microsoft Corporation. All rights r

Microsoft Speech SDK
with SAPI 5.0

[This is preliminary documentation and subject to change.]

ISpObjectTokenInit

This interface inherits from ISpObjectToken.

Methods in Vtable Order

| ISpObjectTokenInit Methods | Description |
| --- | --- |
| InitFromDataKey | Initializes a token to use a specified datakey. |

© 1995-2000 Microsoft Corporation. All rights

[This is preliminary documentation and subject to change.]

ISpObjectTokenInit::InitFromDataKey

ISpObjectTokenInit::SetObjectToken initializes a token to use a specified datakey.

Dynamic token enumerators can use this to create tokens under their token enumerator's token. Once created, this enables ISpDataKey::CreateKey to make a new data key, create a new object token, and then use InitFromDataKey.

```
HRESULT InitFromDataKey(
    const WCHAR    *pszCategoryId,
    const WCHAR    *pszTokenId,
    ISpDataKey     *pDataKey
);
```

Parameters

*pszCategoryId*
    [in] Address of an ISpDataKey interface that specifies the system registry key from which to create the token.
*pszTokenId*
    [in] The null-terminated string name of the TokenId used as the default.
*pDataKey*
    [in] Address of an ISpDataKey interface that specifies the system registry key from which to create the token.

Return values

| Value | Description |
| --- | --- |
| S_OK | Function completed successfully. |
| E_POINTER | At least one of the parameters is invalid or bad. |
| SPERR_ALREADY_INITIALIZED | Token is already initialized. |
| SPERR_TOKEN_DELETED | Key has been deleted. |
| E_OUTOFMEMORY | Exceeded available memory. |

© 1995-2000 Microsoft Corporation. All rights reserved.

Microsoft Speech SDK
with SAPI 5.0

[This is preliminary documentation and subject to change.]

ISpObjectTokenCategory

The ISpObjectToken interface sets object token entries into the registry.

In general, attributes are null-terminated strings comprising a series of key:definition relationships. For example, a token may be defined as:

"vendor=microsoft;language=409;emptyflag=;someflag;..."

In this instance.

- "vendor=microsoft" means a string exists under TokenID\attributes with name *vendor* and value "microsoft";
- "emptyflag=" means a string exists under TokenID\attributes with name *emptyflag* and value "";
- "someflag" means a string exists under TokenID\attributes with name *someflag* and any value.

ISpObjectTokenCategory inherits from ISpDataKey.

Methods in Vtable Order

| ISpObjectToken Methods | Description |
| --- | --- |
| SetId | Sets the CategoryId |
| GetId | Retrieves the CategoryId. |
| GetDataKey | Gets the data key associated with a specific location. |
| EnumTokens | Enumerates the tokens for the category. |
| SetDefaultTokenId | Sets a specific TokenId as the default for the category. |
| GetDefaultTokenId | Retrieves the default TokenId for the category. |

© 1995-2000 Microsoft Corporation All rights reserved.

[This is preliminary documentation and subject to change.] 

ISpObjectTokenCategory::SetId

ISpObjectTokenCategory::SetId sets the CategoryId.

This may be called only once.

```
HRESULT SetId(
    const WCHAR    *pszCategoryId,
    BOOL           fCreateIfNotExist
);
```

Parameters

*pszCategoryId*
    [in] The null-terminated string name of category to set.
*fCreateIfNotExist*
    [in] An optional parameter allowing the object to be created if not currently existing. The default is FALSE unless otherwise specified.

Return values

| Value | Description |
| --- | --- |
| S_OK | Function completed successfully. |
| SPERR_ALREADY_INITIALIZED | Category interface is already initialized. |

| | |
|---|---|
| E_INVALIDARG | *pszCategoryId* is invalid or bad. |
| FAILED(hr) | Appropriate error message. |

Notes

Category IDs be be in the following form.

"HKEY_LOCAL_MACHINE\SOFTWARE\Microsoft\Windows\CurrentVersion\

Speech\Recognizers"

The only acceptable HKEYs are:

HKEY_CLASSES_ROOT

HKEY_CURRENT_USER

HKEY_LOCAL_MACHINE

HKEY_CURRENT_CONFIG

Examples

The following snippet creates an new category and sets the ID. The code also shows the required steps for removing a category.

```
HRESULT hr;

CComPtr cpSpCategory;
CComPtr cpSpRegDataKey;
HKEY hkey;

hr = cpSpCategory.CoCreateInstance(CLSID_SpObjectTokenCategory);
//Check return code hr = cpSpCategory->SetId(L"HKEY_LOCAL_MACHINE\\SOFTWARE\\Microsoft\\S
//Check return code //delete this bogus category
hr = g_Unicode.RegOpenKeyEx(HKEY_LOCAL_MACHINE,
        L"SOFTWARE\\Microsoft\\Speech",
        0, KEY_READ | KEY_WRITE, &hkey);
//Check return code hr = cpSpRegDataKey.CoCreateInstance(CLSID_SpDataKey);
//Check return code hr = cpSpRegDataKey->SetKey(hkey, false);
//Check return code hr = cpSpRegDataKey->DeleteKey(L"bogus");
//Check return code
```

ISpObjectTokenCategory::GetId

ISpObjectTokenCategory::GetId retrieves the category ID.

```
HRESULT GetId(
    WCHAR    **ppszCoMemCategoryId
);
```

Parameters

*ppszCoMemCategoryId*
   [in] The null-terminated string name of the current category. *ppszCoMemCategoryId* must be freed when no longer required.

Return values

| Value | Description |
| --- | --- |
| S_OK | Function completed successfully. |
| SPERR_UNINITIALIZED | Category interface is not initialized. |
| E_POINTER | *ppszCoMemCategoryId* is invalid or bad. |
| FAILED(hr) | Appropriate error message. |

Example

The following snippet retrieves CategoryId for SPCAT_VOICES.

```
HRESULT hr;

CComPtr cpSpCategory;
CSpCoTaskMemPtr cpwszOldID;

hr = SpGetCategoryFromId(SPCAT_VOICES, &cpSpCategory);
//Check return code hr = cpSpCategory->GetId(&cpwszOldID);
//Check return code
```

© 1995-2000 Microsoft Corporation All rights res

---

[This is preliminary documentation and subject to change.]

ISpObjectTokenCategory::GetDataKey

ISpObjectTokenCategory::GetDataKey gets the data key associated with a specific location.

```
HRESULT GetDataKey(
    SPDATAKEYLOCATION    spdkl,
    ISpDataKey           **ppDataKey
);
```

Parameters

*spdkl*
    [in] The registry's top-level node to be searched.
*ppDataKey*
    [out] The data key interface associated with the location *spdkl*.

Return values

| Value | Description |
| --- | --- |
| S_OK | Function completed successfully. |
| SPERR_UNINITIALIZED | Data key interface is not initialized. |
| E_POINTER | *ppDataKey* is invalid or bad. |
| FAILED(hr) | Appropriate error message. |

Example

The following snippet retrieves the data key associated with the local machine registry for SPCAT_VOICES.

```
HRESULT hr;

CComPtr cpSpCategory;
CComPtr cpSpDataKey;

hr = SpGetCategoryFromId(SPCAT_VOICES, &cpSpCategory);
//Check return code hr = cpSpCategory->GetDataKey(SPDKL_LocalMachine, &cpSpDataKey);
//Check return code
```

© 1995-2000 Microsoft Corporation. All rights reserved

---

[This is preliminary documentation and subject to change.]

ISpObjectTokenCategory::EnumTokens

ISpObjectTokenCategory::EnumTokens enumerates the tokens for the category by attempting to match specified requirements.

```
HRESULT EnumTokens(
    const WCHAR         *pszReqAttribs,
    const WCHAR         *pszOptAttribs,
    IEnumSpObjectTokens **ppEnum
);
```

Parameters

*pszReqAttribs*
  [in] The string of required attributes for the token.
*pszOptAttribs*
  [in] The string of optional attributes for the token. The order in which the tokens are listed in *ppEnum* is based on the order they match *pszOptAttribs*.
*ppEnum*
  [out] The enumerated list of tokens found.

Return values

| Value | Description |
|---|---|
| S_OK | Function completed successfully. |
| SPERR_UNINITIALIZED | Data key interface is not initialized. |
| E_POINTER | At least one of the parameters is invalid or bad. |
| FAILED(hr) | Appropriate error message. |

Example

The following code snippet demonstrates getting a complete enumerated token list. Since no specific requirement is given (*pszReqAttribs* and *pszOptAttribs* are NULL), all values are returned for SPCAT_VOICES.

```
HRESULT hr;

CComPtr cpSpCategory;
CComPtr cpSpEnumTokens;

hr = SpGetCategoryFromId(SPCAT_VOICES, &cpSpCategory);
//Check return code hr = cpSpCategory->EnumTokens(NULL, NULL, &cpSpEnumTokens);
//Check return code
```

© 1995-2000 Microsoft Corporation. All rights reserved.

---

[This is preliminary documentation and subject to change.] 

ISpObjectTokenCategory::SetDefaultTokenI

ISpObjectTokenCategory::SetDefaultTokenI

ISpObjectTokenCategory::SetDefaultTokenId sets a specific TokenId as the default for the category.

The defaults are stored either directly in the category by setting the DefaultTokenID value in the category data key, or indirectly by the DefaultTokenIDLocation.

```
HRESULT SetDefaultTokenId(
    const WCHAR    *pszTokenId
);
```

Parameters

*pszTokenId*
    [in] The null-terminated string name of the TokenId to be used as the default.

Return values

| Value | Description |
| --- | --- |
| S_OK | Function completed successfully. |
| SPERR_UNINITIALIZED | Data key interface is not initialized. |
| E_INVALIDARG | *pszTokenId* is invalid or bad. |
| FAILED(hr) | Appropriate error message. |

© 1995-2000 Microsoft Corporation All rights reserved.

[This is preliminary documentation and subject to change.] 

ISpObjectTokenCategory::GetDefaultToken

ISpObjectTokenCategory::GetDefaultTokenId retrieves the default TokenId for the category.

```
HRESULT GetDefaultTokenId(
    const WCHAR    **pszTokenId
);
```

Parameters

*pszTokenId*
    [in] The null-terminated string name of the TokenId used as the default.

Return values

| Value | Description |
| --- | --- |
| S_OK | Function completed successfully. |
| SPERR_UNINITIALIZED | Data key interface is not initialized. |
| E_POINTER | *pszTokenId* is invalid or bad. |
| FAILED(hr) | Appropriate error message. |

© 1995-2000 Microsoft Corporation All rights reserved

Microsoft Speech SDK
with SAPI 5.0

[This is preliminary documentation and subject to change.]

ISpObjectToken

ISpObjectToken inherits from ISpDataKey.

Methods in Vtable Order

| ISpObjectToken Methods | Description |
| --- | --- |
| SetID | Sets the category ID for object token. |
| GetID | Retrieves the object identifier for an object token. |
| GetCategory | Retrieves the category if one is available for the specified token. |
| CreateInstance | Creates an instance of an object. |
| GetStorageFileName | Retrieves the object token file name from the registry. |
| RemoveStorageFileName | Removes the object token file name from the registry. |
| Remove | Removes an object token. |
| IsUISupported | Determines if the UI associated with the object is supported. |
| DisplayUI | Displays the UI associated with the object. |

© 1995-2000 Microsoft Corporation All rights reserve

[This is preliminary documentation and subject to change.]

ISpObjectToken::SetId

ISpObjectToken::SetId sets the CategoryId for object token.

This may be called only once.

```
HRESULT SetId(
    const WCHAR    *pszCategoryId,
    const WCHAR    *pszTokenId,
    BOOL           fCreateIfNotExist
);
```

Parameters

*pszCategoryId*
 [in] The null-terminated string name of category to set.
*pszTokenId*
 [in] The null-terminated string name of token to set.
*fCreateIfNotExist*
 [in] A Boolean indicating the object is to be created if not currently existing. TRUE allows the creation; FALSE does not.

Return values

| Value | Description |
| --- | --- |
| S_OK | Function completed successfully. |
| SPERR_ALREADY_INITIALIZED | Category interface is already initialized. |
| SPERR_TOKEN_DELETED | Key has been deleted. |
| E_INVALIDARG | Either *pszCategoryId* and/or *pszTokenId* is invalid or bad. |
| FAILED(hr) | Appropriate error message. |

Notes

CategoryIds appear in the fully qualified form as:

"HKEY_LOCAL_MACHINE\SOFTWARE\Microsoft\Windows\CurrentVersion\

Speech\Recognizers"

The only acceptable HKEYs are:

HKEY_CLASSES_ROOT,

HKEY_CURRENT_USER,

HKEY_LOCAL_MACHINE,

HKEY_CURRENT_CONFIG

ISpObjectToken::GetID

ISpObjectToken::GetID retrieves the object identifier for an object token. This ID can be used later to recreate a token instances.

```
HRESULT GetID(
    WCHAR    **ppszCoMemTokenId
);
```

Parameters

*ppszCoMemTokenId*
    Address of a pointer to a null-terminated string that receives the identifier for the token object. The caller must call CoTaskMemFree() to free the string pointer.

Return values

| Value | Description |
| --- | --- |
| S_OK | Function completed successfully. |
| E_POINTER | *ppszCoMemTokenId* is invalid or bad. |
| E_OUTOFMEMORY | Exceeded available memory. |
| SPERR_UNINITIALIZED | TokenId interface is not initialized. |
| FAILED(hr) | Appropriate error message. |

© 1995-2000 Microsoft Corporation. All rights reserved

[This is preliminary documentation and subject to change.]

ISpObjectToken::GetCategory

ISpObjectToken::GetCategory retrieves the category for a specified token if one is available.

```
HRESULT GetCategory(
    ISpObjectTokenCategory    **ppTokenCategory
);
```

Parameters

*ppTokenCategory*
    [out] The category interface for the token. *ppTokenCategory* must be freed when no longer required.

Return values

| Value | Description |
| --- | --- |
| S_OK | Function completed successfully. |
| E_POINTER | *ppTokenCategory* is invalid or bad. |
| SPERR_UNINITIALIZED | Token does not have a category. |
| FAILED(hr) | Appropriate error message. |

© 1995-2000 Microsoft Corporation All rights reserved.

[This is preliminary documentation and subject to change.]

ISpObjectToken::CreateInstance

ISpObjectToken::CreateInstance creates an instance of an object.

```
HRESULT CreateInstance(
    IUnknown    *pUnkOuter,
    DWORD       dwClsContext,
    REFIID      riid,
    void        **ppvObject
);
```

Parameters

*pUnkOuter*
  [in] If the object is being created as part of an aggregate, this is a pointer to the controlling IUnknown interface of the aggregate. Otherwise, *pUnkOuter* must be NULL.

*dwClsContext*
  [in] Context in which the code that manages the newly created object will run. It should be one of the following values:
    CLSCTX_INPROC_SERVER
    CLSCTX_INPROC_HANDLER
    CLSCTX_LOCAL_SERVER
    CLSCTX_REMOTE_SERVER

*riid*
  [in] Reference to the identifier of the interface used to communicate with the newly created object. If *pUnkOuter* is NULL, this parameter is frequently the IID of the initializing interface; if *pUnkOuter* is non-NULL, *riid* must be IID_IUnknown.

*ppvObject*
  [out, iid_is(riid)] Address of pointer variable that receives the interface pointer requested in *riid*. Upon successful return, *ppvObject* contains the requested interface pointer. If the object does not support the interface specified in *riid*, the implementation must set *ppvObject* to NULL.

Return values

| Value | Description |
| --- | --- |
| S_OK | Function completed successfully. |

| | |
|---|---|
| E_POINTER | *ppvObject* is invalid or bad. |
| E_INVALIDARG | *pUnkOuter* is invalid or bad. |
| SPERR_UNINITIALIZED | Either the data key or the token delegator interface is not initialized. |
| SPERR_TOKEN_DELETED | Key has been deleted. |
| FAILED(hr) | Appropriate error message. |

Return values

The following code snippet creates an InProc server instance.

```
HRESULT hr;

CComPtr cpSpObjectToken;
CComPtr cpSpObjectWithToken;

hr = SpGetDefaultTokenFromCategoryId(SPCAT_VOICES, &cpSpObjectToken);
//Check return value hr = cpSpObjectToken->CreateInstance(
            NULL, CLSCTX_INPROC_SERVER, IID_ISpObjectWithToken,
            (void **)&cpSpObjectWithToken
        );
//Check return value
```

© 1995-2000 Microsoft Corporation. All rights reserved

[This is preliminary documentation and subject to change.] 

ISpObjectToken::GetStorageFileName

ISpObjectToken::GetStorageFileName retrieves the object token file name from the registry.

```
HRESULT GetStorageFileName(
    REFCLSID      clsidCaller,
    const WCHAR   *pszValueName,
    int           nFolder,
    WCHAR         **ppszFilePath
);
```

Parameters

*clsidCaller*
> [in] Globally unique identifier (GUID) of the calling object.

*pszValueName*
> [in] Address of a null-terminated string containing the registry key name.

*nFolder*
> [in] Value specifying the folder from which to retrieve the location.

*ppszFilePath*
> [out] Address of a pointer to the null-terminated string that receives the file path information. Must be freed when no longer required.

Return values

| Value | Description |
|---|---|
| S_OK | Function completed successfully. |
| E_POINTER | *ppszFilePath* is invalid or bad. |
| E_OUTOFMEMORY | Exceeded available memory. |
| S_FALSE | A new file was created. |
| E_INVALIDARG | *pszValueName* is invalid or bad. |
| SPERR_UNINITIALIZED | Either the data key or the token delegate interface is uninitialized. |
| SPERR_TOKEN_DELETED | Key has been deleted. |
| FAILED(hr) | Appropriate error message. |

Example

The following code snippet creates and removes a token object for a test file.

```
HRESULT hr;
GUID guid0;

CComPtr cpSpObjectToken;
CSpCoTaskMemPtr cpFileName;

hr = SpGetDefaultTokenFromCategoryId(SPCAT_VOICES, &cpSpObjectToken);
//Check return value ZeroStruct(guid0);
hr = cpSpObjectToken->GetStorageFileName(
            guid0, L"TestFile", CSIDL_FLAG_CREATE, &cpFileName
     );
//Check return value hr = cpSpObjectToken->Remove(&guid0);
//Check return value
```

© 1995-2000 Microsoft Corporation All rights reserved

---

[This is preliminary documentation and subject to change.] 

ISpObjectToken::RemoveStorageFileName

ISpObjectToken::RemoveStorageFileName removes the object token file name from the registry.

```
HRESULT RemoveStorageFileName(
    REFCLSID       clsidCaller,
    const WCHAR    *pszValueName,
    BOOL           fDeleteFile
);
```

Parameters

*clsidCaller*
    [in] Globally unique identifier (GUID) of the calling object.
*pszValueName*
    [in] Address of a null-terminated string containing the registry key name.
*fDeleteFile*
    [in] Value specifying if the file should be deleted. TRUE deletes the file afterwards; FALSE does not.

Return values

| Value | Description |
| --- | --- |
| S_OK | Function completed successfully. |
| E_INVALIDARG | *pszValueName* is invalid or bad. |
| SPERR_UNINITIALIZED | Either the data key or token delegate interface is not initialized. |
| SPERR_TOKEN_DELETED | Key has been deleted. |
| FAILED(hr) | Appropriate error message. |

Example

The following code snippet creates a test file, removes it and manually deletes it. It may also have been deleted automatically by setting *fDeleteFile* to TRUE.

```
HRESULT hr;
GUID guid0;

CComPtr cpSpObjectToken;
CComPtr cpSpObjectWithToken;
CSpCoTaskMemPtr cpFileName;

hr = SpGetDefaultTokenFromCategoryId(SPCAT_VOICES, &cpSpObjectToken);
//Check return value ZeroStruct(guid0);
// Create subkeys and value item to be deleted
hr = cpSpObjectToken->GetStorageFileName(
            guid0, L"test file", CSIDL_FLAG_CREATE, &cpFileName
            );

if (SUCCEEDED(hr))
{
        hr = cpSpObjectToken->RemoveStorageFileName(guid0, L"test fil
        //Check return value cpFileName.Clear();
}
```

© 1995-2000 Microsoft Corporation All rights reserved

[This is preliminary documentation and subject to change.]

ISpObjectToken::Remove

ISpObjectToken::Remove removes a token object.

```
HRESULT Remove(
    const GUID    *pclsidCaller
);
```

Parameters

*pclsidCaller*
    [in] Address of the identifier associated with the object token to remove. If *pclsidCaller* is NULL, then the entire token is removed; otherwise, only the specified section is removed.

Return values

| Value | Description |
| --- | --- |
| S_OK | Function completed successfully. |
| E_POINTER | *pclsidCaller* is invalid or bad. |
| SPERR_UNINITIALIZED | The token ID interface is uninitialized. |
| SPERR_TOKEN_DELETED | Key has been deleted. |
| FAILED(hr) | Appropriate error message. |

Example

The following code snippet creates and removes a token object for a test file.

```
HRESULT hr;
GUID guid0;

CComPtr cpSpObjectToken;
CSpCoTaskMemPtr cpFileName;

hr = SpGetDefaultTokenFromCategoryId(SPCAT_VOICES, &cpSpObjectToken);
//Check return value ZeroStruct(guid0);
hr = cpSpObjectToken->GetStorageFileName(
                guid0, L"TestFile", CSIDL_FLAG_CREATE, &cpFileName
        );
//Check return value hr = cpSpObjectToken->Remove(&guid0);
//Check return value
```

ISpObjectToken::IsUISupported

ISpObjectToken::IsUISupported determines if the user interface (UI) associated with the object is supported.

```
[local] HRESULT IsUISupported(
    REFGUID    guidTypeOfUI,
    void       *pvExtraData,
    ULONG      cbExtraData,
    IUnknown   *punkObject,
    BOOL       *pfSupported
);
```

Parameters

*guidTypeOfUI*
    [in] Globally unique identifier (GUID) of the object interface.
*pvExtraData*
    [in] Pointer to additional information needed for the object.
*cbExtraData*
    [in] Size, in bytes, of the *ExtraData*.
*punkObject*
    [in] Address of the IUnknown interface pointer.
*pfSupported*
    [out] Address of a variable that receives the value indicating support for the interface. This value is set to TRUE when this interface is supported, and FALSE when it is not.

Return values

| Value | Description |
| --- | --- |
| S_OK | Function completed successfully. |
| E_INVALIDARG | One of the parameters is invalid or bad. |
| SPERR_UNINITIALIZED | Either the data key or token delegate interface is not initialized. |
| SPERR_TOKEN_DELETED | Key has been deleted. |
| FAILED(hr) | Appropriate error message. |

© 1995-2000 Microsoft Corporation. All rights rese

---

[This is preliminary documentation and subject to change.]

ISpObjectToken::DisplayUI

ISpObjectToken::DisplayUI displays the user interface (UI) associated with the object.

```
[local] HRESULT DisplayUI(
    HWND            hwndParent,
    const WCHAR     *pszTitle,
    REFGUID         guidTypeOfUI,
    void            *pvExtraData,
    ULONG           cbExtraData,
    IUnknown        *punkObject
);
```

Parameters

*hwndParent*
  [in] Specifies the handle of the parent window.
*pszTitle*
  [in] Address of a null-terminated string containing the window title.
*guidTypeOfUI*
  [in] Globally unique identifier (GUID) of the object.
*pvExtraData*
  [in] Pointer to additional information needed for the object.
*cbExtraData*
  [in] Size, in bytes, of the *ExtraData*.
*punkObject*
  [in] Address of the IUnknown interface pointer.

Return values

| Value | Description |
| --- | --- |
| S_OK | Function completed successfully. |
| E_INVALIDARG | One of the parameters is invalid or bad. |
| SPERR_UNINITIALIZED | Either the data key or token delegate interface is not initialized. |
| SPERR_TOKEN_DELETED | Key has been deleted. |
| FAILED(hr) | Appropriate error message. |

© 1995-2000 Microsoft Corporation All rights re:

Microsoft Speech SDK
with SAPI 5.0

[This is preliminary documentation and subject to change.]

IEnumSpObjectTokens

The IEnumSpObjectTokens interface is used to enumerate speech object tokens.

When to Implement

Implement this interface when a caller wants to be able to enumerate the speech token identifiers contained in a speech object.

When to Use

Call methods of the IEnumSpObjectTokens interface to enumerate the speech object tokens.

Methods in Vtable Order

| IEnumSpObjectTokens Methods | Description |
| --- | --- |
| Next | Retrieves the next object token in the enumeration sequence. |
| Skip | Skips a specified number of object tokens in the enumeration sequence. |
| Reset | Resets the enumeration sequence to the beginning. |
| Clone | Creates a new enumerator object with the same items. |
| Item | Locates a specific token in the enumeration. |
| GetCount | Retrieves the number of object tokens contained in the enumeration sequence. |

© 1995-2000 Microsoft Corporation. All rights reserved

[This is preliminary documentation and subject to change.]

IEnumSpObjectTokens::Next

IEnumSpObjectTokens::Next retrieves the next object token in the enumeration sequence.

If there are fewer than the requested number of elements left in the sequence, the remaining elements are retrieved.

```
HRESULT Next(
    ULONG              celt,
    ISpObjectToken     **pelt,
    ULONG              *pceltFetched
);
```

Parameters

*celt*
    [in] The number of object tokens to retrieve.

*pelt*
    [out] Address of an array that receives ISpObjectToken pointers. If an error value is returned, no entries in the array are valid.

*pceltFetched*
    [out] Address of a variable that receives the number of ISpObjectToken pointers actually copied to the array. This parameter cannot be NULL if *celt* is greater than one. If this parameter is NULL, *celt* must be one.

Return values

| Value | Description |
| --- | --- |
| S_OK | Function completed successfully. |

| | |
|---|---|
| E_POINTER | *pelt* is bad or invalid. |
| E_INVALIDARG | *pceltFetched* is bad or invalid or the number of objects is invalid. |
| SPERR_UNINITIALIZED | Attribute parser interface is not initialized. |
| FAILED (hr) | Appropriate error message. |

© 1995-2000 Microsoft Corporation. All rights reserve

[This is preliminary documentation and subject to change.]

IEnumSpObjectTokens::Skip

IEnumSpObjectTokens::Skip skips a specified number of object tokens in the enumeration sequence.

```
HRESULT Skip(
    ULONG    celt
);
```

Parameters

*celt*
    [in] Number of object tokens to skip in the enumeration sequence.

Return values

| Value | Description |
|---|---|
| S_OK | Number of elements skipped was *celt* |
| S_FALSE | Number of elements skipped was less than *celt* |
| SPERR_UNINITIALIZED | Attribute parser interface is not initialized. |
| FAILED (hr) | Appropriate error message. |

© 1995-2000 Microsoft Corporation. All rights reserv

[This is preliminary documentation and subject to change.]

IEnumSpObjectTokens::Reset

IEnumSpObjectTokens::Reset resets the enumeration sequence to the beginning.

```
HRESULT Reset ( void );
```

Parameters

None

Return values

Return values

| Value | Description |
| --- | --- |
| S_OK | Method completed successfully. |
| SPERR_UNINITIALIZED | Attribute parser interface is not initialized. |

© 1995-2000 Microsoft Corporation All rights reserved.

---

[This is preliminary documentation and subject to change.] 

IEnumSpObjectTokens::Clone

IEnumSpObjectTokens::Clone creates a new enumerator object with the same items.

Returns a new enumerator object with the same items but an independent index. The items in the clone are not guaranteed to be in the same order as the original enumerator.

```
HRESULT Clone(
    IEnumSpObjectTokens    **ppEnum
);
```

Parameters

*ppEnum*
    [out] Address of the IEnumSpObjectTokens pointer variable that receives the interface pointer to the cloned enumerator. Using Clone, it is possible to record a particular point in the enumeration sequence and then return to that point at a later time. The enumerator returned is of the same interface type as the one being cloned.

Return values

| Value | Description |
| --- | --- |
| S_OK | Function completed successfully. |
| SPERR_UNINITIALIZED | Attribute parser interface is not initialized. |
| FAILED (hr) | Appropriate error message. |

© 1995-2000 Microsoft Corporation All rights reserved

---

[This is preliminary documentation and subject to change.] 

IEnumSpObjectTokens::Item

IEnumSpObjectTokens::Item locates a specific token in the enumeration.

```
HRESULT Item(
    ULONG               Index,
    ISpObjectToken     **ppToken
);
```

);

Parameters

*Index*
 [in] Value indicating which token in the enumeration sequence to locate.

*ppToken*
 [out] Address of an ISpObjectToken interface pointer.

Return values

| Value | Description |
| --- | --- |
| S_OK | Function completed successfully. |
| SPERR_NO_MORE_ITEMS | *Index* is greater than the amount of items available. |
| E_POINTER | *ppToken* is bad or invalid. |
| SPERR_UNINITIALIZED | Attribute parser interface is not initialized. |
| FAILED (hr) | Appropriate error message. |

© 1995-2000 Microsoft Corporation All rights reserv

---

[This is preliminary documentation and subject to change.] 

IEnumSpObjectTokens::GetCount

IEnumSpObjectTokens::GetCount retrieves the number of object tokens contained in the enumeration sequence.

```
HRESULT GetCount(
    ULONG    *pulCount
);
```

Parameters

*pulCount*
 [out] The number of object token items contained in the enumeration sequence.

Return values

| Value | Description |
| --- | --- |
| S_OK | Function completed successfully. |
| E_POINTER | *pulCount* is bad or invalid. |
| SPERR_UNINITIALIZED | Attribute parser interface is not initialized. |
| FAILED (hr) | Appropriate error message. |

ISpObjectWithToken

Methods in Vtable Order

| ISpObjectWithToken Methods | Description |
|---|---|
| SetObjectToken | Creates an object token. |
| GetObjectToken | Retrieves an object token. |

© 1995-2000 Microsoft Corporation. All righ

[This is preliminary documentation and subject to change.]

ISpObjectWithToken::SetObjectToken

ISpObjectWithToken::SetObjectToken creates an object token.

```
HRESULT SetObjectToken(
    ISpObjectToken   *pToken
);
```

Parameters

*pToken*
 [in] Address of the ISpObjectToken interface creating this object token.

Return values

| Value | Description |
|---|---|
| S_OK | Function completed successfully. |
| E_POINTER | *pToken* is invalid or bad. |
| E_OUTOFMEMORY | Exceeded available memory. |
| FAILED(hr) | Appropriate error message. |

© 1995-2000 Microsoft Corporation. All rig

[This is preliminary documentation and subject to change.]

ISpObjectWithToken::GetObjectToken

ISpObjectWithToken::GetObjectToken retrieves an object token.

```
HRESULT GetObjectToken(
    ISpObjectToken    **ppToken
);
```

Parameters

*ppToken*
    [out] Address of an ISpObjectToken interface that receives the object token.

Return values

| Value | Description |
| --- | --- |
| S_OK | Function completed successfully. |
| E_POINTER | *ppToken* is invalid or bad. |
| E_OUTOFMEMORY | Exceeded available memory. |
| FAILED(hr) | Appropriate error message. |

© 1995-2000 Microsoft Corporation. All rights reserved

Microsoft Speech SDK
with SAPI 5.0

[This is preliminary documentation and subject to change.]

ISpResourceManager

The ISpResourceManager interface provides access to the shared resources between different speech applications.

When to Use

Call methods of the ISpResourceManager interface to access the functionality of the shared resources.

Note: This interface inherits from IServiceProvider.

Methods in Vtable Order

| ISpResourceManager Methods | Description |
| --- | --- |
| SetObject | Adds a service object to the current service list. |
| GetObject | Retrieves a service object from the current service list. |

ISpResourceManager::SetObject

ISpResourceManager::SetObject adds a service object to the current service list.

```
HRESULT SetObject(
    REFGUID    guidServiceId,
    IUnknown   *pUnkObject
);
```

Parameters

*guidServiceId*
    [in] The unique identifier of the service.
*pUnkObject*
    [in] Address of the IUnknown interface of the object that is setting the service.

Return values

| Value | Description |
|---|---|
| S_OK | Function completed successfully. |
| E_INVALIDARG | *pUnkObject* is bad or invalid. |
| E_OUTOFMEMORY | Exceeded available memory. |
| FAILED(hr) | Appropriate error message. |

© 1995-2000 Microsoft Corporation All rights r

[This is preliminary documentation and subject to change.] 

ISpResourceManager::GetObject

ISpResourceManager::GetObject retrieves a service object from the current service list.

If the HRESULT is not S_OK, then the caller must delete this object manually.

```
HRESULT GetObject(
    REFGUID    guidServiceId,
    REFCLSID   ObjectCLSID,
    REFIID     ObjectIID,
    BOOL       fReleaseWhenNoRefs,
    void       **ppObject
);
```

Parameters

*guidServiceId*
 [in] The unique identifier of the service.
*ObjectCLSID*
 [in] Class identifier of the object.
*ObjectIID*
 [in] Interface identifier of the object.
*fReleaseWhenNoRefs*
 [in] Boolean indicating whether or not the object is an aggregate. If TRUE, the object is not a aggregate and may be released when no longer needed. FALSE indicates that the object is an aggregate and must be manually freed when no longer required.
*ppObject*
 [out] Address of a pointer that receives the interface pointer of the service.

Return values

| Value | Description |
| --- | --- |
| S_OK | Function completed successfully. |
| E_INVALIDARG | One or more arguments are invalid. |
| E_POINTER | *ppObject* is bad or invalid. |
| REGDB_E_CLASSNOTREG | Class is not registered. |
| E_OUTOFMEMORY | Exceeded available memory. |
| FAILED(hr) | Appropriate error message. |

© 1995-2000 Microsoft Corporation All rights reserv

Microsoft Speech SDK
with SAPI 5.0

[This is preliminary documentation and subject to change.]

ISpTask

The ISpTask interface allows a single thread to process several events. This permits smaller tasks to run without interfering of more important processes. After the task object is notified, ISpTask::Execute may be called to implement the effects.

When to Use

ISpTask is most useful with multiprocessor computers. Its allows an efficient allocation of tasks based on the current availability of processor time.

Note:

This is not a COM interface.

Methods in Vtable Order

| ISpTask Methods | Description |
| --- | --- |

ISpTask::Execute

ISpTask::Execute implements the processing of a thread. This will be application specific.

```
virtual HRESULT STDMETHODCALLTYPE Execute(
    void                   *pvTaskData,
    volatile const BOOL    *pfContinueProcessing
) = 0;
```

Parameters

*pvTaskData*
    [in] The specific information for the application.
*pfContinueProcessing*
    [in] Boolean indicating if the process should continue. TRUE continues the process; otherwise FALSE.

Return values

The return value is application specific.

© 1995-2000 Microsoft Corporation All rights re

Microsoft Speech SDK
with SAPI 5.0

[This is preliminary documentation and subject to change.]

Speech Recognition Interfaces

The following section covers:

- ISpRecoContext
- ISpRecoGrammar
- ISpRecoResult
- ISpRecognizer
- ISpPhrase
- ISpPhraseAlt
- ISpProperties © 1995-2000 Microsoft Corporation All rights r Microsoft Speech SDK

ISpRecoContext

This interface inherits from ISpEventSource.

Methods in Vtable Order

| ISpRecoContext Methods | Description |
| --- | --- |
| GetRecognizer | Returns a reference to the current engine object. |
| CreateGrammar | Creates a SpGrammar object. |
| GetStatus | Retrieves current context state information. |
| GetMaxAlternates | Retrieves the maximum number of alternates that will be generated for command and control grammars. |
| SetMaxAlternates | Sets the maximum number of alternates returned for command and control grammars. |
| SetAudioOptions | Sets the audio options for results from this context. |
| GetAudioOptions | Retrieves the audio options for the context. |
| DeserializeResult | Creates a new result object from a serialized result. |
| Bookmark | Sets a bookmark within the current recognition stream. |
| SetAdaptationData | Passes a block of text to the SR engine which it can use to adapt the active language models. |
| Pause | Pauses the engine object to synchronize with the SR engine. |
| Resume | Resumes the SR engine from the paused state and restarts the recognition process. |
| SetVoice | Sets the associated ISpVoice to this context. |
| GetVoice | Retrieves a reference to the associated ISpVoice object. |
| SetVoicePurgeEvent | Sets the SR engine events that stop audio output, and purges the current speaking queue. |
| GetVoicePurgeEvent | Retrieves the set of SR engine events that stop audio output, and purges the current speaking queue. |

© 1995-2000 Microsoft Corporation All rights reserved

[This is preliminary documentation and subject to change.] 

ISpRecoContext::GetRecognizer

ISpRecoContext::GetRecognizer returns a reference to the current recognition instance object associated with this context.

```
HRESULT GetRecognizer(
   ISpRecognizer   **ppRecognizer
);
```

Parameters

*ppRecoInstance*
  [out] Address of a pointer that receives the ppRecognizer interface.

Return values

| Value | Description |
|---|---|
| S_OK | Function completed successfully. |
| E_POINTER | Invalid pointer. |
| FAILED (hr) | Appropriate error message. |

© 1995-2000 Microsoft Corporation. All rights reserved

---

[This is preliminary documentation and subject to change.]

ISpRecoContext::CreateGrammar

ISpRecoContext::CreateGrammar creates a SpRecoGrammar object.

```
HRESULT CreateGrammar(
   DWORD_PTR       *pdwpGrammarId,
   ISpRecoGrammar  **ppGrammar
);
```

Parameters

*pdwpGrammarId*
  [in] Specifies the grammar identifier. This identifier is associated with all result objects from the grammar. The identifier is used by the application and is not required.
*ppGrammar*
  [out] Address of a pointer which receives the ISpRecoGrammar object.

Return values

| Value | Description |
|---|---|
| S_OK | Function completed successfully. |
| E_POINTER | *ppGrammar* is invalid. |
| FAILED(hr) | Appropriate error message. |

ISpRecoContext::GetStatus

ISpRecoContext::GetStatus retrieves current state information associated with a context.

```
HRESULT GetStatus(
    SPRECOCONTEXTSTATUS   *pStatus
);
```

Parameters

*pStatus*
 [out] Address of the SPRECOCONTEXTSTATUS structure that receives the context state information.

Return values

| Value | Description |
| --- | --- |
| S_OK | Function completed successfully. |
| E_POINTER | *pStatus* is invalid or bad. |
| FAILED (hr) | Appropriate error message. |

© 1995-2000 Microsoft Corporation All rights reserved

[This is preliminary documentation and subject to change.] 

ISpRecoContext::GetMaxAlternates

ISpRecoContext::GetMaxAlternates retrieves the maximum number of alternates that the SR engine will return for command and control grammars associated with this context. Note that this method has no effect on dictation grammars.

```
HRESULT GetMaxAlternates(
    ULONG   *pcMaxAlternates
);
```

Parameters

*pcMaxAlternates*
 [out] The maximum number of alternates.

Return values

| Value | Description |
|---|---|
| S_OK | Function completed successfully. |
| E_POINTER | *pcMaxAlternates* is invalid or bad. |
| FAILED(hr) | Appropriate error message. |

© 1995-2000 Microsoft Corporation All rights reserved

[This is preliminary documentation and subject to change.]

ISpRecoContext::SetMaxAlternates

ISpRecoContext::SetMaxAlternates sets the maximum number of alternates the SR engine returns for command and control grammars associated with this recognition context. Note that this method has no effect on dictation grammars.

```
HRESULT SetMaxAlternates(
    DWORD    cMaxAlternates
);
```

Parameters

*cMaxAlternates*
    [in] Specifies the maximum number of alternates the engine will return.

Return values

| Value | Description |
|---|---|
| S_OK | Function completed successfully. |

© 1995-2000 Microsoft Corporation All rights reserved

[This is preliminary documentation and subject to change.]

ISpRecoContext::SetAudioOptions

ISpRecoContext::SetAudioOptions sets the audio options for result objects from this recognition context.

The SetAudioOptions method enables or disables the retention of audio with result objects and can change the retained audio format. By default, when an audio format is not specified, the audio will be retained in the same format as the SR engine used to perform the recognition.

```
HRESULT SetAudioOptions(
    SPAUDIOOPTIONS        Options,
    const GUID            *pAudioFormatId,
    const WAVEFORMATEX    *pWaveFormatEx
);
```

Parameters

Parameters

*Options*
 [in] Flag of type SPAUDIOOPTIONS indicating the option. It must be one of the following:

| Value | |
|---|---|
| SPAO_NONE | Do not retain audio for results. |
| SPAO_RETAIN_AUDIO | Retain audio for all future results. |

*pAudioFormatId*
 [in] The audio stream format GUID. Usually this value is *SPFID_WaveForamatEx*. If this value is NULL, the retained audio format will not be changed.

*pWaveFormatEx*
 [in] The audio stream wave format. This is only valid if *\*pAudioFormatId == SPFID_WaveFormatEx*.

Return values

| Value | Description |
|---|---|
| S_OK | Function completed successfully. |
| E_INVALIDARG | *Options* is not one of the correct types. |
| FAILED(hr) | Appropriate error message. |

© 1995-2000 Microsoft Corporation All rights reser

[This is preliminary documentation and subject to change.] 

ISpRecoContext::GetAudioOptions

ISpRecoContext::GetAudioOptions retrieves the audio options for a given stream.

```
HRESULT GetAudioOptions(
    SPAUDIOOPTIONS       *Options,
    const GUID           *pAudioFormatId,
    const WAVEFORMATEX   **pWaveFormatEx
);
```

Parameters

*Options*
 [out] Flag of type SPAUDIOOPTIONS indicating the options set for this context.

*pAudioFormatId*
 [in] The audio stream GUID to retrieve. This value can be NULL.

*pWaveFormatEx*

[in] The audio stream wave format to retrieve. This can be NULL if *pAudioFormatId* is NULL.

Note: This data must be freed using *::CoTaskMemFree()*.

Return values

| Value | Description |
|---|---|
| S_OK | Function completed successfully. |
| E_POINTER | One of the pointers is invalid or bad. |
| FAILED(hr) | Appropriate error message. |

© 1995-2000 Microsoft Corporation All rights reserve

[This is preliminary documentation and subject to change.]

ISpRecoContext::DeserializeResult

ISpRecoContext::DeserializeResult creates a new result object from a serialized result.

```
HRESULT DeserializeResult(
    const SPSERIALIZEDRESULT    pSerializedResult,
    ISpRecoResult               **ppResult
);
```

Parameters

*pSerializedResult*
    [in] The current serialized result.
*ppResult*
    [out] The unserialized result object.

Return values

| Value | Description |
|---|---|
| S_OK | Function completed successfully. |
| E_INVALIDARG | *pSerializedResult* is invalid or bad. |
| E_POINTER | *ppResult* is invalid or bad. |
| E_OUTOFMEMORY | Exceeded available memory. |
| FAILED(hr) | Appropriate error message. |

© 1995-2000 Microsoft Corporation All rights reserv

[This is preliminary documentation and subject to change.]

ISpRecoContext::Bookmark

ISpRecoContext::Bookmark

ISpRecoContext::Bookmark sets a bookmark within the current recognition stream. When the engine reaches the specified stream position, a bookmark event is added to the event queue.

```
HRESULT Bookmark(
    SPBOOKMARKOPTIONS    Options,
    ULONGLONG            ullStreamPosition,
    LPARAM               lParamEvent
);
```

Parameters

*Options*
    [in] Flags of type SPBOOKMARKOPTIONS indicating the options associated with the bookmark. Must be one of the following values:

SPBO_NONE   Context will not be paused when a bookmark event occurs.

SPBO_PAUSE  Context is paused when a bookmark event occurs.

*ullStreamPosition*
    [in] The position of the bookmark within the stream.

If *SP_STREAMPOS_ASAP* is specified, the bookmark event will occur when the engine reaches a synchronization point. This is usually combined with *SPBO_PAUSE* to asynchronously pause the recognition stream. If *SP_STREAMPOS_REALTIME* is specified, the bookmark event occurs when the SR engine reaches the point where the audio device is at the time of the call.

*lParamEvent*
    [in] The *lparam* for the SAPI bookmark event, and can be any value the application uses to uniquely identify this bookmark event.

Return values

| Value | Description |
| --- | --- |
| S_OK | Function completed successfully. |
| E_INVALIDARG | *Options* has a bad value. |
| FAILED(hr) | Appropriate error message. |

© 1995-2000 Microsoft Corporation All rights reserved

[This is preliminary documentation and subject to change.]

ISpRecoContext::SetAdaptationData

ISpRecoContext::SetAdaptationData sets a string to be adapted by the current recognition context.

```
HRESULT SetAdaptationData(
    const WCHAR    *pAdaptationData,
    const ULONG    cch
```

```
    const ULONG    cch
);
```

Parameters

*pAdaptationData*
 [in] The string to adapt.
*cch*
 [in] The number of characters in *pAdaptationData*.

Return values

| Value | Description |
|---|---|
| S_OK | Function completed successfully. |
| E_INVALIDARG | *pAdaptationData* is invalid or *cch* equals zero. |
| E_OUTOFMEMORY | Exceeded available memory. |
| FAILED(hr) | Appropriate error message. |

© 1995-2000 Microsoft Corporation All rights reserved

[This is preliminary documentation and subject to change.] 

ISpRecoContext::Pause

ISpRecoContext::Pause requests the engine object to pause and synchronize with the SR engine.

The SR engine is paused at its synchronization point to allow grammars and rule states to be changed freely. The paused condition remains until the Resume method is called.

Note: The caller must call Resume once for every call that is made to Pause.

```
HRESULT Pause(
    DWORD    dwFlags
);
```

Parameters

*dwFlags*
 [in] Reserved, must be 0.

Return values

| Value | Description |
|---|---|
| S_OK | Function completed successfully. |

Note:

- Pausing the SR engine will stop the recognition activity, but input audio will continue to be collected.

ISpRecoContext::Resume

ISpRecoContext::Resume releases the SR engine from the paused state and restarts the recognition process.

This method must be called after a call to ISpRecoContext::Pause, a bookmark event occurs that pauses the recognition engine, or an auto-pause rule is recognized.

```
HRESULT Resume (
   DWORD dwReserved
);
```

Parameters

*dwReserved*
    [in] Reserved, must be 0.

Return values

| Value | Description |
| --- | --- |
| S_OK | Function completed successfully. |

© 1995-2000 Microsoft Corporation. All rights rese

[This is preliminary documentation and subject to change.] 

ISpRecoContext::SetVoice

ISpRecoContext::SetVoice sets the associated ISpVoice to an object.

```
HRESULT SetVoice(
   ISpVoice   *pVoice,
   BOOL       fAllowFormatChanges
);
```

Parameters

*pVoice*
    [in] The voice interface to be associated.
*fAllowFormatChanges*
    [in] Boolean allowing the voice format alteration by the engine.

Return values

| Value | Description |
|---|---|
| S_OK | Function completed successfully. |
| E_POINTER | *pVoice* is invalid or bad. |
| FAILED(hr) | Appropriate error message. |

© 1995-2000 Microsoft Corporation. All rights reserved.

[This is preliminary documentation and subject to change.]

ISpRecoContext::GetVoice

ISpRecoContext::GetVoice retrieves a reference to the associated ISpVoice object.

```
HRESULT GetVoice(
    ISpVoice    **ppVoice
);
```

Parameters

*ppVoice*
    [in] Address of the ISpVoice interface.

Return values

| Value | Description |
|---|---|
| S_OK | Function completed successfully. |
| FAILED(hr) | Appropriate error message. |
| E_POINTER | Invalid pointer. |

© 1995-2000 Microsoft Corporation. All rights reserved.

[This is preliminary documentation and subject to change.]

ISpRecoContext::SetVoicePurgeEvent

ISpRecoContext::SetVoicePurgeEvent sets the SR engine events that stop audio output, and purges the current speaking queue. It passes the events as extra event interests to the engine.

```
HRESULT SetVoicePurgeEvent(
    ULONGLONG   ullEventInterest
);
```

Parameters

*ullEventInterest*
    [in] The set of flags indicating the event interests. One of the following must be included:
      SPEI_REQUESTUI
      SPEI_INTERFERENCE
      SPEI_END_SR_STREAM
      SPEI_SR_BOOKMARK
      SPEI_SOUNDSTART
      SPEI_SOUNDEND
      SPEI_PHRASESTART
      SPEI_HYPOTHESIS
      SPEI_RECOGNITION
      SPEI_FALSERECOGNITION

Return values

| Value | Description |
| --- | --- |
| S_OK | Function completed successfully. |
| E_INVALIDARG | One or more of the interests set is not allowed. |
| FAILED(hr) | Appropriate error message. |

© 1995-2000 Microsoft Corporation. All rights reserve

[This is preliminary documentation and subject to change.] 

ISpRecoContext::GetVoicePurgeEvent

ISpRecoContext::GetVoicePurgeEvent retrieves the set of SR engine events that stop audio output, and purges the current speaking queue. The events are set by ISpRecoContext::SetVoicePurgeEvent.

```
HRESULT GetVoicePurgeEvent(
    ULONGLONG    *pullEventInterest
);
```

Parameters

*pullEventInterest*
    [out] The set of flags indicating the event interests.

Return values

| Value | Description |
|---|---|
| S_OK | Function completed successfully. |
| E_POINTER | *pullEventInterest* is invalid or bad. |
| FAILED(hr) | Appropriate error message. |

© 1995-2000 Microsoft Corporation. All rights reserved

Microsoft Speech SDK
with SAPI 5.0 

[This is preliminary documentation and subject to change.]

ISpRecoGrammar

Methods in Vtable Order

| ISpRecoGrammar Methods | Description |
|---|---|
| GetGrammarId | Retrieves the grammar identifier associated with the application. |
| GetRecoContext | Retrieves the context object that loaded this grammar. |
| LoadCmdFromFile | Loads a command from a file. |
| LoadCmdFromObject | Loads a command from an object. |
| LoadCmdFromResource | Loads a command from resource. |
| LoadCmdFromMemory | Loads a command from memory. |
| LoadCmdFromProprietaryGrammar | Loads a command from a proprietary grammar. |
| SetRuleState | Activates or deactivates a rule by its RuleName. |
| SetRuleIdState | Activates or deactivates a rule by its RuleID. |
| LoadDictation | Loads a dictation for an engine. |
| UnloadDictation | Unloads a dictation from an engine. |
| SetDictationState | Sets a dictation state to active or inactive. |
| SetWordSequenceData | Sets word sequence data used by <TEXTBUFFER>. |
| SetTextSelection | Sets the insertion point (using word sequence data buffer). |
| IsPronounceable | Determines if the word has a pronunciation. |
| SetGrammarState | Changes the global grammar state. |
| SaveCmd | Allows applications using dynamic grammars to save the current grammar state to a stream. |

ISpRecoGrammar::GetGrammarId

ISpRecoGrammar::GetGrammarId retrieves the grammar identifier associated with the application.

```
HRESULT GetGrammarId(
    DWORD_PTR    *pdwpGrammarId
);
```

Parameters

*pdwpGrammarId*
    [out] Address of the grammar identifier associated with the grammar.

Return values

| Value | Description |
| --- | --- |
| S_OK | Function completed successfully. |
| E_POINTER | *pdwGrammarId* is invalid or bad. |

© 1995-2000 Microsoft Corporation. All rights reserv

---

[This is preliminary documentation and subject to change.] 

ISpRecoGrammar::GetRecoContext

ISpRecoGrammar::GetRecoContext retrieves the context object that loaded this grammar.

```
HRESULT GetRecoContext(
    ISpRecoContext    **ppRecoCtxt
);
```

Parameters

*ppRecoCtxt*
    [out] Address of a pointer to an ISpRecoContext object that receives the recognition context object pointer.

Return values

| Value | Description |
| --- | --- |
| S_OK | Function completed successfully. |

| | |
|---|---|
| E_POINTER | *ppRecoCtxt* is invalid or bad. |
| FAILED(hr) | Rule not loaded. |

© 1995-2000 Microsoft Corporation. All rights reserved.

---

[This is preliminary documentation and subject to change.] 

ISpRecoGrammar::LoadCmdFromFile

ISpRecoGrammar::LoadCmdFromFile loads a command from a file. If the file is an XML file, the information is compiled on-the-fly. Otherwise *Options* must be SPLO_DYNAMIC for it to compile. The file has to reside on the local machine (no URL loads).

```
HRESULT LoadCmdFromFile(
    WCHAR          *pszFileName,
    SPLOADOPTIONS   Options
);
```

Parameters

*pszFileName*
    [in, string] The file name containing the command.
*Options*
    [in] Flag of type SPLOADOPTIONS indicating whether the file should be loaded statically or dynamically.

Return values

| Value | Description |
|---|---|
| S_OK | Function completed successfully. |
| E_INVALIDARG | *pszFileName* is invalid or bad. Alternatively, *Options* is neither SPLO_STATIC nor SPLO_DYNAMIC. |
| FAILED(hr) | Appropriate error message. |

© 1995-2000 Microsoft Corporation. All rights reserved

---

[This is preliminary documentation and subject to change.] 

ISpRecoGrammar::LoadCmdFromObject

ISpRecoGrammar::LoadCmdFromObject loads a command from an object.

```
HRESULT LoadCmdFromObject(
    REFCLSID        rcid,
    const WCHAR    *pszGrammarName,
    SPLOADOPTIONS   Options
);
```

Parameters

*rcid*
 [in] The reference class ID of the object containing the command.
*pszGrammarName*
 [in, string] The grammar name of the object containing the command.
*Options*
 [in] Flag of type SPLOADOPTIONS indicating whether the file should be loaded statically or dynamically.

Return values

| Value | Description |
| --- | --- |
| S_OK | Function completed successfully. |
| E_INVALIDARG | *pszGrammarName* is invalid or bad. Alternatively, *Options* is neither SPLO_STATIC nor SPLO_DYNAMIC. |
| FAILED(hr) | Appropriate error message. |

© 1995-2000 Microsoft Corporation. All rights reserved

[This is preliminary documentation and subject to change.] 

ISpRecoGrammar::LoadCmdFromResource

ISpRecoGrammar::LoadCmdFromResource loads a command from resource.

```
HRESULT LoadCmdFromResource(
    HMODULE         hModule,
    const WCHAR     *pszResourceName,
    const WCHAR     *pszResourceType,
    WORD            wLanguage,
    SPLOADOPTIONS   Options
);
```

Parameters

*hModule*
 [in] Handle to the module whose file name is being requested. If this parameter is NULL, it passes back the path for the file containing the current process.
*pszResourceName*
 [in, string] The name of the resource.
*pszResourceType*
 [in, string] The type of the resource.
*wLanguage*
 [in] The language ID.
*Options*
 [in] Flag of type SPLOADOPTIONS indicating whether the file should be loaded statically or dynamically.

Return values

| Value | Description |
|---|---|
| S_OK | Function completed successfully. |
| E_INVALIDARG | Either *pszResourceName* or *pszResourceType* is invalid or bad. It may also indicate *hModule* could not be found. Alternatively, *Options* is neither SPLO_STATIC nor SPLO_DYNAMIC. |
| FAILED(hr) | Appropriate error message. |

© 1995-2000 Microsoft Corporation. All rights reserved.

---

[This is preliminary documentation and subject to change.] 

ISpRecoGrammar::LoadCmdFromMemory

ISpRecoGrammar::LoadCmdFromMemory loads a command from memory.

```
HRESULT LoadCmdFromMemory(
   const SPBINARYGRAMMAR   *pBinaryData,
   SPLOADOPTIONS           Options
);
```

Parameters

*pBinaryData*
    [in] The serialized header buffer.
*Options*
    [in] Flag of type SPLOADOPTIONS indicating whether the file should be loaded statically or dynamically.

Return values

| Value | Description |
|---|---|
| S_OK | Function completed successfully. |
| E_INVALIDARG | Either *pBinaryData* or one of its members is invalid or bad. It may also indicate *pBinaryData->FormatId* is not SPGDF_ContextFree. Alternatively, *Options* is neither SPLO_STATIC nor SPLO_DYNAMIC. |
| FAILED(hr) | Appropriate error message. |

© 1995-2000 Microsoft Corporation All rights reserved

---

[This is preliminary documentation and subject to change.] 

ISpRecoGrammar::LoadCmdFromProprieta

ISpRecoGrammar::LoadCmdFromProprietaryGrammar loads a command from a proprietary grammar.

```
HRESULT LoadCmdFromProprietaryGrammar(
    REFGUID         rguidParam,
    const WCHAR     *pszStringParam,
    const void      *pvDataParam,
    ULONG           cbDataSize,
    SPLOADOPTIONS   Options
);
```

Parameters

*rguidParam*
    [in] Unique identifier of the grammar.
*pszStringParam*
    [in, string] The string command.
*pvDataParam*
    [in] Additional information for the process.
*cbDataSize*
    [in] The size, in bytes, of *pvDataParam*.
*Options*
    [in] Flag of type SPLOADOPTIONS indicating whether the file should be loaded statically or dynamically. This value must be SPLO_STATIC.

Return values

| Value | Description |
| --- | --- |
| S_OK | Function completed successfully. |
| E_INVALIDARG | *pszStringParam* or *pvDataParam* is invalid or bad. Alternatively, *Options* is not SPLO_STATIC. |
| FAILED(hr) | Appropriate error message. |

© 1995-2000 Microsoft Corporation All rights reser

[This is preliminary documentation and subject to change.]

ISpRecoGrammar::SetRuleState

ISpRecoGrammar::SetRuleState activates or deactivates a rule by its RuleName.

```
HRESULT SetRuleState(
    const WCHAR   *pszName,
    const WCHAR   *pszValue,
    SPRULESTATE   NewState
);
```

Parameters

*pszName*
    [in, string] Address of a null-terminated string containing the rule name. If NULL, all rules are affected.

*pszValue*
    [in, string] Address of a null-terminated string containing the rule value. If NULL, all values are affected.

*NewState*
    [in] Flag of type SPRULESTATE indicating the new rule state.

Return values

| Value | Description |
| --- | --- |
| S_OK | Function completed successfully. |
| E_INVALIDARG | *pszName* or *pszValue* is invalid or bad. |
| SPERR_UNINITIALIZED | The object has not been properly initialized. |
| FAILED(hr) | Appropriate error message. |

Example

The following snippet loads a grammar, then attempts to activate a single rule ("playcard") and immediately deactivate it.

```
HRESULT hr;
CComPtr<ISpRecognizer> cpRecognizer;
CComPtr<ISpRecoContext> cpRecoContext;
CComPtr<ISpRecoGrammar> cpRecoGrammar;

hr = InitReco(cpRecognizer, CLSID_SpInprocRecognizer, cpRecoContext);
//Check return value hr = LoadGrammar(cpRecoContext,TESTGRAMMAR_FILENAME, cpRecoGrammar,GR
//Check return value hr = cpRecoGrammar->SetRuleState(L"playcard", NULL, SPRS_ACTIVE);
//Check return value //Deactivate the rule
hr = cpRecoGrammar->SetRuleState(L"playcard", NULL, SPRS_INACTIVE);
//Check return value
```

© 1995-2000 Microsoft Corporation All rights reserved

[This is preliminary documentation and subject to change.] 

ISpRecoGrammar::SetRuleIdState

ISpRecoGrammar::SetRuleIdState activates or deactivates a rule by its RuleID.

```
HRESULT SetRuleIdState(
    DWORD          dwRuleId,
    SPRULESTATE    NewState
);
```

Parameters

*dwRuleId*

*dwRuleId*
    [in] Value specifying the grammar rule identifier.
*NewState*
    [in] Flag of type SPRULESTATE indicating the new rule state.

Return values

| Value | Description |
| --- | --- |
| S_OK | Function completed successfully. |
| FAILED(hr) | Appropriate error message. |

Examples Using This Method

SDK: Coffee2.

© 1995-2000 Microsoft Corporation. All rights reserved

[This is preliminary documentation and subject to change.] 

ISpRecoGrammar::LoadDictation

ISpRecoGrammar::LoadDictation loads a dictation grammar for an engine.

```
HRESULT LoadDictation(
    const WCHAR    *pszTopicName,
    SPLOADOPTIONS  Options
);
```

Parameters

*pszTopicName*
    [in, optional, string] The string containing the topic name. May be set to NULL. SAPI defines SPTOPIC_SPELLING
*Options*
    [in] Flag of type SPLOADOPTIONS indicating whether the file should be loaded statically or dynamically. This value must be SPLO_STATIC.

Return values

| Value | Description |
| --- | --- |
| S_OK | Function completed successfully. |
| E_INVALIDARG | *pszTopicName* is invalid or bad. Alternatively, *Options* is not SPLO_STATIC. |
| FAILED(hr) | Appropriate error message. |

ISpRecoGrammar::UnloadDictation

ISpRecoGrammar::UnloadDictation unloads a dictation grammar from an engine.

```
HRESULT UnloadDictation ( void );
```

Parameters

None.

Return values

| Value | Description |
| --- | --- |
| S_OK | Function completed successfully. |
| FAILED(hr) | Appropriate error message. |

© 1995-2000 Microsoft Corporation. All rights reserv

[This is preliminary documentation and subject to change.]

ISpRecoGrammar::SetDictationState

ISpRecoGrammar::SetDictationState sets a dictation state to either active or inactive.

```
HRESULT SetDictationState(
    SPRULESTATE   NewState
);
```

Parameters

*NewState*
    [in] Flag of type SPRULESTATE indicating the new state of dictation.

Return values

| Value | Description |
| --- | --- |
| S_OK | Function completed successfully. |
| E_INVALIDARG | *NewState* is not an acceptable value. |
| SPERR_UNINITIALIZED | A dictation is not currently loaded. |
| FAILED(hr) | Appropriate error message. |

© 1995-2000 Microsoft Corporation. All rights reserv

[This is preliminary documentation and subject to change.]

ISpRecoGrammar::SetWordSequenceData

ISpRecoGrammar::SetWordSequenceData

ISpRecoGrammar::SetWordSequenceData sets a word sequence buffer in the SR engine. The CFG grammar can refer to any subsequence of words in this buffer using the <TEXTBUFFER> tag.

```
HRESULT SetWordSequenceData(
    WCHAR    *pText,
    ULONG    cchText,
    const    SPTEXTSELECTIONINFO  *pInfo
);
```

Parameters

*pText*
    [in] Buffer containing the text to search for possible word sequences. The buffer is double-NULL terminated. If the buffer contains '\0' between words, the sub-sequence cannot contain words on either side of the '\0'. It is up to the SR engines to perform word breaking and text normalization for better performance. (See me for an example).

*cchText*
    [in] The number of characters (WCHAR) in pText.

*pInfo*
    [in] Address of the SPTEXTSELECTIONINFO structure that contains the selection information.

Return values

| Value | Description |
| --- | --- |
| S_OK | Function completed successfully. |
| E_INVALIDARG | One or more arguments are invalid. |
| FAILED(hr) | Appropriate error message. |

© 1995-2000 Microsoft Corporation. All rights reserved

---

[This is preliminary documentation and subject to change.]

ISpRecoGrammar::SetTextSelection

ISpRecoGrammar::SetTextSelection sets the current text selection and insertion point information.

```
HRESULT SetTextSelection(
    const    SPTEXTSELECTIONINFO  *pInfo
);
```

Parameters

*pInfo*
    [in] Address of the SPTEXTSELECTIONINFO structure that contains the text selection and insertion point information.

and insertion point information.

Return values

| Value | Description |
|---|---|
| S_OK | Function completed successfully. |
| E_INVALIDARG | One or more arguments are invalid. |
| FAILED(hr) | Appropriate error message. |

© 1995-2000 Microsoft Corporation. All rights reserv

[This is preliminary documentation and subject to change.] 

ISpRecoGrammar::IsPronounceable

ISpRecoGrammar::IsPronounceable calls the engine object to determine if the word has a pronunciation.

```
HRESULT IsPronounceable(
    const WCHAR   *pszWord,
    BOOL          pfPronounceable
);
```

Parameters

*pszWord*
    [in, string] The word to test. Length must be equal to or less than SP_MAX_WORD_LENGTH.

*pfPronounceable*
    [out] Flag indicating the results of the test. TRUE, if a pronunciation was found; otherwise, FALSE.

Return values

| Value | Description |
|---|---|
| S_OK | Function completed successfully. |
| E_POINTER | Either *pszWord* or *pfPronounceable* is invalid or bad. |
| FAILED (hr) | Appropriate error message. |

© 1995-2000 Microsoft Corporation. All rights reserv

[This is preliminary documentation and subject to change.] 

ISpRecoGrammar::SetGrammarState

ISpRecoGrammar::SetGrammarState sets the grammar mode.

If eGrammarState is SPGM_DISABLED, then SAPI will remember the current rule activation state, so that when the grammar state is set to SPGM_ENABLED, it restores the grammar rules back to each of the original activation states. While the grammar is set to SPGM_DISABLED, the application can still activate and deactivate rule. The effect is not communicated to the SR engine (but remembered by SAPI) until the grammar is enabled again.

If eGrammarState is SPGM_EXCLUSIVE, then SAPI will disable all other grammars in the system, unless another grammar is already exclusive. Activation and deactivation commands are buffered for all other grammars until the exclusive grammar is set to SPGM_ENABLED again.

```
HRESULT SetGrammarState(
    SPGRAMMARSTATE    eGrammarState
);
```

Parameters

*eGrammarState*
    [in] Flag of type SPGRAMMARSTATE indicating the new state of the grammar.

Return values

| Value | Description |
| --- | --- |
| S_OK | Function completed successfully. |
| FAILED(hr) | Appropriate error message. |

© 1995-2000 Microsoft Corporation All rights reserved.

[This is preliminary documentation and subject to change.] 

ISpRecoGrammar::SaveCmd

ISpRecoGrammar::SaveCmd allows applications using dynamic grammars to save the current grammar state to a stream.

```
HRESULT SaveCmd(
    IStream    *pSaveStream,
    WCHAR      **ppCoMemErrorText
);
```

Parameters

*pSaveStream*
    [in] The stream to save.
*ppCoMemErrorText*
    [out] Optional parameter of a null-terminated string containing error messages that occurred during the save operation.

Return values

| Value | Description |
|---|---|
| S_OK | Function completed successfully. |
| E_INVALIDARG | *pSaveStream* is invalid or bad. |
| SPERR_NOT_DYNAMIC_GRAMMAR | Command was loaded but compiler is not available. |
| SPERR_UNINITIALIZED | Compiler is not available. |
| E_POINTER | *ppCoMemErrorText* is invalid or bad. |
| FAILED (hr) | Appropriate error message. |

© 1995-2000 Microsoft Corporation. All rights reserved.

Microsoft Speech SDK with SAPI 5.0 

[This is preliminary documentation and subject to change.]

ISpRecoResult

Note: This interface inherits from ISpPhrase.

| ISpRecoResult Methods | Description |
|---|---|
| GetGrammarId | Retrieves the grammar identifier associated with a result. |
| GetResultTimes | Retrieves the time information associated with the result. |
| GetAlternates | Retrieves an array containing alternate phrases. |
| GetAudio | Creates an audio stream for a given number of elements. |
| SpeakAudio | Plays the audio associated with a given range of elements. |
| Serialize | Creates a serialized copy of the recognition result object. |
| ScaleAudio | Converts the format of the retained audio to a different audio format. |
| GetRecoContext | Returns the recognition context object that is associated with this result. |

© 1995-2000 Microsoft Corporation. All rights reserved

[This is preliminary documentation and subject to change.]

ISpRecoResult::GetGrammarId

ISpRecoResult::GetGrammarId retrieves the grammar identifier associated with a result.

```
HRESULT GetGrammarId(
    DWORD_PTR    *pdwpGrammarId
);
```

Parameters

*pdwpGrammarId*
    [out] Address of the result grammar identifier.

Return values

| Value | Description |
| --- | --- |
| S_OK | Function completed successfully. |
| E_POINTER | *pdwGrammarId* is invalid or bad. |
| SPERR_NOT_FOUND | Interface not found. |

© 1995-2000 Microsoft Corporation. All rights res

---

[This is preliminary documentation and subject to change.] 

ISpRecoResult::GetResultTimes

ISpRecoResult::GetResultTimes retrieves the time information associated with the result.

```
HRESULT GetResultTimes(
    SPRECORESULTTIMES    *pTimes
);
```

Parameters

*pTimes*
    [out] Address of the SPRECORESULTTIMES data structure containing the time information associated with the result.

Return values

| Value | Description |
| --- | --- |
| S_OK | Function completed successfully. |
| E_POINTER | *pTimes* is invalid or bad. |
| SPERR_NOT_FOUND | Interface not found. |

Examples Using This Method

SDK: Coffee2, Coffee3, Coffee4.

ISpRecoResult::GetAlternates

ISpRecoResult::GetAlternates retrieves an array of pointers to ISpPhraseAlt objects containing alternate phrases.

```
HRESULT GetAlternates(
    ULONG           ulStartElement,
    ULONG           cElements,
    ULONG           ulRequestCount,
    ISpPhraseAlt    **ppPhrases,
    ULONG           *pcPhrasesReturned
);
```

Parameters

*ulStartElement*
    [in] The starting element to consider for the alternates.
*cElements*
    [in] The number of elements to consider. All elements may be requested by using the enumeration value SPPR_ALL_ELEMENTS of type SPPHRASERNG.
*ulRequestCount*
    [in] The number of requested alternate phrase elements.
*ppPhrases*
    [out] Address of an array of ISpPhraseAlt interface pointers that will contain the alternate phrases. The elements between the start of the *ulStartElement* element and the end of the *ulStartElement* and *cElements* element combined is the portion that will change. The rest of the elements will be included in each alternate phrase.
*pcPhrasesReturned*
    [out] Pointer to a ULONG that receives the actual number of alternate phrases retrieved.

Return values

| Value | Description |
| --- | --- |
| S_OK | Function completed successfully. |
| E_POINTER | *pcPhrasesReturned* is an invalid pointer. However, *ppPhrases* does not contain *ulRequestCount* allocations. |
| E_OUTOFMEMORY | Exceeded available memory. |
| E_INVALIDARG | *ulStartElement* is not less than the number of elements in owning interface. However, the number of expected elements exceeds the number of available elements in the owning interface. |
| S_FALSE | No analyzer is present or there is no driver data. |
| FAILED(hr) | Appropriate error message. |

ISpRecoResult::GetAudio

ISpRecoResult::GetAudio creates an audio stream of the requested words from the audio data in the result object.

Even if there are no elements, that is, *ulStartElement* = 0 and *cElements* = 0, then the audio will still be played. There are "unrecognized" results that have no elements but do have audio.

```
HRESULT GetAudio(
    ULONG              ulStartElement,
    ULONG              cElements,
    ISpStreamFormat    **ppStream
);
```

Parameters

*ulStartElement*
    [in] Value specifying from which element in the result data to start the audio stream.
*cElements*
    [in] Value specifying the total number of words.
*ppStream*
    [out] Address that will receive a pointer to an ISpStreamFormat object containing the audio data requested.

Return values

| Value | Description |
| --- | --- |
| S_OK | Function completed successfully. |
| E_INVALIDARG | *cElements* is zero or the expected number of elements to count exceeds the number available. |
| E_POINTER | *ppStream* is an invalid pointer. |
| SPERR_NO_AUDIO_DATA | This result object does not have any audio data. |
| FAILED(hr) | Appropriate error message. |

© 1995-2000 Microsoft Corporation. All rights reserved

---

[This is preliminary documentation and subject to change.] 

ISpRecoResult::SpeakAudio

ISpRecoResult::SpeakAudio is a shortcut, first calling ISpRecoResult::GetAudio and then calling ISpVoice::SpeakStream on the parent recognition context.

```
HRESULT SpeakAudio(
    ULONG    ulStartElement,
    ULONG    cElements,
```

```
DWORD      dwFlags,
ULONG      *pulStreamNumber
);
```

Parameters

*ulStartElement*
[in] Value specifying with which element to start.
*cElements*
[in] Value specifying the number of elements contained in the stream. A value of zero speaks all elements.
*dwFlags*
[in] Value containing flag information associated with audio elements.
*pulStreamNumber*
[out] Address of a variable containing the stream number information.

Return values

| Value | Description |
| --- | --- |
| S_OK | Function completed successfully. |
| SPERR_NO_AUDIO_DATA | Result does not contain audio data. |
| FAILED(hr) | Appropriate error message. |

Note: Return values may also be the same as ISpVoice::SpeakStream.

© 1995-2000 Microsoft Corporation. All rights reserved.

---

[This is preliminary documentation and subject to change.] 

ISpRecoResult::Serialize

ISpRecoResult::Serialize creates a serialized copy of the recognition result object. The serialized copy can be saved and later restored using the ISpRecoContext::DeserializeResult method.

```
HRESULT Serialize(
    SPSERIALIZEDRESULT    **ppCoMemSerializedResult
);
```

Parameters

*ppCoMemSerializedResult*
[out] Address of a pointer to the SPSERIALIZEDRESULT structure that receives the serialized result information. Call CoTaskMemFree() to free the memory associated with the serialized result object.

Return values

| Value | Description |
| --- | --- |
| S_OK | Function completed successfully. |

| | |
|---|---|
| E_POINTER | *ppCoMemSerializedResult* is an invalid pointer. |
| E_OUTOFMEMORY | Exceeded available memory. |
| FAILED(hr) | Appropriate error message. |

© 1995-2000 Microsoft Corporation. All rights reserve

[This is preliminary documentation and subject to change.]

ISpRecoResult::ScaleAudio

ISpRecoResult::ScaleAudio converts an existing audio stream into a different audio format. Use the ISpPhrase::Discard method to completely discard audio data associated with a result object.

```
HRESULT ScaleAudio(
   const GUID        *pAudioFormatId,
   const WAVEFORMATEX *pWaveFormatEx
);
```

Parameters

*pAudioFormatId*
    [in] Address of the data format identifier. Typically, this value is *SPFID_WaveFormatEx*.

*pWaveFormatEx*
    [in] Address of the WAVEFORMATEX structure that contains the audio format to convert to.

Note: This value must be NULL if *pAudioFormatId* is not specified as *SPFID_WaveForamtEx*.

Return values

| Value | Description |
|---|---|
| S_OK | Function completed successfully. |
| E_INVALIDARG | Either *pAudioFormatId* or *pWaveFormatEx* is invalid or bad. |
| SPERR_NO_AUDIO_DATA | Either *ulPhrases* is zero or an audio stream is unavailable. |
| E_OUTOFMEMORY | Exceeded available memory. |
| FAILED(hr) | Appropriate error message. |

© 1995-2000 Microsoft Corporation All rights reser

[This is preliminary documentation and subject to change.]

ISpRecoResult::GetRecoContext

ISpRecoResult::GetRecoContext returns the recognition context object this result object is associated with.

```
HRESULT GetRecoContext(
    ISpRecoContext   **ppRecoContext
);
```

Parameters

*ppRecoContext*
    [out] A pointer that receives the recognition context interface pointer.

Return values

| Value | Description |
|---|---|
| S_OK | Function completed successfully. |
| E_POINTER | *ppRecoContext* is invalid or bad. |
| FAILED(hr) | Appropriate error message. |

© 1995-2000 Microsoft Corporation. All rights reserved

Microsoft Speech SDK
with SAPI 5.0

[This is preliminary documentation and subject to change.]

ISpRecognizer

The ISpRecognizer interface enables applications to directly control aspects of the speech recognition (SR) engine.

When to Use

Call methods of the ISpRecognizer interface to configure or retrieve the attributes of the SR engine.

Note: Not all functionality will be available in the shared instances.

Note: This interface inherits from ISpProperties.

Methods in Vtable Order

| ISpRecognizer Methods | Description |
|---|---|
| SetRecognizer | Specifies an SR engine. |
| GetRecognizer | Retrieves an SR engine. |
| SetInput | Enables an application to specify which input stream the SR engine should use. |
| GetInputObjectToken | Retrieves the input token object for the stream. |

| | |
|---|---|
| GetInputObjectToken | Retrieves the input token object for the stream. |
| GetInputStream | Retrieves the input stream. |
| CreateRecoContext | Enables an application to create a recognition context for this instance of an SR engine. |
| GetRecoProfile | Retrieves a pointer to the recognition profile token. |
| SetRecoProfile | Sets the profile information of the recognition profile token. |
| IsSharedInstance | Determines if the SR engine is currently shared by other contexts. |
| GetRecoState | Retrieves the state of the recognition engine. |
| SetRecoState | Sets the state of the recognition engine. |
| GetStatus | Retrieves the current input status for the engine. |
| GetFormat | Retrieves the format information associated with the audio stream. |
| IsUISupported | Checks if the underlying tokens support the requested user interface. |
| DisplayUI | Displays the user interface from the underlying tokens. |
| EmulateRecognition | Emulates a recognition from a specified phrase rather than from spoken content. |

© 1995-2000 Microsoft Corporation. All rights reserved

[This is preliminary documentation and subject to change.] 

ISpRecognizer::SetRecognizer

ISpRecognizer::SetRecognizer specifies a speech recognition engine.

```
HRESULT SetRecognizer(
    ISpObjectToken   *pEngineToken
);
```

Parameters

*pEngineToken*
    [in] The desired speech recognition engine.

Return values

| Value | Description |
|---|---|
| S_OK | Function completed successfully. |
| E_INVALIDARG | *pEngineToken* is invalid or bad. |
| SPERR_ALREADY_INITIALIZED | Interface is already initialized. |
| E_NOTIMPL | Method is not available in the shared instance. |
| FAILED(hr) | Appropriate error message. |

ISpRecognizer::GetRecognizer

ISpRecognizer::GetRecognizer retrieves a speech recognition engine.

```
HRESULT GetRecognizer(
    ISpObjectToken    **ppEngineToken
);
```

Parameters

*ppEngineToken*
    [out] The retrieved speech recognition engine.

Return values

| Value | Description |
| --- | --- |
| S_OK | Function completed successfully. |
| E_INVALIDARG | *ppEngineToken* is invalid or bad. |
| FAILED(hr) | Appropriate error message. |

© 1995-2000 Microsoft Corporation. All rights reserved.

[This is preliminary documentation and subject to change.]

ISpRecognizer::SetInput

ISpRecognizer::SetInput enables an application to specify which input stream the SR engine should use.

If the engine is currently processing audio, this call will fail.

```
HRESULT SetInput(
    IUnknown    *pUnkInput,
    BOOL        fAllowFormatChanges
);
```

Parameters

*pUnkInput*
    [in] The stream object token.
*fAllowFormatChanges*
    [in] Boolean indicating an existing format may be converted if required. TRUE allows

[in] Boolean indicating an existing format may be converted if required. TRUE allows the format conversion; otherwise, FALSE.

Return values

| Value | Description |
|---|---|
| S_OK | Function completed successfully. |
| E_INVALIDARG | *pUnkInput* is invalid or not a stream. |
| SPERR_ENGINE_BUSY | The current method can not be performed while a grammar rule is active. |
| FAILED(hr) | Appropriate error message. |

© 1995-2000 Microsoft Corporation All rights resei

[This is preliminary documentation and subject to change.]

ISpRecognizer::GetInputObjectToken

ISpRecognizer::GetInputObjectToken retrieves the input token object for the stream.

```
HRESULT GetInputObjectToken(
    ISpObjectToken   **ppToken
);
```

Parameters

*ppToken*
    [out] The input token pointer

Return values

| Value | Description |
|---|---|
| S_OK | Function completed successfully. |
| S_FALSE | Function completed successfully, but there was no input or the input has no token. |
| E_POINTER | *ppToken* is invalid or bad. |
| E_NOTIMPL | Method is not available in the shared instance. |
| FAILED(hr) | Appropriate error message. |

© 1995-2000 Microsoft Corporation All rights res

[This is preliminary documentation and subject to change.]

ISpRecognizer::GetInputStream

ISpRecognizer::GetInputStream retrieves the input stream.

```
HRESULT GetInputStream(
    ISpStreamFormat    **ppStream
);
```

Parameters

*ppStream*
    [out] Address of a pointer to the ISpStreamFormat object that receives the input stream information.

Return values

| Value | Description |
|---|---|
| S_OK | Function completed successfully. |
| E_POINTER | *ppStream* is invalid or bad. |
| SPERR_NOT_FOUND | *ppStream* is not initialized. |
| E_NOTIMPL | Method is not available in the shared instance. |
| FAILED(hr) | Appropriate error message. |

© 1995-2000 Microsoft Corporation All rights reserved

[This is preliminary documentation and subject to change.] 

ISpRecognizer::CreateRecoContext

ISpRecognizer::CreateRecoContext enables an application to create a recognition context for this instance of an SR engine.

```
HRESULT CreateRecoContext(
    ISpRecoContext    **ppNewContext
);
```

Parameters

*ppNewContext*
    [out] Address of a pointer to an ISpRecoContext interface receiving the recognition context.

Return values

| Value | Description |
|---|---|
| S_OK | Function completed successfully. |
| E_POINTER | *ppNewContext* is invalid or bad. |
| FAILED(hr) | Appropriate error message. |

Examples Using This Method

ISpRecognizer::GetRecoProfile

ISpRecognizer::GetRecoProfile retrieves a pointer to the recognition profile token.

```
HRESULT GetRecoProfile(
    ISpObjectToken    **ppToken
);
```

Parameters

*ppToken*
    [out] Address of a pointer of an ISpObjectToken that receives the profile information.

Return values

| Value | Description |
| --- | --- |
| S_OK | Function completed successfully. |
| E_INVALIDARG | One or more arguments are invalid. |
| FAILED(hr) | Appropriate error message. |

© 1995-2000 Microsoft Corporation. All rights reser

---

[This is preliminary documentation and subject to change.] 

ISpRecognizer::SetRecoProfile

ISpRecognizer::SetRecoProfile sets the profile information of the recognition profile token.

```
HRESULT SetRecoProfile(
    ISpObjectToken    *pToken
);
```

Parameters

*pToken*
    [in] Address of an ISpObjectToken object that contains the profile information

Return values

| Value | Description |
| --- | --- |
| S_OK | Function completed successfully. |

| | |
|---|---|
| S_OK | Function completed successfully. |
| FAILED(hr) | Appropriate error message. |
| E_INVALIDARG | One or more arguments are invalid. |

© 1995-2000 Microsoft Corporation All rights reserve

---

[This is preliminary documentation and subject to change.] 

ISpRecognizer::IsSharedInstance

ISpRecognizer::IsSharedInstance determines if the SR engine is currently shared by other contexts.

```
HRESULT IsSharedInstance ( void );
```

Parameters

None.

Return values

| Value | Description |
|---|---|
| S_OK | Indicates that this instance of the recognition engine is being shared. |
| S_FALSE | Indicates that this instance of the recognition engine is not being shared. |

© 1995-2000 Microsoft Corporation All rights reserve

---

[This is preliminary documentation and subject to change.] 

ISpRecognizer::GetRecoState

ISpRecognizer::GetRecoState retrieves the current state of the recognition engine.

```
HRESULT GetRecoState(
    SPRECOSTATE    *pState
);
```

Parameters

*pState*
    [out] One of the input state flags contained in the SPRECOSTATE enumeration.

Return values

| Value | Description |
|---|---|

| | |
|---|---|
| S_OK | Function completed successfully. |
| E_POINTER | Invalid pointer. |
| FAILED(hr) | Appropriate error message. |

© 1995-2000 Microsoft (

---

[This is preliminary documentation and subject to change.]

ISpRecognizer::SetRecoState

ISpRecognizer::SetRecoState sets the state of the recognition engine.

```
HRESULT SetRecoState(
    SPRECOSTATE    NewState
);
```

Parameters

*NewState*
    [in] One of the flags contained in the SPRECOSTATE enumeration.

Return values

| Value | Description |
|---|---|
| S_OK | Function completed successfully. |
| FAILED(hr) | Appropriate error message. |
| E_INVALIDARG | One or more arguments are invalid. |

© 1995-2000 Microsoft !

---

[This is preliminary documentation and subject to change.]

ISpRecognizer::GetStatus

ISpRecognizer::GetStatus gets the current input status for the engine.

```
HRESULT GetStatus(
    SPRECOGNIZERSTATUS    *pStatus
);
```

Parameters

*pStatus*
    [out] The current input status of the engine.

Return values

| Value | Description |
| --- | --- |
| S_OK | Function completed successfully. |
| E_POINTER | *pStatus* is invalid or bad. |

© 1995-2000 Microsoft Corporation. All rights reserved.

---

[This is preliminary documentation and subject to change.] 

ISpRecognizer::GetFormat

ISpRecognizer::GetFormat retrieves the format information associated with the audio stream.

```
HRESULT GetFormat(
    SPSTREAMFORMATTYPE   WaveFormatType,
    GUID                 *pFormatId,
    WAVEFORMATEX         **ppCoMemWFEX
);
```

Parameters

*WaveFormatType*
 [in] One of the wave file format types specified in SPSTREAMFORMATTYPE.
*pFormatId*
 [out] The address of the unique identifier associated with the format type.
*ppCoMemWFEX*
 [out] Address of a pointer to a WAVEFORMATEX structure that receives the format information.

Return values

| Value | Description |
| --- | --- |
| S_OK | Function completed successfully. |
| E_POINTER | Invalid pointer. |
| FAILED(hr) | Appropriate error message. |

© 1995-2000 Microsoft Corporation. All rights reserved.

---

[This is preliminary documentation and subject to change.] 

ISpRecognizer::IsUISupported

ISpRecognizer::IsUISupported checks if the underlying tokens support the requested UI.

```
[local] HRESULT IsUISupported(
    const WCHAR   *pszTypeOfUI,
    void          *pvExtraData,
    ULONG         cbExtraData,
```

```
    BOOL        *pfSupported
);
```

Parameters

*pszTypeOfUI*
  [in] Address of a pointer to a null-terminated string containing the UI type information.
*pvExtraData*
  [in] Additional information for the call.
*cbExtraData*
  [in] Size, in bytes, of *pvExtraData*.
*pfSupported*
  [out] Address of a variable that receives the value indicating support for the interface. This value is set to TRUE when this interface is supported; otherwise set to FALSE.

Return values

| Value | Description |
| --- | --- |
| S_OK | Function completed successfully. |
| E_INVALIDARG | *pfSupported* is invalid or bad. |
| FAILED(hr) | Appropriate error message. |

© 1995-2000 Microsoft Corporation. All rights reserv

[This is preliminary documentation and subject to change.] 

ISpRecognizer::DisplayUI

ISpRecognizer::DisplayUI displays the UI from the underlying tokens.

```
[local] HRESULT DisplayUI(
    HWND          hwndParent,
    const WCHAR   *pszTitle,
    const WCHAR   *pszTypeOfUI,
    void          *pvExtraData,
    ULONG         cbExtraData
);
```

Parameters

*hwndParent*
  [in] Specifies the handle of the parent window.
*pszTitle*
  [in] Address of a null-terminated string containing the window title.
*pszTypeOfUI*
  [in] Address of a null-terminated string containing the UI type information.
*pvExtraData*
  [in] Additional information for the call.
*cbExtraData*
  [in] Size, in bytes, of the contents of *pvExtraData*.

Return values

| Value | Description |
|---|---|
| S_OK | Function completed successfully. |
| FAILED(hr) | Appropriate error message. |

© 1995-2000 Microsoft Corporation. All rights reserved.

[This is preliminary documentation and subject to change.] 

ISpRecognizer::EmulateRecognition

ISpRecognizer::EmulateRecognition emulates a recognition from a specified phrase rather than from spoken content. This method generates a recognition event only if the entire sentence parsed.

```
HRESULT EmulateRecognition(
    ISpPhrase    *pPhrase
);
```

Parameters

*pPhrase*
    [in] The phrase to emulate.

Return values

| Value | Description |
|---|---|
| S_OK | Function completed successfully. |
| E_POINTER | *ppCoMemPhrase* is invalid or bad. |
| SPERR_UNINITIALIZED | Phrase is uninitialized. |
| E_OUTOFMEMORY | Exceeded available memory. |
| FAILED(hr) | Appropriate error message. |

© 1995-2000 Microsoft Corporation All rights reserved

Microsoft Speech SDK
with SAPI 5.0 

[This is preliminary documentation and subject to change.]

ISpPhrase

Methods in Vtable Order

| ISpPhrase Methods | Description |
|---|---|

| | |
|---|---|
| GetPhrase | Retrieves data elements associated with a phrase. |
| GetSerializedPhrase | Retrieves a memory block containing all of the data for this phrase. |
| GetText | Retrieves elements from a text phrase. |
| Discard | Discards the requested data from an individual element. |

© 1995-2000 Microsoft Corporation. All rights reserved.

[This is preliminary documentation and subject to change.]

ISpPhrase::GetPhrase

ISpPhrase::GetPhrase retrieves data elements associated with a phrase.

```
HRESULT GetPhrase(
    SPPHRASE    **ppCoMemPhrase
);
```

Parameters

*ppCoMemPhrase*
    [out] Address of a pointer to a SPPHRASE data structure receiving the phrase information. May be NULL if no phrase is recognized. If NULL, no memory is allocated for the structure.

Return values

| Value | Description |
|---|---|
| S_OK | Function completed successfully. |
| E_POINTER | Invalid pointer. |
| E_OUTOFMEMORY | Exceeded available memory. |

Note:

Returned data includes all elements associated with this phrase.

© 1995-2000 Microsoft Corporation All rights reserved

[This is preliminary documentation and subject to change.]

ISpPhrase::GetSerializedPhrase

ISpPhrase::GetSerializedPhrase passes back a memory block containing all of the data for this phrase.

This is a serialized version of SPPHRASE. It allocates a continuous block of memory and uses offsets instead of pointers and fills in the block. It also reports the total number of bytes it occupies after serialization in SPSERIALIZEDPHRASE. This allows the text to be written to the disk safely. However, make a critical section lock for the phrase object before making this call.

```
HRESULT GetSerializedPhrase(
    SPSERIALIZEDPHRASE    **ppCoMemPhrase
;)
```

Parameters

*ppCoMemPhrase*
    [out] Address of a pointer to a SPSERIALIZEDPHRASE data structure receiving the phrase information.

Return values

| Value | Description |
| --- | --- |
| S_OK | Function completed successfully. |
| E_POINTER | *ppCoMemPhrase* is invalid or bad. |
| SPERR_UNINITIALIZED | Phrase is uninitialized. |
| E_OUTOFMEMORY | Exceeded available memory. |

© 1995-2000 Microsoft Corporation. All rights reserved.

---

[This is preliminary documentation and subject to change.] 

ISpPhrase::GetText

ISpPhrase::GetText retrieves elements from a text phrase.

```
HRESULT GetText(
    ULONG     ulStart,
    ULONG     ulCount,
    BOOL      fUseTextReplacements,
    WCHAR     **ppszCoMemText,
    BYTE      *pbDisplayAttributes
);
```

Parameters

*ulStart*
    [in] Specifies the first element in the text phrase.
*ulCount*

[in] Specifies the number of elements to retrieve from the text phrase.

*fUseTextReplacements*
　　[in] Boolean value that indicates if replacement text should be used.

*ppszCoMemText*
　　[out] Address of a pointer to the data structure that contains the display text information.

*pbDisplayAttributes*
　　[out] Address of the SPDISPLAYATTRIBUTES enumeration that contains the text display attribute information.

Return values

| Value | Description |
| --- | --- |
| S_OK | Function completed successfully. |
| S_FALSE | A phrase that does not contain text or *ppszCoMemText* is NULL. |
| E_INVALIDARG | One or more arguments are invalid. |
| E_POINTER | Invalid pointer. |
| E_OUTOFMEMORY | Exceeded available memory. |

© 1995-2000 Microsoft Corporation. All rights reserved

[This is preliminary documentation and subject to change.]

ISpPhrase::Discard

ISpPhrase::Discard discards the requested data from an individual element.

This function sets the string pointers to NULL but does not reallocate the structure.

```
ULONG Discard(
    DWORD    dwValueTypes
;)
```

Parameters

*dwValueTypes*
　　[in] Flags of type SPVALUETYPE must be one or a combination of the following values:

| Value | Description |
| --- | --- |
| SPDF_DISPLAYTEXT | Removes the display text. |
| SPDF_LEXICALFORM | Removes the lexicon from text. |
| SPDF_PRONUNCIATION | Removes the pronunciation text. |

Return value

The number of characters discarded.

ISpPhraseAlt

Note: The ISpPhraseAlt interface inherits from ISpPhrase.

Methods in Vtable Order

| ISpPhraseAlt Methods | Description |
| --- | --- |
| GetAltInfo | Retrieves data elements associated with an alternate phrase. |
| Commit | Replaces the section of the phrase that presents the best match to this alternate phrase with the contents of the alternate phrase. |

© 1995-2000 Microsoft Corporation. All rights reserved.

---

[This is preliminary documentation and subject to change.] 

ISpPhraseAlt::GetAltInfo

ISpPhraseAlt::GetAltInfo retrieves data elements associated with an alternate phrase.

```
HRESULT GetAltInfo(
    ISpPhrase    **ppParent,
    ULONG        *pulStartElementInParent,
    ULONG        *pcElementsInParent,
    ULONG        *pcElementsInAlt
);
```

Parameters

*ppParent*
    Address of a pointer to the ISpPhrase object receiving the alternate text phrase information.
*pulStartElementInParent*
    Value that receives the first element in the text phrase of the parent object.
*pcElementsInParent*
    Value that receives the total number of text phrase elements in the parent object.
*pcElementsInAlt*
    Value that receives the total number of elements associated with the alternate text phrase.

Return values

| Value | Description |
| --- | --- |
| S_OK | Function completed successfully. |

| | |
|---|---|
| E_POINTER | *ppvObject* is invalid or bad. |
| E_INVALIDARG | One of the parameters is invalid or bad. |
| SPERR_NOT_FOUND | One of the interfaces is invalid or bad. |
| FAILED(hr) | Appropriate error message. |

© 1995-2000 Microsoft Corporation. All rights reserved

[This is preliminary documentation and subject to change.]

ISpPhraseAlt::Commit

ISpPhraseAlt::Commit replaces the section of the phrase that presents the best match to this alternate phrase with the contents of the alternate phrase.

When the best phrase is subsequently received from the result object instance, the updated phrase will be returned rather than the phrase originally chosen by the recognizer. This method also updates the generation identifier of the phrase.

```
HRESULT Commit ( void );
```

Parameters

None

Return values

| Value | Description |
|---|---|
| S_OK | Function completed successfully. |
| SPERR_NOT_FOUND | One of the interfaces is invalid or bad. |
| FAILED(hr) | Appropriate error message. |

© 1995-2000 Microsoft Corporation All rights reservec

Microsoft Speech SDK
with SAPI 5.0

[This is preliminary documentation and subject to change.]

ISpProperties

ISpProperties sets and retrieves property attribute information.

Methods in Vtable Order

| ISpProperties Methods | Description |
|---|---|
| SetPropertyNum | Sets the numeric attribute property information of the |

| | |
|---|---|
| GetPropertyNum | Retrieves the numeric attribute property information of the recognition engine. |
| SetPropertyString | Sets the text attribute property information of the recognition engine. |
| GetPropertyString | Retrieves the text attribute property information of the recognition engine. |

© 1995-2000 Microsoft Corporation. All rights reserved

---

[This is preliminary documentation and subject to change.] 

ISpProperties::SetPropertyNum

ISpProperties::SetPropertyNum sets the numeric attribute property information of the recognition engine.

```
HRESULT SetPropertyNum(
    const WCHAR    *pName,
    LONG           lValue
);
```

Parameters

*pName*
    [in] Address of the string containing the property attribute name information.
*lValue*
    [in] Address of the value containing the property attribute value information.

Return values

| Value | Description |
|---|---|
| S_OK | Function completed successfully. |
| E_INVALIDARG | One or more arguments are invalid. |
| E_POINTER | Invalid pointer. |
| FAILED(hr) | Appropriate error message. |

© 1995-2000 Microsoft Corporation. All rights reserved

---

[This is preliminary documentation and subject to change.] 

ISpProperties::GetPropertyNum

ISpProperties::GetPropertyNum retrieves the recognition engine numeric attribute property information.

```
HRESULT GetPropertyNum(
```

```
    const WCHAR    *pName,
    LONG           *plValue
);
```

Parameters

*pName*
    [in] Address of the string containing the property attribute name information.
*plValue*
    [out] Address of the value that receives the property attribute value information.

Return values

| Value | Description |
| --- | --- |
| S_OK | Function completed successfully. |
| E_INVALIDARG | One or more arguments are invalid. |
| E_POINTER | Invalid pointer. |
| FAILED(hr) | Appropriate error message. |

© 1995-2000 Microsoft Corporation All ri;

---

[This is preliminary documentation and subject to change.]

ISpProperties::SetPropertyString

ISpProperties::SetPropertyString sets the text attribute property information of the recognition engine.

```
HRESULT SetPropertyString(
    const WCHAR    *pName,
    const WCHAR    *pValue
);
```

Parameters

*pName*
    [in] Address of a string containing the property name information.
*pValue*
    [in] Address of a string containing the property value information.

Return values

| Value | Description |
| --- | --- |
| S_OK | Function completed successfully. |
| E_INVALIDARG | One or more arguments are invalid. |
| FAILED(hr) | Appropriate error message. |

ISpProperties::GetPropertyString

ISpProperties::GetPropertyString retrieves recognition engine text attribute property information.

```
HRESULT GetPropertyString(
    const WCHAR    *pName,
    WCHAR          **ppCoMemValue
);
```

Parameters

*pName*
    [in] Address of a string containing the property name information.
*ppCoMemValue*
    [out] Address of the string that receives the property attribute value information. The caller must call CoTaskMemFree() to free the string pointer.

Return values

| Value | Description |
| --- | --- |
| S_OK | Function completed successfully. |
| E_INVALIDARG | One or more arguments are invalid. |
| FAILED(hr) | Appropriate error message. |

© 1995-2000 Microsoft Corporation. All rig

Microsoft Speech SDK
with SAPI 5.0

[This is preliminary documentation and subject to change.]

SAPI Text to Speech

The following section covers:

- Overview
- Introduction
- Text synthesis
- ISpVoice

© 1995-2000 Microsoft Corporation All rigt

[This is preliminary documentation and subject to change.]

Overview

Overview

The following section covers:

- What is text to speech?
- Why use text to speech?

What is text to speech?

Text to speech (TTS) is a process through which text is rendered as digital audio and then "spoken." Most TTS engines can be categorized by the method they use to translate phonemes into audible sound.

- Concatenated word
- Synthesis
- Subword concatenation

Concatenated word:
> Although concatenated word systems are not really synthesizers, they are one of the most commonly used text–to–speech system implementations. In a concatenated word engine, the application designer provides recordings for phrases and individual words. The engine concatenates the recordings together in order to form one spoken sentence or phrase. A voice–mail system most likely uses a concatenated word engine. For example, "You have three new messages." In this example, the engine has recordings for "You have", + all of the digits, + "new messages" to form the voice mail interaction phrase.

Synthesis:
> A text–to–speech engine uses synthesis to generate sounds similar to those created by the human vocal cords and applies various filters to simulate throat length, mouth cavity, lip shape, and tongue position. The voice produced by synthesis technology tends to sound less human than a voice produced by diphone concatenation, but it is possible to obtain different voice qualities by changing a few parameters.

Subword concatenation:
> A text–to–speech engine uses subword concatenation to link short digital–audio segments together and performs inter–segment smoothing to produce a continuous sound. In diphone concatenation for example, each segment consists of two phonemes, one that leads into the sound and one that finishes the sound. Thus, the word "hello" consists of the phonemes, h – eh – l – oe. The corresponding subword segments are silence–h – h–eh – eh–l – l–oe – oe–silence. Subword segments are created by recording many hours of a human voice and carefully identifying the beginning and ending of phonemes. Although this technique can produce a more realistic voice, it takes a considerable amount of work to create a new voice and the voice is not easily localizable, as the phonemes are specific to the speaker's language.

 Back to top

Why use text to speech?

Text to speech (TTS) should be used to audibly communicate information to the user, when digital audio recordings are inadequate. Generally, text to speech is better than audio recordings when:

- Audio recordings are too large to store on disk or too expensive to record.
- Audio recording is not possible, as the application doesn't know ahead of time what it will speak.

Text to speech also offers a number of benefits. In general, text to speech is most useful for short phrases or for situations when prerecording is not practical. Text to speech has the following practical uses:

- Reading dynamic text
- Proofreading
- Conserving storage space
- Notifying the user of events
- Providing audible feedback

Reading dynamic text:
Text to speech is useful for phrases that vary too much to record and store each possible alternative. For example, speaking the time is a good use for text to speech, because the effort and storage involved in concatenating all possible times is manageable.

Proofreading:
Audible proofreading of text and numbers helps catch typing errors missed by visual proofreading.

Conserving storage space:
Text to speech is useful for phrases that would occupy too much storage space if they were prerecorded in digital–audio format.

Notifying the user of events:
Text to speech works well for informational messages. For example, to inform the user that a print job is complete, an application could say "printing complete" rather than displaying a message box and requiring the user to click the OK button.
Note: This should be used for noncritical notifications, as the user may have turned off the computer's sound, or may be physically out of hearing range.

Providing audible feedback:
Text to speech can provide audible feedback when visual feedback is inadequate or impossible. For example, the user's eyes might be busy with another task, such as transcribing data from a paper document. Users who have low vision could be reliant on text to speech as primary feedback mechanism from the computer.

 Back to top

© 1995-2000 Microsoft Corporation. All rights reserved.

---

[This is preliminary documentation and subject to change.] 

Introduction

The following section covers:

- Introducing the text-to-speech architecture
- Text-to-speech implementation considerations
- Application design considerations

Introducing the text-to-speech architecture

SAPI 5.0 compliant applications use the ISpVoice interface methods to access and control the text-to-speech features.

The ISpVoice interface Speak method is used to create the synthesized output of the engine.

SAPI 5.0 compliant applications can speak synchronously or asynchronously. It is possible to have the speak call speak text files and mix TTS synthesis text with audio files. Applications select text-to-speech voices by implementing the ISpVoice interface SetVoice method.

SAPI 5.0 enables the Extensible Markup Language (XML) to configure the settings for state of the voice (characteristics such as rate, pitch, and speed). Applications can use XML when calling the ISpVoice interface Speak method. Voices can be assigned different priorities using the ISpVoice::SetPriority, and voices with a higher priority will interrupt a voice with a lower priority. Additional information about SAPI 5.0 XML tagging is located at Text synthesis.

Application drivers for the SAPI speech synthesis (text to speech) engine implement the ISpTTSEngine interface. The primary method called by SAPI to perform speech rendering is ISpTTSEngine::Speak. SAPI, rather than the engine, performs XML parsing of the input text stream. The engine's Speak method is handed a linked list of text fragments with their associated XML attribute states. The Speak method also receives a pointer to the ISpVoice's ISpTTSEngineSite interface. The TTS engine uses this interface to queue events and to write output data.

Although SAPI 5.0 is a free-threaded architecture, instances of the TTS engine will always be called by SAPI on a single thread. TTS engines are never directly accessed by applications.

 Back to top

Text-to-speech implementation considerations

The following section covers:

- Text-to-speech voice quality
- Creating and localizing text-to-speech voices
- Registering text-to-speech voices

Text-to-speech voice quality

Most text-to-speech (TTS) engines can render individual words successfully. However, as soon as the engine speaks a sentence, it is easy to identify the voice as synthesized because it lacks human prosody (i.e., the inflection, accent, and timing that is commonly present in human speech communications.) For this reason, text-to-speech voices are often difficult to listen to and require concentration to understand, especially for more than a few words at a time.

Some TTS engines allow an application to define TTS segments with human prosody attached, making the synthesized voice much clearer. The engine provides this capability by pre-recording a human voice and allowing the application developer to transfer its intonation and speed to the text being spoken.

In effect, this acts as a highly effective voice compression algorithm. Although text with prosody attached requires more storage than ASCII text (approximately 1 kilobyte per minute compared to a few hundred bytes per minute), it requires considerably less storage than pre-recorded speech, which requires at least 30 kilobytes per minute. The following list of TTS factors also influence the quality of a synthesized voice:

- Emotion:
    Although many TTS engines can parse and interpret punctuation, such as periods, commas, exclamation points, and questions, none of the engines that are currently available can render the sound of human emotion.

o Mispronunciation:
Text-to-speech engines use a set of pronunciation rules to translate text into phonemes. This is fairly easy for languages with phonetic alphabets, but it is very difficult for the English language, especially if last names are to be pronounced correctly. (Pronunciation rules seldom fail on common words, but often yield unsuccessful results on names that are unusual or of non-English origin.)

Creating and localizing text-to-speech voices

Creating a new voice for an engine that uses synthesis can be done relatively quickly by altering a few parameters of an existing voice. Although the pitch and timbre of the new voice are different, it uses the same speaking style and prosody rules as the existing voice.

Creating a new voice for a TTS engine that uses diphone concatenation can take a considerable amount of work. This is because the diphones must be acquired by recording a human voice and identifying the beginning and ending of phonemes, which are specific to the speaker's language.

Whether a text-to-speech engine uses synthesis or diphone concatenation, the work of localizing an engine for a new language requires a skilled linguist to design pronunciation and prosody rules and reprogram the engine to simulate the sound of the language's phonemes. In addition, diphone concatenation systems require a new voice to be constructed for the new language. As a result, most engines support only five to ten major languages.

Registering text-to-speech voices

In order to register a new voice, the user will need to specify the CLSID (Class ID). This specifies the object that is created when the ISpVoice object is created. For example, this could be the engine in the text-to-speech development environment.

In the registry, the Microsoft TTS Voices have a VoiceData and a VoiceDef field. These are proprietary fields that are specific to the Microsoft engine and define where the voice data are located. These can be changed to company specific proprietary names. These values are accessible from the engine upon creation using the SetObjectToken method.

The Attributes field contains information associated with the TTS engine. However, in the SAPI 5.0 release the properties of this field have not been completely defined. It is important that the word "Default" appear as one of the registered voices. Microsoft has not specified the type of information, or the format of this field. Thus, all information associated with this field is subject to change in a future release. The locale name (LCID) of the voice is 409 and is intended for UI purposes only.

Engine developers are required to register the voices for their engine and include the following four fields in the registry:

1. Default The default voice for the engine.
2. 409 The engine name as displayed in the locale identifier (LCID).
3. Attributes The text string containing the TTS engine voice information.
4. CLSID The class identifier (CLSID) for the TTS engine.

While it is possible to store other engine specific information within the registry, the above entries are required.

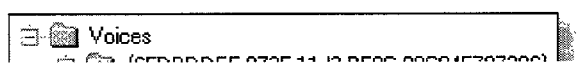

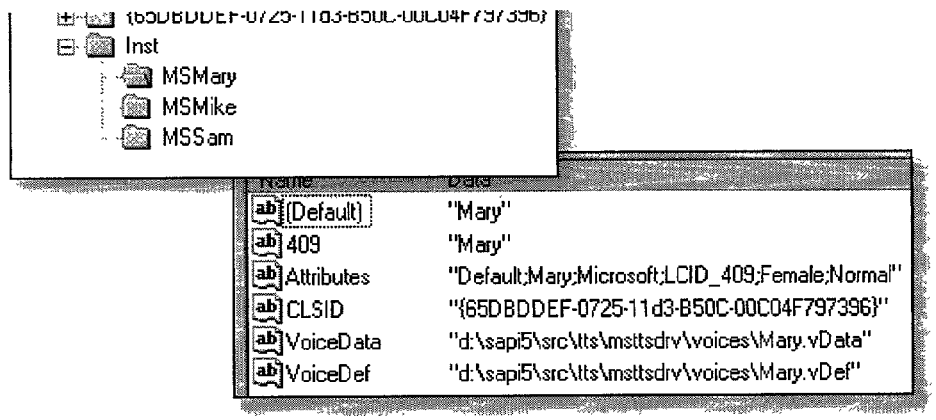

An example of the Microsoft TTS engine registries are shown above:

⊼ Back to top

Application design considerations

The following section covers:

- Using text to speech for short phrases
- Presenting important information visually
- Avoiding a mix of text to speech and recorded voice
- Making text to speech optional

Using text to speech for short phrases
    An application should use text to speech only for reading short phrases or notifications, not long passages of text. Listening to a synthesized voice read more than a few sentences requires more concentration and a user can become distracted.

Presenting important information visually
    An application should communicate critical information visually as well as audibly, and it should not rely solely on text to speech to communicate important information. The user can miss spoken messages for a variety of reasons, such as not having speakers or headphones attached to the computer, being distracted, or being physically away from the computer when the application speaks. Or the user may have simply turned off text to speech.

Avoiding a mix of text to speech and recorded voice
    The synthesized voice provided by even the best text-to-speech engine is noticeably different from that provided by a digital-audio recording. Mixing the two in the same utterance can be disturbing to the user and usually makes the text-to-speech voice sound worse by comparison. For example, to have an application speak "The number is 56,738," the user should not prerecord "The number is" then use text to speech to speak the numbers. Everything should be either prerecorded or text to speech.

Making text to speech optional
    Applications should enable the user to turn off the text-to-speech feature. Some users work in environments where audible speech or sound eminating from a computer could distract coworkers. Additionally, it may be undesirable to audibly share computer information with others in the work environment.

⊼ Back to top

Text synthesis

SAPI 5.0 utilizes the Extensible Markup Language (XML) to define text synthesis characteristics and application configuration settings.

A text-to-speech (TTS) engine that uses synthesis generates sounds similar to those created by the human voice and applies various filters to simulate throat length, mouth cavity, lip shape, and tongue position. Although the voice produced through text synthesis often sounds less human than a voice produced by diphone concatenation, it is possible to obtain different qualities of voice through modifying TTS configuration settings. SAPI 5.0 compliant TTS engines can achieve improved synthesized text-to-speech voice qualities using XML to control the configuration settings for text synthesis.

The following section covers:

- Synthesis markup
- Scope of XML elements
- Context tag definition

© 1995-2000 Microsoft Corporation. All rights reserved.

[This is preliminary documentation and subject to change.] 

Synthesis markup

SAPI 5.0 synthesis markup is the collection of XML tags inserted into text to modify the speech synthesis of that text. These XML tags, which provide functionality such as volume control and word emphasis, are inserted into text passed into ISpVoice::Speak and text streams of format SPDFID_XML which are then passed into ISpVoice::SpeakStream. Please see ISpVoice for more information.

SAPI 5.0 synthesis markup is an application of XML. Every XML element consists of a start tag <Some_tag> and an end tag </Some_tag> with a case-sensitive tag name and contents between these tags. If the element is empty, it has no contents <Some_tag></Some_tag> and the start tag and the end tag might be the same <Some_tag/>. More information about XML and the XML specification is available at: http://www.w3.org/TR/1998/REC-xml-19980210.html.

The following section covers:

- SAPI 5.0 XML tags
- Attributes
- Contents
- Comments
- Relationship to HTML web pages and SABLE

SAPI 5.0 XML tags

SAPI 5.0 XML tags

XML tags in SAPI 5.0 follow a defined structure program scope and implementation. SAPI 5.0 XML tags have a specific purpose and affect the input text in a predetermined manner.

The SAPI 5.0 XML tags are divided into four different scope categories.

1. Non-scoped
2. Scoped
3. Global
4. Scoped/Global

The behavior and application-specific properties can be controlled through the use of XML tags. Additional information on SAPI 5.0 XML elements is available at: Scope of XML elements.

Attributes
Attributes of an XML element appear inside the start tag. Each attribute is in the form of a name, followed by an equal character, followed by a quoted string value. An attribute of a given name may only appear once in a start tag. Exact details on what characters may appear between quotes can be found at http://www.w3.org/TR/REC-xml#NT-AttValue.

Briefly, the literal string cannot contain a less than character "<" if the string is surrounded by single quotation marks, it cannot contain a single quotation mark. If the string is surrounded by double quotation marks it cannot contain a double quotation mark. Furthermore, all ampersands (&) can be used only in an entity reference such as & and ">". When a literal string is parsed, the resulting replacement text will resolve all entity references such as ">" into its corresponding text, such as ">".

In this specification, only the resulting replacement text needs to be defined for attribute value strings. The XML specification defines the exact file syntax details. Character references allow entity references in ASCII characters to specify replacement text which has unprintable characters such as extended UNICODE characters. The entity reference "ə" specifies the single UNICODE character for the International Phonetic Alphabet symbol for a mid-central unrounded vowel. See http://www.w3.org/TR/1998/REC-xml-19980210#sec-references for details.

Contents
The contents of an element consist of text or sub-elements. With these definitions, the XML specification defines the exact file syntax details.
Comments
Comments of the form <!-- my comment --> are supported. More information about comments and the XML specification is available at: http://www.w3.org/TR/REC-xml#sec-comments.

Relationship to HTML web pages and SABLE

The XML format that SAPI 5.0 uses is NOT placed inside web pages. Web page authors who want to mark up sections of HTML text so that it is synthesized correctly, should use the W3C Aural Cascading Style Sheets (ACSS). More information is available at: http://www.w3.org/TR/WD-acss SAPI applications that are synthesizing text from a web page will "render" HTML+ACSS into SAPI's synthesis markup format. Programs apply a default ACSS file when synthesizing web pages that do not have an associated ACSS file.

SAPI 5.0 synthesis markup format is similar to the format published by the SABLE Consortium. However, this format and SABLE version 1.0 are not interoperable. At this time, it's not determined if they will become partially interoperable in the future. More information about the SABLE specification is available at: http://www.bell-labs.com/project/tts/sable.html.

🔺 Back to top

© 1995-2000 Microsoft Corporation. All rights reserved.

[This is preliminary documentation and subject to change.] 

Scope of XML elements

SAPI Synthesis markup XML elements (tags) fall into one of four scope categories:

1. Non-scoped – an element which must be empty and does not directly affect the synthesis of input text around it.

Valid tag formats are: <TAG/>

2. Scoped – an element that contains input text, possibly zero-length, and only directly affects the input text that it contains. If this element is empty, it only directly affects the zero-length string it contains.

Valid tag formats are: <TAG>,<TAG/>

3. Global – an element which is empty and directly affects the rest of the input text following it in the input stream.

Valid tag formats are: <TAG/>

4. Scoped/Global – an element that can be used in either a scoped or global manner.

Valid tag formats are: <TAG/>,<TAG>,</TAG>

The following table describes the synthesis markup elements/tags which are functional across all SAPI compliant synthesis engines:

| Element | Scope | Attributes | Description |
|---|---|---|---|
| BOOKMARK | Non-scoped | MARK | Inserts a bookmark. |
| SILENCE | non-scoped | MSEC | Inserts silence for a specified number of milliseconds. |
| EMPH | Scoped | None | Places emphasis on words. |
| SPELL | Scoped | None | Spells out words letter by letter. |
| PRON | Scoped/Non- | SYM | Pronounces according to International |

| | | | |
|---|---|---|---|
| | scoped | | Phonetic Alphabet. |
| SAPI | Scoped | None | Indicates to the XML parser that the XML tags contained within the scope should be parsed as SAPI tags. |
| LANG | Scoped/Global | LANGID | Language/locale of contained text. |
| PARTOFSP | Scoped | PART | Part of speech of contained word(s). |
| VOICE | Scoped/Global | REQUIRED, OPTIONAL | Sets which voice implementation is used for synthesis. |
| RATE | Scoped/Global | SPEED, ABSSPEED | Sets the relative adjustment for speaking speed of synthesized speech. |
| VOLUME | Scoped/Global | LEVEL | Sets the volume of synthesized output. |
| PITCH | Scoped/Global | MIDDLE, ABSMIDDLE | Sets the relative pitch adjustment of synthesized speech. |
| CONTEXT | Scoped | Type | Context of the text that is being parsed. |

Guaranteed XML Elements

BOOKMARK
Inserts a bookmark into the input stream using the bookmark element. If an application specifies interest in bookmark events, it will receive an event when synthesis has passed this element in an input stream. If the audio output destination supports handling of events, then an application will receive this event once the synthesized speech up to this bookmark has been output. Otherwise, an application receives a bookmark event when the voice implementation has synthesized speech up to this bookmark.

*MARK*
The value of a bookmark may be any string or integer.

⊼ Back to top

SILENCE
Produces silence for a specified number of milliseconds to the output audio stream.

*MESC*
Number of milliseconds, from zero to 65535, of silence. Value entries that exceed this range should be limited to 65535. Value entries that are below this range (negative values) should be set to zero.

⊼ Back to top

EMPH
Places emphasis on the words contained by this element.

⊼ Back to top

SPELL
Spells out words letter by letter contained by this element.
Note: The engine should not normalize the text scoped in the SPELL tag. This includes numbers, words, etc. Words that contain punctuation, such as "U.S.A." should spell out the letters as well as the punctuation scoped within the tag.

⊼ Back to top

PRON
    Pronounces the contained text (possibly empty) according to the provided Unicode string.
    See American English Phoneme Representation for more information.

*SYM*
    String representing a phoneme for a language supported by the voice implementing synthesized speech.

⤒ Back to top

SAPI
    At the beginning of the SAPI tag, the state of the voice is the same state as the insertion point of the SAPI tag. At the close of the SAPI tag, the voice returns to the same state as that of the insertion point. SAPI tags may be nested. When a nested SAPI tag is closed, the voice state returns to what it was at the insertion point of the nested tag.

⤒ Back to top

LANG
    Changes the LANGID of the scoped text. When the LANGID is changed, SAPI will try to detect if the current voice can handle the new language.

If voice does not speak the specified language, then an engine must choose another language it speaks as a best attempt. Using the VOICE tag and REQUIRED attribute, this fall back path can be prevented if not desirable.

*LANGID*
    Language identifier.

⤒ Back to top

PARTOFSP
    The part of speech of contained word(s). The PARTOFSP tag is used to force a particular pronunciation of a word (for example, the word record as a *noun* versus the word record as a *verb*).

*PART*
    String name of part of speech. Following are valid parts of speech:
- noun
- verb
- modifier
- function
- interjection
- abbreviation
- unknown ⤒ Back to top

VOICE
    Sets which voice implementation is used for synthesis of associated input stream text. If the user specifies a voice ID, then a specific voice implementation will be selected, otherwise the best voice implementation given the required and optional attributes will be selected by SAPI.

*ID*
The progID (class ID) of a component supporting the ISpTTSEngine interface that provides a voice implementation. This attribute takes precedence over the REQUIRED/OPTIONAL attributes if used together. If the specific voice progID is not found on the system, the XML parser will do a best match based on the REQUIRED/OPTIONAL attributes. If these attributes are not specified, the XML parser uses the default voice.

*REQUIRED*
The XML parser selects the first voice registered containing all of the specified attributes. A string that contains semicolon-delimited sub-strings is used to specify the attributes. The speak call will fail if the parser cannot find the required tags.

The following are required attributes:

- name
- age group
- vendor
- language
- gender
- CLSID

*OPTIONAL*
The XML parser selects the first voice registered containing all of the REQUIRED attributes, and has the best match to the specified OPTIONAL attributes. Optional attribute importance is specified by the order that they appear in the string. The first sub-string is the most important. A string that contains semicolon-';'delimited sub-strings is used to specify the optional attributes.

The optional attributes are:

- name
- age group
- vendor
- language
- gender
- CLSID
- description

↖ Back to top

VOLUME, PITCH, RATE

The scoped/global elements, VOLUME, RATE and PITCH respectively, modify the underlying numerical values of a speech block. Relative attribute values, those preceded by a dash (-) or a plus sign (+), increment the underlying numerical value by the specified amount.
For VOLUME, the underlying value can never be below zero or exceed 100. All negative value entries will result in zero and all values above 100 will result in 100. VOLUME may also receive an absolute value (no '-' or '+' character) of an integer between zero and 100. For PITCH and RATE, SAPI compliant engines have the option of supporting only the guaranteed range of values and behaving as -10 for adjustments below -10 and behaving as +10 for values above +10.

| Element | Attribute | Valid Strings | Guaranteed Range |
|---------|-----------|---------------|------------------|
| VOLUME | LEVEL | "N" | 0 to 100 (no overflow allowed) |
| PITCH | MIDDLE | "-N" or "+N" | -10 to 10 (overflow allowed) |
| RATE | SPEED | "-N" or "+N" | (overflow allowed) |

↥ Back to top

VOLUME
Set the volume of synthesized output.

*LEVEL*
Specifies the volume as percent of the maximum volume of the current voice. Each voice implementation has its own maximum volume. This value must be between zero and 100 inclusive.

↥ Back to top

PITCH
Sets the relative pitch adjustment of synthesized speech.

*MIDDLE*
The value can range from -10 to +10. A value of zero sets a voice to speak at its default pitch. A value of -10 sets a voice to speak at three fourths (or 3/4) of its default pitch. A value of +10 sets a voice to speak at four thirds (or 4/3) of its default pitch. Each increment between -10 and +10 is logarithmically distributed such that incrementing/decrementing by one is multiplying/dividing the pitch by the 24th root of two (about 1.03). Values more extreme than -10 and +10 will be passed to an engine, but SAPI 5.0 compliant engines may not support such extremes and instead may clip the pitch to the maximum or minimum pitch it supports. Values of -24 and +24 must lower and raise pitch by one octave respectively. All incrementing/decrementing by one must multiply/divide the pitch by the 24th root of two. When scoped, this attribute is relative.

The following is an example of the <PITCH> tag and the MIDDLE attribute.

```
<SAPI>Pitch adjustment zero,
    <PITCH MIDDLE="-3">pitch adjustment -3,
        <PITCH MIDDLE="-3">pitch adjustment -6,</PITCH>
    back to adjustment -3,
    </PITCH>
and back to adjustment zero, the default pitch.
</SAPI>
```

*ABSMIDDLE*

The value can range from -10 to +10. A value of zero sets a voice to speak at its default pitch. A value of -10 sets a voice to speak at three-fourths (or 3/4) of its default pitch. A value of +10 sets a voice to speak at four-thirds (or 4/3) of its default pitch. Each increment between -10 and +10 is logarithmically distributed such that incrementing/decrementing by one is multiplying/dividing the pitch by the 24th root of two (about 1.03). Values more extreme than -10 and 10 will be passed to an engine but compliant engines may not support such extremes and instead may clip the pitch to the maximum or minimum pitch it supports. Values of -24 and +2SAPI 54 must lower and maximum or minimum pitch it supports. Values of -24 and +2SAPI 54 must lower and raise pitch by one octave respectively. All incrementing/decrementing by one must multiply/divide the pitch by the 24th root of two. When scoped, this attribute is absolute.

The following is an example of the <PITCH> tag and the ABSMIDDLE attribute.

```
<SAPI>Pitch adjustment zero,
        <PITCH ABSMIDDLE="-3">pitch adjustment -3,
                <PITCH ABSMIDDLE ="-3">pitch adjustment -3,
                </PITCH>
        back to adjustment -3,
        </PITCH>
and back to adjustment zero, the default pitch.
</SAPI>
```

⇱ Back to top

RATE

Sets the relative speed adjustment at which words are synthesized.

*SPEED*

The value can range from -10 to +10. A value of zero sets a voice to speak at its default rate. A value of -10 sets a voice to speak at one-third of its default rate. A value of +10 sets a voice to speak at three times its default rate. Each increment between -10 and +10 is logarithmically distributed such that incrementing/decrementing by one is multiplying/dividing the rate by the tenth root of three (about 1.12). Values more extreme than -10 and +10 will be passed to an engine but SAPI 5.0 compliant engines may not support such extremes and instead may clip the rate to the maximum or minimum rate it supports.

The following is an example of the <RATE> tag and the SPEED attribute:

```
<SAPI>Rate adjustment zero,
        <RATE SPEED="-3">rate adjustment -3,
                <RATE SPEED="-4">rate adjustment -7,
                </RATE>
        back to adjustment -3,
        </RATE>
and back to adjustment zero, the default rate.
</SAPI>
```

*ABSSPEED*

The value can range from -10 to +10. A value of zero sets a voice to speak at its default rate. A value of -10 sets a voice to speak at one-third (or 1/3) of its default rate. A value of +10 sets a voice to speak at three times its default rate. Each increment between -10 and +10 is logarithmically distributed such that incrementing/decrementing by one is multiplying/dividing the rate by the 10th root of three (about 1.12). Values more extreme than -10 and +10 will be passed to an engine, but SAPI 5.0 compliant engines may not support such extremes and instead may clip the rate to the maximum or minimum rate it supports. When scoped, this attribute is absolute.

The following is an example of the <RATE> tag and the ABSSPEED attribute:

```
<SAPI>Rate adjustment zero,
        <RATE ABSSPEED="-3">rate adjustment -3,
                <RATE ABSSPEED="-4">rate adjustment -4,
                </RATE>
        back to adjustment -3,
        </RATE>
```

```
and back to adjustment zero, the default rate.
</SAPI>
```

⌅ Back to top

CONTEXT

Context specifies the type of normalization rules which to apply to the scoped text. SAPI does not guarantee any predefined contexts. For additional information, please see Context tag definition.

*ID*
This specifies the type of context.

SAPI predefined context IDs

| | Context type |
|---|---|
| Date | date_mdy<br>date_dmy<br>date_ymd<br>date_ym<br>date_my<br>date_dm<br>date_md<br>date_year |
| Time | time |
| Number | number_cardinal<br>number_digit<br>number_fraction<br>number_decimal |
| Phone_Number | phone_number |
| Currency | currency |
| Web | web_url<br>web_email |
| Postal | postal<br>address_postal |

⌅ Back to top

Context tag definition

The CONTEXT tag specifies the normalization of a block of text. This specification defines the SAPI predefined attributes (ID) for the CONTEXT tag. These IDs are strings. SAPI does not perform any parameter validation on the string passed to the engine, hence, the application can specify engine-specific normalization IDs to the engine. Engine-specific strings should begin with the engine vendor's name to avoid confusion between engines.

For example:

<CONTEXT ID = "MS_My_Context"> text </CONTEXT>

The exact implementation of some of these values is dependent on the engine in SAPI 5. In order to force a certain normalization, the application developer may choose to use another SAPI tag, an engine specific ID, or normalize the text themselves. Each context tag may contain more than one string.

For example:

<CONTEXT ID = "date_mdy"> 12/21/99 11/21/99 10/21/99 </CONTEXT>
would be normalized to "December twenty first nineteen ninety nine November twenty first nineteen ninety nine October twenty first nineteen ninety nine."

Note: In SAPI 5.0 the exact implementation of some of these values depends on the engine. In order to force a certain normalization, the application developer may choose to use another SAPI tag or an engine specific ID. The developer may choose to normalize the text.

The following predefined context types are covered in this section:

- Date
- Time
- Number
- Phone_Number
- Currency
- Web
- E-mail
- Address

Date

This context specifies that the number passed to the engine is a date. Dates will generally have the format of number [delimiter] number [delimiter] number or number [delimiter] number where the delimiter may be a '.', '/' or '-', and numbers are typically between 01 and 12 for months, 01 and 31 for days. A year is generally a two or four digit number.
The following are valid string types:

date_mdy
This will normalize the date such that the first group of numbers is the month, the second group is the day, and the third group is the year. In the case where the year is a two digit number, the engine may read it as a two digit number or a four digit number.

For example:

```
<context ID = "date_mdy">12/21/99</context>
```
will be normalized to "December twenty first ninety nine"
or "December twenty first nineteen ninety nine"

```
<context ID = "date_mdy">12/21/1999</context>
```
will be normalized to "December twenty first nineteen ninety nine"

↖ Back to top date_dmy

This will normalize the date such that the first group of numbers is the day, the second group is the month, and the third group is the year. In the case where the year is a two digit number, the engine should read it as a two digit number. If the year is represented as a four digit number, it will be represented as a four digit year.

For example:

```
<context ID = "date_dmy">21.12.99</context>
```
will be normalized to "December twenty first ninety nine"
or "December twenty first nineteen ninety nine"

```
<context ID = "date_ dmy">21-12-1999</context>
```
will be normalized to "December twenty first nineteen ninety nine"

↖ Back to top date_ymd

This will normalize the date such that the first group of numbers is the year, the second group is the month, and the third group is the day. In the case where the year is a two digit number, the engine should read it as a two digit number. If the year is represented as a four digit number, it will be represented as a four digit year.

For example:

```
<context ID = "date_ymd">99-12-21</context>
```
will be normalized to "December twenty first ninety nine"
or "December twenty first nineteen ninety nine"

```
<context ID = "date_ ymd">1999.12.21</context>
```
will be normalized to "December twenty first nineteen ninety nine"

↖ Back to top date_ym

This will normalize the date such that the first group of numbers is the year, and the second group is the month. In the case where the year is a two digit number, the engine should read it as a two digit number. If the year is represented as a four digit number, it will be represented as a four digit year.

For example:

```
<context ID = "date_ym">99-12</context>
```
will be normalized to "December ninety nine"
or "December nineteen ninety nine"

```
<context ID = "date_ym">1999.12</context>
```
will be normalized to "December nineteen ninety nine"

⤒ Back to top date_my

This will normalize the date such that the first group of numbers is the month, and the second group is the year. In the case where the year is a two digit number, the engine should read it as a two digit number. If the year is represented as a four digit number, it will be represented as a four digit year.

For example:

```
<context ID = "date_my">12/99</context>
```
will be normalized to "December ninety nine"
or "December nineteen ninety nine"

```
<context ID = "date_my">12/1999</context>
```
will be normalized to "December nineteen ninety nine"

⤒ Back to top date_dm

This will normalize the date such that the first group of numbers is the day and the second group is the month.

For example:

```
<context ID = "date_dm">21.12</context>
```
will be normalized to "December twenty first"

⤒ Back to top date_md

This will normalize the date such that the first group of numbers is the month and the second group is the day.

For example:

```
<context ID = "date_md">12/21</context>
```
will be normalized to "December twenty first"

⤒ Back to top date_year

This will normalize the date such that the number is read as a year.

For example:

```
<context ID = "date_year">1999</context>
```
will be normalized to "nineteen ninety nine"

\<context ID = "date_year">2001\</context>
will be normalized to "Two thousand one"

↖ Back to top

Time

This context specifies that the number passed to the engine is a time. Times will generally have the format of number [delimiter] number [delimiter] number or number [delimiter] number where the delimiter is ':' or ' ' ' or ' " ' and numbers are typically between 01 and 24 for hours, 01 and 59 for minutes and seconds.

When a zero is present in numbers between 01 and 09, the engine may choose to ignore this, or normalize it as "oh". The engine may also choose to place an "and" in the normalized time. The valid string types are:

For example:

\<context ID = "time">12:30\</context>
will be normalized to "twelve thirty"

\<context ID = "time">01:21\</context>
may be normalized as "one twenty one"
or "oh one twenty one"

\<context ID = "time">1'21"\</context>
may be normalized as "one minute twenty one seconds"
or "one minute and twenty one seconds"

↖ Back to top

Number number_cardinal
The text should be normalized as a number using the regular format of ones, tens, etc. The engine may choose to place "and" in the normalized text.

For example:

\<context ID = "number_cardinal">3432\</context>
will be normalized to "three thousand four hundred thirty two"

\<context ID = "number_cardinal">3432\</context>
will be normalized to "three thousand four hundred and thirty two"

↖ Back to top number_digit
The text should be normalized digit by digit.

For example:

<context ID = "number_digit">3432</context>
will be normalized to "three four three two"

⊼ Back to top number_fraction
The text should be normalized as a fraction.

For example:

<context ID = "number_fraction">3/15</context>
will be normalized to "three fifteenths" or "three over fifteen"

⊼ Back to top number_decimal
The text should be normalized as a decimal value.

For example:

<context ID = "number_decimal">423.1243</context>
will be normalized to "four hundred and twenty three point one two four three"

⊼ Back to top

Phone_Number
The text should be normalized as a phone number. The exact implementation of this will be left to the engine and maybe defined in a future release of SAPI.

⊼ Back to top

Currency
The text should be normalized as a currency. The exact implementation of this will be left to the engine and maybe defined in a future release of SAPI.

For example:

<context ID = "currency">$34.90</context>
will be normalized to "thirty four dollars and ninety cents"

⊼ Back to top

Web

The text should be normalized as a url. The exact implementation of this will be left to the engine and maybe defined in a future release of SAPI.

web_url

For example:

<context ID = "web_url">www.Microsoft.com</context> will be normalized to "may be normalized to "w w w dot Microsoft dot com"

↥ Back to top

E-mail

The text should be normalized as e-mail. The exact implementation of this will be left to the engine and maybe defined in a future release of SAPI.

E-mail_address
The text should be normalized as an e-mail address. The exact implementation of this will be left to the engine and maybe defined in a future release of SAPI.

For example:

<context ID = "E-mail_Address">someone@microsoft.com</context>
may be normalized to "Someone at Microsoft dot com"

↥ Back to top

Address

The text should be normalized as an address. The exact implementation of this will be left to the engine and maybe defined in a future release of SAPI.

For example:

<context ID = "address">One Microsoft Way, Redmond, WA, 98052</context>
will be normalized to "One Microsoft Way Redmond Washington nine eight zero five two"

address_postal
The text should be normalized as a postal address. The exact implementation of this will be left to the engine and maybe defined in a future release of SAPI.

For example:

<context ID = "address_postal">A2C 4X5</context>
will be normalized to "A 2 C 4 X 5"

↥ Back to top

© 1995-2000 Microsoft Corporation All rights reserved

Microsoft Speech SDK 
with SAPI 5.0

[This is preliminary documentation and subject to change.]

ISpVoice

The ISpVoice interface enables an application to perform text synthesis operations.

When to Use

An application uses the ISpVoice interface to communicate with a SAPI-compliant TTS engine. The ISpVoice::Speak method creates a synthesized output using the engine. It is possible for an application to speak text files or mix synthesized text with audio files in addition to text streams. An application can do this by speaking synchronously or asynchronously.

Applications can choose a specific TTS voice using the ISpVoice::SetVoice. In order to change the state of the voice (for example, rate, pitch, and volume), use XML inside the ::speak call. Voices can receive different priorities using the ISpVoice::SetPriority. This allows voices with a higher priority to interrupt a voice with a lower priority.

SAPI returns synthesis events to the application informing the application that the engine has processed a certain event such as bookmarks or phonemes.

ISpVoice inherits from the ISpEventSource interface.

Methods in Vtable Order

| ISpVoice Methods | Description |
| --- | --- |
| SetOutput | Sets the current output destination. |
| GetOutputObjectToken | Retrieves the current output stream object token. |
| GetOutputStream | Retrieves a pointer to an output stream. |
| Pause | Pauses the voice and closes the output device. |
| Resume | Sets the output device to the RUN state and resumes rendering. |
| SetVoice | Sets the identity of a voice used in text synthesis. |
| GetVoice | Retrieves the engine voice token information. |
| Speak | Enables the engine to speak the contents of a speak a text buffer. |
| SpeakStream | Enables the engine to speak the contents of a stream. |
| GetStatus | Retrieves the current rendering and event status associated with this voice. |
| Skip | Enables the engine to skip ahead the specified number of items within the current speak request. |
| SetPriority | Sets the queue priority for a voice. |
| GetPriority | Retrieves the current voice priority level. |
| SetAlertBoundary | Specifies which event should be used as the insertion point for alerts. |
| GetAlertBoundary | Retrieves which event should be used as the insertion point for alerts. |
| SetRate | Sets the engine's rate of spoken text. |
| GetRate | Retrieves the engine's rate of spoken text. |

| | |
|---|---|
| SetVolume | Sets the output volume level. |
| GetVolume | Retrieves the current output volume level. |
| WaitUntilDone | Specifies the time interval to wait for the speech queue to complete processing. |
| SetSyncSpeakTimeout | Sets the timeout interval for synchronous speech operations. |
| GetSyncSpeakTimeout | Retrieves the timeout interval for synchronous speech operations. |
| SpeakCompleteEvent | Returns an event handle used to wait until the voice has completed speaking. |
| IsUISupported | Determines if the specified type of UI is supported. |
| DisplayUI | Displays the requested UI. |

© 1995-2000 Microsoft Corporation. All rights reserved

[This is preliminary documentation and subject to change.]

ISpVoice::SetOutput

ISpVoice::SetOutput sets the current output destination. Output may be in the form of audio or text.

```
SetOutput(
    IUnknown    *pUnkOutput,
    BOOL        fAllowFormatChanges
);
```

Parameters

*pUnkOutput*
    [in] Address of an IUnknown interface containing the output stream destination information.
*fAllowFormatChanges*
    [in] Flag specifying whether the stream is set to allow format changes.

Return values

| Value | Description |
|---|---|
| S_OK | Function completed successfully. |
| E_INVALIDARG | One or more arguments are invalid. |
| E_POINTER | Invalid pointer. |
| E_OUTOFMEMORY | Exceeded available memory. |

ISpVoice::GetOutputObjectToken

ISpVoice::GetOutputObjectToken retrieves the current output stream object token.

```
HRESULT GetOutputObjectToken(
    ISpObjectToken    **ppObjectToken
);
```

Parameters

*ppObjectToken*
    [out] Address of the ISpObjectToken that receives the output stream object token.

Return values

| Value | Description |
| --- | --- |
| S_OK | Function completed successfully. |
| E_INVALIDARG | One or more arguments are invalid. |
| FAILED (hr) | Appropriate error message. |

© 1995-2000 Microsoft Corporation. All rights

---

[This is preliminary documentation and subject to change.]

ISpVoice::GetOutputStream

ISpVoice::GetOutputStream retrieves a pointer to an output stream.

```
HRESULT GetOutputStream(
    ISpStreamFormat    **ppStream
);
```

Parameters

*ppStream*
    [out] Address of a pointer to an ISpStreamFormat that receives the output stream.

Return values

| Value | Description |
| --- | --- |
| S_OK | Function completed successfully. |
| E_INVALIDARG | One or more arguments are invalid. |
| FAILED (hr) | Appropriate error message. |

ISpVoice::Pause

ISpVoice::Pause pauses the voice and closes the output device.

```
HRESULT Pause ( void );
```

Parameters

None.

Return values

| Value | Description |
|---|---|
| S_OK | Function completed successfully. |
| FAILED(hr) | Appropriate error message. |

© 1995-2000 Microsoft Corporation. A

[This is preliminary documentation and subject to change.]

ISpVoice::Resume

ISpVoice::Resume sets the output device to the RUN state and resumes rendering.

```
HRESULT Resume ( void );
```

Parameters

None.

Return values

| Value | Description |
|---|---|
| S_OK | Function completed successfully. |
| FAILED (hr) | Appropriate error message. |

© 1995-2000 Microsoft Corporation.

[This is preliminary documentation and subject to change.]

ISpVoice::SetVoice

ISpVoice::SetVoice sets the identity of a voice used in text synthesis.

```
HRESULT SetVoice(
    ISpObjectToken   *pToken
);
```

Parameters

*pToken*
    [in] Address of the ISpObjectToken interface containing the voice implementation to be used in the synthesis operation for this ISpVoice instance. The system default voice is selected if this pointer is NULL.

Return values

| Value | Description |
| --- | --- |
| S_OK | Function completed successfully. |
| E_INVALIDARG | One or more arguments are invalid. |
| E_POINTER | Invalid pointer. |

Remarks

- Changing the voice selection will preserve the same volume and rate levels for a voice.
- If the SetVoice method is not called, the first call into the ISpVoice interface requiring a voice implementation will initialize it. This results in the default voice for the system to be chosen and initialized for this ISpVoice instance.

© 1995-2000 Microsoft Corporation. All rights reserved

---

[This is preliminary documentation and subject to change.] 

ISpVoice::GetVoice

ISpVoice::GetVoice retrieves the voice identity used in text synthesis.

```
HRESULT GetVoice(
    ISpObjectToken   **ppToken
);
```

Parameters

*ppToken*
    [out] Address of a pointer to the ISpObjectToken object representing the synthesized voice implementation used for this ISpVoice instance.

Return values

| Value | Description |
| --- | --- |
| S_OK | Function completed successfully. |

| | |
|---|---|
| E_INVALIDARG | One or more arguments are invalid. |
| E_POINTER | Invalid pointer. |

Note:

If there is an error in the initialization of GetVoice, the error returned will not occur until Speak or SpeakStream methods are called.

© 1995-2000 Microsoft Corporation All rights reserved

---

[This is preliminary documentation and subject to change.] 

ISpVoice::Speak

ISpVoice::Speak enables the engine to speak the contents of a stream.

This stream may be a text file, text buffer, wav file or other streaming source.

```
HRESULT Speak(
    const WCHAR    *pwcs,
    DWORD          dwFlags,
    ULONG          *pulStreamNumber
);
```

Parameters

*pwcs*
   [in, string] Address of a buffer null-terminated text string containing the synthesis markup to be synthesized. This value can be NULL when *dwFlags* is set to SPF_PURGEBEFORESPEAK indicating that the audio data currently being sent to the audio destination is to be purged and the synthesis process stopped.

*dwFlags*
   [in] Value indicating the attributes of the text stream. These values are contained in the SPEAKFLAGS enumeration.

*pulStreamNumber*
   [out] Address of a value specifying the current input stream number associated with this Speak instance.

Return values

| Value | Description |
|---|---|
| S_OK | Function completed successfully. |
| E_INVALIDARG | One or more arguments are invalid. |
| E_POINTER | Invalid pointer. |
| E_OUTOFMEMORY | Exceeded available memory. |
| SPERR_INVALID_FLAGS | Invalid flags specified for this operation. |
| SPERR_DEVICE_BUSY | Timeout occurred on synchronous call. |

Remarks

- The first call into ISpVoice::Speak or ISpVoice::SpeakStream for an ISpVoice instance will be assigned a stream number of zero. Every subsequent call to Speak and SpeakStream is assigned one plus the stream number of the previous call to either Speak or SpeakStream (relative to the ISpVoice instance, not the calling thread).
- If there is an error in the initialization of ISpVoice::GetVoice, the error returned will not occur until ISpVoice::Speak or ISpVoice::SpeakStream methods are called.

© 1995-2000 Microsoft Corporation. All rights reserved

[This is preliminary documentation and subject to change.] 

ISpVoice::SpeakStream

ISpVoice::SpeakStream enables the engine to speak the contents of a stream.

```
HRESULT SpeakStream(
    IStream    *pStream,
    DWORD      dwFlags,
    ULONG      *pulStreamNumber
);
```

Parameters

*pStream*
    [in] Address of an IStream interface containing the input stream. If the ISpStreamFormat interface is not supported the input stream format type is specified as *SPFID_Text*.

*dwFlags*
    [in] Value indicating the attributes of the text stream. These values are contained in the SPEAKFLAGS enumeration.

*pulStreamNumber*
    [out] Address of a variable that receives the current input stream number associated with this SpeakStream instance.

Return values

| Value | Description |
| --- | --- |
| S_OK | Function completed successfully. |
| E_INVALIDARG | One or more arguments are invalid. |
| E_POINTER | Invalid pointer. |
| E_OUTOFMEMORY | Exceeded available memory. |
| SPERR_INVALID_FLAGS | Invalid flags specified for this operation. |
| SPERR_DEVICE_BUSY | Timeout on synchronous call. |

Remarks

- If the input stream is wav data, it is sent directly to the destination stream.
- If the input stream is text data, it is processed by the text-to-speech (TTS) engine.
- The first call into Speak or SpeakStream for an ISpVoice instance will be assigned a stream number of zero. Every subsequent call to Speak and SpeakStream is assigned one stream number of zero. Every subsequent call to Speak and SpeakStream is assigned one plus the stream number of the previous call to either Speak or SpeakStream (relative to the ISpVoice instance, not the calling thread).

© 1995-2000 Microsoft Corporation All rights reserved.

---

[This is preliminary documentation and subject to change.] 

ISpVoice::GetStatus

ISpVoice::GetStatus retrieves the current rendering and event status associated with this *ISpVoice* instance.

```
HRESULT GetStatus(
    SPVOICESTATUS   *pStatus,
    WCHAR           **ppszLastBookmark
);
```

Parameters

*pStatus*
  [out] Address of a SPVOICESTATUS structure receiving the status information. Optionally, this can be NULL if the caller does not want this information.
*ppszLastBookmark*
  [out, string] Address of a pointer to a CoTaskMemAlloc allocated null-terminated string containing the last bookmark reached. If there are no last bookmarks, then a NULL will returned. Applications implementing this method must call CoTaskMemFree() to free memory associated with this string. Optionally, this value can be NULL if this return value is not needed.

Return values

| Value | Description |
|---|---|
| S_OK | Function completed successfully. |
| E_INVALIDARG | One or more arguments are invalid. |
| E_POINTER | Invalid pointer. |
| E_OUTOFMEMORY | Exceeded available memory. |

© 1995-2000 Microsoft Corporation. All rights reserved

---

[This is preliminary documentation and subject to change.] 

ISpVoice::Skip

ISpVoice::Skip enables the engine to skip ahead the specified number of items within the current speak request.

```
HRESULT Skip(
    WCHAR   *pItemType,
    long    lNumItems,
```

```
    long    lNumItems,
    ULONG   *pulNumSkipped
);
```

Parameters

*pItemType*
    [in,string] Specifies the skipped speak request item type.
*lNumItems*
    [in] Specifies the number of items to skip in the current speak request.
*pulNumSkipped*
    [out] The actual number of items skipped.

Return values

| Value | Description |
| --- | --- |
| S_OK | Function completed successfully. |
| E_INVALIDARG | *pItemType* is invalid or bad. |
| FAILED (hr) | Appropriate error message. |

© 1995-2000 Microsoft Corporation. All rights reserved.

[This is preliminary documentation and subject to change.] 

ISpVoice::SetPriority

ISpVoice::SetOutput sets the queue priority for a voice.

```
HRESULT SetPriority(
    SPVPRIORITY     ePriority
);
```

Parameters

*ePriority*
    [in] Queue priority of type SPVPRIORITY associated with the current voice.

Return values

| Value | Description |
| --- | --- |
| S_OK | Function completed successfully. |
| E_INVALIDARG | One or more arguments are invalid. |

Remarks

- The alert priority voice will interrupt a normal priority voice.
- When two alert priority voices are specified, the first voice will finish before the second voice will proceed.
- SPVPRI_OVER is supported only on Windows 2000.

ISpVoice::GetPriority

ISpVoice::GetPriority retrieves the current voice priority level.

```
HRESULT GetPriority(
    SPVPRIORITY   *pePriority
);
```

Parameters

*pePriority*
    [out] Priority information of type SPVPRIORITY.

Return values

| Value | Description |
| --- | --- |
| S_OK | Function completed successfully. |
| E_POINTER | Invalid pointer. |

© 1995-2000 Microsoft Corporation. All rights reserved

[This is preliminary documentation and subject to change.]

ISpVoice::SetAlertBoundary

ISpVoice::SetAlertBoundary specifies which event should be used as the insertion point for alerts.

```
HRESULT SetAlertBoundary(
    SPEVENTENUM   eBoundary
);
```

Parameters

*eBoundary*
    [in] Address of a SPEVENTENUM enumeration that specifies which event to use for the alert insertion point information.

Return values

Value    Description

| | |
|---|---|
| S_OK | Function completed successfully. |
| E_INVALIDARG | One or more arguments are invalid. |
| FAILED (hr) | Appropriate error message. |

© 1995-2000 Microsoft Corporation. All rights reserv

[This is preliminary documentation and subject to change.]

ISpVoice::GetAlertBoundary

ISpVoice::GetAlertBoundary retrieves which event to be used as the insertion point for alerts.

```
HRESULT GetAlertBoundary(
    SPEVENTENUM   *peBoundary
);
```

Parameters

*peBoundary*
　　[out] Address of a SPEVENTENUM enumeration that receives the event information specifying the alert insertion point information.

Return values

| Value | Description |
|---|---|
| S_OK | Function completed successfully. |
| E_POINTER | Invalid pointer. |
| FAILED (hr) | Appropriate error message. |

© 1995-2000 Microsoft Corporation. All rights reser

[This is preliminary documentation and subject to change.]

ISpVoice::SetRate

ISpVoice::SetRate sets the engine's rate of spoken text relative to the normal rate.

See Engine Characteristics for a detailed explaination of rate adjustment.

```
HRESULT SetRate(
    long   RateAdjust
);
```

Parameters

*RateAdjust*

[in] Value specifying the spoken text units per minute rate.

Return values

| Value | Description |
|---|---|
| S_OK | Function completed successfully. |
| E_INVALIDARG | One or more arguments are invalid. |
| E_NOTIMPL | This functionality is not implemented. |

Remarks

- Voices do not have the same default rate.
- The granularity of the rate is engine dependent.

© 1995-2000 Microsoft Corporation All rights reserved

---

[This is preliminary documentation and subject to change.] 

ISpVoice::GetRate

ISpVoice::GetRate retrieves the engine's rate of spoken text relative to the normal rate.

See Engine Characteristics for a detailed explanation of rate adjustment.

```
HRESULT GetRate(
    long    *pRateAdjust
);
```

Parameters

*pRateAdjust*
    [out] Address of the value that receives the relative spoken text rate information. Range must be between -10 and 10, inclusive.

Return values

| Value | Description |
|---|---|
| S_OK | Function completed successfully. |
| E_INVALIDARG | One or more arguments are invalid. |
| E_NOTIMPL | This functionality is not implemented. |

© 1995-2000 Microsoft Corporation All rights reserve

---

[This is preliminary documentation and subject to change.] 

ISpVoice::SetVolume

ISpVoice::SetVolume sets the output volume level of speech synthesized by an engine.

See Engine Characteristics for a detailed explanation of volume adjustment.

```
HRESULT SetVolume(
    USHORT   usVolume
);
```

Parameters

*usVolume*
    [in] Value containing the volume level information. Volume levels are specified in percentage values ranging from 0 to 100 percent.

Return values

| Value | Description |
| --- | --- |
| S_OK | Function completed successfully. |
| E_INVALIDARG | One or more arguments are invalid. |

Remarks

- Volume is specified as a percentage of the maximum volume of the current voice. Each voice implementation has its own maximum volume.
- The *usVolume* parameter must between 0 (SPMIN_VOLUME) and 100 (SPMAX_VOLUME) inclusive. These values are contained in the SPVLIMITS enumeration sequence.

© 1995-2000 Microsoft Corporation. All rights reserved.

---

[This is preliminary documentation and subject to change.]

ISpVoice::GetVolume

ISpVoice::GetVolume retrieves the current output volume level of speech synthesized by an engine.

See Engine Characteristics for a detailed explanation of volume adjustment.

```
HRESULT GetVolume(
    USHORT   *pusVolume
);
```

Parameters

*pusVolume*
    [out] Address of the value that receives the volume level information. Volume levels are specified in percentage values ranging from 0 to 100 percent.

Return values

| Value | Description |
|---|---|
| S_OK | Function completed successfully. |
| E_POINTER | Invalid pointer. |

Notes:

- When an ISpVoice object is first instantiated, it will have a volume of SPMAX_VOLUME.
- Volume is specified as a percent of the maximum volume of the current voice. Each voice implementation has its own maximum volume.
- The *pusVolume* parameter must between 0 (SPMIN_VOLUME) and 100 (SPMAX_VOLUME) inclusive. These values are contained in the SPVLIMITS enumeration sequence.

© 1995-2000 Microsoft Corporation. All rights reserved

[This is preliminary documentation and subject to change.] 

ISpVoice::WaitUntilDone

ISpVoice::WaitUntilDone specifies the time interval in milliseconds that the engine should wait for all queued Speak and SpeakStream actions associated with this ISpVoice instance to have completed. Completion of a queued Speak or SpeakStream action is based on when an audio object has committedd its audio playing.

```
HRESULT WaitUntilDone(
    ULONG   msTimeout
);
```

Parameters

*msTimeout*
    [in] Value specifying the time interval in milliseconds to wait before the WaitUntilDone method times out with an error. The WaitUntilDone method will not time out by specifying INFINITE for this value.

Return values

| Value | Description |
|---|---|
| S_OK | Function completed successfully. |
| S_FALSE | Wait time interval was exceeded. |

ISpVoice::SetSyncSpeakTimeout

ISpVoice::SetSyncSpeakTimeout sets the timeout interval in milliseconds after which, synchronous Speak and SpeakStream calls to this instance of ISpVoice will timeout.

```
HRESULT SetSyncSpeakTimeout(
    ULONG    msTimeout
);
```

Parameters

*msTimeout*
    [in] Value specifying the timeout interval in milliseconds for synchronous speech operations. The SetSyncSpeakTimeout method will not time out by specifying INFINITE for this value.

Return values

| Value | Description |
| --- | --- |
| S_OK | Function completed successfully. |
| E_INVALIDARG | One or more arguments are invalid. |

Remarks

- The timeout interval is set for each ISpVoice instance and by default it is set to 10 seconds when the timeout interval is not specified in SetSyncSpeakTimeout.

© 1995-2000 Microsoft Corporation All rights reserved.

[This is preliminary documentation and subject to change.] 

ISpVoice::GetSyncSpeakTimeout

ISpVoice::GetSyncSpeakTimeout retrieves the timeout interval for synchronous speech operations for this ISpVoice instance.

```
HRESULT GetSyncSpeakTimeout(
    ULONG    *pmsTimeout
);
```

Parameters

*pmsTimeout*
    [out] Address of the timeout interval in milliseconds for synchronous speech operations.

Return values

| Value | Description |
|---|---|
| S_OK | Function completed successfully. |
| E_POINTER | Invalid pointer. |

© 1995-2000 Microsoft Corporation All rights reserved

[This is preliminary documentation and subject to change.]

ISpVoice::SpeakCompleteEvent

ISpVoice::SpeakCompleteEvent returns an event handle used to wait until the voice has completed speaking.

This is similar to the functionality provided by ISpVoice::WaitUntilDone, but allows the caller to wait on the event handle. The event handle is owned by this object and is not duplicated.

The caller must neither call CloseHandle(), nor should the caller ever use the handle after releasing the COM reference to this object.

```
[local] HANDLE  SpeakCompleteEvent  ( void );
```

Parameters

None.

Return values

| Value | Description |
|---|---|
| Event Handle | For WAIT operation. |

© 1995-2000 Microsoft Corporation All rights reserved

[This is preliminary documentation and subject to change.]

ISpVoice::IsUISupported

ISpVoice::IsUISupported determines if the specified type of UI is supported.

```
[local] HRESULT IsUISupported(
    const WCHAR   *pszTypeOfUI,
    void          *pvExtraData,
    ULONG          cbExtraData,
    BOOL          *pfSupported
);
```

Parameters

Parameters

*pszTypeOfUI*
    [in] Address of the null-terminated string containing the UI type that is being queried.
*pvExtraData*
    [in] Pointer to additional information needed for the object.
*cbExtraData*
    [in] Size, in bytes, of the ExtraData.
*pfSupported*
    [out] Flag specifying whether the specified UI is supported. TRUE indicates the UI is supported, and FALSE indicates the UI is not supported.

Return values

| Value | Description |
| --- | --- |
| S_OK | Function completed successfully. |
| E_INVALIDARG | One or more arguments are invalid. |
| FAILED(hr) | Appropriate error message. |

© 1995-2000 Microsoft Corporation. All rights rese

---

[This is preliminary documentation and subject to change.]

ISpVoice::DisplayUI

ISpVoice::DisplayUI displays the requested UI.

```
[local] HRESULT DisplayUI(
    HWND            hwndParent,
    const WCHAR     *pszTitle,
    const WCHAR     *pszTypeOfUI,
    void            *pvExtraData,
    ULONG           cbExtraData
);
```

Parameters

*hwndParent*
    [in] Specifies the parent window handle information.
*pszTitle*
    [in] Address of a null-terminated string containing the window title information.
*pszTypeOfUI*
    [in] Address of the null-terminated string containing the requested UI type to display.
*pvExtraData*
    [in] Pointer to additional information needed for the object.
*cbExtraData*
    [in] Size, in bytes, of the ExtraData.

Return values

| Value | Description |
| --- | --- |

| | |
|---|---|
| S_OK | Function completed successfully. |
| E_INVALIDARG | One or more arguments are invalid. |
| FAILED(hr) | Appropriate error message. |

Appendix B

Microsoft Speech SDK
with SAPI 5.0 

[This is preliminary documentation and subject to change.]

Engine-Level Interfaces

This section describes the interfaces and methods for incorporating speech engines into applications. They are intended for use at the DDI or device driver interface level. Some managers or interfaces may have entries also in the Application-Level Interfaces section. However, entries listed here apply only to the device driver or engine level.

- Grammar Compiler Manager
- Resource Manager
- Speech Recognition Manager
- Speech Recognition Engine Manager
- Text-to-Speech Engine Manager © 1995-2000 Microsoft Corporation. All rights reserved.

Microsoft Speech SDK
with SAPI 5.0 

[This is preliminary documentation and subject to change.]

Grammar Compiler Manager (DDI-level)

The following section covers:

- ISpErrorLog
- ISpGramCompBackend
- ISpGrammarCompiler
- ISpITNProcessor
- ISpCFGEngineClient
- ISpCFGInterpreter
- ISpCFGInterpreterSite © 1995-2000 Microsoft Corporation. All rights reserved Microsoft Speech SDK
with SAPI 5.0 

[This is preliminary documentation and subject to change.]

ISpErrorLog

Methods in Vtable Order

ISpErrorLog Methods

AddError

Description

Writes an error to the log file.

© 1995-2000 Microsoft Corporation. All rights reserv·

[This is preliminary documentation and subject to change.]

ISpErrorLog::AddError

ISpErrorLog::AddError writes an error to the log file.

This function is application-defined and may be customized for the application's needs. By default, no action is performed.

```
HRESULT AddError(
    const long      lLineNumber,
    HRESULT         hr,
    const WCHAR     *pszDescription,
    const WCHAR     *pszHelpFile,
    DWORD           dwHelpContext
);
```

Parameters

*lLineNumber*
    The line number of the error.
*hr*
    The error code being logged.
*pszDescription*
    A textual description of the error.
*pszHelpFile*
    The file being written to.
*dwHelpContext*
    Flags providing additional information for the log.

Return values

| Value | Description |
| --- | --- |
| S_OK | Function completed successfully. |
| FAILED (hr) | Appropriate error message. |

Because this method is application defined, the return value may change. See specific vendor documentation for details.

ISpGramCompBackend

ISpGramCompBackend inherits from the ISpGrammarBuilder interface.

Methods in Vtable Order

| ISpGramCompBackend Methods | Description |
| --- | --- |
| SetSaveObjects | Sets the storage location of the binary grammar. |
| InitFromBinaryGrammar | Initializes a grammar from binary data. |

© 1995-2000 Microsoft Corporation. All rights reserved

[This is preliminary documentation and subject to change.] 

ISpGramCompBackend::SetSaveObjects

ISpGramCompBackend::SetSaveObjects sets the storage location of the binary grammar.

When the ISpGrammarBuilder::Commit method is called, the grammar compiler back end writes the binary grammar to the location of *pStream*. When calling the SetSaveObjects method multiple times, the last call made before calling the Commit method, receives the binary grammar.

```
HRESULT SetSaveObjects(
    IStream     *pStream,
    ISpErrorLog *pErrorLog
);
```

Parameters

*pStream*
    Address of the IStream that receives the binary grammar.
*pErrorLog*
    Address of the ISpErrorLog interface that receives the error information.

Return values

| Value | Description |
| --- | --- |
| S_OK | Function completed successfully. |
| E_INVALIDARG | One or more arguments are invalid. |
| FAILED(hr) | Appropriate error message. |

ISpGramCompBackend::InitFromBinaryGram

ISpGramCompBackend::InitFromBinaryGrammar initializes a grammar from binary data.

```
HRESULT InitFromBinaryGrammar(
    const   SPBINARYGRAMMAR  *pBinaryData
);
```

Parameters

*pBinaryData*
    Pointer to the grammar list.

Return values

| Value | Description |
| --- | --- |
| S_OK | Function completed successfully. |
| E_OUTOFMEMORY | Exceeded available memory. |
| FAILED (hr) | Appropriate error message. |

© 1995-2000 Microsoft Corporation. All rights reserved.

Microsoft Speech SDK
with SAPI 5.0

[This is preliminary documentation and subject to change.]

ISpGrammarCompiler

Methods in Vtable Order

| ISpGrammarCompiler Methods | Description |
| --- | --- |
| CompileStream | Loads the XML file into the DOM. |

© 1995-2000 Microsoft Corporation. All rights reserved

[This is preliminary documentation and subject to change.]

ISpGrammarCompiler::CompileStream

ISpGrammarCompiler::CompileStream loads the XML file into the DOM.

Also loads the XML that contains the <DEFINE> in case it is different from the main file specified by -d flag.

```
HRESULT CompileStream(
```

```
    IStream       *pSource,
    IStream       *pDest,
    IStream       *pHeader,
    IStream       *pDefine,
    ISpErrorLog   *pErrorLog,
    DWORD          dwFlags
);
```

Parameters

*pSource*
    Pointer to the source.
*pDest*
    Pointer to the destination.
*pHeader*
    Pointer to the stream header.
*pDefine*
    Pointer to the definition.
*pErrorLog*
    Pointer to the error log receiving the messages.
*dwFlags*
    [in] Not currently used. May be NULL.

Return values

| Value | Description |
| --- | --- |
| S_OK | Function completed successfully. |
| E_INVALIDARG | One of the parameters is bad or invalid. |
| FAILED (hr) | Appropriate error message. |

© 1995-2000 Microsoft Corporation. All rights rese

Microsoft Speech SDK
with SAPI 5.0

[This is preliminary documentation and subject to change.]

ISpITNProcessor

ISpITNProcessor interface is implemented by SAPI to do the Inverse Text Normalization (ITN).

Methods in Vtable Order

| ISpITNProcessor Methods | Description |
| --- | --- |
| LoadITNGrammar | Loads an inverse text normalization grammar. |
| ITNPhrase | Parses an inverse text normalization phrase. |

ISpITNProcessor::LoadITNGrammar

ISpITNProcessor::LoadITNGrammar loads an inverse text normalization (ITN) grammar. The loaded grammar can be used by either SAPI or the speech recognition (SR) engine.

```
HRESULT LoadITNGrammar(
    WCHAR    *pszCLSID
);
```

Parameters

*pszCLSID*
    Address of the null-terminated string containing the CLSID of the ITN grammar object implementing ISpCFGInterpreter.

Return values

| Value | Description |
| --- | --- |
| S_OK | Function completed successfully. |
| E_POINTER | *pszCLSID* is invalid or bad. |
| FAILED(hr) | Appropriate error message. |

© 1995-2000 Microsoft Corporation All rights reserved.

[This is preliminary documentation and subject to change.]

ISpITNProcessor::ITNPhrase

ISpITNProcessor::ITNPhrase parses an inverse text normalization (ITN) phrase.

The ITNPhrase will attempt to parse the *pPhrase* passed in using the ITN grammar loaded by ISpITNProcessor::LoadITNGrammar. If a parse is found, the ITN grammar will add the display text replacement. For example, AddReplacement "$100" for "one hundred dollars".

```
HRESULT ITNPhrase(
    ISpPhraseBuilder    *pPhrase
);
```

Parameters

*pPhrase*
    Address of the phrase to parse.

Return values

| Value | Description |
|---|---|
| S_OK | Function completed successfully. |
| E_INVALIDARG | No words are available. |
| SP_NO_RULE_ACTIVE | No rules are available. |
| E_OUTOFMEMORY | Not enough memory to complete operation. |
| FAILED(hr) | Appropriate error message. |

© 1995-2000 Microsoft Corporation All rights reserved

Microsoft Speech SDK
with SAPI 5.0

[This is preliminary documentation and subject to change.]

ISpCFGEngineClient

The ISpCFGEngineClient interface allows the CFG engine to notify the SR engine of changes in the status of loaded grammars.

When to Implement

Implemented by an SR engine.

Methods in Vtable Order

| ISpCFGEngineClient Methods | Description |
|---|---|
| WordNotify | Notifies the SR engine of events related to the addition or deletion of words in the loaded grammars. |
| RuleNotify | Notifies the SR engine of events related to the addition, deletion, activation, or deactivation of rules in the loaded grammars. |

© 1995-2000 Microsoft Corporation. All rights reserved

[This is preliminary documentation and subject to change.]

ISpCFGEngineClient::WordNotify

ISpCFGEngineClient::WordNotify notifies SR engine of events related to the addition or deletion of words in the loaded grammars.

Duplication words (from multiple grammars) are added only once.

```
HRESULT WordNotify(
    SPCFGNOTIFY    Action,
    ULONG          cWords,
```

```
    const    SPWORDENTRY    *pWords
);
```

Parameters

*Action*
    The action being taken of type SPCFGNOTIFY. Must be either SPCFGN_ADD or SPCFGN_REMOVE.
*cWords*
    The number of words in *pWords*.
*pWords*
    An array of words for which *Action* specifies.

Return values

| Value | Description |
| --- | --- |
| S_OK | Function completed successfully. |
| E_INVALIDARG | One or more of the parameters are invalid. |
| E_OUTOFMEMORY | Exceeded available memory. |
| E_FAIL | Operation failed for unspecified reason. |
| FAILED (hr) | Appropriate error message. |

© 1995-2000 Microsoft Corporation All rights reser

[This is preliminary documentation and subject to change.] 

ISpCFGEngineClient::RuleNotify

ISpCFGEngineClient::RuleNotify notifies SR engine of events related to the addition, deletion, activation, or deactivation of rules in the loaded grammars.

```
HRESULT RuleNotify(
    SPCFGNOTIFY              Action,
    ULONG                    cRules,
    const    SPRULEENTRY     *pRules
);
```

Parameters

*Action*
    The action being taken of type SPCFGNOTIFY. Must be either SPCFGN_ADD, SPCFGN_REMOVE, SPCFGN_ACTIVATE, SPCFGN_DEACTIVATE, or SPCFGN_INVALIDATE.
*cRules*
    The number of rules in *pRules*.
*pRules*
    An array of rules for which *Action* specifies.

Return values

| Value | Description |
|---|---|
| S_OK | Function completed successfully. |
| FAILED (hr) | Appropriate error message. |

© 1995-2000 Mic

Microsoft Speech SDK with SAPI 5.0

[This is preliminary documentation and subject to change.]

ISpCFGInterpreter

Methods in Vtable Order

| ISpCFGInterpreter Methods | Description |
|---|---|
| InitGrammar | |
| Interpret | |

© 1995-2000 Mi

[This is preliminary documentation and subject to change.]

ISpCFGInterpreter::InitGrammar

ISpCFGInterpreter::InitGrammar

```
HRESULT InitGrammar(
    const WCHAR    *pszGrammarName,
    const void     **pvGrammarData
);
```

Parameters

*pszGrammarName*
    [in]
*pvGrammarData*
    [in]

Return values

| Value | Description |
|---|---|
| S_OK | Function completed successfully. |
| FAILED(hr) | Appropriate error message. |

ISpCFGInterpreter::Interpret

ISpCFGInterpreter::Interpret

```
HRESULT Interpret(
    ISpPhraseBuilder        *pPhrase,
    const ULONG             ulFirstElement,
    const ULONG             ulCountOfElements,
    ISpCFGInterpreterSite   *pSite
);
```

Parameters

*pPhrase*
    [in]
*ulFirstElement*
    [in]
*ulCountOfElements*
    [in]
*pSite*
    [in]

Return values

| Value | Description |
| --- | --- |
| S_OK | Function completed successfully. |
| FAILED(hr) | Appropriate error message. |

© 1995-2000 Microsoft Corporation All ri

Microsoft Speech SDK
with SAPI 5.0

[This is preliminary documentation and subject to change.]

ISpCFGInterpreterSite

Methods in Vtable Order

| ISpCFGInterpreterSite Methods | Description |
| --- | --- |
| AddTextReplacement | Adds one text replacement to the phrase. |
| AddProperty | Adds a property entry to the phrase object. |
| GetResourceValue | Retrieves the resource information for a grammar. |

ISpCFGInterpreterSite::AddTextReplacement

ISpCFGInterpreterSite::AddTextReplacement adds one text replacement to the phrase. The object must have been initialized by calling SetPhrase prior to calling this method.

```
HRESULT AddTextReplacement(
    SPPHRASEREPLACEMENT   *pReplace
);
```

Parameters

*pReplace*
    [in] Address of the SPPHRASEREPLACEMENT that contains the replacement text.

Return values

| Value | Description |
| --- | --- |
| S_OK | Function completed successfully. |
| E_INVALIDARG | *cReplacements* is zero or *pReplace* is invalid. |
| SPERR_UNINITIALIZED | The object is uninitialized. |
| FAILED(hr) | Appropriate error message. |

© 1995-2000 Microsoft Corporation. All rights reserve

[This is preliminary documentation and subject to change.]

ISpCFGInterpreterSite::AddProperty

ISpCFGInterpreterSite::AddProperty adds a property entry to the phrase object.

```
HRESULT AddProperty(
    SPPHRASEPROPERTY   *pProperty
);
```

Parameters

*pProperty*
    [in] Address of the SPPHRASEPROPERTY structure that contains the property information.

Return values

| Value | Description |
| --- | --- |
| S_OK | Function completed successfully. |
| E_INVALIDARG | *pProperty* is bad or invalid. |
| SPERR_UNINITIALIZED | The object is uninitialized. |
| FAILED(hr) | Appropriate error message. |

© 1995-2000 Microsoft Corporation. All rights res

[This is preliminary documentation and subject to change.] 

ISpCFGInterpreterSite::GetResourceValue

ISpCFGInterpreterSite::GetResourceValue retrieves the resource information for a grammar.

```
HRESULT GetResourceValue(
    const SPRULEHANDLE   hRule,
    const WCHAR          *pszResourceName,
    WCHAR                **ppCoMemResource
);
```

Parameters

*hRule*
    [in] The rule handle containing the valid rule ID and index.
*pszResourceName*
    [in] The name of the resource from which to retrieve the grammar information.
*ppCoMemResource*
    [out] Pointer containing the passed back resource value.
    Applications implementing this method must call CoTaskMemFree() to free memory associated with this resource.

Return values

| Value | Description |
| --- | --- |
| S_OK | Function completed successfully. |
| E_INVALIDARG | One of the parameters is bad or invalid. |
| E_OUTOFMEMORY | Exceeded available memory. |
| FAILED(hr) | Appropriate error message. |

© 1995-2000 Microsoft Corporation. All rights r

Microsoft Speech SDK
with SAPI 5.0

[This is preliminary documentation and subject to change.]

Resource Manager (DDI-level)

The following section covers:

- ISpObjectTokenEnumBuilder
- ISpTokenUI
- ISpTaskManager
- ISpThreadControl
- ISpThreadTask © 1995-2000 Microsoft Corporation. All rights reserved Microsoft Speech SDK
with SAPI 5.0

[This is preliminary documentation and subject to change.]

ISpObjectTokenEnumBuilder

This interface inherits from IEnumSpObjectTokens.

Methods in Vtable Order

| ISpObjectTokenEnumBuilder Methods | Description |
|---|---|
| SetAttribs | Sets the required and optional token enumerator attribute information. |
| AddTokens | Adds tokens to the object token enumerator. |
| AddTokensFromDataKey | Adds a new token using specified subkey and CategoryId information. |
| AddTokensFromTokenEnum | Adds a new token from an enumerated list of object tokens. |
| Sort | Sorts the list of enumerated object tokens. |

© 1995-2000 Microsoft Corporation. All rights reserved

[This is preliminary documentation and subject to change.]

ISpObjectTokenEnumBuilder::SetAttribs

ISpObjectTokenEnumBuilder::SetAttribs sets the required and optional token enumerator attribute information.

```
HRESULT SetAttribs(
    const WCHAR    *pszReqAttribs,
    const WCHAR    *pszOptAttribs
);
```

Parameters

*pszReqAttribs*
    Address of a null-terminated string containing the required attribute information.
*pszOptAttribs*
    Address of a null-terminated string containing the optional attribute information.

Return values

| Value | Description |
|---|---|
| S_OK | Function completed successfully. |
| SPERR_ALREADY_INITIALIZED | The object has already been initialized. |
| E_OUTOFMEMORY | Exceeded available memory. |
| FAILED(hr) | Appropriate error message. |

© 1995-2000 Microsoft Corporation. All rights reserve

[This is preliminary documentation and subject to change.]

ISpObjectTokenEnumBuilder::AddTokens

ISpObjectTokenEnumBuilder::AddTokens adds tokens to the object token enumerator.

```
HRESULT AddTokens(
    ULONG           cTokens,
    ISpObjectToken  **pToken
);
```

Parameters

*cTokens*
    The number of object tokens being added to the sequence.
*pToken*
    Address of a pointer to an *ISpObjectToken* object containing the information associated with the tokens being added.

Return values

| Value | Description |
|---|---|
| S_OK | Function completed successfully. |
| E_INVALIDARG | One or more arguments are invalid. |
| E_POINTER | Invalid pointer. |
| E_OUTOFMEMORY | Exceeded available memory. |
| SPERR_UNINITIALIZED | The object has not been properly initialized. |
| FAILED(hr) | Appropriate error message. |

ISpObjectTokenEnumBuilder::AddTokensFro

ISpObjectTokenEnumBuilder::AddTokensFromDataKey adds a new token using specified subkey and CategoryId information.

```
HRESULT AddTokensFromDataKey(
    ISpDataKey    *pDataKey,
    const WCHAR   *pszSubKey,
    const WCHAR   *pszCategoryId
);
```

Parameters

*pDataKey*
    Address of an ISpDataKey interface that specifies the system registry key to create the token from.
*pszSubKey*
    Address of a null-terminated string containing the system registry subkey information.
*pszCategoryId*
    Address of a null-terminated string containing the category identifier information for the system registry subkey.

Return values

| Value | Description |
| --- | --- |
| S_OK | Function completed successfully. |
| E_INVALIDARG | One or more arguments are invalid. |
| SPERR_UNINITIALIZED | The object has not been properly initialized. |
| FAILED(hr) | Appropriate error message. |

© 1995-2000 Microsoft Corporation. All rights reserved

---

[This is preliminary documentation and subject to change.] 

ISpObjectTokenEnumBuilder::AddTokensFro

ISpObjectTokenEnumBuilder::AddTokensFromTokenEnum adds a new token from an enumerated list of object tokens.

```
HRESULT AddTokensFromTokenEnum(
    IEnumSpObjectTokens   *pTokenEnum
);
```

Parameters

*pTokenEnum*
    Address of an IEnumSpObjectTokens interface containing the list of enumerated object tokens to add.

Return values

| Value | Description |
|---|---|
| S_OK | Function completed successfully. |
| E_INVALIDARG | One or more arguments are invalid. |
| SPERR_UNINITIALIZED | The object has not been properly initialized. |
| FAILED(hr) | Appropriate error message. |

© 1995-2000 Microsoft Corporation. All rights reserved

[This is preliminary documentation and subject to change.]

ISpObjectTokenEnumBuilder::Sort

ISpObjectTokenEnumBuilder::Sort sorts the list of enumerated object tokens.

```
HRESULT Sort(
    const WCHAR    *pszTokenIdToListFirst
);
```

Parameters

*pszTokenIdToListFirst*
Address of a null-terminated string specifying the identifier of the first token in the sorted list.

Return values

| Value | Description |
|---|---|
| S_OK | Function completed successfully. |
| E_POINTER | Invalid pointer. |
| SPERR_UNINITIALIZED | The object has not been properly initialized. |
| FAILED(hr) | Appropriate error message. |

© 1995-2000 Microsoft Corporation. All rights reserved

Microsoft Speech SDK
with SAPI 5.0

[This is preliminary documentation and subject to change.]

ISpTokenUI

Methods in Vtable Order

| ISpTokenUI Methods | Description |
|---|---|
| IsUISupported | Determines if the specified UI type is supported by the token. |
| DisplayUI | Displays the UI associated with the object token. |

© 1995-2000 Microsoft Corporation. All rights res

[This is preliminary documentation and subject to change.]

ISpTokenUI::IsUISupported

ISpTokenUI::IsUISupported determines if the specified UI type is supported by the token.

```
[local] HRESULT IsUISupported(
    const WCHAR   *pszTypeOfUI,
    void          *pvExtraData,
    ULONG         cbExtraData,
    IUnknown      *punkObject,
    BOOL          *pfSupported
);
```

Parameters

*pszTypeOfUI*
    [in] Address of a null-terminated string containing the object's UI type.
*pvExtraData*
    [in] Pointer to additional information needed for the object.
*cbExtraData*
    [in] Size, in bytes, of the ExtraData.
*punkObject*
    [in] Address of the object's IUnknown interface.
*pfSupported*
    [out] Address of a variable that receives the value indicating support for the interface. This value is set to TRUE when this interface is supported and FALSE otherwise.

Return values

| Value | Description |
|---|---|
| S_OK | Function completed successfully. |
| E_INVALIDARG | One or more arguments are invalid. |
| E_POINTER | Invalid pointer. |

© 1995-2000 Microsoft Corporation. All rights

[This is preliminary documentation and subject to change.]

ISpTokenUI::DisplayUI

ISpTokenUI::DisplayUI displays the UI associated with the object token.

```
[local] HRESULT DisplayUI(
    HWND                hwndParent,
    const WCHAR         *pszTitle,
    const WCHAR         *pszTypeOfUI,
    void                *pvExtraData,
    ULONG               cbExtraData,
    ISpObjectToken      *pToken,
    IUnknown            *punkObject
);
```

Parameters

*hwndParent*
    [in] Specifies the handle of the parent window.
*pszTitle*
    [in] Address of a null-terminated string containing the window title.
*pszTypeOfUI*
    [in] Address of a null-terminated string containing the UI type to display.
*pvExtraData*
    [in] Pointer to additional information needed for the object.
*cbExtraData*
    [in] Size, in bytes, of the ExtraData.
*pToken*
    [in] Address of the ISpObjectToken containing the object token identifier.
*punkObject*
    [in] Address of the IUnknown interface pointer.

Return values

| Value | Description |
| --- | --- |
| S_OK | Function completed successfully. |
| E_INVALIDARG | One or more arguments are invalid. |
| E_POINTER | Invalid pointer. |

© 1995-2000 Microsoft Corporation. All rights res

Microsoft Speech SDK
with SAPI 5.0

[This is preliminary documentation and subject to change.]

ISpTaskManager

When to Implement

This interface is used to implement a task management service provider to optimize thread usage.

Methods in Vtable Order

| ISpTaskManager Methods | Description |
| --- | --- |
| SetThreadPoolInfo | Sets the attributes for thread pool management. |
| GetThreadPoolInfo | Retrieves the current thread pool management attributes. |
| QueueTask | Adds a task to the queue for asynchronous task processing. |
| CreateReoccurringTask | Creates a task entry that will be processed on a high priority thread. |
| CreateThreadControl | Creates a thread control object. |
| TerminateTask | Interrupts a specified task. |
| TerminateTaskGroup | Terminates a group of tasks that match a specific group identifier. |

© 1995-2000 Microsoft Corporation All rights reserve

[This is preliminary documentation and subject to change.]

ISpTaskManager::SetThreadPoolInfo

ISpTaskManager::SetThreadPoolInfo defines the thread pool attributes.

```
HRESULT SetThreadPoolInfo(
    const    SPTMTHREADINFO    *pPoolInfo
);
```

Parameters

*pPoolInfo*
    [in] Address of an SPTMTHREADINFO structure that receives the thread management information.

Return values

| Value | Description |
| --- | --- |
| S_OK | Function completed successfully. |
| E_INVALIDARG | *pPoolInfo* is invalid or *pPoolInfo->lPoolSize* size is less than -1. |
| FAILED (hr) | Appropriate error message. |

© 1995-2000 Microsoft Corporation All rights reser

[This is preliminary documentation and subject to change.]

ISpTaskManager::GetThreadPoolInfo

ISpTaskManager::GetThreadPoolInfo retrieves the current thread pool management attributes.

```
HRESULT GetThreadPoolInfo(
    SPTMTHREADINFO   *pPoolInfo
);
```

Parameters

*pPoolInfo*
    [out] Address of an SPTMTHREADINFO structure that contains the current thread management information.

Return values

| Value | Description |
| --- | --- |
| S_OK | Function completed successfully. |
| E_POINTER | *pPoolInfo* is invalid or bad. |
| FAILED (hr) | Appropriate error message. |

© 1995-2000 Microsoft Corporation. All rights r

[This is preliminary documentation and subject to change.]

ISpTaskManager::QueueTask

ISpTaskManager::QueueTask adds a task to the queue for asynchronous task processing.

```
HRESULT QueueTask(
    ISpTask    pTask,
    void       *pvTaskData,
    HANDLE     hCompEvent,
    DWORD*     *pdwGroupId,
    DWORD*     *pTaskID
);
```

Parameters

*pTask*
    [in] Address of an ISpTask interface containing the task.
*pvTaskData*
    [in] Address of the task data.
*hCompEvent*
    [in] Handle of the task completion event.
*pdwGroupId*
    [in, out] Value specifying the identifier for the task group. This value may be NULL.
*pTaskID*
    [out] Value specifying the task identifier.

Return values

| Value | Description |
|---|---|
| S_OK | Function completed successfully. |
| E_INVALIDARG | *pTask* is invalid or bad. |
| E_POINTER | *pTaskId* or *pdwGroupId* is invalid or bad. |
| FAILED (hr) | Appropriate error message. |

© 1995-2000 Microsoft Corporation. All rights rese

[This is preliminary documentation and subject to change.] 

ISpTaskManager::CreateReoccurringTask

ISpTaskManager::CreateReoccurringTask creates a task entry that will be processed on a high priority thread when the ISpTask::Execute method is called.

These reoccurring tasks are designed to supply data to hardware devices.

```
HRESULT CreateReoccurringTask(
    ISpTask         *pTask,
    void            *pvTaskData,
    HANDLE          hCompEvent,
    ISpNotifySink   **ppTaskCtrl
);
```

Parameters

*pTask*
    [in] Address of an ISpTask interface containing the task.
*pvTaskData*
    [in] Address of the task data.
*hCompEvent*
    [in] Handle of the task completion event.
*ppTaskCtrl*
    [out] Address of a pointer to an ISpNotifySink interface that receives the task notifications.

Return values

| Value | Description |
|---|---|
| S_OK | Function completed successfully. |
| E_INVALIDARG | *pTask* is invalid or bad. |
| E_POINTER | *ppTaskCtrl* is invalid or bad. |
| FAILED (hr) | Appropriate error message. |

ISpTaskManager::CreateThreadControl

ISpTaskManager::CreateThreadControl allocates a thread control object. It does not allocate a thread. If the task manager's controlling IUnknown has been allocated by ADDREF since the thread's creation, the allocated thread control object uses the thread pool in the task manager.

```
HRESULT CreateThreadControl(
    ISpThreadTask      *pTask,
    void               *pvTaskData,
    long                nPriority,
    ISpThreadControl  **ppTaskCtrl
);
```

Parameters

*pTask*
    [in] Address of the ISpThreadTask interface that is used to initialize and execute the task thread.
*pvTaskData*
    [in] Data passed to all ISpThreadTask member functions. This value can be NULL.
*nPriority*
    [in] The Win32 priority for the allocated thread.
*ppTaskCtrl*
    [out] Address of a pointer to an ISpThreadControl interface that receives the thread control.

Return values

| Value | Description |
| --- | --- |
| S_OK | Function completed successfully. |
| E_INVALIDARG | *pTask* is invalid or bad. |
| E_POINTER | *ppThreadCtrl* is invalid or bad. |
| E_OUTOFMEMORY | Exceeded available memory. |
| FAILED (hr) | Appropriate error message. |

© 1995-2000 Microsoft Corporation All rights reserved

[This is preliminary documentation and subject to change.]

ISpTaskManager::TerminateTask

ISpTaskManager::TerminateTask interrupts the specified task.

```
HRESULT TerminateTask(
    DWORD   dwTaskId,
    ULONG   ulWaitPeriod
);
```

Parameters

*dwTaskId*
 [in] Value specifying the identifier of the task to interrupt.
*ulWaitPeriod*
 [in] Number of milliseconds to wait before interrupting the task.

Return values

| Value | Description |
|---|---|
| S_OK | Function completed successfully. |
| S_FALSE | Method timed out. |
| FAILED (hr) | Appropriate error message. |

© 1995-2000 Microsoft Corporation. All rights reserved

---

[This is preliminary documentation and subject to change.] 

ISpTaskManager::TerminateTaskGroup

ISpTaskManager::TerminateTaskGroup terminates a group of tasks matching the specified group identifier.

```
HRESULT TerminateTaskGroup(
    DWORD    dwGroupId,
    ULONG    ulWaitPeriod
);
```

Parameters

*dwGroupId*
 [in] Value specifying the identifier for the task group to interrupt.
*ulWaitPeriod*
 [in] Number of milliseconds to wait before interrupting the task group.

Return values

| Value | Description |
|---|---|
| S_OK | Function completed successfully. |
| FAILED (hr) | Appropriate error message. |

© 1995-2000 Microsoft Corporation. All rights reserved.

Microsoft Speech SDK
with SAPI 5.0 

[This is preliminary documentation and subject to change.]

ISpThreadControl

The ISpThreadControl interface inherits from the ISpNotifySink interface.

Methods in Vtable Order

| ISpThreadControl Methods | Description |
|---|---|
| StartThread | Initializes a thread and returns a window handle. |
| WaitForThreadDone | Specifies the time interval to wait before ending thread processing. |
| TerminateThread | |
| ThreadHandle | |
| ThreadId | |
| NotifyEvent | |
| WindowHandle | |
| ThreadCompleteEvent | |
| ExitThreadEvent | |

© 1995-2000 Microsoft Corporation. All rights reserved

[This is preliminary documentation and subject to change.]

ISpThreadControl::StartThread

ISpThreadControl::StartThread initializes a thread and returns a window handle.

```
HRESULT StartThread(
    DWORD   dwFlags,
    HWND    *phwnd
);
```

Parameters

*dwFlags*
    Currently not implemented.
*phwnd*
    Optional address of an handle to a window. The handle of the new window will be returned to *phwnd* if this parameter is non-NULL. A window will not be created if this parameter is NULL.

Return values

| Value | Description |
|---|---|
| S_OK | Function completed successfully. |
| E_INVALIDARG | One or more arguments are invalid. |
| E_POINTER | Invalid pointer. |
| E_OUTOFMEMORY | Exceeded available memory. |

ISpThreadControl::WaitForThreadDone

ISpThreadControl::WaitForThreadDone specifies the time interval to wait before ending thread processing.

```
HRESULT WaitForThreadDone(
    BOOL        fForceStop,
    HRESULT     *phrThreadResult,
    ULONG       msTimeOut
);
```

Parameters

*fForceStop*
    Flag specifies to stop thread processing. Thread processing will stop if the value is TRUE and continue if FALSE.
*phrThreadResult*
    Address of a handle to a COM return value.
*msTimeOut*
    Time-out interval in milliseconds to wait before interrupting the task.

Return values

| Value | Description |
| --- | --- |
| S_OK | Function completed successfully. |
| E_INVALIDARG | One or more arguments are invalid. |

© 1995-2000 Microsoft Corporation. All rights reserved

[This is preliminary documentation and subject to change.] 

ISpThreadControl::TerminateThread

ISpThreadControl::TerminateThread

```
HRESULT  TerminateThread  ( void );
```

Parameters

None.

Return values

| Value | Description |
|---|---|
| S_OK | Function completed successfully. |
| E_INVALIDARG | One or more arguments are invalid. |

© 1995-2000 Microsoft Corporation. All rights reserved.

[This is preliminary documentation and subject to change.]

ISpThreadControl::ThreadHandle

ISpThreadControl::ThreadHandle retrieves a thread handle.

`HANDLE ThreadHandle ( void );`

Parameters

None.

Return values

| Value | Description |
|---|---|
| S_OK | Method completed successfully. |

© 1995-2000 Microsoft Corporation. All rights reserved

[This is preliminary documentation and subject to change.]

ISpThreadControl::ThreadId

ISpThreadControl::ThreadId

`DWORD ThreadId ( void );`

Parameters

None.

Return values

| Value | Description |
|---|---|

ISpThreadControl::NotifyEvent

```
HANDLE  NotifyEvent ( void );
```

Parameters

None.

Return values

| Value | Description |

---

[This is preliminary documentation and subject to change.]

ISpThreadControl::WindowHandle

ISpThreadControl::WindowHandle

```
HWND  WindowHandle ( void );
```

Parameters

None.

Return values

| Value | Description |
|-------|-------------|
| S_OK  | Method completed successfully. |

---

[This is preliminary documentation and subject to change.]

ISpThreadControl::ThreadCompleteEvent

ISpThreadControl::ThreadCompleteEvent

```
HANDLE  ThreadCompleteEvent ( void );
```

Parameters

None.

Return values

| Value | Description |
|---|---|
| S_OK | Method completed successfully. |

© 1995-2000 Microsoft Corporation. All rights reserved.

[This is preliminary documentation and subject to change.]

ISpThreadControl::ExitThreadEvent

ISpThreadControl::ExitThreadEvent

```
HANDLE    ExitThreadEvent(void);
```

Parameters none.

© 1995-2000 Microsoft Corporation. All rights reserved

Microsoft Speech SDK
with SAPI 5.0

[This is preliminary documentation and subject to change.]

ISpThreadTask

The ISpThreadTask interface simplifies thread-based operations. It allows SAPI to handle specific aspects of threads and thereby avoiding more complex Win32 operations.

When to Implement

If applications need this interface, there are three methods that need to be implemented and they are application specific. These methods may also be defined in more than once instance.

Note:

This is not a COM interface.

Methods in Vtable Order

| ISpThreadTask Methods | Description |
|---|---|
| InitThread | Attempts to create a thread. |
| ThreadProc | Implements the processing of the thread. |
| WindowMessage | Implements the processing of window messages. |

ISpThreadTask::InitThread

ISpThreadTask::InitThread attempts to create a thread. The thread is created only if it has successfully met the application's criteria. This method is an alternative to creating a thread from Win32 functions.

```
virtual HRESULT STDMETHODCALLTYPE InitThread(
    void    *pvTaskData,
    HWND    hwnd
) = 0;
```

Parameters

*pvTaskData*
    [in] The specific information for the application.
*hwnd*
    [in] A window handle.

Return values

| | |
|---|---|
| S_OK | Function completed successfully. |
| S_FAILED | Function failed and should not create a new thread. |

© 1995-2000 Microsoft Corporation. All rights res

---

[This is preliminary documentation and subject to change.] 

ISpThreadTask::ThreadProc

ISpThreadTask::ThreadProc implements the processing of the thread. This method will be application specific.

```
virtual HRESULT STDMETHODCALLTYPE ThreadProc(
    void                    *pvTaskData,
    HANDLE                  hExitThreadEvent,
    HANDLE                  hNotifyEvent,
    HWND                    hwndWorker,
    volatile const BOOL     *pfContinueProcessing
) = 0;
```

Parameters

*\*pvTaskData*
    [in] The specific information for the application.
*hExitThreadEvent*

[in, out] A handle to a thread object or an array of thread objects.
*hNotifyEvent*
[in] A handle to the notification event.
*hwndWorker*
[in] A window handle.
*pfContinueProcessing*
[in] Boolean flag indicating whether to continue processing. TRUE indicates the process should continue; FALSE otherwise.

Return values

| | |
|---|---|
| S_OK | Function completed successfully. |
| S_FAILED | Function failed. |

© 1995-2000 Microsoft Corporation. All right

[This is preliminary documentation and subject to change.]

ISpThreadTask::WindowMessage

ISpThreadTask::WindowMessage implements the processing of window messages. Not all applications will need a window and this method may be left unimplemented. However, SAPI maintains a hidden window and messages posted will require this method.

```
virtual LRESULT STDMETHODCALLTYPE WindowMessage(
    void    *pvTaskData,
    HWND    hWnd,
    UINT    Msg,
    WPARAM  wParam,
    LPARAM  lParam
) = 0;
```

Parameters

*pvTaskData*
[in] The specific information for the application.
*hWnd*
[in] A window handle.
*Msg*
[in] The type of window message.
*wParam*
Application-specific information. This will change based on the *Msg* value.
*lParam*
Application-specific information. This will change based on the *Msg* value.

Return values

The return value is application specific.

Speech Recognition Manager (DDI-level)

The following section covers:

- ISpPhraseBuilder

© 1995-2000 Microsoft Corporation All right

Microsoft Speech SDK
with SAPI 5.0

[This is preliminary documentation and subject to change.]

ISpPhraseBuilder

Note: The ISpPhraseBuilder interface inherits from ISpPhrase.

Methods in Vtable Order

| ISpPhraseBuilder Methods | Description |
| --- | --- |
| InitFromPhrase | Initializes from a phrase. |
| InitFromSerializedPhrase | Initializes a phrase from a serialized phrase. |
| AddElements | Adds a copy of the given element to the end of this object's element list. |
| AddRules | Adds phrase rules to the phrase object. |
| AddProperties | Adds property entries to the phrase object. |
| AddReplacements | Adds one or more text replacements to the phrase. |

© 1995-2000 Microsoft Corporation All rigl

[This is preliminary documentation and subject to change.]

ISpPhraseBuilder::InitFromPhrase

ISpPhraseBuilder::InitFromPhrase initializes from a phrase.

```
HRESULT InitFromPhrase(
    const   SPPHRASE   *pSrcPhrase
);
```

Parameters

*pSrcPhrase*

Address of a SPPHRASE data structure containing the phrase information. If *pSrcPhrase* is NULL, then the object is reset to its initial state.

Return values

| Value | Description |
| --- | --- |
| S_OK | Function completed successfully. |
| E_INVALIDARG | *pSrcPhrase* or *pSrcPhrase->Rule.pNextSibling* is invalid or bad. Alternatively, *pSrcPhrase->LangID* may be zero or *pSrcPhrase->cbSize* does not indicate the same size as *pSrcPhrase*. |
| FAILED(hr) | Appropriate error message. |

Example

The following code snippet demonstrates creating and initializing from a phrase.

```
HRESULT hr;

CComPtr<ISpPhraseBuilder>  cpPhraseBuilder;
CComPtr<ISpPhrase>         cpPhrase;
CSpPhrasePtr               pPhrase;

hr = cpPhraseBuilder.CoCreateInstance( CLSID_SpPhraseBuilder );
//Check return value hr = GetStdRecognition_Phrase( &cpPhrase, CLSID_SpSharedRecogognizer );

hr = cpPhrase->GetPhrase(&pPhrase );
//Check return value hr = cpPhraseBuilder->InitFromPhrase( pPhrase );
//Check return value
```

© 1995-2000 Microsoft Corporation. All rights reserve

[This is preliminary documentation and subject to change.] 

ISpPhraseBuilder::InitFromSerializedPhrase

ISpPhraseBuilder::InitFromSerializedPhrase initializes a phrase from a serialized phrase.

```
HRESULT InitFromSerializedPhrase(
    const   SPSERIALIZEDPHRASE   *pPhrase
);
```

Parameters

*pPhrase*
  Address of the SPSERIALIZEDPHRASE structure that contains the phrase information.

Return values

| Value | Description |
|---|---|
| S_OK | Function completed successfully. |
| E_INVALIDARG | *pSrcPhrase* or *pSrcPhrase->cbSerializedSize* is invalid or bad. |
| FAILED(hr) | Appropriate error message. |

Example

The following code fragment demonstrates InitFromSerializedPhrase.

```
HRESULT hr;
CComPtr<ISpRecoResult>      RecoResult;
CComPtr<ISpPhraseBuilder>   pPhraseBuilder;
SPSERIALIZEDPHRASE          *SerializedPhrase=NULL;
SPSERIALIZEDPHRASE          *pSerPhrase=NULL;
ULONG                       SerSize;
CComPtr<IStream>            cpStream;

LARGE_INTEGER   liZero = {0,0};

hr = Init( &cpRecoResult );
// Check result

// Get SerializedPhrase
hr = cpRecoResult->GetSerializedPhrase(&pSerializedPhrase);

if(SUCCEEDED(hr))
    // Check for pSerializedPhrase != NULL

CreateStreamOnHGlobal(NULL, true, &cpStream);

if (cpStream)
        hr = cpStream->Write(pSerializedPhrase, pSerializedPhrase->ulSerializedSiz hr = cpStream->Seek(liZero, STREAM_SEEK_SET, NULL);
if (SUCCEEDED(hr))
        hr = cpStream->Read((void *)&SerSize, sizeof(SerSize), NULL);

pSerPhrase = (SPSERIALIZEDPHRASE*)::CoTaskMemAlloc(SerSize);

hr = cpStream->Seek(liZero, STREAM_SEEK_SET, NULL);
        if (SUCCEEDED(hr))
                hr = cpStream->Read((void *)pSerPhrase, SerSize, NULL);

hr = cpPhraseBuilder.CoCreateInstance( CLSID_SpPhraseBuilder );
        // Check result hr = cpPhraseBuilder->InitFromSerializedPhrase( pSerPhrase );
        // Check result ::CoTaskMemFree( pSerializedPhrase );
```

© 1995-2000 Microsoft Corporation All rights reserved

---

[This is preliminary documentation and subject to change.]

ISpPhraseBuilder::AddElements

ISpPhraseBuilder::AddElements adds a copy of the given element to the end of this object's element list.

```
HRESULT AddElements(
    ULONG                cElements,
    const SPPHRASEELEMENT *pElement
);
```

Parameters

*cElements*
    Specifies the number of phrase elements to add.
*pElement*
    Address of the SPPHRASEELEMENT data structure containing the phrase element to add.

Return values

| Value | Description |
| --- | --- |
| S_OK | Function completed successfully. |
| E_INVALIDARG | One or more arguments are invalid. |
| SPERR_UNINITIALIZED | The object has not been properly initialized. |
| FAILED(hr) | Appropriate error message. |

© 1995-2000 Microsoft Corporation All rights res

[This is preliminary documentation and subject to change.] 

ISpPhraseBuilder::AddRules

ISpPhraseBuilder::AddRules adds phrase rules to the phrase object.

```
HRESULT AddRules(
    const SPPHRASERULEHANDLE   hParent,
    const SPPHRASERULE         *pRule,
    SPPHRASERULEHANDLE         *phNewRule
);
```

Parameters

*hParent*
    Handle to the parent phrase rule.
*pRule*
    Address of the SPPHRASERULE structure that contains the phrase rule information.
*phNewRule*
    Address of the SPPHRASERULEHANDLE structure that contains the new phrase rule information.

Return values

| Value | Description |
|---|---|
| S_OK | Function completed successfully. |
| E_POINTER | Invalid pointer. |
| SPERR_UNINITIALIZED | The object has not been properly initialized. |
| FAILED(hr) | Appropriate error message. |

© 1995-2000 Microsoft Corporation All rights res

[This is preliminary documentation and subject to change.] 

ISpPhraseBuilder::AddProperties

ISpPhraseBuilder::AddProperties adds property entries to the phrase object.

```
HRESULT AddProperties(
    const SPPHRASEPROPERTYHANDLE hParent,
    const SPPHRASEPROPERTY       *pProperty,
    SPPHRASEPROPERTYHANDLE       *phNewProperty
);
```

Parameters

*hParent*
    Handle to the parent phrase element.
*pProperty*
    Address of the SPPHRASEPROPERTY structure that contains the property information.
*phNewProperty*
    Address of the SPPHRASEPROPERTYHANDLE structure that contains the new property information.

Return values

| Value | Description |
|---|---|
| S_OK | Function completed successfully. |
| E_INVALIDARG | One or more arguments are invalid. |
| E_POINTER | Invalid pointer. |
| SPERR_UNINITIALIZED | The object has not been properly initialized. |
| SPERR_ALREADY_INITIALIZED | The object has already been initialized. |
| FAILED(hr) | Appropriate error message. |

© 1995-2000 Microsoft Corporation All rights res

[This is preliminary documentation and subject to change.] 

ISpPhraseBuilder::AddReplacements

ISpPhraseBuilder::AddReplacements adds one or more text replacements to the phrase.

```
HRESULT AddReplacements(
    ULONG                       cReplacements,
    const SPPHRASEREPLACEMENT   *pReplacements
);
```

Parameters

*cReplacements*
    The number of replacement phrase elements.
*pReplacements*
    Address of the SPPHRASEREPLACEMENT structure that contains the phrase element replacement information.

Return values

| Value | Description |
| --- | --- |
| S_OK | Function completed successfully. |
| E_INVALIDARG | One or more arguments are invalid. |
| SPERR_UNINITIALIZED | The object has not been properly initialized. |
| FAILED(hr) | Appropriate error message. |

© 1995-2000 Microsoft Corporation All righ

Microsoft Speech SDK
with SAPI 5.0

[This is preliminary documentation and subject to change.]

Speech Recognition Engine Manager (DDI-level)

The following section covers:

- ISpPrivateEngineCall
- ISpSREngine
- ISpSREngineSite
- ISpSRAlternates

© 1995-2000 Microsoft Corporation All rig

Microsoft Speech SDK
with SAPI 5.0

[This is preliminary documentation and subject to change.]

ISpPrivateEngineCall

When to Implement

Implemented by SAPI and inherits from ISpRecoContext. Private Engine Call is initialized by the engine extension object while it is being created.

Methods in Vtable Order

| ISpPrivateEngineCall Methods | Description |
| --- | --- |
| CallEngine | Allows an engine-specific call. |

© 1995-2000 Microsoft Corporation. All rights res<

[This is preliminary documentation and subject to change.] 

ISpPrivateEngineCall::CallEngine

ISpPrivateEngineCall::CallEngine allows an engine specific call.

It is called from the engine extension object to the engine object.

```
HRESULT CallEngine(
    PVOID   pCallFrame,
    ULONG   ulCallFrameSize
);
```

Parameters

*pCallFrame*
    [in, out] The engine-specific structured block of memory parameters. This block will be marshalled in the shared engine case and must not contain pointers to other memory allocations. It must be fully self-contained and relative only to itself.

*ulCallFrameSize*
    [in] Size, in bytes, of the *pCallFrame* structure.

Return values

| Value | Description |
| --- | --- |
| S_OK | Function completed successfully. |
| E_FAILED | No engine could be found. |
| FAILED (hr) | Appropriate error message. |

ISpSREngine

The speech recognition engine implements the interface ISpSREngine.

Note: The ISpSREngine interface inherits from ISpCFGEngineClient.

Methods in Vtable Order

| ISpSREngine Methods | Description |
| --- | --- |
| SetSite | Sets the ISpEngineSite interface for the engine to use. |
| GetInputAudioFormat | Gets the format of the input audio stream. |
| RecognizeStream | Begins recognition processing on a stream. |
| SetRecoProfile | Sets the profile information of the recognition profile token. |
| OnCreateGrammar | Creates a text buffer structure and returns a pointer to it. |
| OnDeleteGrammar | Removes the text buffer structure. |
| LoadProprietaryGrammar | Loads an engine specific grammar. |
| UnloadProprietaryGrammar | Unloads the engine specific grammar. |
| SetProprietaryRuleState | Sets the proprietary grammar rule state. |
| SetProprietaryRuleIdState | Sets the proprietary grammar rule ID state. |
| LoadSLM | Loads an engine specific statistical language model (SLM). |
| UnloadSLM | Unloads an engine specific statistical language model (SLM). |
| SetSLMState | Sets the initial state of the SR engine's SLM. |
| SetWordSequenceData | Sets the SR engine word sequence data. |
| SetTextSelection | Copies the currently selected text into the grammar. |
| IsPronounceable | Gets the IPA pronunciation of a word's pronunciation id. |
| OnCreateRecoContext | Sets the driver context cookie to NULL. |
| OnDeleteRecoContext | Notifies the engine that a recognition context is being destroyed. |
| PrivateCall | Gets or sets miscellaneous information about the engine. |
| SetAdaptationData | Sets the SR engine text data associated with the language model adaptation. |
| SetPropertyNum | Sets the numerical property attribute information of the SR engine. |
| GetPropertyNum | Retrieves the numerical property attribute information of the SR engine. |
| SetPropertyString | Sets the text property attribute information of the SR engine. |
| GetPropertyString | Retrieves the text property attribute information of the SR engine. |
| SetGrammarState | Changes the state of a proprietary to determine if specific grammar rules should be recognized. |

ISpSREngine::SetSite

ISpSREngine::SetSite sets the ISpEngineSite interface for the engine to use. It also passes the SAPI 5 CFG language model if it is available.

```
HRESULT SetSite(
    ISpSREngineSite    *pSite
);
```

Parameters

*pSite*
    Pointer to the ISpEngineSite interface of the engine to use.

Return values

| Value | Description |
| --- | --- |
| S_OK | Function completed successfully. |
| E_OUTOFMEMORY | Exceeded available memory. |
| FAILED(hr) | Appropriate error message. |

© 1995-2000 Microsoft Corporation. All rights reserved.

[This is preliminary documentation and subject to change.]

ISpSREngine::GetInputAudioFormat

ISpSREngine::GetInputAudioFormat gets the format of the input audio stream.

```
HRESULT GetInputAudioFormat(
    const GUID          *pSourceFormatId,
    const WAVEFORMATEX  *pSourceWFEX,
    GUID                *pDesiredFormatId,
    WAVEFORMATEX        **ppCoMemDesiredWFEX,
    ULONG               *pulBasicBlockSize
);
```

Parameters

*pSourceFormatId*
    The GUID of the source file format. Not currently used.
*pSourceWFEX*
    [in] Address of the WAVEFORMATEX structure containing the wave file format information.
*pDesiredFormatId*

The GUID of the intended format.
*ppCoMemDesiredWFEX*
    The complete wave file format information.
*pulBasicBlockSize*
    The basic block size of the wave based on the sampling rate. If the driver does not use a fixed block size, zero is passed back.

Return values

| Value | Description |
| --- | --- |
| S_OK | Function completed successfully. |
| SPERR_FORMAT_NOT_SUPPORTED | A local id was not found or is not supported. |
| E_OUTOFMEMORY | Insufficient memory to allocate acoustic model. |
| E_FAIL | Speech user is invalid or not initialized. |
| E_UNEXPECTED | Sampling rate is not valid. |
| FAILED (hr) | Appropriate error message. |

© 1995-2000 Microsoft Corporation. All rights reserv

---

[This is preliminary documentation and subject to change.] 

ISpSREngine::RecognizeStream

ISpSREngine::RecognizeStream begins recognition processing on a stream. The processing continues until the buffer is empty or is explicitly stopped. This method is implemented by the application.

```
HRESULT Function(
    REFGUID              rguidFmtId,
    const WAVEFORMATEX   *pWaveFormatEx,
    HANDLE               hRequestSync,
    HANDLE               hDataAvailable,
    HANDLE               hExit,
    BOOL                 fNewAudioStream,
    BOOL                 fRealTimeAudio,
    ISpObjectToken    s  *pAudioObjectToken
);
```

Parameters

*rguidFmtId*
    [in] The REFGUID for the format to recognize
*pWaveFormatEx*
    [in] Address of a WAVEFORMATEX structure describing the input format.
*hRequestSync*
    [in] Handle to the task queue allowing or denying stream synchronization.
*hDataAvailable*
    [in] Handle to the event indicating available data.
*hExit*
    [in] Handle to exit event.
*fNewAudioStream*

[in] Indicates whether the input is a new stream or not. TRUE means it is a newly created stream; FALSE otherwise.

*fRealTimeAudio*
    [in] Indicates whether the input is real time audio or not. TRUE means it is real time audio; FALSE otherwise

*pAudioObjectToken*
    [in] The object token interface for the stream.

Return values

| Value | Description |
| --- | --- |
| S_OK | Function completed successfully. |
| FAILED (hr) | Appropriate error message. |

© 1995-2000 Microsoft Corporation. All rights reserved

[This is preliminary documentation and subject to change.] 

ISpSREngine::SetRecoProfile

ISpSREngine::SetRecoProfile sets the profile information of the recognition profile token.

```
HRESULT SetRecoProfile(
    ISpObjectToken    *pProfile
);
```

Parameters

*pProfile*
    Address of an ISpObjectToken object that contains the recognition profile token information.

Return values

| Value | Description |
| --- | --- |
| S_OK | Function completed successfully. |
| E_OUTOFMEMORY | Exceeded available memory. |
| FAILED(hr) | Appropriate error message. |

© 1995-2000 Microsoft Corporation All rights reserved

[This is preliminary documentation and subject to change.] 

ISpSREngine::OnCreateGrammar

ISpSREngine::OnCreateGrammar creates a text buffer structure and passes back a pointer to it as the *ppvEngineGrammar* cookie which the speech recognition (SR) engine will receive as part of the SPTEXTBUF transition.

```
HRESULT OnCreateGrammar(
    void              *pvEngineRecoContext,
    SPGRAMMARHANDLE   hSAPIGrammar,
    void              **ppvEngineGrammar
);
```

Parameters

*pvEngineRecoContext*
    [in] The engine's recognition context.
*hSAPIGrammar*
    [in] Handle to the SAPI grammar.
*ppvEngineGrammar*
    [out] Address of a pointer to a *ppvEngineGrammar* that contains the grammar cookie.

Return values

| Value | Description |
| --- | --- |
| S_OK | Function completed successfully. |
| E_INVALIDARG | One or more arguments are invalid. |
| E_OUTOFMEMORY | Exceeded available memory. |
| FAILED(hr) | Appropriate error message. |

© 1995-2000 Microsoft Corporation. All r

[This is preliminary documentation and subject to change.]

ISpSREngine::OnDeleteGrammar

ISpSREngine::OnDeleteGrammar removes the text buffer structure.

```
HRESULT OnDeleteGrammar(
    void    *pvEngineGrammar
);
```

Parameters

*pvEngineGrammar*
    [in] Address of the text buffer structure that is being removed.

Return values

| Value | Description |
| --- | --- |
| S_OK | Function completed successfully. |
| E_INVALIDARG | One or more arguments are invalid. |
| FAILED(hr) | Appropriate error message. |

ISpSREngine::LoadProprietaryGrammar

ISpSREngine::LoadProprietaryGrammar loads an engine with either specific or proprietary grammar.

```
HRESULT LoadProprietaryGrammar(
    void            *pvEngineGrammar,
    REFGUID         rguidParam,
    const WCHAR     *pszStringParam,
    const void      *pvDataParam,
    ULONG           ulDataSize.
    SPLOADOPTIONS   Options
);
```

Parameters

*pvEngineGrammar*
    [in] The address of the driver's grammar cookie.
*rguidParam*
    [in] Unique identifier of the grammar.
*pszStringParam*
    [in, string] Address of a null-terminated string containing proprietary grammar string parameters.
*pvDataParam*
    [in] Pointer to the grammar image.
*ulDataSize*
    [in] Size, in bytes, of the grammar image.
*Options*
    [in] One of the grammar loading options specified in the SPLOADOPTIONS enumeration sequence.

Return values

| Value | Description |
| --- | --- |
| S_OK | Function completed successfully. |
| E_INVALIDARG | *pvDataParam* or *ppvEngineGrammar* is invalid or bad. |
| E_OUTOFMEMORY (hr) | Insufficient memory available for allocations. |
| FAILED (hr) | Appropriate error message. |

© 1995-2000 Microsoft Corporation. All rights res

---

[This is preliminary documentation and subject to change.] 

ISpSREngine::UnloadProprietaryGrammar

ISpSREngine::UnloadProprietaryGrammar unloads the engine specific grammar.

```
HRESULT UnloadProprietaryGrammar(
    void    *pvEngineGrammar
);
```

Parameters

*pvEngineGrammar*
    [in] Address of the driver's grammar cookie.

Return values

| Value | Description |
|---|---|
| S_OK | Function completed successfully. |

© 1995-2000 Microsoft Corporation. All rights reser

[This is preliminary documentation and subject to change.] 

ISpSREngine::SetProprietaryRuleState

ISpSREngine::SetProprietaryRuleState sets the proprietary grammar rule state.

```
HRESULT SetProprietaryRuleState(
    void         *pvEngineGrammar,
    const WCHAR  *pszName,
    const WCHAR  *pszValue,
    SPRULESTATE   NewState,
    ULONG        *pcRulesChanged
);
```

Parameters

*pvEngineGrammar*
    [in] The engine's proprietary grammar rule.
*pszName*
    [in, string] Address of a null-terminated string that contains the grammar rule name information.
*pszValue*
    [in, string] Address of a null-terminated string that contains the grammar rule value information.
*NewState*
    [in] One of the grammar rule states specified in the SPRULESTATE enumeration sequence.
*pcRulesChanged*
    [out] The number of grammar rules being set.

Return values

| Value | Description |
|---|---|
| S_OK | Function completed successfully. |
| E_INVALIDARG | *pvEngineGrammar* is invalid or bad. |
| FAILED(hr) | Appropriate error message. |

© 1995-2000 Microsoft Corporation. All rights rese

[This is preliminary documentation and subject to change.]

ISpSREngine::SetProprietaryRuleIdState

ISpSREngine::SetProprietaryRuleIdState sets the propriety grammar rule ID state.

```
HRESULT SetProprietaryRuleIdState(
    void         *pvEngineGrammar,
    DWORD        dwRuleId,
    SPRULESTATE  NewState
);
```

Parameters

*pvEngineGrammar*
 [in] The engine's proprietary grammar rule.
*dwRuleId*
 [in] The engine propriety grammar rule identifier.
*NewState*
 [in] One of the grammar rule states specified in the SPRULESTATE enumeration sequence.

Return values

| Value | Description |
|---|---|
| S_OK | Function completed successfully. |
| E_INVALIDARG | One or more arguments are invalid. |
| FAILED(hr) | Appropriate error message. |

© 1995-2000 Microsoft Corporation All rights rese

[This is preliminary documentation and subject to change.]

ISpSREngine::LoadSLM

ISpSREngine::LoadSLM loads an engine specific statistical language model (SLM).

```
HRESULT LoadSLM(
    void         *pvEngineGrammar,
    const WCHAR  *pszTopicName
);
```

Parameters

*pvEngineGrammar*
　　　　[in] The current grammar for the engine.
*pszTopicName*
　　　　[in, string] Address of a null-terminated string that specifies the SLM name information. The default SLM is loaded if the value of *pszTopicName* is NULL.

Return values

| Value | Description |
| --- | --- |
| S_OK | Function completed successfully. |
| E_INVALIDARG | *pvEngineGrammar* is invalid or bad. |
| E_OUTOFMEMORY | Exceeded available memory. |
| FAILED(hr) | Appropriate error message. |

© 1995-2000 Microsoft Corporation. All rights reser

---

[This is preliminary documentation and subject to change.] 

ISpSREngine::UnloadSLM

ISpSREngine::UnloadSLM unloads an engine specific statistical language model (SLM).

```
HRESULT UnloadSLM(
    void    *pvEngineGrammar
);
```

Parameters

*pvEngineGrammar*
　　　　[in] The current grammar for the engine.

Return values

| Value | Description |
| --- | --- |
| S_OK | Function completed successfully. |
| E_INVALIDARG | *pvEngineGrammar* is invalid or bad. |
| FAILED(hr) | Appropriate error message. |

© 1995-2000 Microsoft Corporation All rights reser

---

[This is preliminary documentation and subject to change.] 

ISpSREngine::SetSLMState

ISpSREngine::SetSLMState sets the initial state of the SR engine's statistical language model (SLM).

```
HRESULT SetSLMState(
    void          *pvEngineGrammar,
    SPRULESTATE   NewState
);
```

Parameters

*pvEngineGrammar*
    [in] The current grammar for the engine.
*NewState*
    [in] One of the grammar rule states specified in the SPRULESTATE enumeration sequence.

Return values

| Value | Description |
| --- | --- |
| S_OK | Function completed successfully. |
| E_INVALIDARG | One or more arguments are invalid. |
| FAILED(hr) | Appropriate error message. |

© 1995-2000 Microsoft Corporation. All rights rese

[This is preliminary documentation and subject to change.] 

ISpSREngine::SetWordSequenceData

ISpSREngine::SetWordSequenceData sets the SR engine word sequence data.

```
HRESULT SetWordSequenceData(
    void                       *pvEngineGrammar,
    const WCHAR                *pText,
    ULONG                      cchText,
    const SPTEXTSELECTIONINFO  *pInfo
);
```

Parameters

*pvEngineGrammar*
    [in] The current grammar for the engine.
*pText*
    [in] The text selection information.
*cchText*
    [in] The length, in characters, of the text buffer.
*pInfo*
    [in] Address of the SPTEXTSELECTIONINFO structure that contains the sequence information.

Return values

| Value | Description |
|---|---|
| S_OK | Function completed successfully. |
| FAILED(hr) | Appropriate error message. |

© 1995-2000 Microsoft Corporation. All rights reserved.

[This is preliminary documentation and subject to change.] 

ISpSREngine::SetTextSelection

ISpSREngine::SetTextSelection copies the currently selected text into the grammar.

```
HRESULT SetTextSelection(
    void                  *pvEngineGrammar,
    const  SPTEXTSELECTIONINFO  *pInfo
);
```

Parameters

*pvEngineGrammar*
    [in] The current grammar for the engine.
*pInfo*
    [in] The text selection information.

Return values

| Value | Description |
|---|---|
| S_OK | Function completed successfully. |
| E_INVALIDARG | *pvEngineGrammar* is invalid or bad. |
| FAILED(hr) | Appropriate error message. |

© 1995-2000 Microsoft Corporation. All rights reserved.

[This is preliminary documentation and subject to change.] 

ISpSREngine::IsPronounceable

ISpSREngine::IsPronounceable gets the International Phonetic Alphabet (IPA) pronunciation of a word's pronunciation id.

```
HRESULT IsPronounceable(
    void          *pvDrvGrammar,
    const  WCHAR  *pszWord,
    BOOL          *pfPronounceable
);
```

Parameters

*pvDrvGrammar*
 [in] The driver's grammar cookie.
*pszWord*
 [in] The word to test.
*pfPronounceable*
 [out] Flag indicating the results of the test. TRUE, if a pronunciation was found; FALSE, otherwise.

Return values

| Value | Description |
| --- | --- |
| S_OK | Method completed successfully. |
| E_NOTIMPL | The SLM interface is not available. |
| FAILED(hr) | Appropriate error message. |

See Also

ISpRecoGrammar::IsPronounceable

© 1995-2000 Microsoft Corporation. All rights

[This is preliminary documentation and subject to change.] 

ISpSREngine::OnCreateRecoContext

ISpSREngine::OnCreateRecoContext notifies the engine that a recognition context is being created.

```
HRESULT OnCreateRecoContext(
    void    *pvSapiContext,
    void    **ppvEngineContext
);
```

Parameters

*pvSapiContext*
 [in] Handle to the recognition context.
*ppvEngineContext*
 [out] Pointer to engine-specific information.

Return values

| Value | Description |
| --- | --- |
| NOERROR | Call succeeds. |

ISpSREngine::OnDeleteRecoContext

ISpSREngine::OnDeleteRecoContext notifies the engine that a recognition context is being destroyed.

Note: This method performs no operation and returns S_OK.

```
HRESULT OnDeleteRecoContext(
    void    *pvEngineContext
);
```

Parameters

*pvEngineContext*
    [in] Pointer to the engine context value returned from a previous call to ISpSREngine::OnCreateRecoContext for this context.

Return values

| Value | Description |
| --- | --- |
| S_OK | Only possible return value. |

© 1995-2000 Microsoft Corporation. All rig

[This is preliminary documentation and subject to change.]

ISpSREngine::PrivateCall

ISpSREngine::PrivateCall gets or sets miscellaneous information about the engine.

```
HRESULT PrivateCall(
    VOID    *pvEngineCtxtCookie,
    void    *pCallFrame,
    ULONG   ulCallFrameSize,
);
```

Parameters

*pvEngineCtxtCookie*
    [in] The driver's recognition context cookie.
*pCallFrame*
    [in] Pointer to the private data.
*ulCallFrameSize*
    [in] Size, in bytes, of the private data.

Return values

| Value | Description |
|---|---|
| S_OK | Function completed successfully. |
| E_INVALIDARG | *pCallFrame* is not a recognized value. |
| FAILED (hr) | Appropriate error message. |

© 1995-2000 Microsoft Corporation. All rights reserved.

[This is preliminary documentation and subject to change.] 

ISpSREngine::SetAdaptationData

ISpSREngine::SetAdaptationData sets the SR engine text data associated with the language model adaptation.

```
HRESULT SetAdaptationData(
    void         *pvEngineContext,
    const WCHAR  *pCoMemAdaptationData,
    const ULONG  cch
);
```

Parameters

*pvEngineContext*
    [in] Address of the SR engine context information.
*pCoMemAdaptationData*
    Address of the adaption data information. Applications implementing this method must call CoTaskMemFree() to free memory associated with this string.
*cch*
    The number of SR engine text data items.

Return values

| Value | Description |
|---|---|
| S_OK | Function completed successfully. |
| E_OUTOFMEMORY | Exceeded available memory. |
| FAILED(hr) | Appropriate error message. |

© 1995-2000 Microsoft Corporation. All rights reserved.

[This is preliminary documentation and subject to change.] 

ISpSREngine::SetPropertyNum

ISpSREngine::SetPropertyNum sets the numerical property attribute information of the SR engine.

```
HRESULT SetPropertyNum(
```

```
SPPROPSRC       eSrc,
void            *pvSrcObj,
const WCHAR     *pName,
LONG            lValue
);
```

Parameters

*eSrc*
    [in] One of the recognition context types specified in the SPPROPSRC enumeration sequence.
*pvSrcObj*
    [in] Address of the object containing the property name and value information.
*pName*
    [in] Address of the string containing the property attribute name information.
*lValue*
    [in] Address of the value containing the property attribute value information.

Return values

| Value | Description |
|---|---|
| S_OK | Function completed successfully. |
| FAILED(hr) | Appropriate error message. |

© 1995-2000 Microsoft Corporation. All rights reserved.

[This is preliminary documentation and subject to change.] 

ISpSREngine::GetPropertyNum

ISpSREngine::GetPropertyNum retrieves the numerical property attribute information of the SR engine.

```
HRESULT GetPropertyNum(
    SPPROPSRC       eSrc,
    void            *pvSrcObj,
    const WCHAR     *pName,
    LONG            *lValue
);
```

Parameters

*eSrc*
    [in] One of the recognition context types specified in the SPPROPSRC enumeration sequence.
*pvSrcObj*
    [in] Address of the object containing the property name and value information.
*pName*
    [in] Address of the string containing the property attribute name information.
*lValue*
    [out] Address of the value containing the property attribute value information.

Return values

| Value | Description |
|---|---|
| S_OK | Function completed successfully. |
| FAILED(hr) | Appropriate error message. |

© 1995-2000 Microsoft Corporation All rights reserved.

[This is preliminary documentation and subject to change.] 

ISpSREngine::SetPropertyString

ISpSREngine::SetPropertyString sets the text property attribute information of the SR engine.

```
HRESULT SetPropertyString(
    SPPROPSRC     eSrc,
    void          *pvSrcObj,
    const WCHAR   *pName,
    const WCHAR   *pValue
);
```

Parameters

*eSrc*
    [in] One of the recognition context types specified in the SPPROPSRC enumeration sequence.
*pvSrcObj*
    [in] Address of the object containing the property name and value information.
*pName*
    [in] Address of the string containing the property attribute name information.
*pValue*
    [in] Address of the value containing the property attribute value information.

Return values

| Value | Description |
|---|---|
| S_OK | Function completed successfully. |
| FAILED(hr) | Appropriate error message. |

© 1995-2000 Microsoft Corporation All rights reserved

[This is preliminary documentation and subject to change.] 

ISpSREngine::GetPropertyString

ISpSREngine::GetPropertyString retrieves the text property attribute information of the SR engine.

```
HRESULT GetPropertyString(
    SPPROPSRC     eSrc,
```

```
    void            *pvSrcObj,
    const   WCHAR   *pName,
    WCHAR           **ppCoMemValue
);
```

Parameters

*eSrc*
    [in] One of the recognition context types specified in the SPPROPSRC enumeration sequence.
*pvSrcObj*
    [in] Address of the object containing the property name and value information.
*pName*
    [in] Address of the string containing the property attribute name information.
*ppCoMemValue*
    [out] Address of a pointer to a string that receives the property attribute value information. Applications implementing this method must call CoTaskMemFree() to free memory associated with this string.

Return values

| Value | Description |
| --- | --- |
| S_OK | Function completed successfully. |
| FAILED(hr) | Appropriate error message. |

© 1995-2000 Microsoft Corporation All rights reserved

[This is preliminary documentation and subject to change.] 

ISpSREngine::SetGrammarState

ISpSREngine::SetGrammarState changes the state of a proprietary to determine if specific grammar rules should be recognized. The SR engine must implement this method itself. If the engine does not support proprietary grammars, then S_OK may be returned.

```
HRESULT SetGrammarState(
    void              *pvEngineGrammar,
    SPGRAMMARSTATE    *eGrammarState
);
```

Parameters

*pvEngineGrammar*
    [in] Void pointer to the specified grammar for the context.
*eGrammarState*
    [in] Flag of type SPGRAMMARSTATE indicating the new state of the grammar.

Return values

Return values are specific to the engine implementation.

ISpSREngineSite

The interface ISpEngineSite is implemented by SAPI and is called by the engine to get audio data and signal detected sound events, and return recognition information.

Methods in Vtable Order

| ISpSREngineSite Methods | Description |
| --- | --- |
| Read | Reads the input stream in a safe thread method. |
| DataAvailable | Retrieves the amount of data that can be read. |
| SetBufferNotifySize | (This method is not yet implemented) |
| ParseFromTransitions | Parses an ISpPhraseBuilder result from a list of transitions. |
| Recognition | Indicates an end of the phrase and to start recognition. |
| AddEvent | Retrieves a RecoContext event handle from the SR engine. |
| Synchronize | Allows the SR engine to process changes in its active grammar state. |
| GetWordInfo | Retrieves information for CFG word. |
| SetWordClientContext | Sets an engine-defined context pointer for a CFG word. |
| GetRuleInfo | Retrieves information about a CFG rule. |
| SetRuleClientContext | Sets an engine-defined context pointer for a CFG rule. |
| GetStateInfo | Retrieves transition state information for CFG transition. |
| GetResource | Retrieves a named resource from a grammar. |
| GetTransitionProperty | Retrieves the SR engine transition property information. |
| IsAlternate | Determines whether one rule is an alternate of the other. |
| GetMaxAlternates | Passes back the maximum number of alternates that should be generated for the specified rule. |
| GetContextMaxAlternates | Passes back the maximum number of alternates that should be generated for the specified recognition context. |
| UpdateRecoPos | Returns the current position of the recognizer in the stream. |

© 1995-2000 Microsoft Corporation. All rights reserved

[This is preliminary documentation and subject to change.] 

ISpSREngineSite::Read

ISpSREngineSite::Read reads the input stream in a safe thread method.

```
HRESULT Function(
    void    *pv,
    ULONG   cb,
    ULONG   *pcbRead
);
```

Parameters

*pv*
 [in] The input stream.
*cb*
 [in] Size, in bytes, of the input stream.
*pcbRead*
 [out] Number of bytes read.

Return values

| Value | Description |
| --- | --- |
| S_OK | Function completed successfully. |
| SPERR_STREAM_NOT_ACTIVE | Input stream is not defined or active. |
| E_POINTER | At least one of *pcbRead* or *pv* are invalid or bad. |
| STG_E_ACCESSDENIED | Input stream is read only and no bytes will be read. |
| FAILED (hr) | Appropriate error message. |

© 1995-2000 Microsoft Corporation. All rights reserve

[This is preliminary documentation and subject to change.] 

ISpSREngineSite::DataAvailable

ISpSREngineSite::DataAvailable retrieves the amount of data that can be read using ISpSREngineSite::Read without blocking.

```
HRESULT DataAvailable(
    ULONG   pcb
);
```

Parameters

*pcb*
 [out] The amount, in bytes, of data available. For audio streams this is the actual amount. For non-audio streams, this is the minimum known amount.

Return values

| Value | Description |
|---|---|
| S_OK | Function completed successfully. |
| E_INVALIDARG | *ullStartPos* is less than the stream minimum. |
| E_POINTER | *pullDataAvailable* or *pfNoBlock* is invalid or bad. |
| FAILED(hr) | Appropriate error message. |

© 1995-2000 Microsoft Corporation All rig

[This is preliminary documentation and subject to change.]

ISpSREngineSite::SetBufferNotifySize

Note: This method is not implemented.

```
HRESULT SetBufferNotifySize(
    ULONG    cbSize
);
```

Parameters

*cbSize*
    [in] The minimum amount of data that should be available before the event is set.

Return values

| Value | Description |
|---|---|
| S_OK | Function completed successfully. |

© 1995-2000 Microsoft Corporation. All rig

[This is preliminary documentation and subject to change.]

ISpSREngineSite::ParseFromTransitions

ISpSREngineSite::ParseFromTransitions parses an ISpPhraseBuilder result from a list of transitions.

Called by the SR engine to get an SPPHRASE. This method uses a greedy top-down search algorithm to find the semantic properties.

```
HRESULT ParseFromTransitions(
    const    SPPARSEINFO     *pParseInfo,
    ISpPhraseBuilder         **ppPhrase
);
```

Parameters

*pParseInfo*
    [in] Address of the SPPARSEINFO structure containing phrase information.

*ppPhrase*
    [out] Address of a pointer to an ISpPhraseBuilder interface that receives the phrase information.

Return values

| Value | Description |
| --- | --- |
| S_OK | Function completed successfully. |
| FAILED (hr) | Appropriate error message. |

© 1995-2000 Microsoft Corporation. All rights reserved.

[This is preliminary documentation and subject to change.] 

ISpSREngineSite::Recognition

ISpSREngineSite::Recognition indicates the end of a phrase and initiates recognition.

The phrase can be either a hypothesis or a final result. If it is a hypothesis, a global hypothesis notification is issued to all interested recognition contexts. Otherwise, a final global hypothesis notification is issued to all interested contexts. A final phrase notification is issued to the target grammar identified by the SR engine.

ISpSREngineSite::AddEvent with a SPEI_PHRASE_START as the event type must precede the call to ::Recognition. SAPI does enforce the phrase start and recognition order. *pResultInfo* must be allocated by CoTaskMemAlloc() so that ownership can pass to SAPI.

```
HRESULT Recognition(
    SPRECORESULTINFO    *pResultInfo
);
```

Parameters

*pResultInfo*
    [in] Pointer to type SPRECORESULTINFO indicating the results.

Return values

| Value | Description |
| --- | --- |
| S_OK | Function completed successfully and to continue recognition. |
| S_FALSE | Function completed successfully and the engine can terminate recognition without reading the rest of the stream. |

| | |
|---|---|
| FAILED (hr) | Appropriate error message. |

© 1995-2000 Microsoft Corporation. All rights rese

---

[This is preliminary documentation and subject to change.] 

ISpSREngineSite::AddEvent

ISpSREngineSite::AddEvent retrieves a RecoContext event handle from the SR engine.

```
HRESULT AddEvent(
    const    SPEVENT           *pEvent,
    SPRECOCONTEXTHANDLE        hContext
);
```

Parameters

*pEvent*
    [in] Address of the SPEVENT structure containing the event information.

*hContext*
    [in] The RecoContext is the event handle passed to SR Engine from SAPI through ISpSREngine::OnCreateRecoContext. A NULL value in *hContext* indicates the event is a global one.

Return values

| Value | Description |
|---|---|
| S_OK | Function completed successfully. |
| E_INVALIDARG | At least one of *pEvent* or *hContext* is invalid or bad. Alternatively, it indicates an event is being added to an inappropriate mode. |
| E_POINTER | Invalid pointer. |
| SPERR_STREAM_POS_INVALID | The current audio stream offset is greater than either the current seek position or the last sync position. Alternatively, if the event stream is not initialized the stream position is not zero. |
| FAILED(hr) | Appropriate error message. |

© 1995-2000 Microsoft Corporation. All rights rese

---

[This is preliminary documentation and subject to change.] 

ISpSREngineSite::Synchronize

ISpSREngineSite::Synchronize allows the SR engine to process changes in its active grammar state.

```
HRESULT Synchronize(
```

```
    ULONGLONG   ullStreamPos
);
```

Parameters

*ullStreamPos*
    [in] The position within the audio stream to stop processing.

Return values

| Value | Description |
|---|---|
| S_OK | Function completed successfully and to continue recognition. |
| SPERR_STREAM_NOT_ACTIVE | Stream is not initialized. |
| SPERR_STREAM_POS_INVALID | Stream position is either greater than the current seek position or less than the last synchronized position. |
| S_FALSE | Function completed successfully and the engine can terminate recognition without reading the rest of the stream. |
| FAILED (hr) | Appropriate error message. |

© 1995-2000 Microsoft Corporation. All rights reserve

[This is preliminary documentation and subject to change.] 

ISpSREngineSite::GetWordInfo

ISpSREngineSite::GetWordInfo retrieves information for CFG word.

```
HRESULT GetWordInfo(
    SPWORDENTRY     *pWordEntry,
    SPWORDINFOOPT   Options
);
```

Parameters

*pWordEntry*
    Address of the SPWORDENTRY structure that contains the grammar word entry information. The following members may be allocated with CoTaskMemAlloc() and if so, must be freed with CoTaskMemtaskFree() when no longer required.
    pWordEntry->pszDisplayText
    pWordEntry->pszLexicalForm
    pWordEntry->aPhoneId

*Options*
    One of the grammar word options specified in the SPWORDINFOOPT enumeration.

Return values

| Value | Description |
|---|---|
| S_OK | Function completed successfully. |
| E_INVALIDARG | *Options* cannot include both SPWIO_NONE and SPWIO_WANT_TEXT |
| E_OUTOFMEMORY | Not enough memory to complete the operation. |
| FAILED (hr) | Appropriate error message. |

© 1995-2000 Microsoft Corporation. All rights reserved

[This is preliminary documentation and subject to change.] 

ISpSREngineSite::SetWordClientContext

ISpSREngineSite::SetWordClientContext sets an engine-defined context pointer for a CFG word.

```
HRESULT SetWordClientContext(
    SPWORDHANDLE   hWord,
    void           *pvClientContext
);
```

Parameters

*hWord*
   The handle for a word.
*pvClientContext*
   Pointer to the word's client context.

Return values

| Value | Description |
|---|---|
| S_OK | Function completed successfully. |
| FAILED (hr) | Appropriate error message. |

© 1995-2000 Microsoft Corporation All rights reserved

[This is preliminary documentation and subject to change.] 

ISpSREngineSite::GetRuleInfo

ISpSREngineSite::GetRuleInfo retrieves information about a CFG rule.

```
HRESULT GetRuleInfo(
    SPRULEENTRY     *pRuleEntry,
    SPRULEINFOOPT   Options
);
```

Parameters

*pRuleEntry*
   [in, out] Address of the SPRULEENTRY structure that contains the grammar rule entry information.
*Options*
   [in] One of the grammar rule options specified in the SPRULEINFOOPT enumeration sequence.

Return values

| Value | Description |
|---|---|
| S_OK | Function completed successfully. |
| FAILED (hr) | Appropriate error message. |

© 1995-2000 Microsoft Corporation. All rights rese

[This is preliminary documentation and subject to change.]

ISpSREngineSite::SetRuleClientContext

ISpSREngineSite::SetRuleClientContext sets an engine-defined context pointer for a CFG rule.

```
HRESULT SetRuleClientContext(
   SPRULEHANDLE   hRule,
   void           *pvClientContext
);
```

Parameters

*hRule*
   Handle of rule that was recognized.
*pvClientContext*
   Pointer to the rule's client context.

Return values

| Value | Description |
|---|---|
| S_OK | Function completed successfully. |
| FAILED (hr) | Appropriate error message. |

© 1995-2000 Microsoft Corporation. All rights rese

[This is preliminary documentation and subject to change.]

ISpSREngineSite::GetStateInfo

ISpSREngineSite::GetStateInfo retrieves transition state information for CFG transition.

```
HRESULT GetStateInfo(
    SPSTATEHANDLE   hState,
    SPSTATEINFO     *pStateInfo
);
```

Parameters

*hState*
    Handle to the current state.
*pStateInfo*
    The state information.

Return values

| Value | Description |
| --- | --- |
| S_OK | Function completed successfully. |
| FAILED (hr) | Appropriate error message. |

© 1995-2000 Microsoft Corporation All rights

[This is preliminary documentation and subject to change.] 

ISpSREngineSite::GetResource

ISpSREngineSite::GetResource retrieves a named resource from a grammar.

Note: This method is not currently implemented.

```
HRESULT GetResource(
    SPRULEHANDLE   hRule,
    WCHAR          **ppCoMemResource
);
```

Parameters

*hRule*
    [in] The rule handle.
*ppCoMemResource*
    The resource associated with the rule. Applications implementing this method must call CoTaskMemFree() to free memory associated with this resource.

Return values

| Value | Description |
|---|---|
| S_OK | Function completed successfully. |
| E_POINTER | *ppCoMemResource* is invalid or bad. |
| E_NOTIMPL | Method is not implemented. |
| FAILED (hr) | Appropriate error message. |

© 1995-2000 Microsoft Corporation. All rights reserved

---

[This is preliminary documentation and subject to change.] 

ISpSREngineSite::GetTransitionProperty

ISpSREngineSite::GetTransitionProperty retrieves the SR engine transition property information.

```
HRESULT GetTransitionProperty(
    SPTRANSITIONID          ID,
    SPTRANSITIONPROPERTY    **ppCoMemProperty
);
```

Parameters

*ID*
    [in] The transition identifier.

*ppCoMemProperty*
    [out] Address of a pointer to a SPTRANSITIONPROPERTY that receives the transition information. Applications implementing this method must call CoTaskMemFree() to free memory associated with this resource.

Return values

| Value | Description |
|---|---|
| S_OK | Function completed successfully. |
| E_INVALIDARG | One or more arguments are invalid. |
| E_POINTER | Invalid pointer. |
| E_OUTOFMEMORY | Exceeded available memory. |
| FAILED(hr) | Appropriate error message. |

© 1995-2000 Microsoft Corporation All rights reserved

---

[This is preliminary documentation and subject to change.] 

ISpSREngineSite::IsAlternate

ISpSREngineSite::IsAlternate determines whether one rule is an alternate of the other.

```
HRESULT IsAlternate(
    SPRULEHANDLE    hPriRule,
    SPRULEHANDLE    hAltRule
);
```

Parameters

*hPriRule*
    [in] The primary rule.
*hAltRule*
    [in] The alternate rule to be checked.

Return values

| Value | Description |
| --- | --- |
| S_OK | *hAltRule* is an alternate of *hPriRule*. |
| S_FALSE | *hAltRule* is not an alternate of *hPriRule*. |
| FAILED (hr) | Appropriate error message. |

© 1995-2000 Microsoft Corporation All rights reserved

[This is preliminary documentation and subject to change.] 

ISpSREngineSite::GetMaxAlternates

ISpSREngineSite::GetMaxAlternates passes back the maximum number of alternates that should be generated for the specified rule.

```
HRESULT GetMaxAlternates(
    SPRULEHANDLE    hRule,
    ULONG           *pulNumAlts
);
```

Parameters

*hRule*
    [in] The rule to check.
*pulNumAlts*
    [out] The maximum number of alternates for the rule.

Return values

| Value | Description |
| --- | --- |
| S_OK | Function completed successfully. |
| E_POINTER | *pulNumAlts* is invalid or bad. |
| FAILED (hr) | Appropriate error message. |

ISpSREngineSite::GetContextMaxAlternates

ISpSREngineSite::GetContextMaxAlternates passes back the maximum number of alternates that should be generated for the specified recognition context. Engines supporting proprietary grammars need to call this to determine how many alternates to generate. For SAPI grammars, it is usually easier to use the ISpSREngineSite::GetMaxAlternates method.

```
HRESULT GetContextMaxAlternates(
    SPRECOCONTEXTHANDLE   hContext,
    ULONG                 *pulNumAlts
);
```

Parameters

*hContext*
 [in] Handle to the current context.
*pulNumAlts*
 [out] The number of possible alternates.

Return values

| Value | Description |
| --- | --- |
| S_OK | Function completed successfully. |
| E_POINTER | *pulNumAlts* is invalid or bad. |
| FAILED (hr) | Appropriate error message. |

© 1995-2000 Microsoft Corporation All rights reserved.

---

[This is preliminary documentation and subject to change.] 

ISpSREngineSite::UpdateRecoPos

ISpSREngineSite::UpdateRecoPos returns the current position of the recognizer in the stream to SAPI. An engine should call this regularly, up to several times a second, regardless of whether it is recognizing speech or silence.

```
HRESULT UpdateRecoPos(
    ULONGLONG   ullStreamPos
);
```

Parameters

*ullStreamPos*
    [out] The current recognizer of the stream position.

Return values

| Value | Description |
| --- | --- |
| S_OK | Function completed successfully and to continue recognition. |

© 1995-2000 Microsoft Corporation. All ri

Microsoft Speech SDK
with SAPI 5.0

[This is preliminary documentation and subject to change.]

ISpSRAlternates

ISpSRAlternates allows alternate word selection and implementation for speech recognition.

Methods in Vtable Order

| ISpSRAlternates Methods | Description |
| --- | --- |
| GetAlternates | Retrieves a list of alternate words. |
| Commit | Chooses the lexicon manager's word probability. |

© 1995-2000 Microsoft Corporation. All ri

[This is preliminary documentation and subject to change.]

ISpSRAlternates::GetAlternates

ISpSRAlternates::GetAlternates retrieves a list of alternate words.

```
HRESULT GetAlternates(
    SPPHRASEALTREQUEST   *pAltRequest,
    SPPHRASEALT          **ppAlts,
    ULONG                *pcAlts
);
```

Parameters

*pAltRequest*
    [in] A structure to the requested alternate words.
*ppAlts*
    [out] A list of SPPHRASEALT for alternate words.
*pcAlts*
    [out] The number of alternates in *ppAlts*list.

Return values

| Value | Description |
|---|---|
| S_OK | Function completed successfully. |
| FAILED (hr) | Appropriate error message. |

© 1995-2000 Microsoft Corporation. All rights res

[This is preliminary documentation and subject to change.]

ISpSRAlternates::Commit

ISpSRAlternates::Commit chooses the lexicon manager's word probability. This allows fine adjustments for the decoder to pick the new, alternate words over the current ones.

```
HRESULT Commit(
    SPPHRASEALTREQUEST    *pAltRequest,
    SPPHRASEALT           *pAlt,
    void                  **ppvResultExtra,
    ULONG                 *pcbResultExtra
);
```

Parameters

*pAltRequest*
    [in] A structure to the requested alternate words.
*pAlt*
    [in] A structure to alternate words.
*ppvResultExtra*
    [out] Additional information for the new results.
*pcbResultExtra*
    [out] Size, in bytes, of *ppvResultExtra*.

Return values

| Value | Description |
|---|---|
| S_OK | Function completed successfully. |
| FAILED (hr) | Appropriate error message. |

© 1995-2000 Microsoft Corporation. All rights res

Microsoft Speech SDK
with SAPI 5.0

[This is preliminary documentation and subject to change.]

Text To Speech Recognition Engine Manager

(DDI-level)

The following section covers:

- ISpTTSEngine
- ISpTTSEngineSite

© 1995-2000 Microsoft Corporation. All rights reserved

Microsoft Speech SDK
with SAPI 5.0

[This is preliminary documentation and subject to change.]

ISpTTSEngine

The SAPI speech synthesis (text-to-speech, or TTS) engine (driver) implements an ISpTTSEngine interface.

ISpTTSEngine::Speak is the primary method called by SAPI to perform speech rendering. SAPI, rather than the engine, performs XML parsing of the input text stream. The engine's Speak method is handed a linked list of text fragments with their associated XML attribute state. The Speak method also receives a pointer to the SpVoice's ISpTTSEngineSite interface. The TTS engine uses this interface to queue events and to write the output data.

Even though SAPI 5.0 is a free-threaded architecture, TTS engine instances will always be called by SAPI on a single thread. TTS engines are never directly accessed by applications. SAPI ensures that all parameter validation and thread synchronization has been performed properly before calling the TTS engine. All calls to the TTS engine in the release build of SAPI are within a try or except block to protect applications from faulting.

Methods in Vtable Order

| ISpTTSEngine Methods | Description |
| --- | --- |
| Speak | Speaks a text buffer. |
| GetOutputFormat | Retrieves the output stream format. |

© 1995-2000 Microsoft Corporation. All rights reserved.

[This is preliminary documentation and subject to change.]

ISpTTSEngine::Speak

ISpTTSEngine::Speak speaks a text buffer according to the associated XML state.

The Speak method renders the specified linked list of text fragments in the selected output format. All XML markups have been removed from the input text; the absolute state has been accumulated and stored in a data structure associated with each text fragment.

```
HRESULT Speak(
    DWORD            dwSpeakFlags,
    REFGUID          rguidFormatId,
    const WaveFormatEx  *pWaveFormatEx,
    const SPVTEXTFRAG   *pTextFragList,
    ISpTTSEngineSite    *pOutputSite
);
```

Parameters

*dwSpeakFlags*
    [in] Flags defining the attributes of speech. These values are contained in the SPEAKFLAGS enumeration.

*rguidFormatId*
    [in] The stream format identifier describing the desired output format.

SPDFID_Text — If SPDFID_Text is specified, the output is sent to a text buffer and *pTargetWaveFormatEx* is NULL.

SPDFID_WaveFormatEx — If SPDFID_WaveFormatEx is specified, the output type is a WAVEFORMATEX data structure.

*pWaveFormatEx*
    [in] Address of a WAVEFORMATEX structure describing the output format.

Note: WaveFormatEx is the output format when the contents of *rguidFormatId* is SPDFID_WaveFormatEx.
    The contents of *pWaveFormatEx* is NULL if *rguidFormatID* specifies SPDFID_Text.

*pTextFragList*
    [in] The fragment link list of type SPVTEXTFRAG to synthesize.

*pOutputSite*
    [in] Address of the ISpTTSEngineSite interface of the SpVoice object where events are queued and the output data is written.

Return values

| Value | Description |
| --- | --- |
| S_OK | Function completed successfully. |
| E_INVALIDARG | *rguidFormatId* or *pOutputSite* is bad or invalid. |
| E_OUTOFMEMORY | Exceeded available memory. |
| FAILED (hr) | Appropriate error message. |

© 1995-2000 Microsoft Corporation. All rights reserved

[This is preliminary documentation and subject to change.] 

ISpTTSEngine::GetOutputFormat

ISpTTSEngine::GetOutputFormat retrieves the output stream format.

If the specified output format is not supported by the engine, the engine can return either the closest format supported or the default format of the engine.

```
HRESULT GetOutputFormat(
    const GUID          *pTargetFmtId,
    const WAVEFORMATEX  *pTargetWaveFormatEx,
    GUID                *pOutputFormatId,
    WAVEFORMATEX        **ppCoMemOutputWaveFormatEx
);
```

Parameters

*pTargetFmtId*
    [in] Address of the GUID describing the output format desired by the application.

SPDFID_Text    If SPDFID_Text is specified, the output is sent to a text buffer and *pTargetWaveFormatEx* is NULL.

SPDFID_WaveFormatEx    If SPDFID_WaveFormatEx is specified, the output type is a WAVEFORMATEX data structure.

*pTargetWaveFormatEx*
    [in] Address of the WAVEFORMATEX structure describing the application's output format.
    If *pTagetFmtId* specifies SPDFID_Text, the contents of *pTargetWaveFormatEx* will be NULL.

The contents of *pTargetWaveFormatEx* must be set when *pTagetFmtId* is specified as SPDFID_WaveFormatEx.

*pOutputFormatId*
    [out] Address of the output format identifier.

SPDFID_Text    If SPDFID_Text is specified, *ppCoMemOutputWaveFormatEx* is set to NULL.

SPDFID_WaveFormatEx    If SPDFID_WaveFormatEx is specified, and the engine can support this format, then a pointer to the WAVEFORMATEX structure should be returned by the engine.

*ppCoMemOutputWaveFormatEx*
    [out] Adddress of the pointer to the WAVEFORMATEX returned by the engine.

Return values

| Value | Description |
| --- | --- |
| S_OK | Function completed successfully. |
| E_OUTOFMEMORY | *ppCoMemDesiredWaveFormatEx* could not be allocated. |
| FAILED (hr) | Appropriate error message. |

© 1995-2000 Microsoft Corporation. All rights reserved

Microsoft Speech SDK
with SAPI 5.0

[This is preliminary documentation and subject to change.]

ISpTTSEngineSite

ISpTTSEngineSite is implemented on the voice and redirects engine output based on current voice settings.

Note: The ISpTTSEngineSite interface inherits from ISpEventSink.

Methods in Vtable Order

| ISpTTSEngineSite Methods | Description |
| --- | --- |
| GetActions | Retrieves the action the engine needs to perform. |
| Write | Sends synthesized speech audio data to the TTS engine. |
| GetRate | Retrieves the current TTS engine rate. |
| GetVolume | Retrieves the output volume level of speech synthesized by an engine. |
| GetSkipInfo | Retrieves the number and type of items to be skipped in the text stream. |
| CompleteSkip | Retrieves the number of sentences skipped by the engine. |

© 1995-2000 Microsoft Corporation. All rights reserved

[This is preliminary documentation and subject to change.] 

ISpTTSEngineSite::GetActions

ISpTTSEngineSite::GetActions obtains the action that it needs to perform. SAPI returns a DWORD indicating one of several actions contained in the SPVESACTIONS enumeration.

```
DWORD GetActions ( void );
```

Parameters

None.

Return values

The DWORD indicates whether or not the engine should take any actions.

© 1995-2000 Microsoft Corporation All rights reserved

[This is preliminary documentation and subject to change.] 

ISpTTSEngineSite::Write

ISpTTSEngineSite::Write sends synthesized speech audio data to SAPI allowing it to send the audio data to the output destination.

SAPI handles sending the audio data to the correct output destination. It is important that any events associated with the audio data are queued by calling the ISpEventSink::AddEvents method prior to calling this method. This ensures proper synchronization of event firing and audio rendering.

```
HRESULT Write(
    const void  *pBuff,
    ULONG       cb,
    ULONG       *pcbWritten
);
```

Parameters

*pBuff*
    Pointer to synthesized speech audio data. The format (resolution) is specified by SAPI on the ISpTTSEngine::Speak call on which this ISpTTSEngineSite interface was passed.
*cb*
    The buffer size, in bytes, of *pBuff*.
*pcbWritten*
    Pointer to the number of bytes actually copied.

Return values

| Value | Description |
| --- | --- |
| S_OK | Function completed successfully. |
| E_INVALIDARG | *pBuff* is bad or invalid. |
| E_POINTER | *pcbWritten* is bad or invalid. |
| SPERR_UNINITIALIZED | Output stream can not be initialized. |
| FAILED (hr) | Appropriate error message. |

© 1995-2000 Microsoft Corporation. All rights reserv

[This is preliminary documentation and subject to change.]

ISpTTSEngineSite::GetRate

ISpTTSEngineSite::GetRate retrieves the current TTS engine rate.

```
HRESULT GetRate(
    long    *pRateAdjust
);
```

Parameters

*pRateAdjust*
    [out] Value specifying the units per minute rate for spoken text.

Return values

| Value | Description |
| --- | --- |
| S_OK | Function completed successfully. |
| FAILED(hr) | Appropriate error message. |

ISpTTSEngineSite::GetVolume

ISpTTSEngineSite::GetVolume retrieves the output volume level of speech synthesized by an engine.

```
HRESULT GetVolume(
  USHORT* pusVolume
);
```

Parameters

*pusVolume*
    [out] Address of the value that receives the volume level information.

Return values

| Value | Description |
| --- | --- |
| S_OK | Function completed successfully. |
| FAILED(hr) | Appropriate error message. |

© 1995-2000 Microsoft Corporation All rights reserv

---

[This is preliminary documentation and subject to change.] 

ISpTTSEngineSite::GetSkipInfo

ISpTTSEngineSite::GetSkipInfo retrieves the number and type of items to be skipped in the text stream. These items can be skipped either forward or backward within the text stream.

```
HRESULT GetSkipInfo(
   SPVSKIPTYPE   *peType,
   long          *plNumItems
);
```

Parameters

*peType*
    [out] Address of the SPVSKIPTYPE enumeration that receives the item type information.
*plNumItems*
    [out] Address of a value specifying the number of items to skip.

Return values

| Value | Description |
|---|---|
| S_OK | Function completed successfully. |
| FAILED(hr) | Appropriate error message. |

© 1995-2000 Microsoft Corporation. All rights reserved.

[This is preliminary documentation and subject to change.] 

ISpTTSEngineSite::CompleteSkip

ISpTTSEngineSite::CompleteSkip retrieves the number of sentences skipped by the engine and passes the count to SAPI.

```
HRESULT CompleteSkip(
    long    ulNumSkipped
);
```

Parameters

*ulNumSkipped*
    [in] Specifies the number of items to be skipped. Negative values result in a skip in the reverse direction, while positive values result in a skip forward. A value of zero causes the engine to skip to the beginning of the current item of the specified type.

For example, if the item type were "sentence" and the value of *ulNumSkipped* is zero, the engine will begin the sentence again. Additionally, the engine will skip to the beginning of the next sentence if the value of *ulNumSkipped* is one. Conversely, the engine will skip to the beginning of the previous sentence if the value of *ulNumSkipped* is negative one.

Return values

| Value | Description |
|---|---|
| S_OK | Function completed successfully. |
| FAILED(hr) | Appropriate error message. |

What is claimed is:

1. A multi-voice speech synthesis middleware layer of computer-readable instructions embedded on a computer-readable medium, the instructions being configured to, when executed, facilitate communication between one or more applications and a plurality of text-to-speech (TTS) engines, the multi-voice speech synthesis middleware layer comprising:

at least a first voice object having an application interface configured to receive TTS engine attribute information from the application and to instantiate first and second TTS engines based on the TTS attribute information, to receive a speak request requesting at least one of the TTS engines to speak a message, and to receive priority information associated with each speak request indicative of a precedence each speak request is to take;

wherein the first voice object has an engine interface configured to call a specified one of the first and second TTS engines to synthesize input data;

wherein the at least first voice object is configured to receive a normal priority associated with a message and to call the TTS engines so the message with normal priority is spoken in turn; and wherein the at least first voice object is configured to receive a speakover priority associated with a message and to call the TTS engines so the message with speakover priority is spoken at a same time as other currently speaking messages.

2. The multi-voice speech synthesis middleware layer of claim 1 wherein the at least first voice object is configured to receive an alert priority associated with a message and to call the TTS engines so the message with alert priority is spoken with precedence over messages with normal and speakover priority.

3. A method of formatting data for use by a speech engine and an audio device, comprising obtaining, at a middleware layer which facilitates communication between the speech engine and an application, a data format for data used by the engine;

obtaining, at the middleware layer, a data format of data used by the audio device;

determining, at the middleware layer, whether the engine data format and the audio data format are consistent; and if not, utilizing the middleware layer to reconfigure the engine to change the data format of the data used by the engine.

* * * * *